(12) United States Patent
Lakovic et al.

(10) Patent No.: US 9,329,053 B2
(45) Date of Patent: May 3, 2016

(54) ATHLETIC WATCH

(75) Inventors: Tomislav Lakovic, Portland, OR (US); Maximillian P. Burton, San Francisco, CA (US); Jamian R. Cobbett, Portland, OR (US); James Molyneux, Portland, OR (US)

(73) Assignee: Nike, Inc., Beaverton, OR (US)

( * ) Notice: Subject to any disclaimer, the term of this patent is extended or adjusted under 35 U.S.C. 154(b) by 0 days.

(21) Appl. No.: 12/767,308

(22) Filed: Apr. 26, 2010

(65) Prior Publication Data
US 2010/0331145 A1      Dec. 30, 2010

Related U.S. Application Data

(60) Provisional application No. 61/172,769, filed on Apr. 26, 2009.

(51) Int. Cl.
G04G 21/00 (2010.01)
A63B 71/06 (2006.01)
(Continued)

(52) U.S. Cl.
CPC .......... *G01C 22/006* (2013.01); *A63B 71/0622* (2013.01); *A63B 71/0686* (2013.01);
(Continued)

(58) Field of Classification Search
CPC ..... G04G 21/00; G04G 9/0064; G04G 17/04; G04G 21/02; G04G 21/08; A63B 2071/0663; A63B 2220/62; A63B 71/0622; A63B 71/0686; G04F 10/00; G07C 1/22; G01S 19/19
USPC .......... 482/1, 3, 5, 6, 7, 8, 9; 368/67, 73, 243; 342/357.57; D10/78
See application file for complete search history.

(56) References Cited

U.S. PATENT DOCUMENTS 5,504,474 A      4/1996   Libman et al.
5,699,082 A  *  12/1997   Marks et al. ................... 345/157
(Continued)

FOREIGN PATENT DOCUMENTS

CN     1424861 A     6/2003
CN     1655097 A     8/2005
(Continued)

OTHER PUBLICATIONS

Garmin: "Forerunner 405CX owner's manual" [online] Mar. 2009, Retrieved from the Internet: URL: http://www8.garmin.com/manuals/Forerunner405CX_OwnersManual.pdf, retrieved Jul. 7, 2010.
(Continued)

*Primary Examiner* — Loan H Thanh
*Assistant Examiner* — Sundhara Ganesan
(74) *Attorney, Agent, or Firm* — Banner & Witcoff, Ltd.

(57) ABSTRACT

A device for monitoring athletic performance of a user has a wristband configured to be worn by the user. An electronic module is removably attached to the wristband. The electronic module has a controller and a screen and a plurality of user inputs operably associated with the controller. The user inputs include a user input configured to be applied by the user against the screen and in a direction generally normal to the screen. The controller may further be configured to generate one or more user interfaces in response to various user inputs and conditions. For example, the controller may generate workout mode interfaces and non-workout mode interfaces including various goal information, workout data, reminders and the like. In one or more arrangements, multiple types of information may be displayed simultaneously.

18 Claims, 94 Drawing Sheets

(51) Int. Cl.
*G04G 9/00* (2006.01)
*G04F 10/00* (2006.01)
*G04G 17/04* (2006.01)
*G04G 21/02* (2010.01)
*G07C 1/22* (2006.01)
*G04G 21/08* (2010.01)
*G01S 19/19* (2010.01)
*G01C 22/00* (2006.01)

(52) U.S. Cl.
CPC ............... *G01S 19/19* (2013.01); *G04F 10/00* (2013.01); *G04G 17/04* (2013.01); *G04G 21/00* (2013.01); *G04G 21/02* (2013.01); *G04G 21/08* (2013.01); *A63B 2071/0663* (2013.01); *A63B 2220/62* (2013.01); *G04G 9/0064* (2013.01); *G07C 1/22* (2013.01)

(56) References Cited

U.S. PATENT DOCUMENTS

| | | | |
|---|---|---|---|
| 5,762,241 | A | 6/1998 | Cross |
| 5,769,290 | A | 6/1998 | Pestana |
| 5,946,274 | A | 8/1999 | Yamaguchi et al. |
| 6,013,008 | A * | 1/2000 | Fukushima ............ 482/8 |
| 6,536,941 | B1 | 3/2003 | Fang |
| 6,736,759 | B1 | 5/2004 | Stubbs et al. |
| 6,837,827 | B1 * | 1/2005 | Lee et al. ............... 482/8 |
| 7,016,263 | B2 | 3/2006 | Gueissaz et al. |
| 7,057,551 | B1 | 6/2006 | Vogt |
| 7,173,604 | B2 | 2/2007 | Marvit et al. |
| D545,220 | S | 6/2007 | Leung |
| 7,254,516 | B2 | 8/2007 | Case, Jr. et al. |
| 7,345,954 | B2 | 3/2008 | Ehrsam et al. |
| 7,398,151 | B1 * | 7/2008 | Burrell et al. ........... 701/410 |
| 7,510,508 | B2 | 3/2009 | Santomassimo et al. |
| 7,529,155 | B2 | 5/2009 | Fasciano |
| 7,603,255 | B2 | 10/2009 | Case, Jr. et al. |
| 7,670,263 | B2 * | 3/2010 | Ellis et al. ............... 482/8 |
| 7,717,827 | B2 * | 5/2010 | Kurunmaki et al. ..... 482/8 |
| 7,771,320 | B2 * | 8/2010 | Riley et al. ............. 482/9 |
| 7,789,802 | B2 * | 9/2010 | Lee et al. ................ 482/8 |
| 7,828,697 | B1 * | 11/2010 | Oberrieder et al. ..... 482/8 |
| 7,843,769 | B2 | 11/2010 | Ishida et al. |
| 8,040,758 | B1 | 10/2011 | Dickinson |
| 8,086,421 | B2 | 12/2011 | Case, Jr. et al. |
| 8,088,044 | B2 * | 1/2012 | Tchao et al. ............ 482/8 |
| 8,112,251 | B2 | 2/2012 | Case, Jr. et al. |
| 8,152,693 | B2 | 4/2012 | Nurmela et al. |
| 8,341,557 | B2 * | 12/2012 | Pisula et al. ............ 715/863 |
| 8,512,211 | B2 * | 8/2013 | Rottler et al. ........... 482/9 |
| 2002/0055419 | A1 * | 5/2002 | Hinnebusch ............ 482/8 |
| 2002/0186621 | A1 * | 12/2002 | Lai ......................... 368/82 |
| 2004/0081025 | A1 | 4/2004 | Chen |
| 2005/0033515 | A1 | 2/2005 | Bozzone |
| 2005/0209051 | A1 | 9/2005 | Santomassimo et al. |
| 2005/0212911 | A1 | 9/2005 | Marvit et al. |
| 2006/0136173 | A1 | 6/2006 | Case, Jr. et al. |
| 2007/0033069 | A1 * | 2/2007 | Rao et al. ............... 705/2 |
| 2007/0091730 | A1 | 4/2007 | Ting |
| 2007/0213955 | A1 | 9/2007 | Ishida et al. |
| 2007/0246494 | A1 | 10/2007 | Kim et al. |
| 2007/0247306 | A1 | 10/2007 | Case, Jr. |
| 2007/0260482 | A1 | 11/2007 | Nurmela et al. |
| 2007/0279852 | A1 | 12/2007 | Daniel et al. |
| 2007/0287596 | A1 | 12/2007 | Case, Jr. et al. |
| 2008/0204225 | A1 * | 8/2008 | Kitchen ................ 340/539.22 |
| 2009/0018456 | A1 | 1/2009 | Hung |
| 2009/0048070 | A1 * | 2/2009 | Vincent et al. ......... 482/8 |
| 2009/0280861 | A1 | 11/2009 | Khan |
| 2009/0319230 | A1 | 12/2009 | Case, Jr. et al. |
| 2010/0210421 | A1 | 8/2010 | Case, Jr. et al. |
| 2011/0003665 | A1 * | 1/2011 | Burton et al. .......... 482/9 |
| 2011/0281687 | A1 * | 11/2011 | Gilley et al. ........... 482/8 |
| 2012/0078396 | A1 | 3/2012 | Case, Jr. et al. |

FOREIGN PATENT DOCUMENTS

| | | | | |
|---|---|---|---|---|
| CN | 2752825 | Y | 1/2006 | |
| CN | 101111743 | A | 1/2008 | |
| CN | 101287215 | A | 10/2008 | |
| CN | 101329600 | A | 12/2008 | |
| CN | 101388708 | A | 3/2009 | |
| EP | 0700661 | A2 | 3/1996 | |
| EP | 0700661 | A3 | 5/1998 | |
| EP | 1833103 | A1 | 9/2007 | |
| EP | 2025369 | A2 * | 2/2009 | ............ A63B 24/00 |
| GB | 2424084 | A * | 9/2006 | ............ A63B 23/00 |
| JP | H11-178798 | A | 7/1999 | |
| JP | 2000300711 | A | 10/2000 | |
| JP | 2001289975 | A | 10/2001 | |
| JP | 2002022859 | A | 1/2002 | |
| JP | 2002507734 | A | 3/2002 | |
| JP | 2002300632 | A | 10/2002 | |
| JP | 2002306660 | A | 10/2002 | |
| JP | 2003236028 | A | 8/2003 | |
| JP | 3098803 | | 10/2003 | |
| JP | 2004081745 | | 3/2004 | |
| JP | 2006058806 | A | 3/2006 | |
| JP | 2008524589 | A | 7/2008 | |
| JP | 2008529559 | | 8/2008 | |
| JP | 2009050699 | A | 3/2009 | |
| JP | 2009078134 | A | 4/2009 | |
| JP | 2010249578 | A | 11/2010 | |
| JP | 2011516174 | A | 5/2011 | |
| KR | 10-724887 | | 6/2007 | |
| KR | 20080022680 | A | 3/2008 | |
| KR | 20090029695 | A | 3/2009 | |
| WO | 2004100059 | A2 | 11/2004 | |
| WO | 2006/065679 | A2 | 6/2006 | |
| WO | 2007083314 | | 7/2007 | |
| WO | 2007135389 | A1 | 11/2007 | |
| WO | 2008050590 | A1 | 5/2008 | |
| WO | 2008056524 | A1 | 5/2008 | |
| WO | 2008101085 | A2 | 8/2008 | |
| WO | 2008142477 | | 11/2008 | |
| WO | 2009030484 | A1 | 3/2009 | |
| WO | 2009033034 | A1 | 3/2009 | |
| WO | 2009124193 | A1 | 10/2009 | |

OTHER PUBLICATIONS

Garmin: "Foot Pod" [online] Oct. 2008, Retrieved from the Internet: URL: http://www8.garmin.com/manuals/FootPod_Instructions_Multilingual_pdf, retrieved Jul. 7, 2010.
International Search Report and Written Opinion issued in corresponding PCT Application, International Application No. PCT/US2010/032381, mailed on Oct. 1, 2010.
International Search Report in corresponding PCT Application, International Application No. PCT/US2010/032391 mailed Jul. 16, 2010.
Polar Electro Oy: "Polar RS200 User Manual" Company website. 2005, XPOO2585994, retrieved from the internet: URL: http://support.polar.fi/gip/PKBStoGIP .nsf/4eb122f6011156bec22573e0003779ed/c225742500419a8ac225702e004619aa/$FILE/Polar_RS200_user_manual_English.pdf [retrieved on Jul. 5, 2010].
International Search Report and Written Opinion for Application No. PCT/US2010/032401, mailed Jul. 14, 2010, 14 pages.
International Search Report in corresponding PCT Application, International Application No. PCT/US2010/032401 mailed Jul. 14, 2010.
The First Office Action for Chinese patent application No. 201080023090.6 mailed Jul. 30, 2012.
The First Office Action for Chinese patent application No. 201080023164.6 mailed Jul. 30, 2012.
Office action for related Korean application 10-2011-7026978 mailed Feb. 6, 2013.
Office action for related Korean application 10-2011-7028262 mailed Feb. 27, 2013.
European search report for related application 13151122.2 mailed Mar. 13, 2013.

(56) References Cited

OTHER PUBLICATIONS

The Second Office Action for related Chinese application 201080023090.6 mailed Mar. 27, 2013.
Office action for related U.S. Appl. No. 12/767,288 mailed Dec. 3, 2012.
Office action for related U.S. Appl. No. 12/767,425 mailed Dec. 4, 2012.
Office action received in related European application 10719155.3 mailed Aug. 29, 2012.
Office Action for related Korean application No. 10-2011-7028263 mailed Dec. 20, 2012.
Office action for U.S. Appl. No. 12/767,447 mailed Jan. 3, 2013.
The Second Office Action for Chinese application No. 201080023164.6 mailed Jan. 18, 2013.
Office action for European application No. 10717937.6 mailed Mar. 1, 2013.
European Office Action for patent application No. 10 719 155.3 mailed Jul. 11, 2013.
International Search Report and Written Opinion for application No. PCT/US2013/027262 mailed Aug. 7, 2013.
Statement in accordance with the Notice from the European Patent Office dated Oct. 1, 2007 concerning business methods (OJ EPO Nov. 2007, 592-593), XP002456414.
Notice from the European Patent Office dated Oct. 1, 2007 concerning business methods, vol. 30, No. 1, Nov. 1, 2007, pp. 592-593, XP007905525, ISSN: 0170-9291.
The First Office Action for Chinese patent application No. 201080023088.9 mailed Aug. 19, 2013.
Office Action in related U.S. Appl. No. 12/767,425 mailed Jul. 17, 2013.
The Third Office Action for Chinese patent application No. 201080023164.6 mailed May 16, 2013.
Notice of Reasons for Rejection for Japanese patent application No. 2012-507466 mailed Jun. 17, 2013.
International Search Report and Written Opinion for International patent application No. PCT/US2012/071700 mailed Jun. 11, 2013.
Notice of Reasons for Rejection for Japanese patent application No. 2012-507467 mailed Jun. 13, 2013.
United States Patent and Trademark Office, "Non-Final Office Action," issued in connection with U.S. Appl. No. 12/767,447, mailed Oct. 25, 2013, 20 pages.
United States Patent and Trademark Office, "Non-Final Office Action," issued in connection with U.S. Appl. No. 12/767,425, mailed Nov. 6, 2013, 12 pages.
Japanese Patent Office, "Notice of Reasons for Rejection," issued in connection with Japanese application serial No. 2012-507468, issued Dec. 4, 2013, 5 pages.

\* cited by examiner

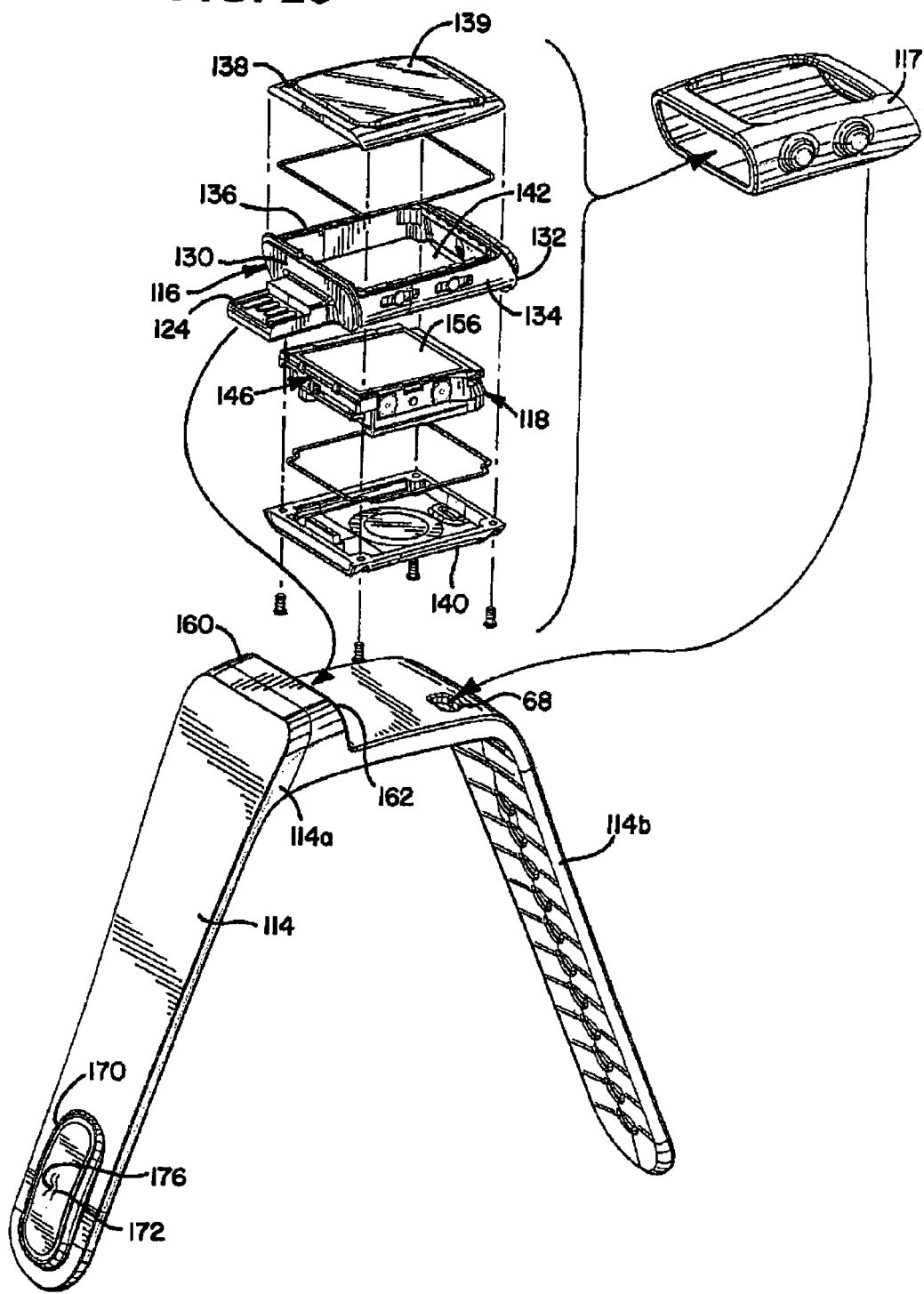

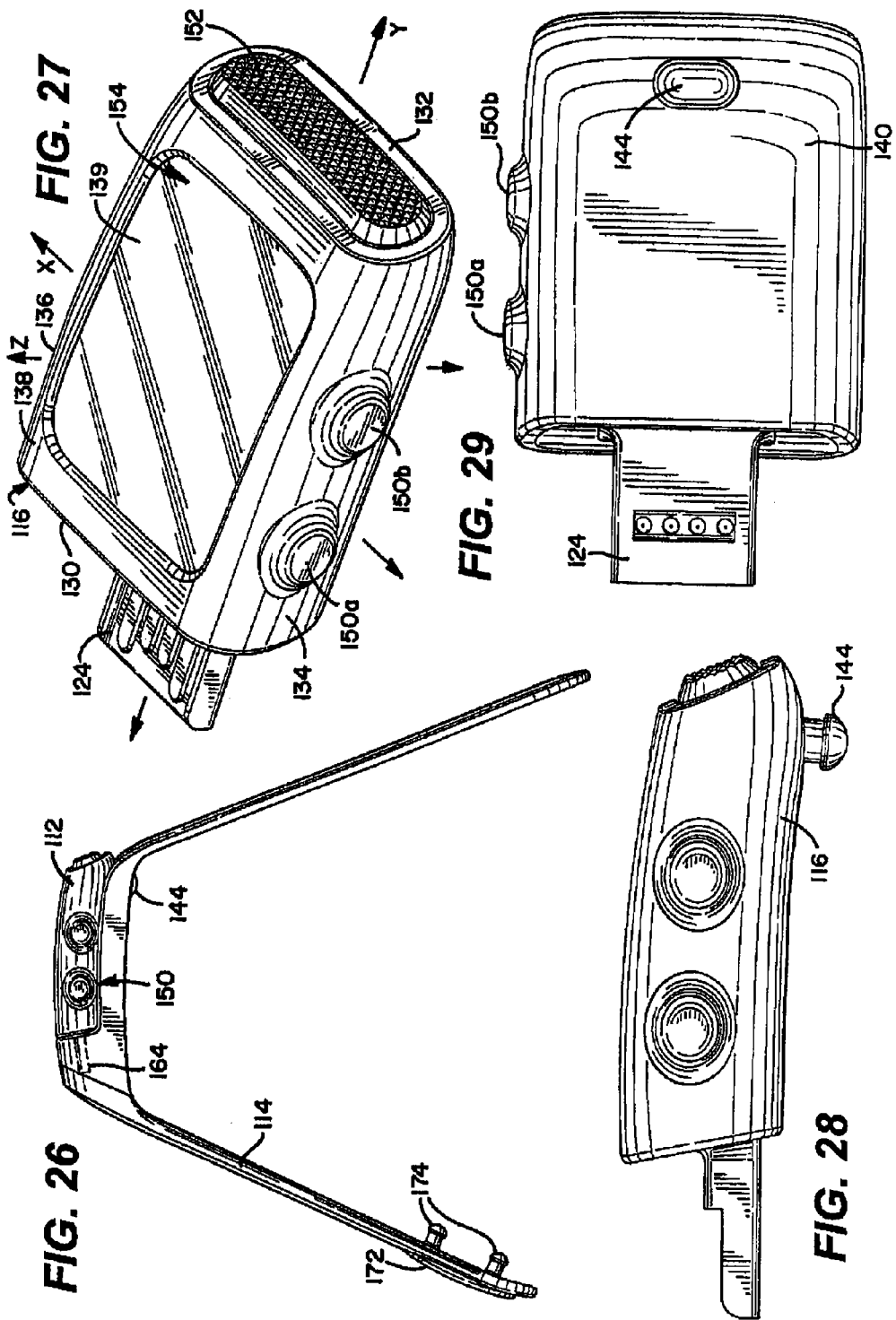

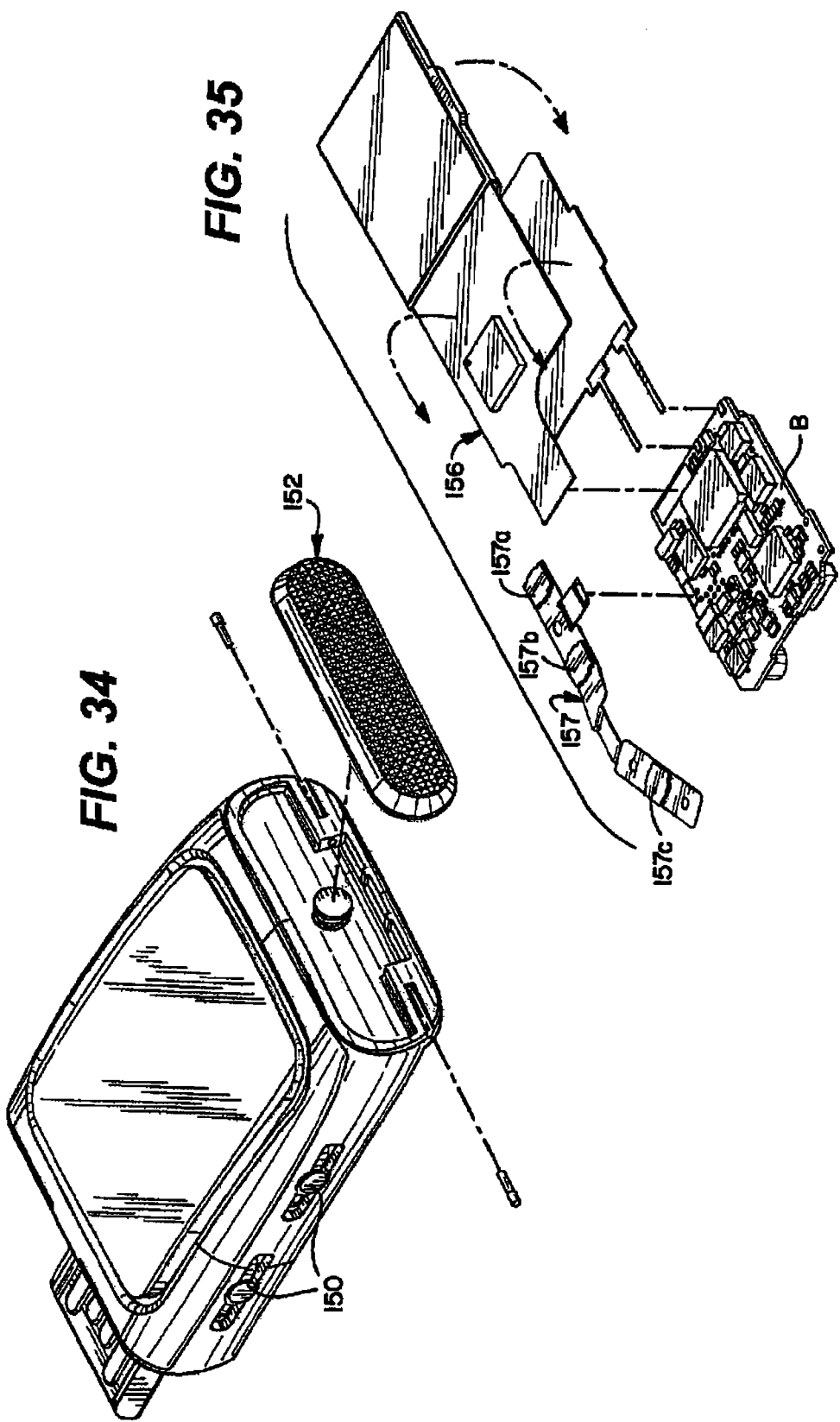

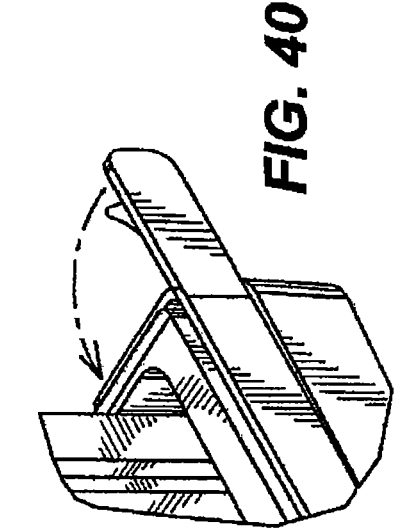
FIG. 38
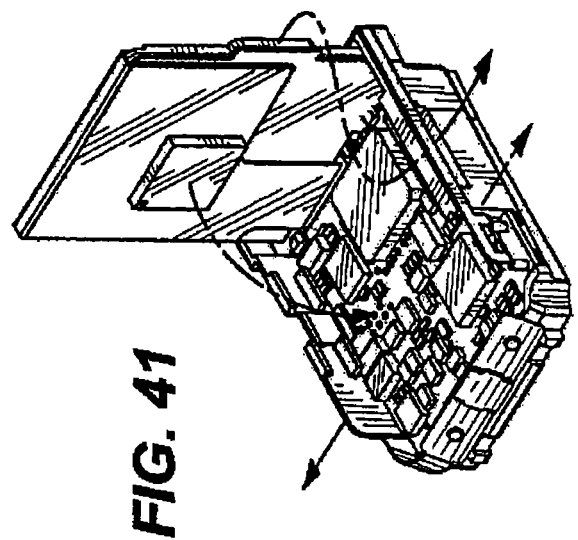
FIG. 40
FIG. 41
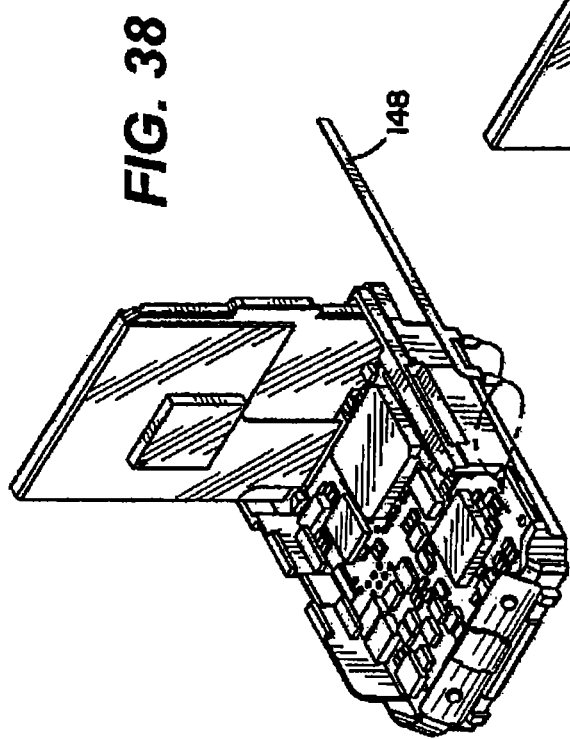
FIG. 39
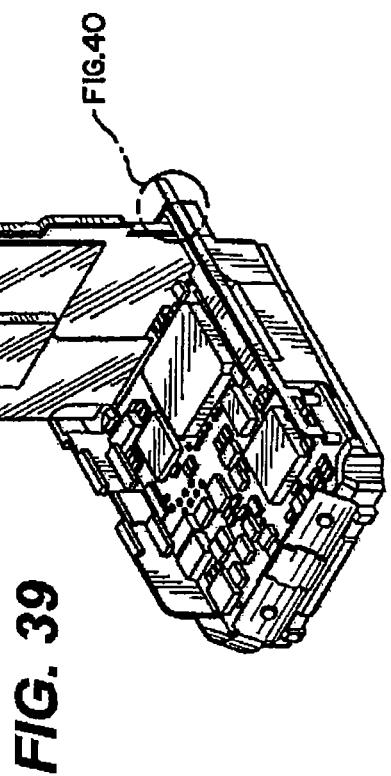

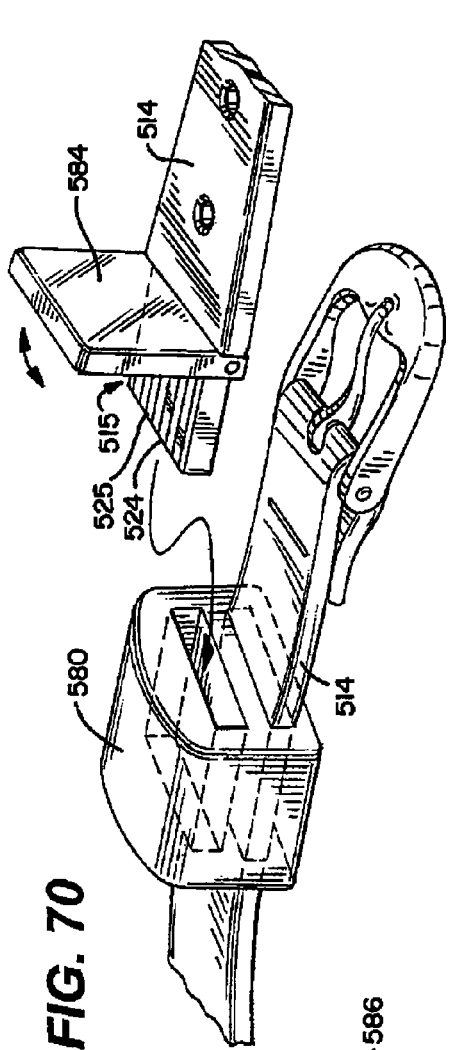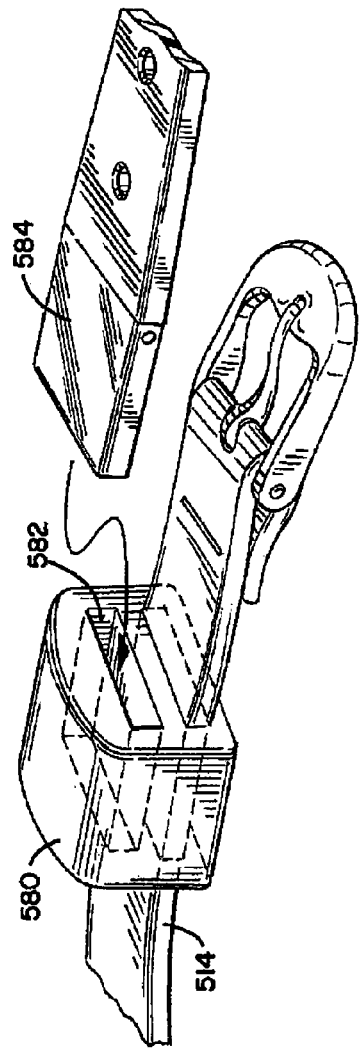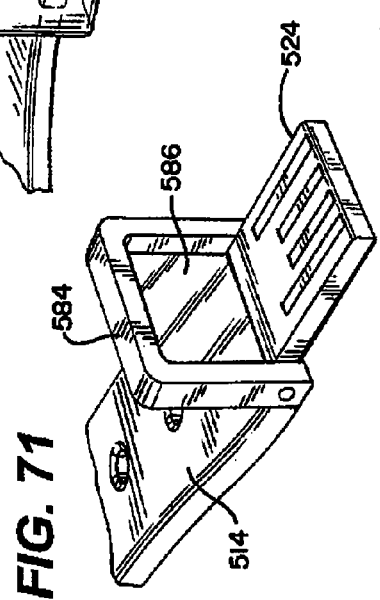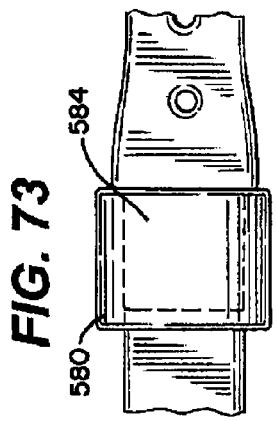

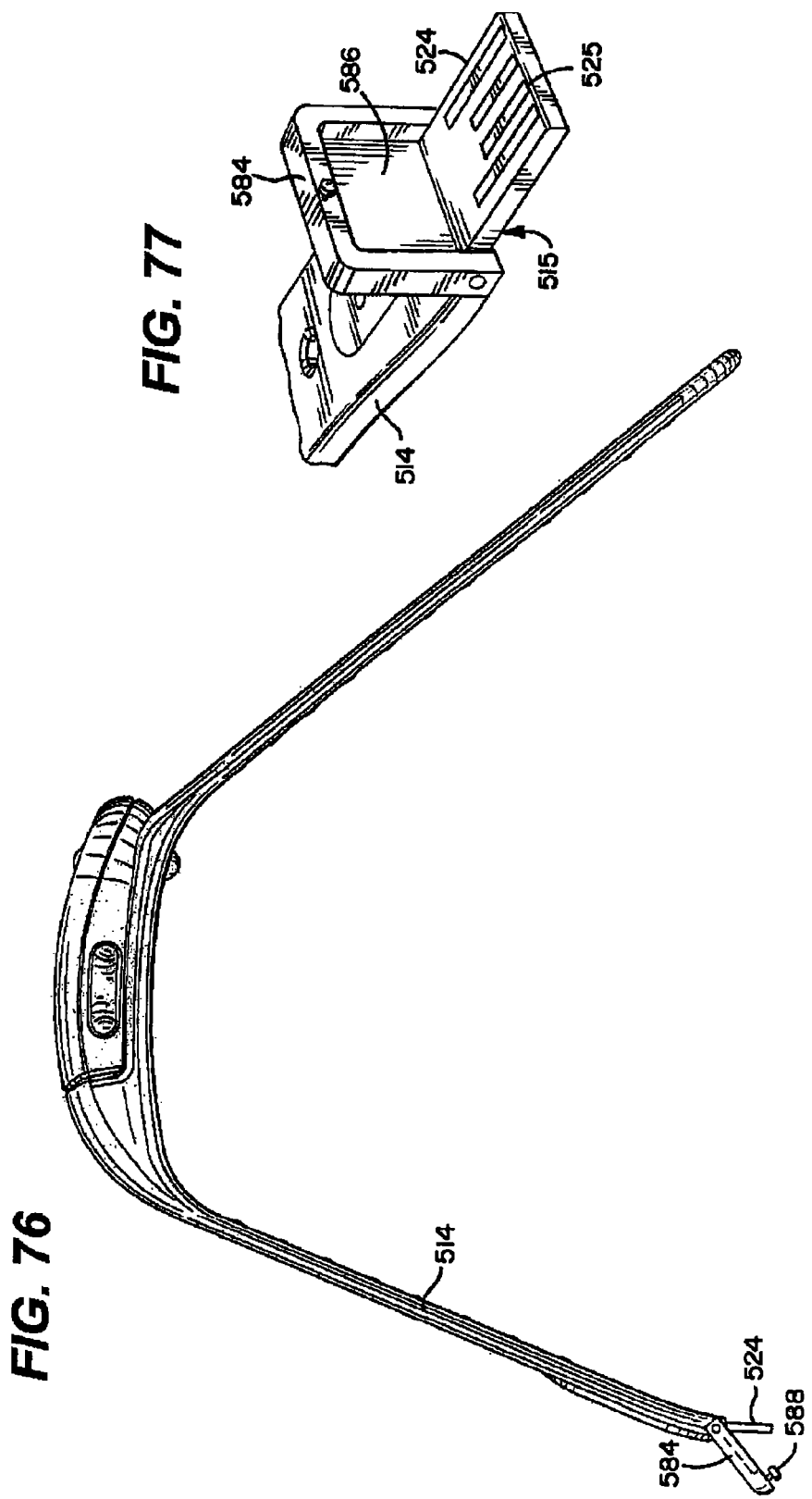

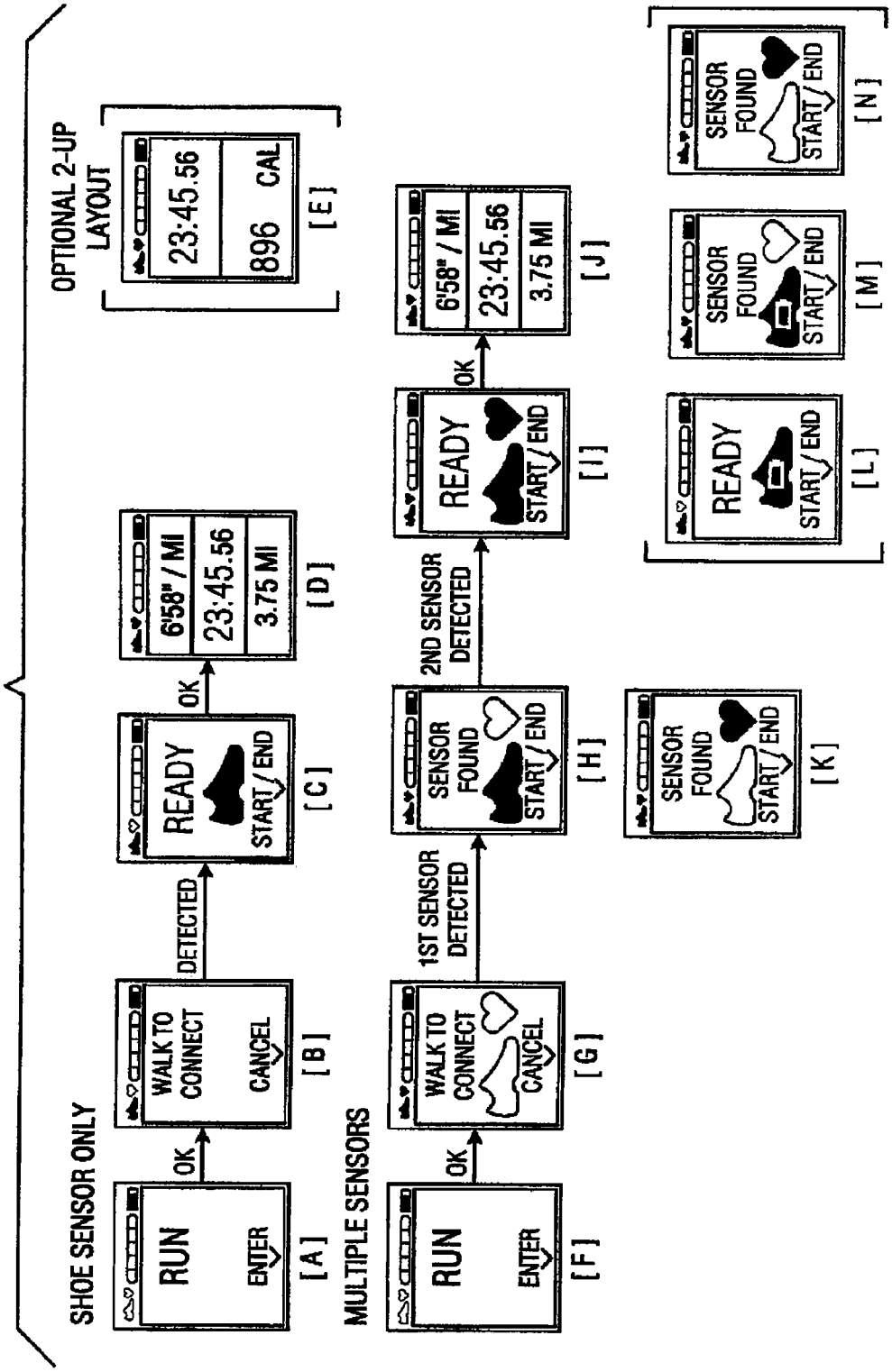

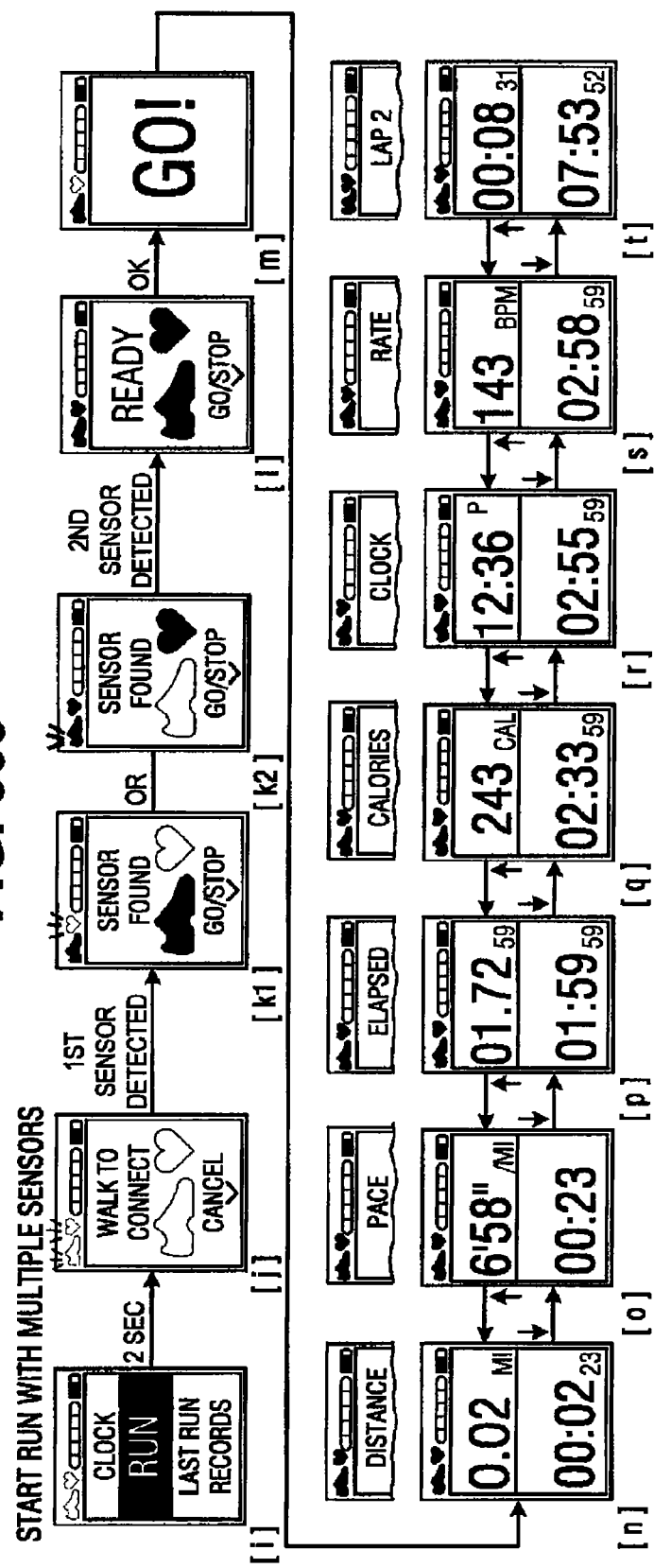

START A WORKOUT
(HEART SENSOR ONLY)

FIG. 88c
FIG. 88d

*INTERVAL TRAINING (OFF BY DEFULT OOB, BUT AVAILABLE AS A SPECIAL "LAPS" MODE FOR ADVANCED USERS)

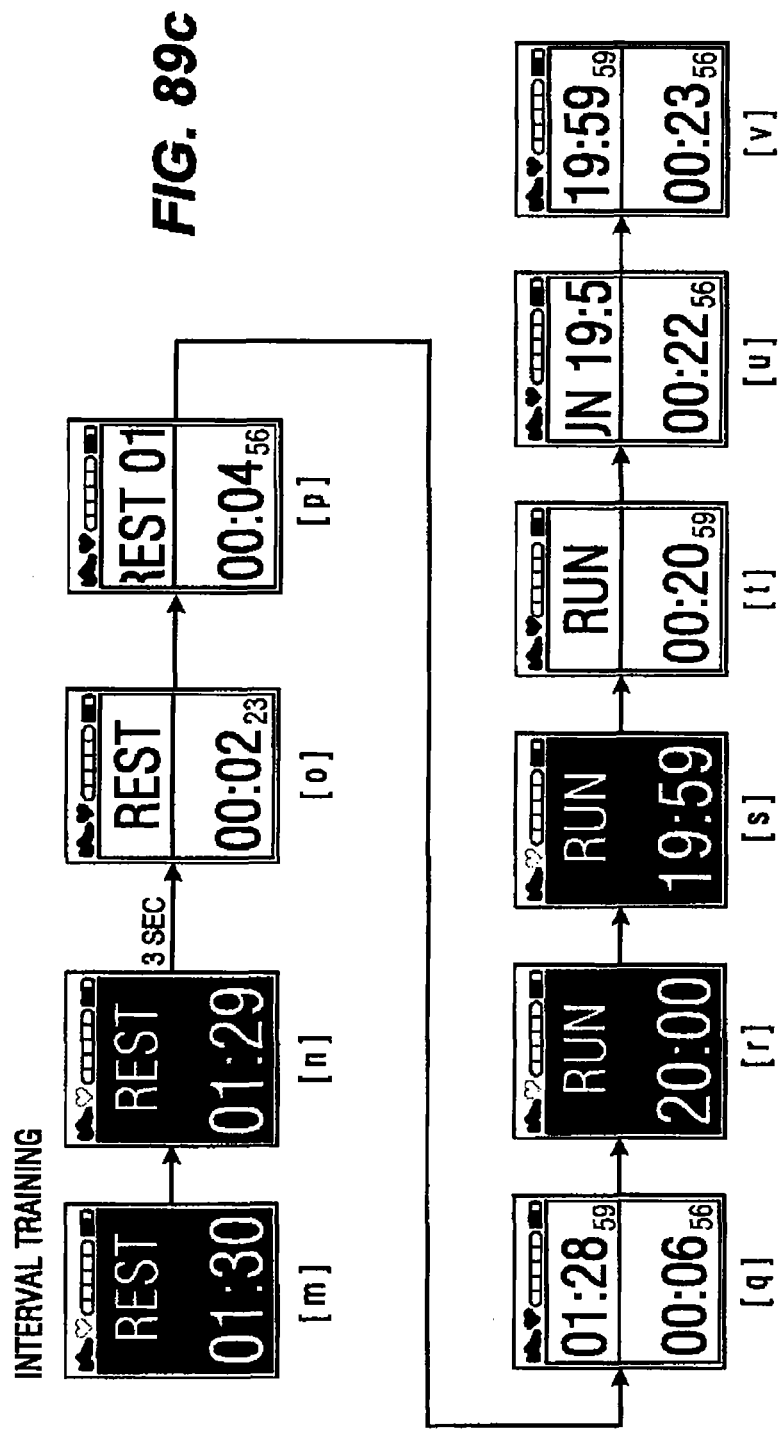

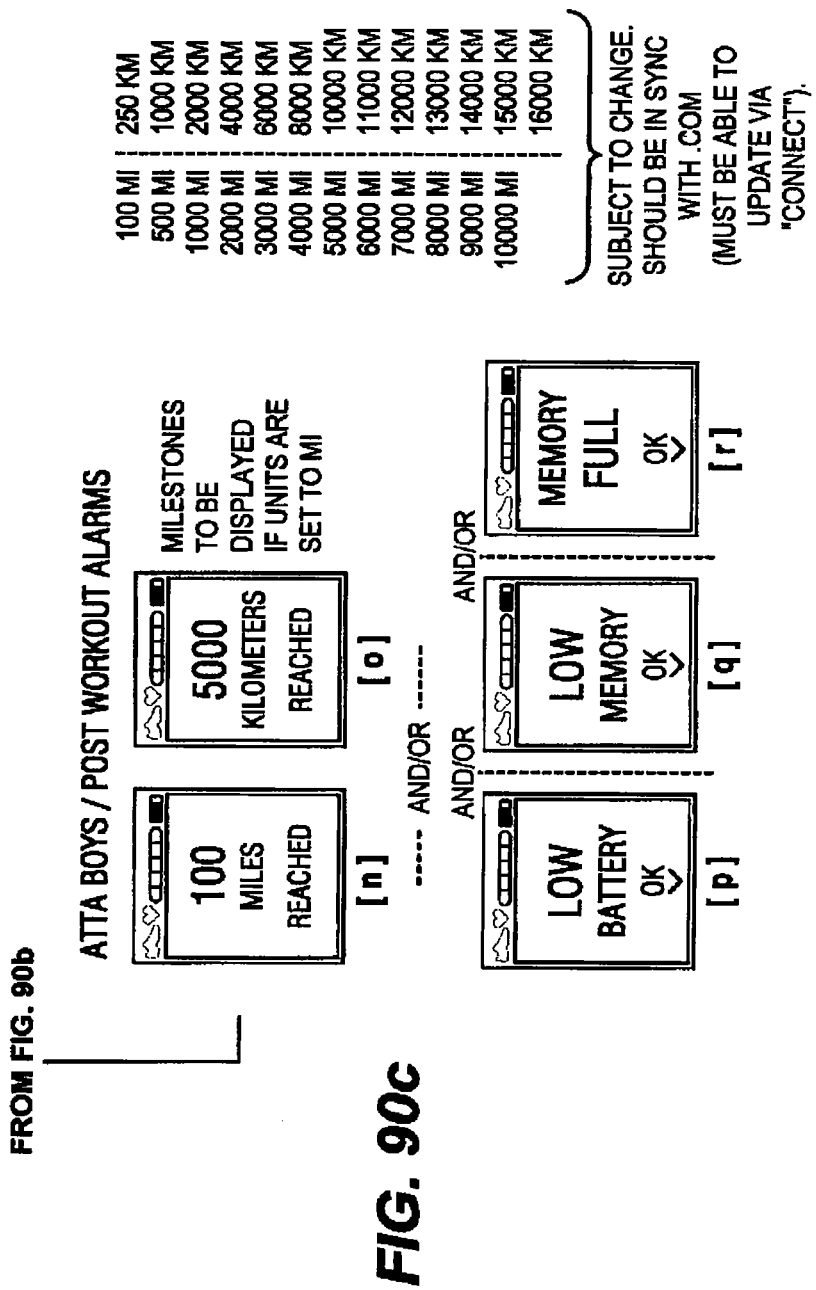

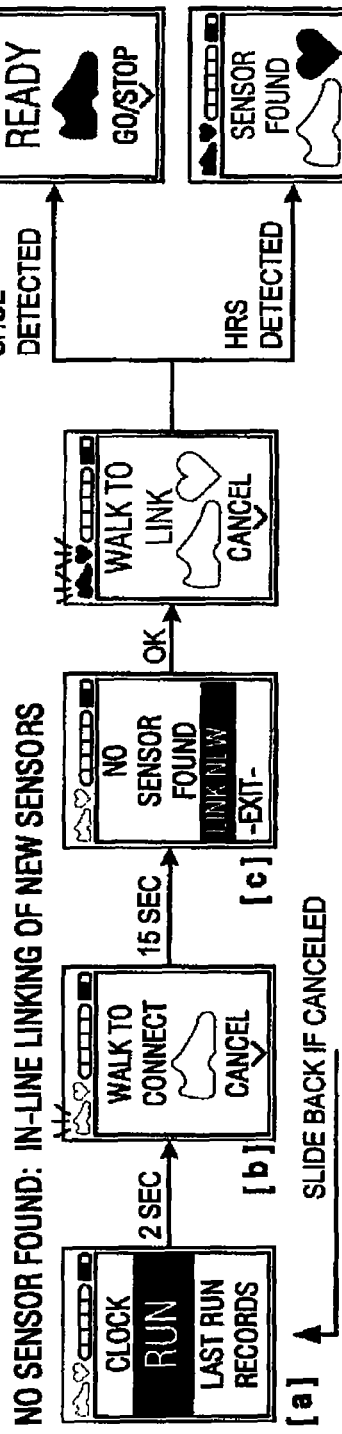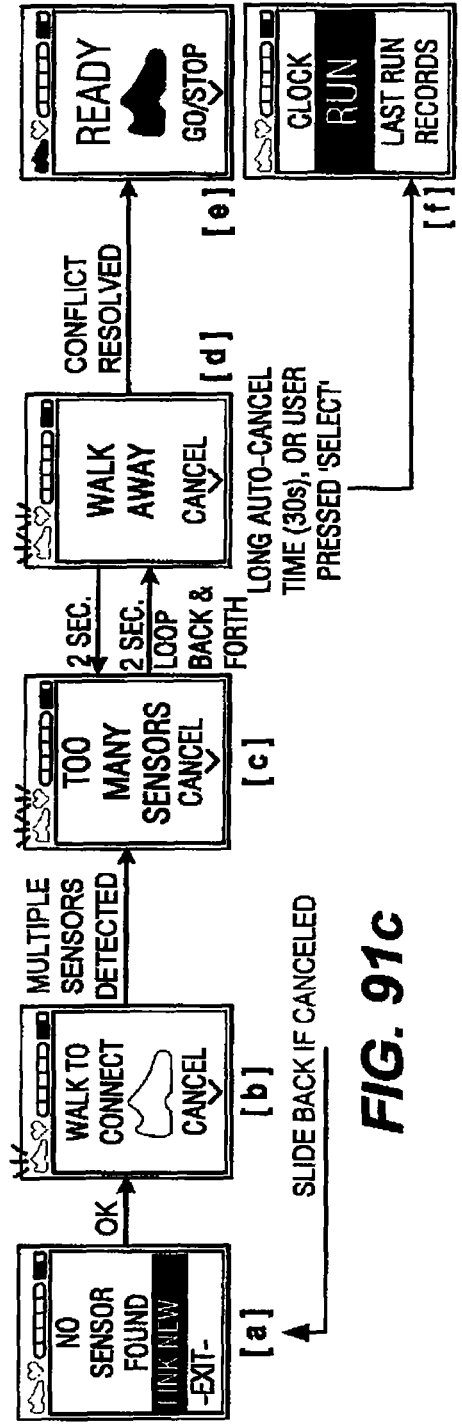

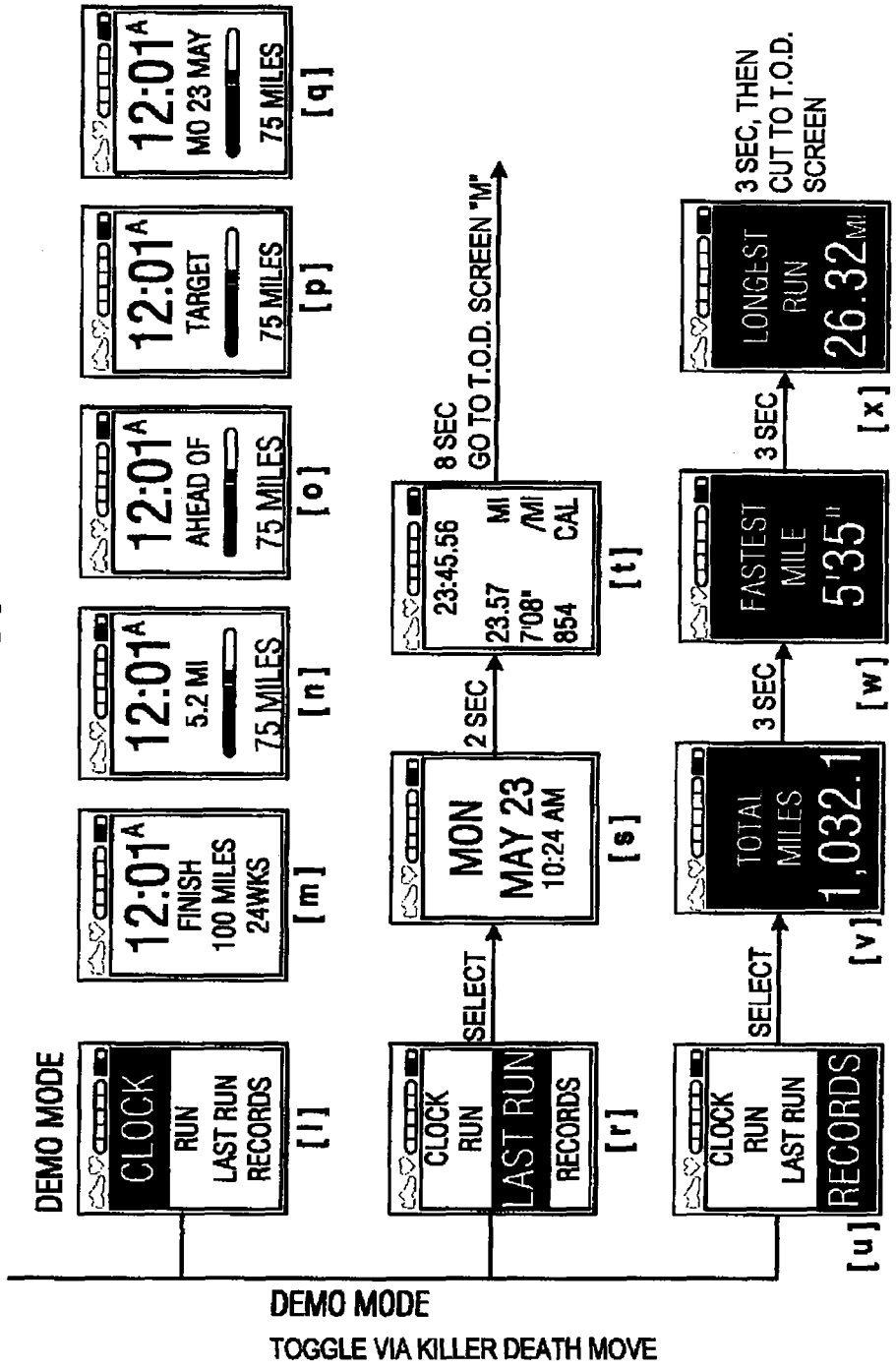

T.O.D. + WEEKLY RUNS
(DEFAULT SELECTION OUT-OF-BOX)

USER-SELECTABLE ROTATION (APPLIES TO RUN / TIMING SCREENS ONLY)

T.O.D. + WEEKLY RUNS

T.O.D. + COACH
(A VARIANT ON WEEKLY RUNS, TRIGGERED WHEN THE USER HAS AN ACTIVE TRAINING PROGRAM ON .com)

COACH POPUPS (DAYS WITHOUT A RUN)

SOFT RESET
[a]
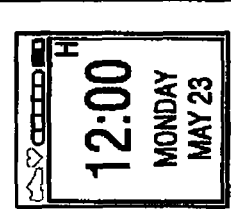
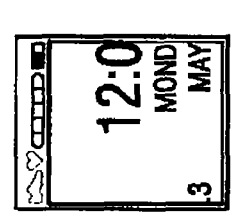
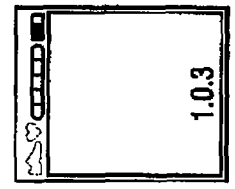
FIG. 128
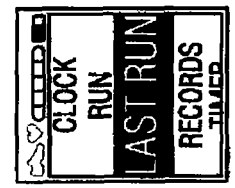
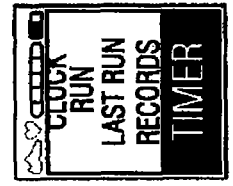
FUTURE
FIG. 129

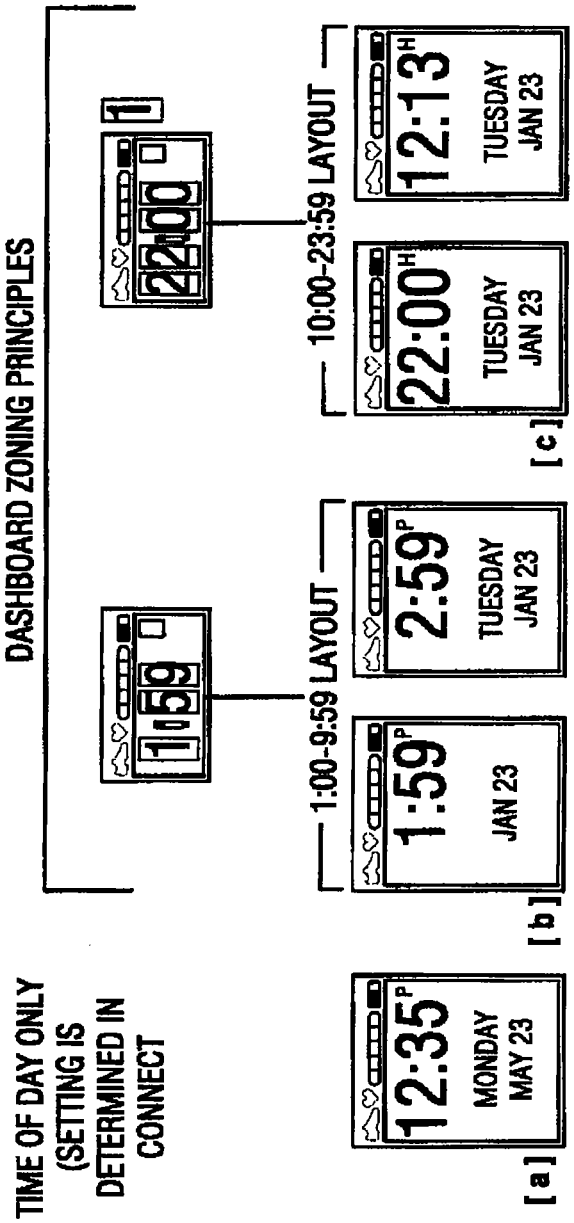

FIG. 132

ZONING PRINCIPLES

4 ITEM LAYOUT

USE IF THE FOLLOWING INFO IS AVAILABLE:

- ELAPSED TIME
- DISTANCE
- AVG. PACE
- CALORIES

5PX BETWEEN LINES (1PX EXTRA ABOVE LINE 1 AND BELOW LINE 4)

Positions:
- POSITION 1 — ELAPSED TIME
- POSITION 2 — DISTANCE
- POSITION 3 — PACE
- POSITION 4 — CALORIES Example:
- 23:45.56
- 3.57 MI
- 7'08" /MI
- 854 CAL

5 ITEM LAYOUT

**USE IF THE FOLLOWING INFO IS AVAILABLE (*FOR CALIBRATION LAYOUT, SEE NOTE TO THE LEFT)**

- ELAPSED TIME
- DISTANCE
- AVG. PACE
- CALORIES
- -AND/OR-
- CALIBRATION*
- -AND/OR-
- AVG. HEART RATE
- -AND/OR-
- LAP TIMES

3PX BETWEEN LINES

Positions:
- POSITION 1 — ELAPSED TIME
- POSITION 2 — DISTANCE
- POSITION 3 — AVG. PACE
- POSITION 4 — CALORIES
- POSITION 5

PRIORITY:
1. CALIBRATION*
2. AVG. HEARTRATE
3. LAP TIMES

Example:
- 23:45.56
- 3.57 MI
- 7'08" /MI
- 854 CAL
- L1 6:54.44
- 145 BPM

3 ITEM LAYOUT

USE IF THE FOLLOWING INFO IS AVAILABLE:

- ELAPSED TIME
- CALORIES
- AVG. HEART RATE (5 PX BETWEEN LINES, 6PX ABOVE 1ST AND BELOW LAST)

Positions:
- POSITION 1 — ELAPSED TIME
- POSITION 2 — CALORIES
- POSITION 3 — HEARTRATE Example:
- 23:45.56
- 143 BPM
- 854 CAL

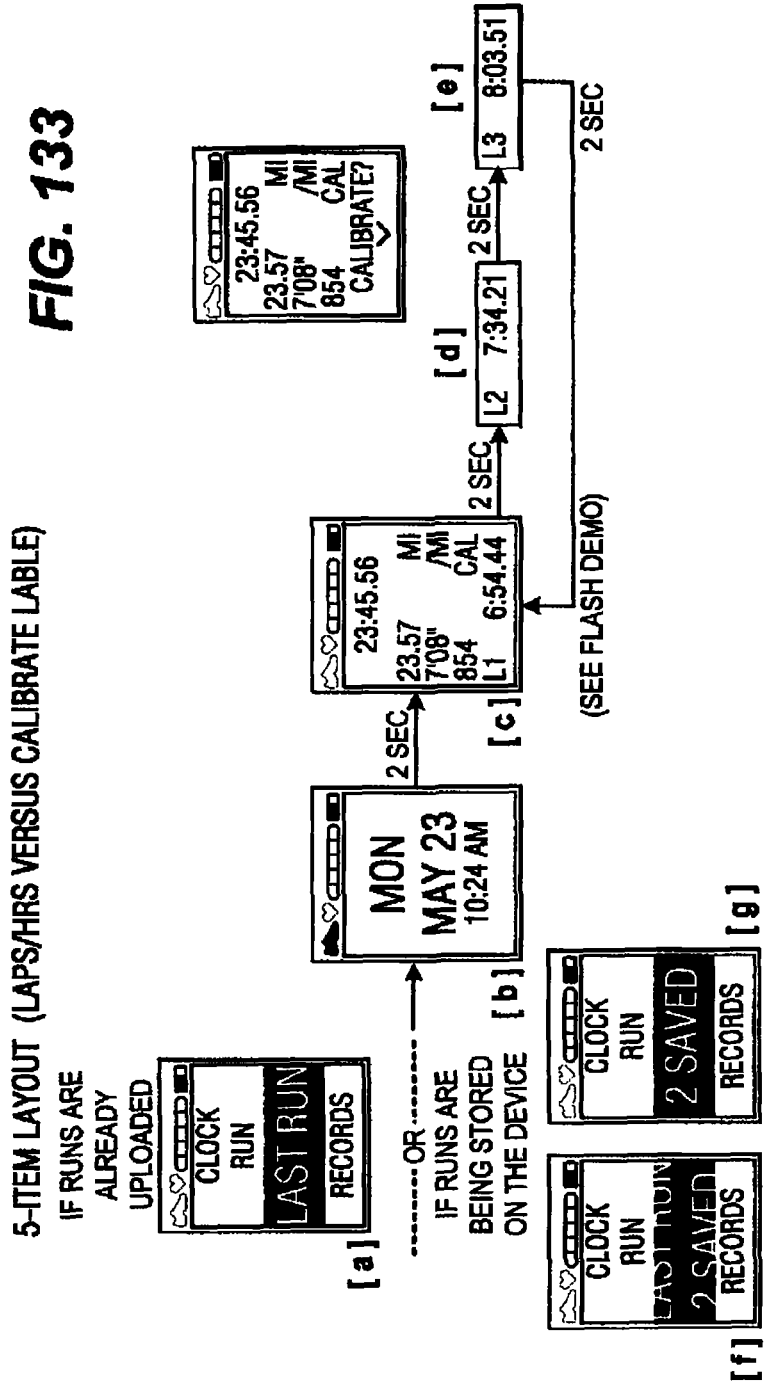

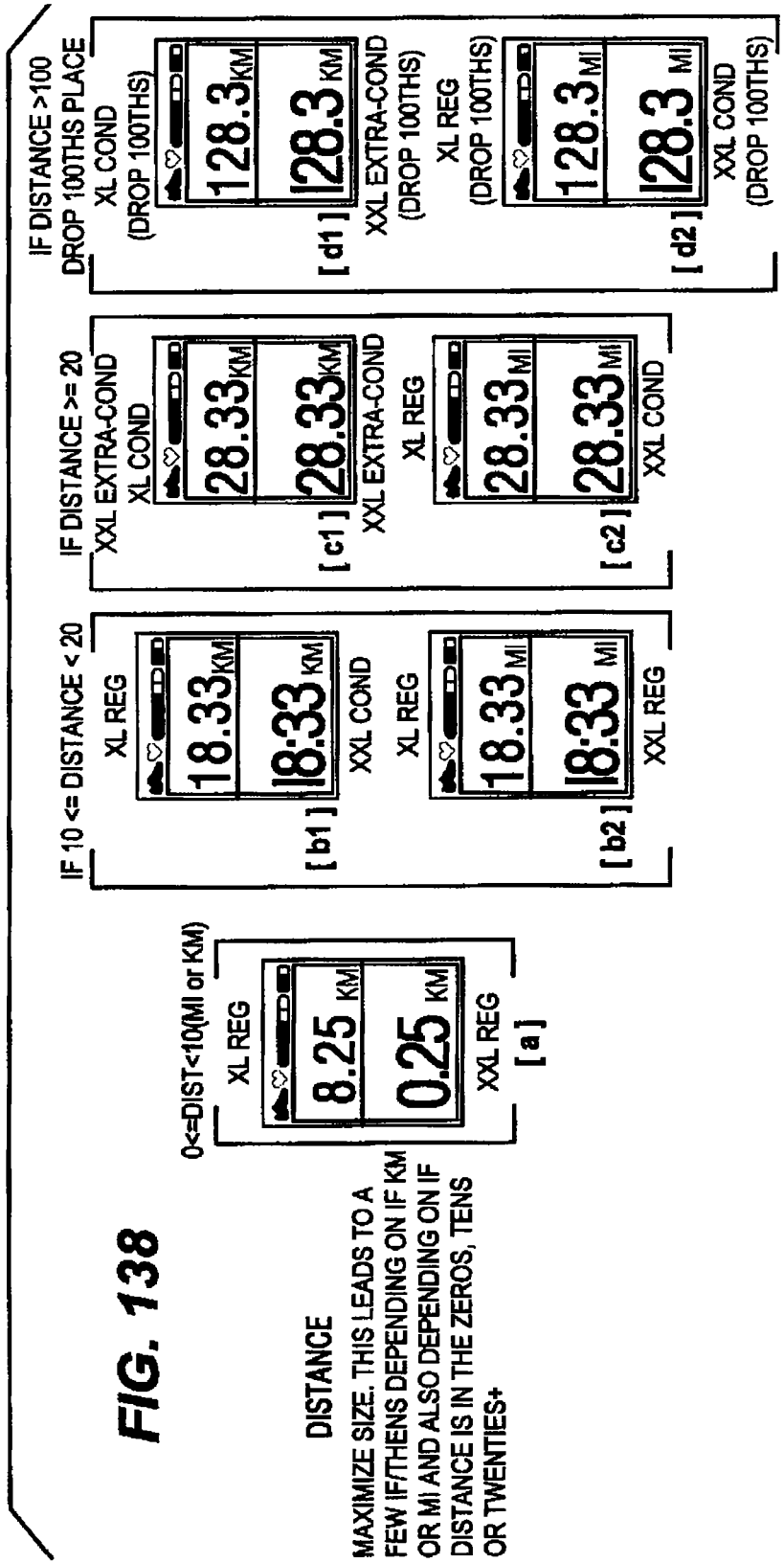

ATHLETIC WATCH

RELATED APPLICATIONS

The present application is a continuation-in-part of and claims the benefit of U.S. Patent Application No. 61/172,769, filed on Apr. 26, 2009, which application is expressly incorporated herein by reference and made a part hereof. Also, aspects of this invention may be used in conjunction with other user interface features, global positioning system ("GPS") features and watch constructions described for example, in the following concurrently filed U.S. patent applications:
  (a) U.S. patent application Ser. No. 12/767,288, entitled "Athletic Watch", now U.S. Pat. No. 8,562,489;
  (b) U.S. patent application Ser. No. 12/767,447, entitled "GPS Features And Functionality In An Athletic Watch System", now U.S. Pat. No. 9,122,250; and
  (c) U.S. patent application Ser. No. 12/767,425, entitled "Athletic Watch".
These concurrently filed U.S. patent applications are entirely incorporated herein by reference and made a part hereof.

TECHNICAL FIELD

The present invention generally relates to an athletic performance monitoring device and, more particularly, to a watch having enhanced athletic functionality.

BACKGROUND

Devices such as watches and, in particular, watches having features allowing a wearer to monitor athletic performance are known. For example, runners often wear watches to keep track of time, distance, pace and laps etc. Such watches, however, are oftentimes not user friendly and cumbersome to use. Consequently, the wearer may not utilize the watch to its full potential. Such watches also have limited athletic performance monitoring capabilities. Accordingly, while certain watches having athletic functionality provide a number of advantageous features, they nevertheless have certain limitations. The present invention seeks to overcome certain of these limitations and other drawbacks of the prior art, and to provide new features not heretofore available.

SUMMARY

The present invention relates to athletic performance monitoring devices and, in particular, to a watch having enhanced athletic functionality.

According to one aspect of the invention, a device for monitoring athletic performance of a user has a wristband configured to be worn by the user. An electronic module is removably attached to the wristband. The electronic module has a controller and a screen and a plurality of user inputs operably associated with the controller. In an exemplary embodiment, the user inputs are configured in a three-axis or tri-axis configuration for enhanced user operability. A first input is applied along an x-axis. A second input is applied along an y-axis. A third input is applied along a z-axis.

According to another aspect of the invention, the watch has a controller and user interface having enhanced operability for the user. For example, the controller may generate one or more user interfaces displaying various types of athletic activity statistics during, before or after user performance of an athletic activity. A user interface may include multiple lines of data, each line displaying a different workout statistic or other information (e.g., time of day, time zone, user location, etc.). In one arrangement, a user interface may include a goal progress tracker. The tracker may include one or more progress bars, for example, representing one or more sub-goals. Sub-goals may correspond to tasks required for completion of the overall goal. Sub-goals may be defined and scheduled to facilitate completion of the overall goal. An indicator may further be displayed to identify a current sub-goal or time period for a sub-goal (e.g., a current day). Depending on an amount of athletic activity a user has performed for a time period of a sub-goal, a corresponding progress bar may be filled in by a corresponding amount. For example, if a user has completed 50% of a distance scheduled to be run on Wednesday, a progress bar for Wednesday may be filled in halfway.

According to another aspect, reminders or motivating messages may be displayed to a user to encourage users to maintain an athletic activity regimen and/or to keep on track to complete a goal. In one or more arrangements, the reminders or motivating messages may include a prompt asking the user to confirm that athletic activity will be performed within a specified amount of time from the reminder. Additionally, upon the user confirming that athletic activity will be performed within a specified amount of time, a confirmation message may be displayed. The confirmation may include a further motivational or encouraging message. Further, a user may be asked to schedule the athletic activity upon specifying that athletic activity will be performed within the specified amount of time.

According to yet another aspect, a user may mark laps through an interface of an athletic activity monitoring device. In one or more arrangements, lap information might only be updated after a specified amount of time after the receipt of the user lap marking input. Additionally or alternatively, a lap indicator might only be increased or an increased lap indicator might only be displayed after the specified amount of time. An interface other than an interface displaying the lap indicator may be displayed after receiving the lap marking input but prior to expiration of the specified amount of time.

According to another aspect of the invention, a user can send a motivational message to a second user via the remote site. Upon connecting to the remote site, a notify message is transferred to the electronic module of the second user. When the second user reaches a certain predetermined metric associated with the message, the second user receives the notify message. The second user can access the motivational message by plugging in the electronic module into the computer to connect to the remote site. In another embodiment, the message may be displayed directly on the watch of the second user.

According to another aspect of the invention, the electronic module is removably connected to the wristband. In one embodiment, the electronic module may have one or more protrusions received by corresponding apertures in the wristband. The watch may employ alternative connection structures. The connection structures may have flexible configurations, removable key module configurations, and articulating connector configurations.

According to yet another aspect, an amount of time a backlight is active may be defined dynamically and/or automatically based on a function that the user is currently performing. For example, if a user is viewing or interacting with a first user interface (e.g., a graph of a workout), the device may a lot more backlight time (e.g., the backlight will automatically turn off after a longer predefined period) than a default backlight time. In another example, the amount of backlight time may depend on amounts of backlight time used in previous user interactions with the same process, interface or function.

Other features and advantages of the invention will be apparent from the following examples in the specification taken in conjunction with the following drawings.

BRIEF DESCRIPTION OF THE DRAWINGS

FIGS. 22-49 disclose views of another embodiment of a device in the form of a watch of an exemplary embodiment of the present invention;

FIGS. 70-73 disclose views of another embodiment of a device in the form of a watch of an exemplary embodiment of the present invention;

FIGS. 74-77 disclose views of another embodiment of a device in the form of a watch of an exemplary embodiment of the present invention;

FIGS. 126-140 illustrate additional example user interfaces having various display configurations and in which workout information may be conveyed according to one or more aspects described herein.

DETAILED DESCRIPTION

Figure 1:
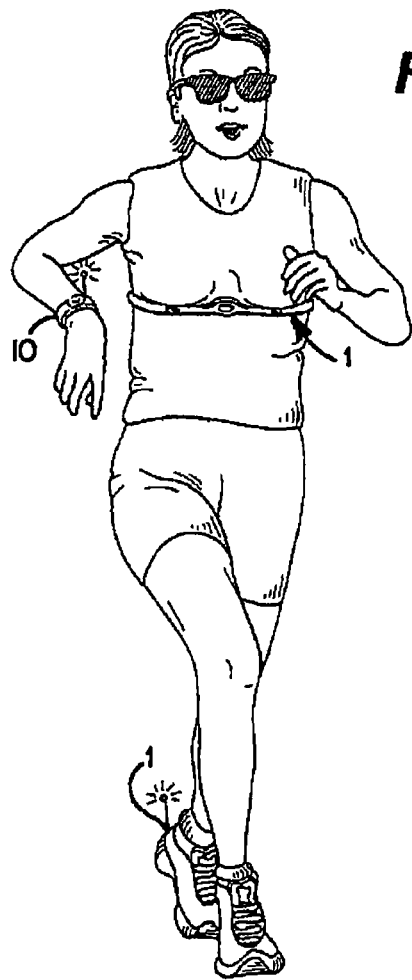
FIGS. 1-21 disclose views of a first embodiment of a device in the form of a watch of an exemplary embodiment of the present invention including views showing certain user interface operability of the watch.

While this invention is susceptible of embodiment in many different forms, there are shown in the drawings, and will herein be described in detail, preferred embodiments of the invention with the understanding that the present disclosure is to be considered as an exemplification of the principles of the invention and is not intended to limit the broad aspects of the invention to the embodiments illustrated and described.

Device Structures

The present invention discloses multiple embodiments of a device or athletic watch. FIGS. 1-21 disclose a first embodiment of the watch; FIGS. 22-49 disclose a second embodiment of the watch; FIGS. 50-64 disclose a third embodiment of the watch; and FIGS. 65-85 disclose additional alternative embodiments of the watch. As discussed further herein, each of the embodiments can incorporate the various operational features, user interface and global positioning system ("GPS") features as described herein. Structures of each embodiment will be described in greater detail below followed by a description of additional capabilities and features of the watch.

Figure 2:
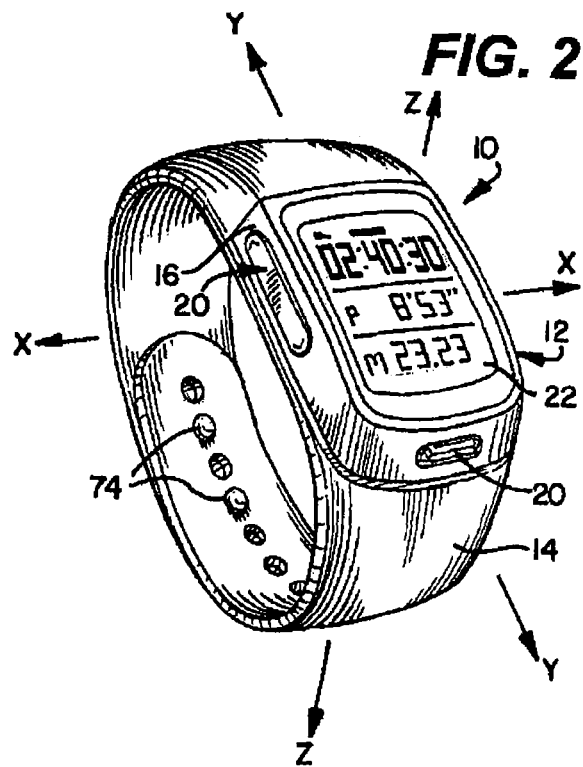
Figure 3:
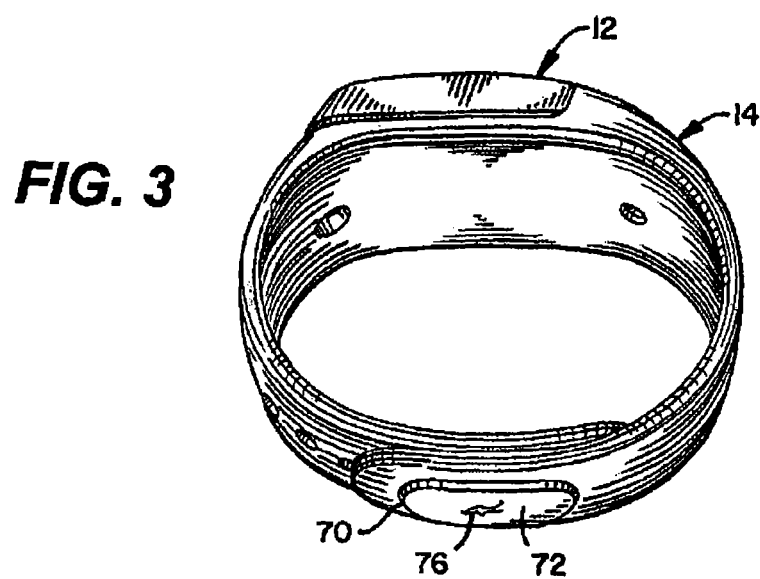

FIGS. 1-3 generally show a device or watch of the present invention, generally designated with the reference numeral 10. While the watch 10 has traditional uses such as incorporating a chronograph for general timekeeping, as explained in greater detail below, the watch 10 has unique functionality for athletic and fitness use such as monitoring athletic performance of the user. The watch 10 generally includes a portable electronic module 12 removably connected to a carrier 14 or strap member in the form of a wristband 14 in an exemplary embodiment.

The structure of the watch 10 will first be described followed by a description of the operation of the watch 10. However, as explained in greater detail below, it is noted that the watch 10 is capable of wirelessly communicating with various sensors 1 worn by a user to record and monitor athletic performance of a user. The sensor(s) can take various forms. For example, the sensor may be mounted on the shoe of a user as shown in FIG. 1 and include an accelerometer. The sensor may have various electronic components including a power supply, magnetic sensor element, microprocessor, memory, transmission system and other suitable electronic devices. The sensor may be used in conjunction with other components of the system to record speed and distance among other parameters of athletic performance. In exemplary embodiments, the sensor can be a sensor as disclosed in U.S. Publications No. 2007/0006489; 2007/0011919 and 2007/0021269, which are incorporated by reference herein and made a part hereof. Additionally, the sensor may be a component of a heart-rate monitor 1 worn by a user as shown in FIG. 1. Thus, the watch 10 may communicate with both a shoe sensor 1 and a heart rate sensor 1. The watch 10 may further communicate with only one of the shoe sensor and heart rate sensor depending on a user's preference. As explained in greater detail below, the watch 10 may also include component(s) such as a three-axis accelerometer to monitor speed and distance of a user/runner without the need for the shoe sensor. As also explained below, the watch 10 has communication capabilities with remote locations for receiving and transferring data relating to athletic performance monitoring.

Electronic Module

As further shown in FIGS. 2-8, the portable electronic module 12 includes various components supported by a housing 16, the components include a controller 18 having a suitable processor and other known components, an input device assembly 20, an output device assembly 22, and a communication connector 24, which may be considered a part of the input device assembly 20 and/or the output device assembly 22 in various embodiments. The communication connector 24 may be, for instance, a USB connector 24. The controller 18 is operably connected to the input device assembly 20, the output device assembly 22 and the communication connector 24. As explained in greater detail below, the electronic module 12 may also include a GPS ("Global Positioning System") receiver and associated antenna operably connected to the controller 18 for incorporating various GPS features.

Figure 7:
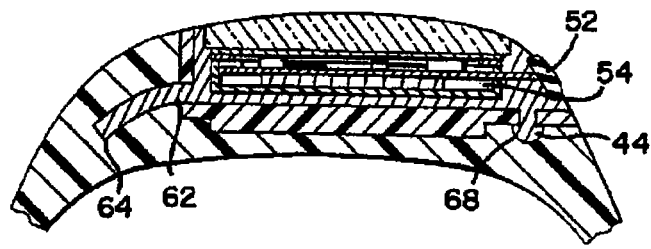

As depicted in FIGS. 2-5, the housing 16 has a first end 30, a second end 32, a first side 34, a second side 36, a front side 38, and a back side 40. The front side 38 may also include a glass member 39 or crystal 39 for viewing a display of the controller 18 therethrough. The housing 16 defines a cavity 42 therein for accommodating the various components of the controller 18. It is understood that the housing ends, sides and crystal cooperate to enclose the housing 16. As further shown in the figures, the communication connector 24 extends from the first side 30 of the housing 16. It is understood that the communication connector 24 could be positioned at various other locations of the housing 16. The communication connector 24 generally extends rigidly from the housing 16. As further shown in other embodiments, the communication connector 24 can be flexible with respect to the housing 16. In other embodiments described herein, the USB connector 24 may be rigidly connected to the housing 16 in other configurations. As discussed, the communication connector 24 is a USB connector and may have a plurality of leads therein and wherein the leads are operably connected to the controller 18. The housing 16 can be made from a variety of different rigid materials including metal or generally rigid polymeric materials. The housing 16 could also be formed in a two-shot injection molding process wherein the communication connector 24 could be molded to be flexible with respect to the housing 16. It is also understood that the USB connector 24 could be separately fastened to the housing 16 consistent with other embodiments described herein. The USB connector 24 generally provides a water-resistant connection with the housing 16 and controller 18. As shown in FIG. 7, the housing 16 has a pair of protrusions 44 (it is understood one protrusion 44 is hidden) extending from the back side 40 of the housing 16. It is understood that a single protrusion 44 could be used or more protrusions 44. Because the watch 10 may be used in fitness activities, there is some chance that the watch 10 can be subject to water or moisture such as perspiration. The housing 16 is designed to be water-resistant to protect components of the controller 18. Such structures further provide for a certain level of impact resistance. A vent opening is provided in the wristband 14 to channel any moisture away from the module 12.

Figure 4:
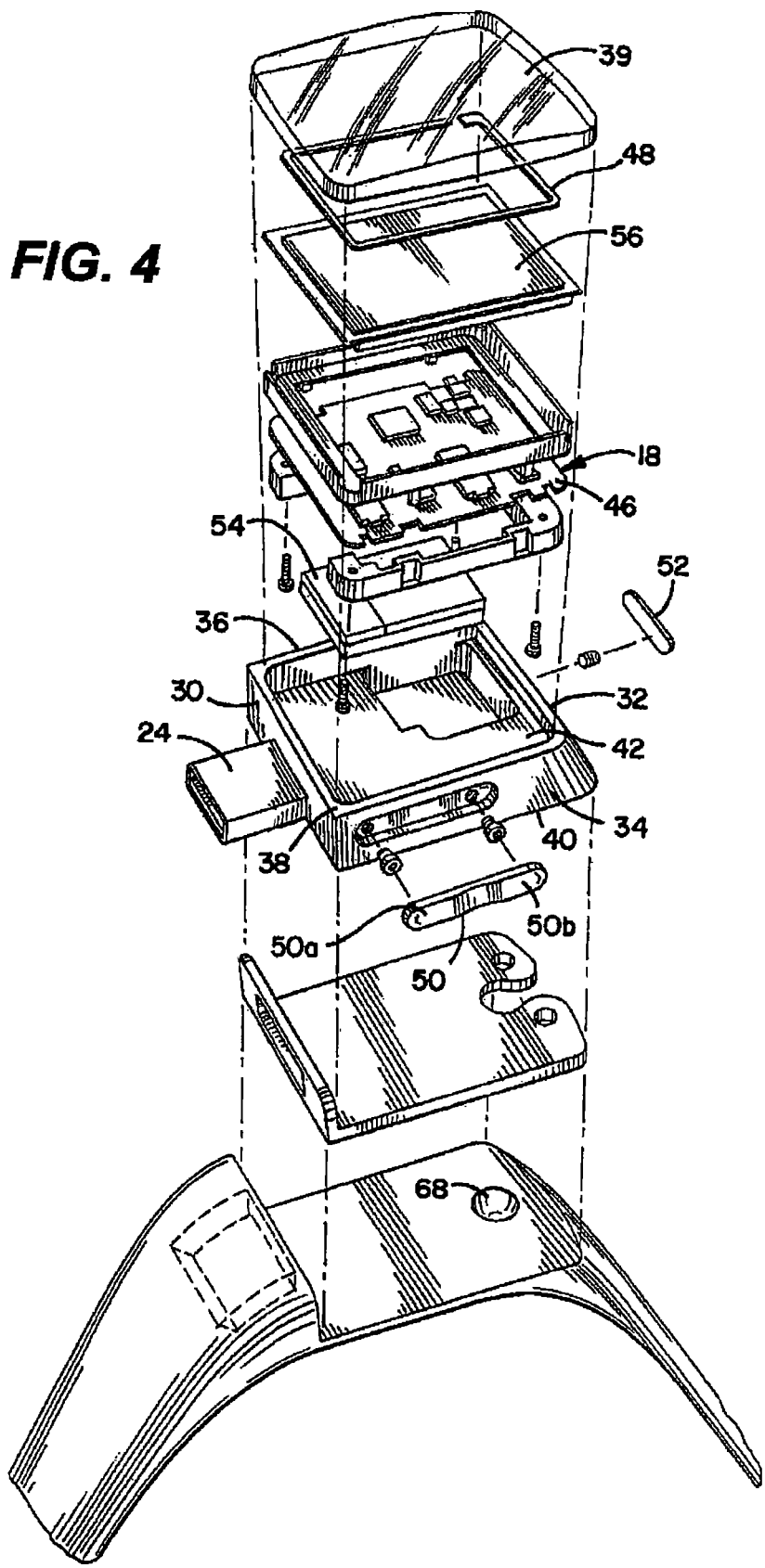
Figure 5:
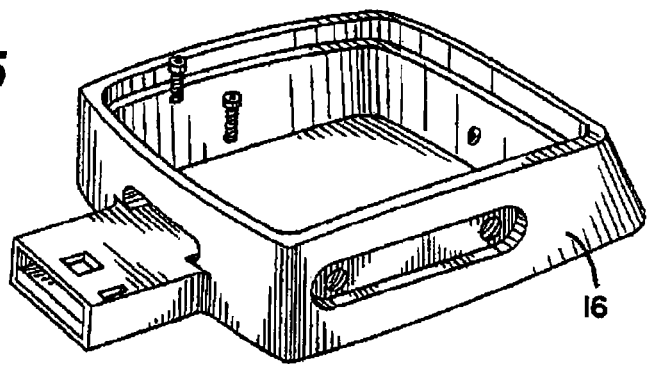

As further shown in FIG. 4, the controller 18 generally has a processor 46 that is operably connected to the input device assembly 20 and the output device assembly 22 as understood by those skilled in the art. The controller 18 includes software that in cooperation with the input device assembly and output device assembly provide user interface features as will be described in greater below. The components of the controller 18 are contained within and supported by the housing 16. The controller 18 includes various electrical components including a rechargeable power supply (e.g., rechargeable battery or other battery types) and system memory. The controller 18 will also include an antenna 48, allowing the controller and portable electronic module can communicate with the sensors 1, record and store data relating to athletic performance, and other time information. The controller 18 also functions to upload performance data to a remote location or site as is known in the art, but can also download additional information from a remote site or location to be stored by the controller 18 for further use. The antenna 48 can take various forms including a chip antenna associated with the controller 18. Alternatively, the antenna 48 could be a sheet metal antenna. With other embodiments incorporating GPS features, an additional GPS antenna may also be provided. Thus, the watch 10 may incorporate multiple antennas. The controller is operably connected to the communication connector 24 of the housing 16.

As further shown in FIGS. 2-4, the input device assembly 20 includes a plurality of input devices such as in the form of depressible buttons. In certain exemplary embodiment, the USB connector 24 can also be considered an input device when data is transferred to the watch 10 via the connector 24. In one exemplary embodiment, the input device assembly 20 has three input buttons that collectively define a tri-axis operating configuration (e.g., x-y-z axes). The input buttons include a side button 50, an end button 52 and a shock sensor, shock button or tap button 54.

Figure 11:
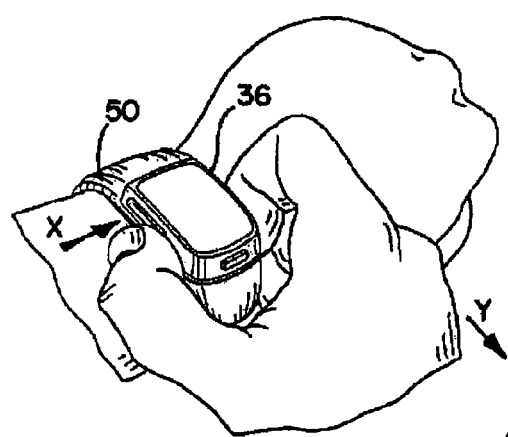

The side button 50 is located on the first side 34 of the housing 16. The side button 50 may correspond with a first input and being operably connected to the controller 18 for controlling the portable electronic module 12. As shown in FIG. 1, the side button 50 is configured to operate in an x-axis direction. The user may activate the first input by pressing on the side button 50 on the first side 34 of the housing 16. The user may squeeze the side button 50 and opposite second side 36 of the housing 16 along the x-axis direction (FIGS. 2 and 11). The side button 50 may also cooperate with an additional input of the controller 18 for controlling the portable electronic module 12. For example, a user may press one segment of the side button 50, such as a top segment 50a, for a first input, and may press a second segment of the side button 50, such as a bottom segment 50b, for a second or additional input different from the first input. As explained in greater detail below regarding the operation of the watch 10, the side button 50 may be utilized as a toggle button or scroll button, with the first input located towards the top of the side button and the additional input located towards the bottom of the side button. The side button 50 may then be used to move a cursor on the display up or down in order to select an item from a list. It is also understood that the side button 50 may be positioned on the opposite side 36 of the housing 16, which may be considered a three o'clock position. The side button 50 shown in FIG. 2 is considered to be in the nine o-clock position.

Figure 12:
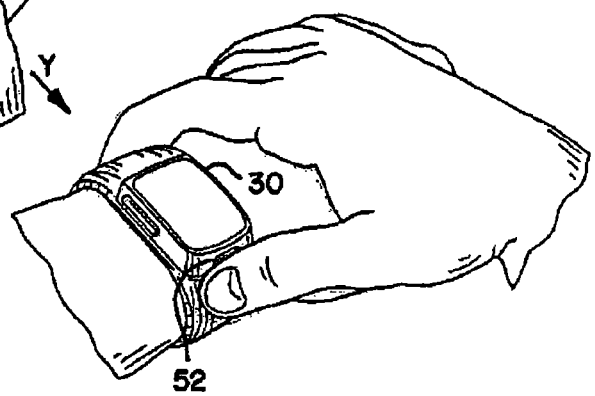
Figure 13:
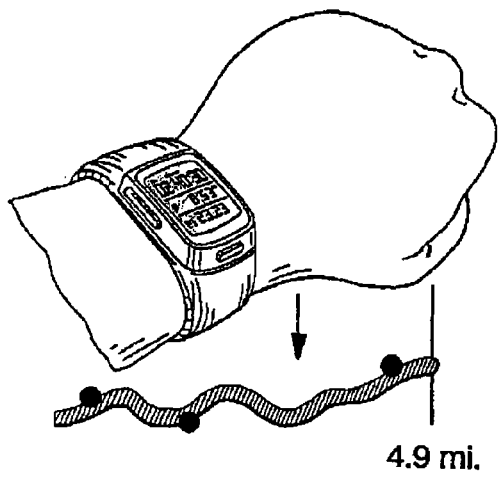

The end button 52 may be located on the second end 32 of the housing 16. The end button 52 will correspond to a second input and is operably connected to the controller 18 for controlling the portable electronic module 12. As shown in FIG. 2, the end button 52 is configured to operate in a y-axis direction. The user may activate the second input by pressing on the end button 52 on the second end 32 of the housing 16. The user may squeeze the end button 50 and the opposite first end 30 of the housing 16 along the y-axis direction (FIG. 12). As explained in greater detail below regarding the operation of the watch 10, the end button may be used as the OK or SELECT function.

Figure 8A:
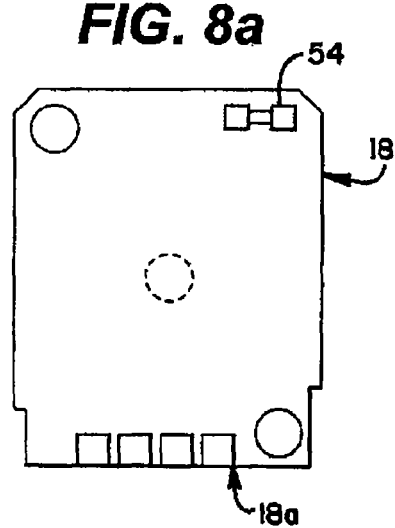
Figure 8B:
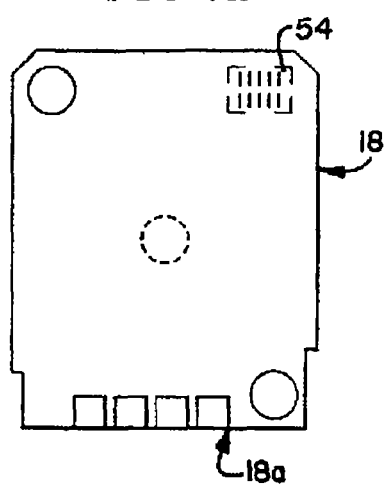
Figure 9:
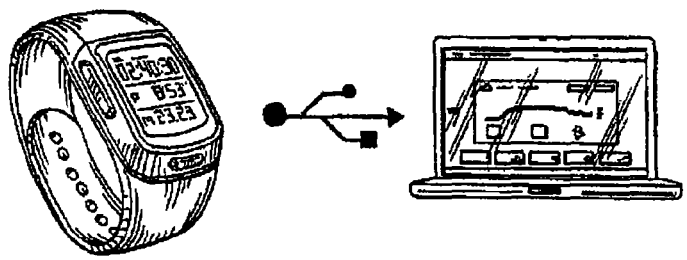

In an exemplary embodiment, the shock button 54 or tap button 54 generally corresponds to a shock sensor that is preferably located within the housing 16 and is operably connected to the controller 18, such as a printed circuit board of the controller 18. FIG. 8a shows a schematic view of a printed circuit board of the controller 18. The controller 18 includes lead interfaces 18a that cooperate with the USB connector 24. The board operably supports the shock sensor 54 generally proximate a periphery of the board which also positions the shock sensor at a periphery of the housing 16. Thus, the shock sensor 54 is operably connected to the controller 18 and may be a piezo shock sensor in this exemplary embodiment. Even when positioned proximate a periphery, the acceleration sensed at the periphery location is generally very close to the acceleration at the center location such as from a user tapping generally at a center of the screen 39. It is understood that the shock button 54 may be located in alternate positions on the controller 18 or in the housing 16. For example, the shock sensor 54 may be located proximate a center of the board as shown in phantom lines in FIG. 8a, which generally corresponds to a center of the housing 16 and underneath a center point of the crystal 39. The shock sensor can take other forms other than a shock sensor and may also be an accelerometer in one exemplary embodiment. For example, FIG. 8b shows a printed circuit board of the controller 18 wherein a shock button 54 is in the form of an accelerometer and positioned at a periphery of the board. As shown in phantom lines, the accelerometer may also be positioned proximate a center of the board and therefore proximate a center of the housing 16. As discussed, the shock button 54, in any of its forms, is generally positioned within the housing 16 and beneath the crystal 39 (FIG. 7). It is understood that the shock sensor 54 shown in FIG. 8*a* may have lesser power requirements than the accelerometer sensor 54 shown in FIG. 8*b*. It is understood that the accelerometer 54 shown in FIG. 8*b* could be a three-axis accelerometer and have additional function in addition to sensing the tap input or third input. For example, the accelerometer could be used to wake-up the device upon motion as well as speed and distance measurement for the user.

The shock sensor 54 could also be positioned on the front side 38 of the housing 16. The shock button 54 corresponds to a third input and is operably connected to the controller 18 controlling the portable electronic module 12. It is understood that the shock button 54 possesses required sensitivity to sense taps or forces applied to the screen 39 by the user. As shown in FIG. 1, the shock button 54 is configured to operate in a z-axis direction. The user may activate the third input by tapping or pressing on the crystal 39 or display screen. This tapping or pressing on the display screen 39 will activate the shock button 54 or tap button 54. Thus, the shock button 54 has a sensitivity such that a tap on the crystal 39 activates the shock button 54 and applies certain inputs associated with the controller 18. In an exemplary embodiment, the z-axis direction is a direction that is generally normal to the screen 39. It is understood that directions varying from a normal direction can also be sufficient to activate the shock button.

Additionally, the shock button 54 may be configured to correspond with a fourth input of the controller 18 for controlling the portable electronic module 12. For instance, the shock button 54 may sense two different shock levels or forces, e.g. a soft level and a hard level. The soft level is activated when the user presses or taps with a first amount of force (F1) in order to activate the soft level of the sensor 54. The hard level is activated when the user presses or taps with a greater amount of force (F2) to activate the hard level of the sensor 54. Additional levels could also be incorporated into the shock button 54. Additional tapping sequences can also be operably associated with the button 54 to provide additional inputs to the watch 10. Generally, the watch 10 can be programmed to receive a plurality of taps to provide a desired input to the watch 10. For example, a fast double tap or triple tap could provide a preset input. In addition, as further described herein, the watch 10 may have a variety of different operational modes. The various tap or tapping sequences could be assigned to different inputs based on a particular operational mode. The tap-related inputs can also be assigned to the watch at the user's computer location. Once assigned at the user's computer, once data transfer is performed from the computer to the watch 10, the tap-related inputs are loaded onto the watch 10. The tap sensor could also be combined with other force-related sensors wherein a tap combined with dragging the user's finger across the screen could provide yet additional input(s). Thus, the watch 10 may provide the shock button in combination with a touch screen for additional input capabilities. As a further exemplary embodiment, the tap or tapping sequence may provide other specific inputs if the user is in the GPS operational mode of the watch 10. The sensors can further be configured to sense forces applied to the screen in different directions other than a general normal force on the screen.

As further shown in FIG. 4, the output device assembly 22 includes a plurality of output devices including a display 56. The USB connector 24 may also be considered an output device when transferring data from the electronic module 12. It is further understood that the output device assembly 22 may include an audible speaker if desired. The controller 18 can have additional capabilities for communicating with other devices such as digital music players or other electronic devices.

The display 56 is located generally proximate the front side 38 of the housing 16 and is positioned beneath the crystal 39 or screen 39. The display 56 is operably connected to the controller 18 and includes a plurality of different display fields as shown in the user interface display screens to be described. In cooperation with the user interface associated with the watch 10, information is displayed in the various display fields as described in greater detail below. As also described, a user can modify what information is displayed and the manner in which the information is displayed. In one exemplary embodiment, the display 56 may be a liquid crystal display (LCD) screen. The display 56 may also have a negative screen. The negative screen may give the user the option to reverse the appearance of text from black numbers on a white background to white numbers on a black background. This negative screen may also be referred to as reverse display or negative display. The negative screen may help to reduce the glare for many users. It is understood that the portable electronic module 12 can have additional or alternate input devices and output devices.

Figure 10:
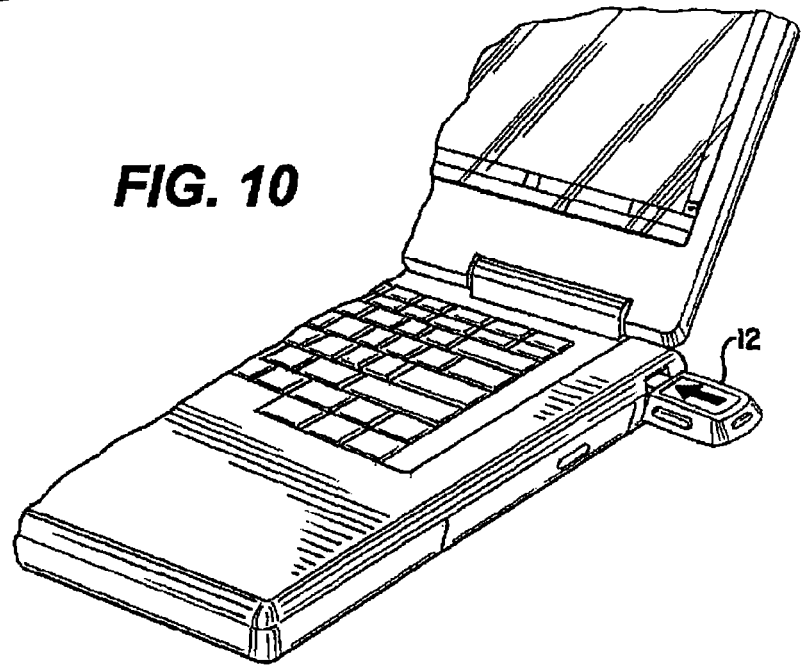

The electronic module has a rechargeable battery contained within the housing to provide power to the watch 10. The rechargeable battery is charged such as when the user plugs the electronic module into a computer as shown in FIG. 10. It is understood that the battery associated with the controller can utilize a plurality of batteries or power sources. A first battery may be utilized for the general watch/chronograph functions. A second battery may be utilized for other controller functions including communicating with the sensors for example. The first battery would be a typical battery that has a long life and support the basic watch functions. The other second battery can be a traditional rechargeable battery to support the additional controller functions associated with monitoring athletic performance, which functions may be more demanding on the power source. In such configuration, the watch functions would not be compromised even if the rechargeable battery was depleted by the athletic performance monitoring functions or if the user had not worked out for some time and had not charged the electronic module.

Carrier

Figure 6:
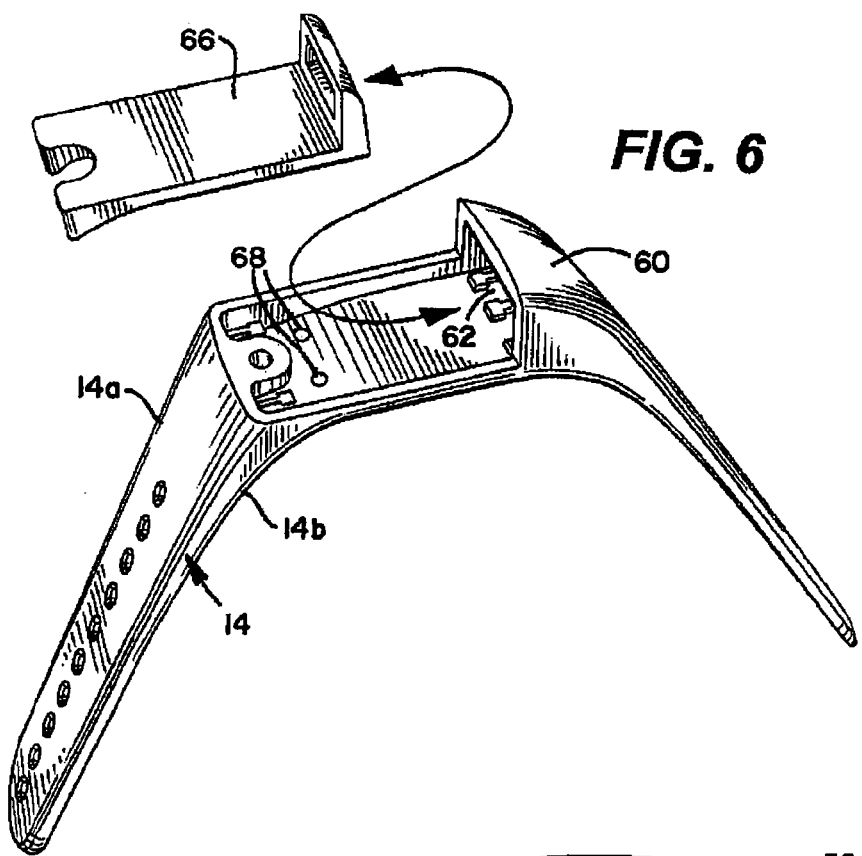

As shown in FIGS. 1-7, the carrier 14 is generally in the form of a wristband 14 having a central portion between a first end portion and a second end portion. The wristband 14 may include a first member and second member generally molded or connected together. The wristband 14 is flexible to fit around a user's wrist. In one exemplary embodiment, the wristband 14 may be injected molded of a flexible polymeric material. The wristband 14 has receiving structures for connection to the portable electronic module 12. As shown in FIG. 6, the carrier 14 includes a protective sleeve 60 proximate the central portion and having an opening 62 in communication with an internal passageway 64. The communication connector 24 is received through the opening 62 and into the internal passageway 64. The protective sleeve 60 has a generally contoured outer surface. The sleeve 60 may have internal structure for assisting in securing the connector 24, such as ridges that provide an interference type fit between the sleeve 60 and the connector 24. As further shown in FIG. 6, the central portion of the wristband 14 may have an insert 66 that defines a portion of the opening 62. A vent may be provided through a bottom portion of the wristband 14 and is in communication with the passageway 64 proximate the connector 24 when inserted into the wristband 14. The vent allows any moisture to escape from the wristband 14 and be channeled away from the connector 24. Also at the central portion, the carrier 14 has a pair of apertures 68 dimensioned to respectively receive the pair of protrusions 44 of the portable electronic module 12.

As further shown in the figures, the first end portion has a pair of holes to accommodate a removable closure 70 used to fasten the wristband 14 to a wrist of a user. To this end, the removable closure 70 cooperates with the plurality of holes in the wristband 14. The removable closure 70 has a plate member 72 and a plurality of posts 74 extending generally in a perpendicular direction from the plate member 72. In the exemplary embodiment, the plate member 72 has two posts 74. To wear the wristband, first the removable closure 70 is connected to the first end portion of the wristband strap wherein the pair of holes is provided to receive the posts 74. The wristband 14 is positioned around the user's wrist and the posts 74 are inserted into holes provided on the second end portion of the wristband 14 as can be appreciated from FIG. 2. After the posts 74 are inserted into the pair of holes of the first end portion of the wristband 14 and the plurality of holes of the second end portion of the wristband 14, the first end portion and second end portion of the wristband 14 overlap one another. With the use of a pair of posts 74, the removable closure 70 allows for a secure connection and greater flexibility in connection providing for a greater adjustment to accommodate for a range of wrist sizes.

Additionally, the plate member 72 can have indicia 76 thereon. The plate member 72, when attached to the wristband 14 faces away from the wristband 14 wherein the indicia 76 can be viewed by others. Because the removable closure 70 is easily removable, the closure 70 can be used as a memento, different closures can be provided and used with the wristband 18. Thus, removable closures 70 having different indicia can be provided and used as a keepsake, memento, or a reward for accomplishing a goal, participating in a race, or otherwise achieving a certain level of fitness. Indicia can take various forms including wording, graphics, color schemes, textures, or other designs etc.

Figure 64:
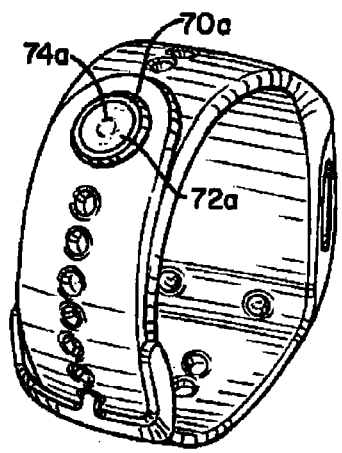

The watch 10 can utilize alternate closure mechanisms. For example, as shown in FIG. 64, the wristband 14 can utilized a traditional buckle member in conjunction with an alternate removable closure 70a. In this embodiment, the removable closure 70 has a smaller circular plate member 72a having a single post 74a. The removable closure 70a is attached at a distal end of one of the end portions of the wristband 14 and then inserted into the other portion of the wristband 14.

Figure 19:
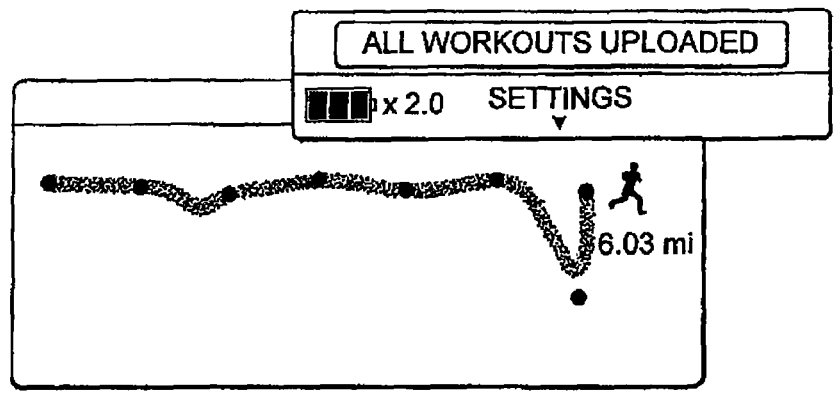
Figure 20:
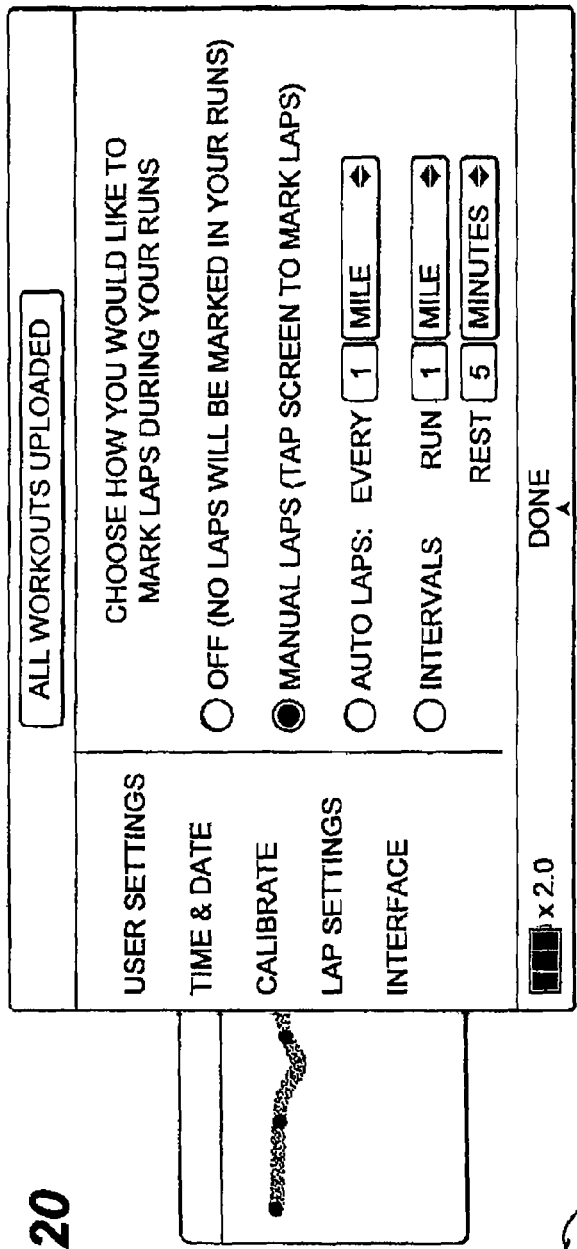
Figure 21:
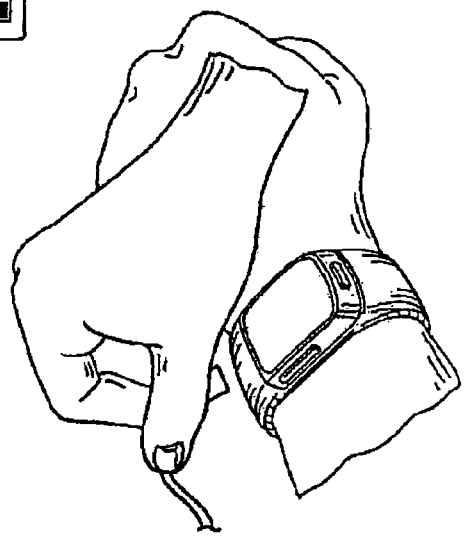

As discussed, the portable electronic module 12 is removably connected to the carrier 14 or wristband 14. As explained in greater detail below, the portable electronic module 12 may be plugged into a computer via the communication connector 24 wherein data and other information may be downloaded to the module 12 from a remote location such as an athletic performance monitoring site, or remote site (FIGS. 9, 10, 16-20). Data recorded by the electronic module 12 may also be uploaded to the computer and then the remote site. Data can be displayed as shown in FIGS. 16, 17, 19 and 20. Additional data can also be downloaded from the remote site or computer to the portable electronic module 12. The portable electronic module 12 can then be re-connected to the wristband 14. The connector 24 is inserted into the sleeve 60 of the carrier 14, and the protrusions 44 are placed into the respective apertures 68 of the carrier 14. The enlarged heads of the protrusions 44 abuts against the wristband 14 to retain the module 12 onto the wristband 14. This provides for a wearable watch 10 wherein a user can utilize additional features of the watch 10 described herein relating to athletic performance and fitness. As discussed, the electronic module 12 is removably connected to the wristband 14 wherein data can be transferred by plugging the module 12 into the computer as shown in FIG. 10. In another exemplary embodiment as shown in FIG. 21, the module 12 can have a port to receive a communication cord used for data transfer between the module 12 and a computer or remote site.

General Operation

Figure 18:
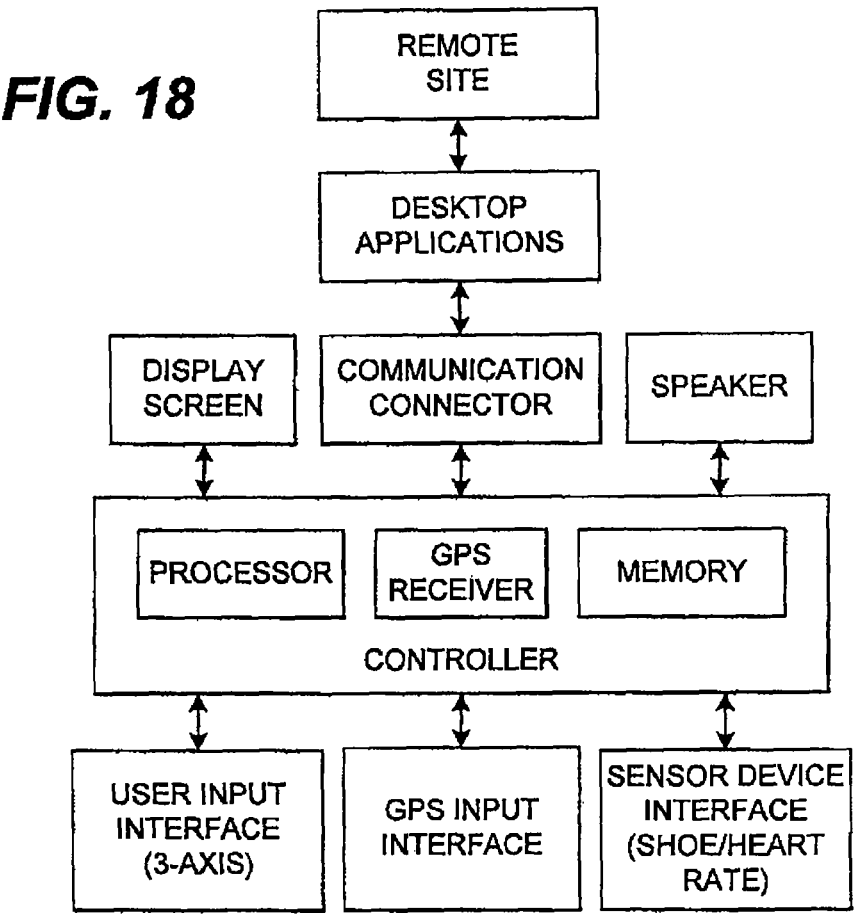

It is understood that the portable electronic module 12 of the watch 10 has associated software to function with the user interfaces associated with the watch 10. FIG. 18 shows schematically components of an overall system associated with the watch 10. As explained in greater detail below, in addition to having chronograph functions like a conventional watch, the watch 10 has additional athletic functionality. For example, a user wearing shoes having a sensor(s) 1 mounted therein or a heart rate monitor 1 can use the watch 10 to wirelessly communicate with the sensor(s) 1 and monitor performance such as during exercise including running. Other sensor types can also be incorporated for use by the user and communication with the watch 10. The watch 10 can record and monitor athletic performance of the user.

Figure 14:
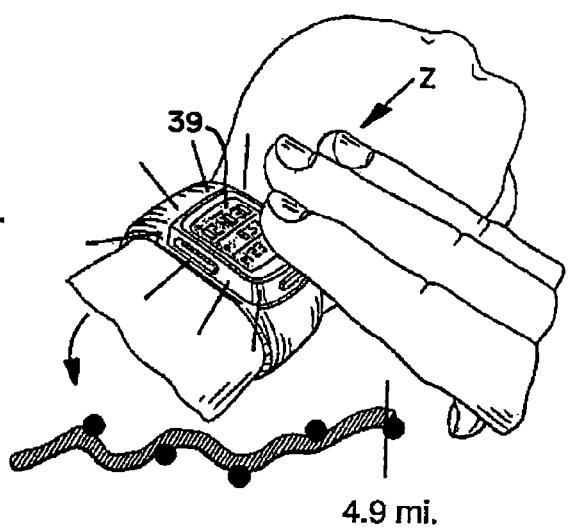
Figure 15:
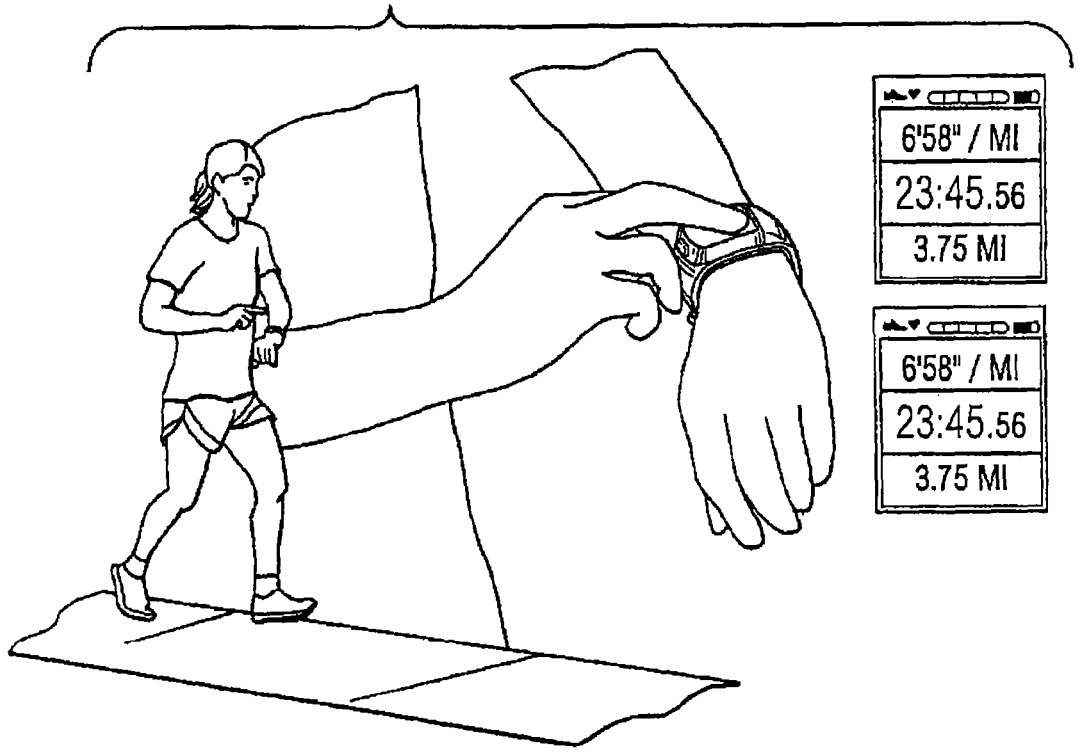
Figure 16:
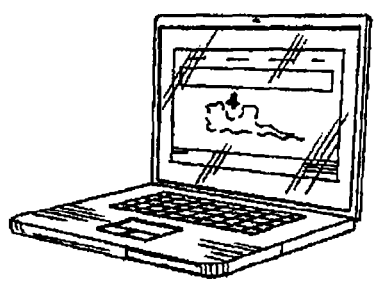
Figure 17:
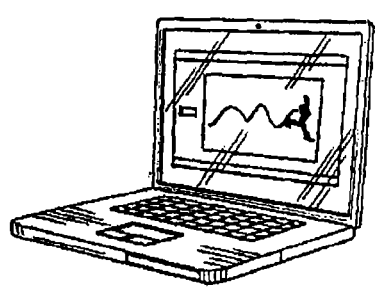

Generally, the user controls operation of the watch 10 utilizing the three inputs described above, namely the side button 50, the end button 52 and the shock button 54. These inputs are configured such that the user provides inputs along first, second and third axes. In an exemplary embodiment, the inputs are configured in a tri-axes configuration, namely an x-y-z axes configuration (FIG. 2). This provides an enhanced user friendly user interface wherein the user can easily control operation of the watch 10 while participating in athletic activity. As can be appreciated from FIG. 11, the side button 50 is typically actuated by a user squeezing or pinching the side button 50 and opposite housing side 36 generally along the x-axis. The end button 52 is typically actuated by a user squeezing or pinching the end button 52 and proximate the opposite housing end 30 generally along the y-axis (FIG. 12). Finally, the shock button 54 is typically actuated by the user tapping the front side 38 of the housing 16, typically the crystal 39, generally along the z-axis (FIGS. 14 and 15). As explained in greater detail below, the side button 50 is normally utilized to scroll or cycle through a list of items or values within the user interface, by pressing up or down in order to scroll through the list of items. The end button 52 is normally utilized for selecting items within the user interface, such as the options of "SELECT" and "OK." The shock button 54 is generally utilized for lighting the backlight and other specific functions such as marking of laps. For example, to light the backlight associated with the controller 18 and display 56, a user can simply tap the crystal 39. As also discussed in greater detail below, a user can tap the crystal 39 to actuate the shock button 54 to "mark" a segment of an athletic performance. The user may also have the ability to customize the buttons to their own preferences by utilizing the set-up functionality within the watch 10 or other software such as from a desktop utility associated with the watch 10 as well as remote site functionality that may be inputted into the watch 10 such as through the USB connector 24. Additional operability and features of the watch 10 will be described in greater detail below.

FIGS. 22-49 disclose another embodiment of the athletic watch of the present invention, generally designated with the reference numeral 100. Similar structures will be designated with similar reference numerals in the 100 series of reference numerals Similar to the embodiment of FIGS. 1-21, the athletic watch 100 generally includes an electronic module 112 and a carrier 114 in the form of a wristband 114 in the exemplary embodiment. Similar to the watch 10 of FIGS.

1-21, the watch 100 has traditional uses such as incorporating a chronograph for general timekeeping, as well as the unique functionality for athletic and fitness use such as monitoring athletic performance of the user. Thus, the watch 100 can communicate with a shoe-based sensor 1 and/or a hear rate monitor 1 (shown in phantom in FIG. 22). It is further understood that the watch 100 has the same operational features regarding user interfaces, GPS and other features as described herein.

Electronic Module

As shown in FIGS. 23-28, the portable electronic module 112 includes various components supported by a housing 116, the components including a controller 118 having a suitable processor and other known components, an input device assembly 120, an output device assembly 122, and a communication connector 124, which may be considered a part of the input device assembly 120 and/or the output device assembly 122 in various embodiments. The communication connector 124 may be, for instance, a USB connector 124. The controller 118 is operably connected to the input device assembly 120, the output device assembly 122 and the communication connector 124. As discussed, the electronic module 112 may also include a GPS receiver and associated antenna for incorporating various GPS features.

As depicted in FIG. 25, the housing 116 has a first end 130, a second end 132, a first side 134, a second side 136, a front side 38, and a back side 140. The front side 138 may also include a glass member 139 or crystal 139 for viewing a display of the controller 118 therethrough. The housing 116 defines a cavity 142 therein for accommodating the various components of the controller 118. It is understood that the housing ends, sides and crystal cooperate to enclose the housing 116. As further shown in the figures, the communication connector 124 extends from the first side 130 of the housing 116. It is understood that the communication connector 124 could be positioned at various other locations of the housing 16. The communication connector 124 could also be operably connected to other portions of the watch 10 such as various portions of the carrier 114. In this embodiment, the communication connector 124 generally rigidly extends from the housing 116. As discussed, the communication connector 124 is a USB connector and may have a plurality of leads therein and wherein the leads are operably connected to the controller 118. The housing 116 can be made from a variety of different rigid materials including metal or generally rigid polymeric materials. In this exemplary embodiment, the housing 116 is injection molded. The USB connector 124 generally provides a water-resistant connection with the housing 16 and controller 18. As shown in FIGS. 26, 27-28, the housing 116 has a protrusion 144 extending from the back side 140 of the housing 116. It is understood that a plurality of protrusions 144 could be used if desired. Because the watch 100 may be used in fitness activities, there is some chance that the watch 10 can be subject to water or moisture such as perspiration. The housing 116 is designed to be water-resistant to protect components of the controller 118. Such structures further provide for a certain level of impact resistance. A vent opening may also be provided in the wristband 114 to channel any moisture away from the module 112. As further shown in FIG. 25, the housing 116 may also include a rubber boot 117 that is designed to generally cover surfaces of the housing 117 and serve as an outer skin. It is understood that the rubber boot 117 has an opening for the crystal 139 to be visible and for the protrusion 144 to extend through. The rubber boot 117 is cooperatively dimensioned to wrap around the housing 116 to resist any moisture or debris penetration.

As further shown in FIG. 25, the controller 118 generally has a processor 146 that is operably connected to the input device assembly 120 and the output device assembly 122 as understood by those skilled in the art. The controller 118 includes software that in cooperation with the input device assembly 120 and output device assembly 122 provide user interface features as will be described in greater below. The components of the controller 118 are contained within and supported by the housing 116. The controller 118 includes various electrical components including a rechargeable power supply (e.g., rechargeable battery or other battery types) and system memory. The controller 118 will also include an antenna 148 (FIG. 38), allowing the controller 118 and portable electronic module 112 to communicate with the sensors 1, record and store data relating to athletic performance, other time information, as well other operational features such as GPS features. The antenna 148 can take various forms including a chip antenna associated with the controller 118. Alternatively, the antenna 148 could be a sheet metal antenna. With other embodiments incorporating GPS features, a separate GPS antenna may also be provided. Thus, the watch 110 may incorporate multiple antennas. The controller 118 is operably connected to the communication connector 124 of the housing 116.

The input device assembly 120 includes a plurality of input devices such as in the form of depressible buttons. In certain exemplary embodiment, the USB connector 124 can also be considered an input device when data is transferred to the watch 100 via the connector 124. In one exemplary embodiment, the input device assembly 120 has three input buttons that collectively define a tri-axis operating configuration (e.g., x-y-z axes) (FIG. 27). The input buttons include a side button 150, an end button 152 and a shock or tap button 154.

The side button 150 is located on the first side 134 of the housing 116. The side button 150 may correspond with a first input and being operably connected to the controller 118 for controlling the portable electronic module 112. As shown in FIG. 1, the side button 150 is configured to operate in an x-axis direction. The user may activate the first input by pressing on the side button 150 on the first side 134 of the housing 116. The user may squeeze the side button 150 and opposite second side 136 of the housing 116 along the x-axis direction (FIG. 27). In an exemplary embodiment, the side button 150 may include a pair of buttons that are operably associated with the controller 118 for controlling the portable electronic module 112. For example, the side button 150 has a first side button 150*a* and a second side button 150*b*. Thus, a user may press the first side button 150*a*, for a first input, and may press the second side button 150*b* for a second or additional input different from the first input. As explained in greater detail below regarding the operation of the watch 110, the side buttons 150*a*,150*b* may be utilized as a toggle button or scroll button, with the first input corresponding to the first side button 150*a* and the additional input corresponding to the second side button 150*b*. The side buttons 150*a*,150*b* may then be used to move a cursor on the display up or down in order to select an item from a list. It is also understood that the side button 150 may be positioned on the opposite side 136 of the housing 16, which may be considered a three o'clock position. The side button 150 shown in FIG. 27 is considered to be in the nine o-clock position.

The end button 152 is located on the second end 132 of the housing 116. The end button 152 corresponds to a second input and is operably connected to the controller 118 for controlling the portable electronic module 112. As shown in FIG. 27, the end button 152 is configured to operate in a y-axis direction. The user may activate the second input by pressing on the end button 152 on the second end 132 of the housing 116. The user may squeeze the end button 152 and the opposite first end 130 of the housing 116 along the y-axis direction (FIG. 27). As explained in greater detail below regarding the operation of the watch 110, the end button 152 may be used as the OK or SELECT function.

Figure 30:
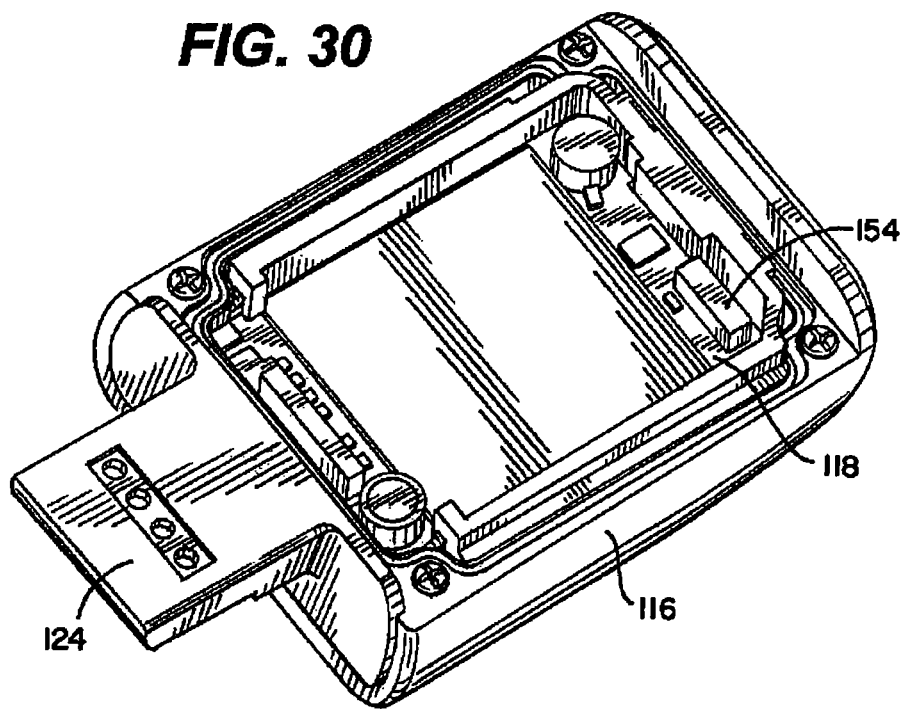
Figure 31:
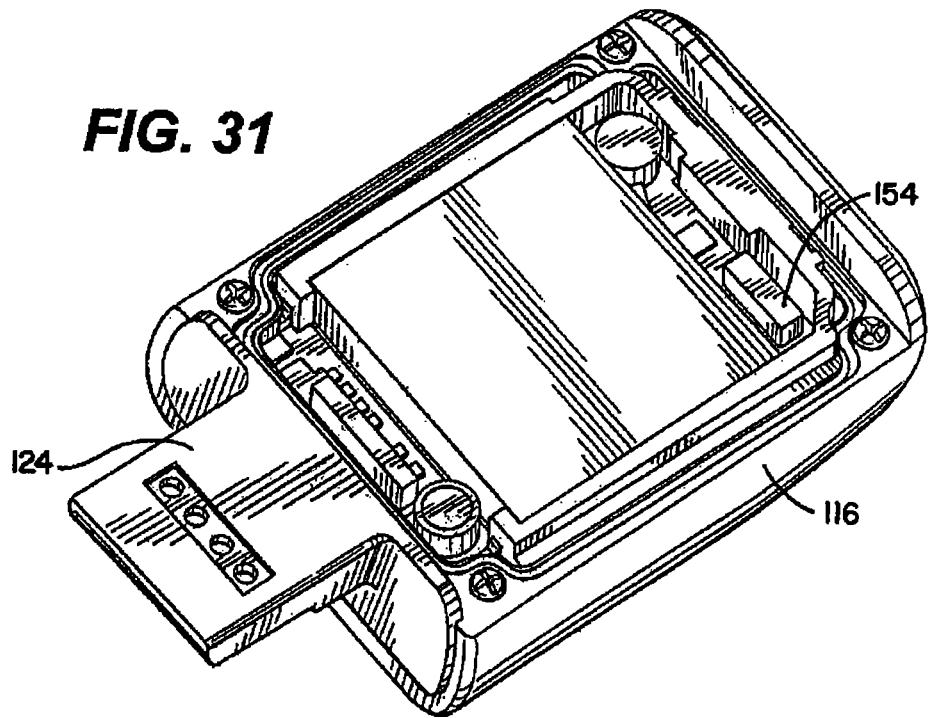

In an exemplary embodiment, the shock button 154 or tap button 154 generally corresponds to a shock sensor that is preferably located within the housing 16. It is understood that the discussion above regarding the shock button 54 of FIGS. 1-21 equally applies to the shock button 154 in this embodiment. It is understood that the button 154 can take other forms other than a shock sensor and also may be located in alternate positions within the housing 116. The shock sensor 154 is generally positioned within the housing 116 (FIGS. 30-31) and beneath the crystal 139. As shown in FIGS. 30 and 31, the shock button 154 is positioned proximate a periphery of the controller 118 and housing 116. FIG. 31 shows the shock button 154 adjacent to the battery positioned in the housing 116. As discussed above, the shock button 154 could be positioned at other locations such as generally proximate a center of the housing controller 18 and housing 116. The shock sensor 154 could be positioned on the front side 138 of the housing 116. The shock button 54 corresponds to a third input and is operably connected to the controller 118 controlling the portable electronic module 12. As shown in FIG. 27, the shock button 154 is configured to operate in a z-axis direction. The user may activate the third input by tapping or pressing on the crystal 39 or display screen. This tapping or pressing on the display screen 39 will activate the shock button 154 or tap button 154. Thus, the shock sensor 154 has a sensitivity such that a tap on the crystal 39 activates the shock button 54. Additionally, the shock button 154 may be configured to correspond with a fourth input of the controller 118 for controlling the portable electronic module 112. For instance, the shock button 154 may sense two different shock levels or forces, e.g. a soft level and a hard level. The soft level is activated when the user presses or taps with a first amount of force F1 in order to activate the soft level of the sensor 154. The hard level is activated when the user presses or taps with a greater amount of force F2 to activate the hard level of the sensor 154. Additional levels could also be incorporated into the shock sensor 154.

As further shown in FIGS. 25 and 27, the output device assembly 122 includes a plurality of output devices including a display 156. The USB connector 124 may also be considered an output device when transferring data from the electronic module 112. It is further understood that the output device assembly 122 may include an audible speaker if desired. The controller 118 can have additional capabilities for communicating with other devices such as digital music players or other electronic devices.

The display 156 is located generally proximate the front side 138 of the housing 116 and is positioned beneath the crystal 139 or screen 139. The display 156 is operably connected to the controller 118 and includes a plurality of different display fields as shown in the user interface display screens to be described. In cooperation with the user interface associated with the watch 100, information is displayed in the various display fields as described in greater detail below. As also described, a user can modify what information is displayed and the manner in which the information is displayed. In one exemplary embodiment, the display 156 may be a liquid crystal display (LCD) screen. The display 156 may also have a negative screen. The negative screen may give the user the option to reverse the appearance of text from black numbers on a white background to white numbers on a black background. This negative screen may also be referred to as reverse display or negative display. The negative screen may help to reduce the glare for many users. It is understood that the portable electronic module 112 can have additional or alternate input devices and output devices.

The electronic module has a rechargeable battery contained within the housing to provide power to the watch 100. The rechargeable battery is charged such as when the user plugs the electronic module into a computer as shown in FIG. 10. It is understood that the battery associated with the controller can utilize a plurality of batteries or power sources. A first battery may be utilized for the general watch/chronograph functions. A second battery may be utilized for other controller functions including communicating with the sensors for example. The first battery would be a typical battery that has a long life and support the basic watch functions. The other second battery can be a traditional rechargeable battery to support the additional controller functions associated with monitoring athletic performance, which functions may be more demanding on the power source. In such configuration, the watch functions would not be compromised even if the rechargeable battery was depleted by the athletic performance monitoring functions or if the user had not worked out for some time and had not charged the electronic module. FIG. 31 discloses a battery positioned in the housing 116.

Carrier

As shown in FIGS. 23-26, the carrier 114 is generally in the form of a wristband 114 having a central portion between a first end portion and a second end portion. The wristband 114 may include separate members generally molded or connected together. The wristband 114 is flexible to fit around a user's wrist. In one exemplary embodiment, the wristband 114 may be injected molded of a flexible polymeric material. The wristband 114 has receiving structures for connection to the portable electronic module 112. The carrier 114 includes a protective sleeve 160 proximate the central portion and having an opening 162 in communication with an internal passageway 164. The communication connector 124 is received through the opening 162 and into the internal passageway 164. The protective sleeve 160 has a generally contoured outer surface. The sleeve 160 may have internal structure for assisting in securing the connector 124, such as ridges that provide an interference type fit between the sleeve 160 and the connector 124. A vent may be provided through a bottom portion of the wristband 114 and is in communication with the passageway 164 proximate the connector 124 when inserted into the wristband 114. The vent allows any moisture to escape from the wristband 118 and be channeled away from the connector 124. Also at the central portion, the carrier 14 has an aperture 68 dimensioned to respectively receive the protrusion 44 of the portable electronic module 112.

As further shown in the figures, the first end portion has a pair of holes to accommodate a removable closure 170 used to fasten the wristband 114 to a wrist of a user. To this end, the removable closure 170 cooperates with the plurality of holes in the wristband 114. The removable closure 170 has a plate member 172 and a plurality of posts 174 extending generally in a perpendicular direction from the plate member 172. In the exemplary embodiment, the plate member 172 has two posts 174. To wear the wristband, first the removable closure 170 is connected to the first end portion of the wristband strap 114 wherein the pair of holes is provided to receive the posts 174. The wristband 114 is positioned around the user's wrist and the posts 174 are inserted into holes provided on the second end portion of the wristband 114. After the posts 174 are inserted into the pair of holes of the first end portion of the wristband 114 and the plurality of holes of the second end portion of the wristband 114, the first end portion and second end portion of the wristband 114 overlap one another. With the use of a pair of posts 174, the removable closure 170 allows for a secure connection and greater flexibility in connection providing for a greater adjustment to accommodate for a range of wrist sizes.

Additionally, the plate member 172 can have indicia 176 thereon. The plate member 172, when attached to the wristband 114 faces away from the wristband 114 wherein the indicia 176 can be viewed by others. Because the removable closure 170 is easily removable, the closure 170 can be used as a memento, different closures can be provided and used with the wristband 114. Thus, removable closures 170 having different indicia can be provided and used as a keepsake, memento, or a reward for accomplishing a goal, participating in a race, or otherwise achieving a certain level of fitness. Indicia can take various forms including wording, graphics, color schemes, textures, or other designs etc.

FIGS. 33-49 disclose additional views and features of the watch 100 and, in particular, showing additional connection of components associated with the electronic module 112.

Figure 32:
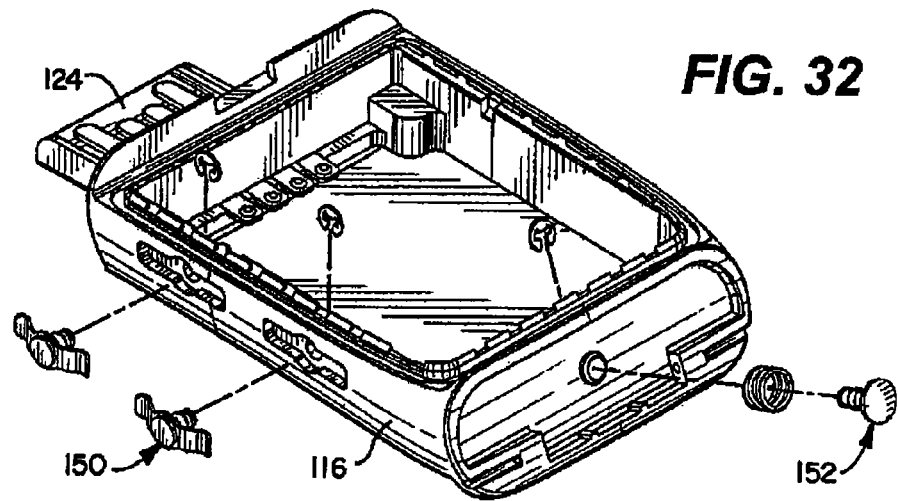
Figure 33:
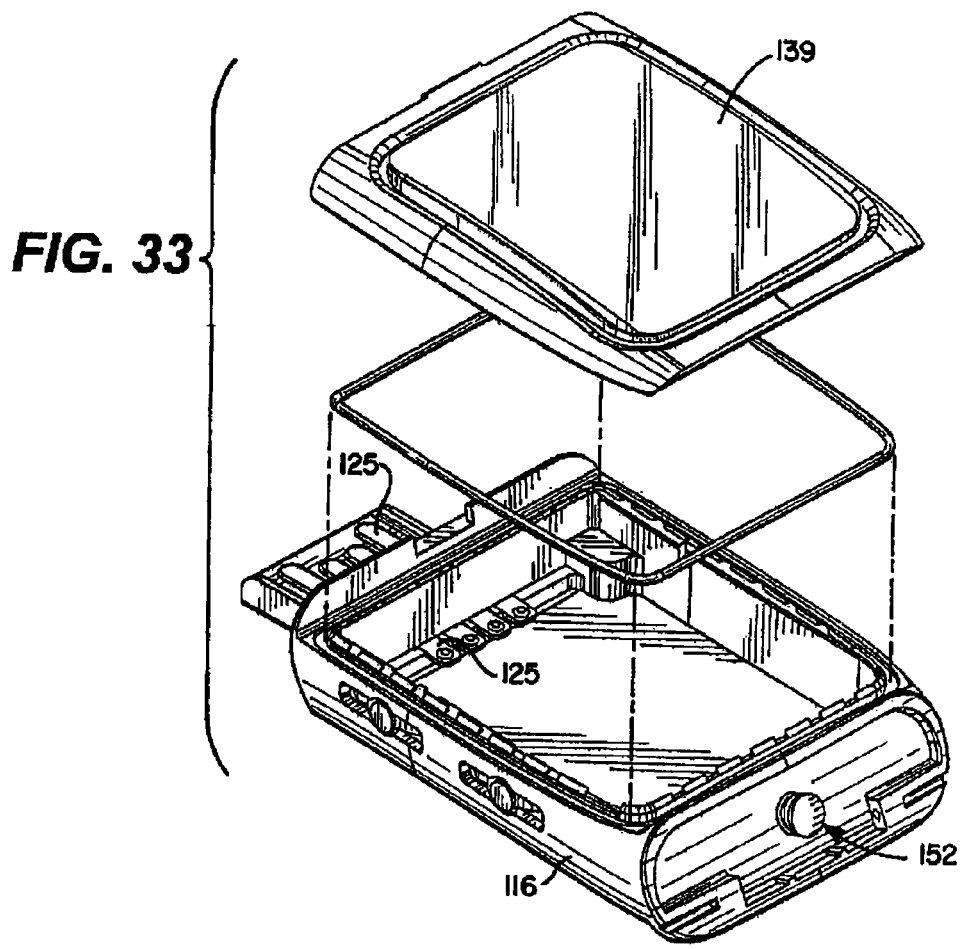
Figure 37:
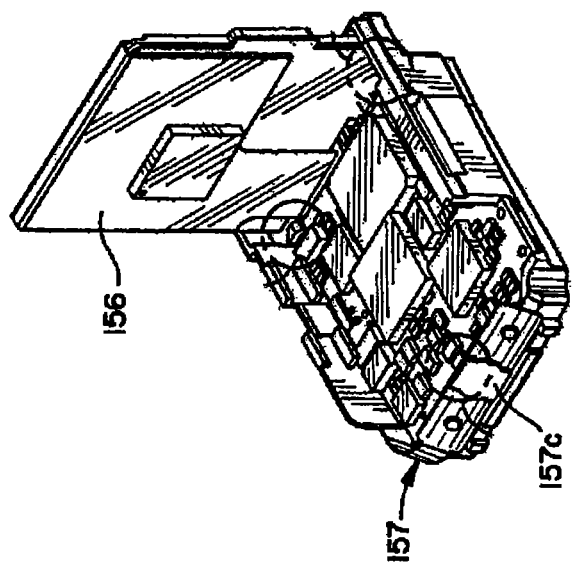

As shown in FIGS. 32-34, the housing 116 is provided and is an injection-molded component in an exemplary embodiment. The USB connector 124 may be integrally formed as part of the housing 116 and the USB connector 124 may have metal leads 125 embedded within the connector 124. Ends of the leads 125 extend into the internal cavity of the housing 116 to be in operable connection with the controller 118 as explained in greater detail below. The side button 150 and end button 152 are suitably mounted to the housing 116 and have associated resilient spring members to assist in the operability of the buttons. In an exemplary embodiment, the housing 116 has multiple components wherein a top component supporting the screen 139 is fastened to the main housing component such as by ultrasonic welding. A seal ring may also be positioned between the housing components prior to connection to provide a sealed configuration.

Figure 36:
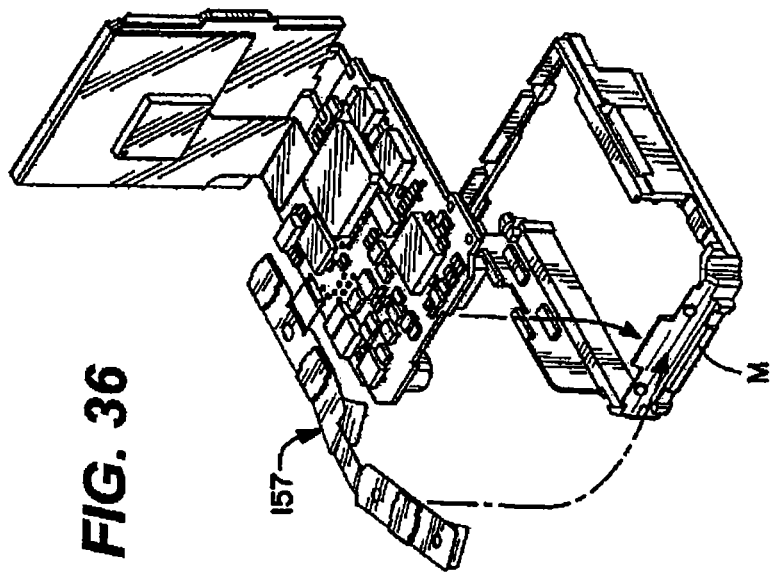
Figure 42:
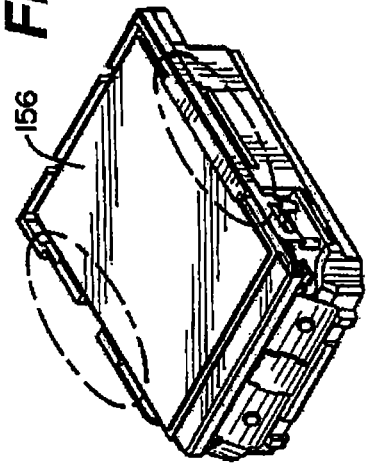
Figure 43:
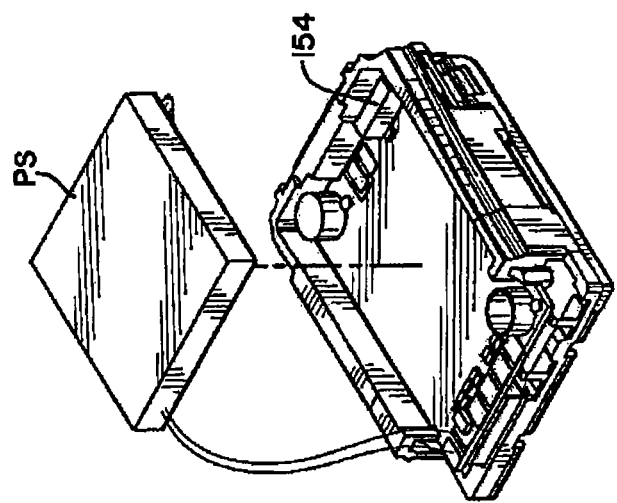

As further shown in FIGS. 35-43, the controller 118 is formed as a sub-assembly to be mounted in the housing 116. The controller 118 has a main printed circuit board B that is connected to the display 156, which is an LCD display in an exemplary embodiment. The controller 118 further has a user input interface 157 that is also operably connected to the main printed circuit board. The user input interface 157 is a flexible member and has a first pair of members 157a,157b that correspond to the first input/side button 150a,150b as well as a second member 157c that corresponds to the second input/end button 152. The flexible member is capable of bending around so that one segment of the flexible member is mounted on a side of the controller 118 and a second segment of the flexible member is mounted on an end of the controller 118. The flexible member may have locating openings that mount on pegs on the mid-frame M. The flexible user input interface 157 provides for a more efficient manufacture of the watch as the flexible member is more easy to handle and manipulate. The shock button 154 in the form of a shock sensor or accelerometer is also operably mounted on the main printed circuit board B consistent with the discussion regarding FIGS. 8a and 8b above. As shown in FIG. 36, the controller 118 may have a mid-frame component M to support the components of the controller 118. The antenna 148 is connected to the main printed circuit board B as shown in FIGS. 38-40. A distal end of the antenna 148 may be formed around an edge of the mid-frame M as shown in FIG. 40. As shown in FIGS. 41-42, the display 156 is snapped into place. The battery PS is also connected to the main printed circuit board B as shown in FIGS. 43-44.

Figure 44:
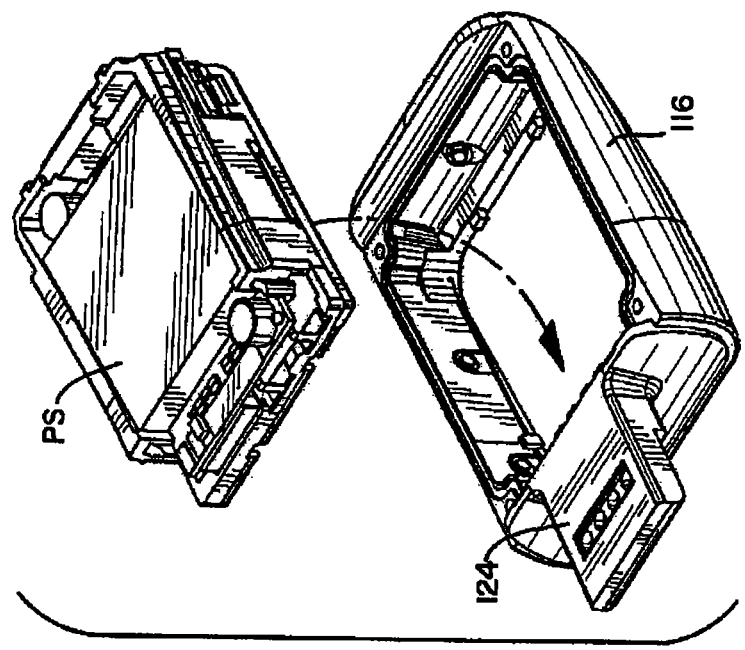
Figure 47:
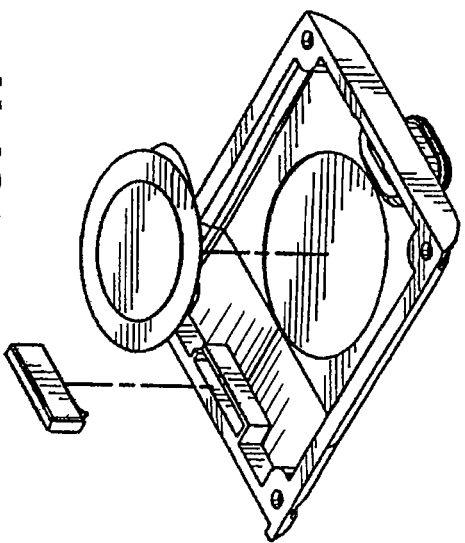
Figure 46:
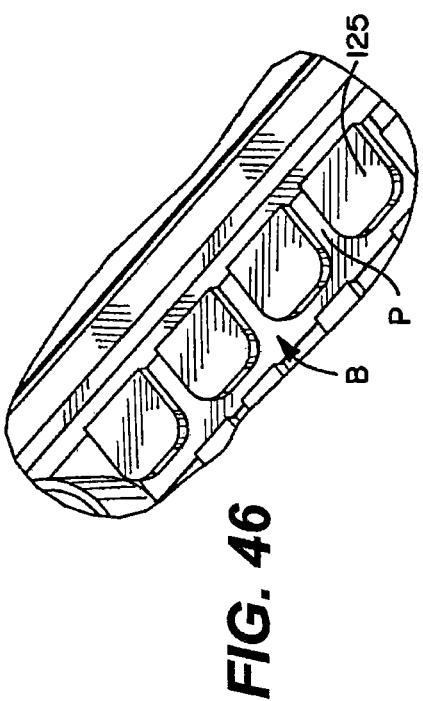
Figure 45:
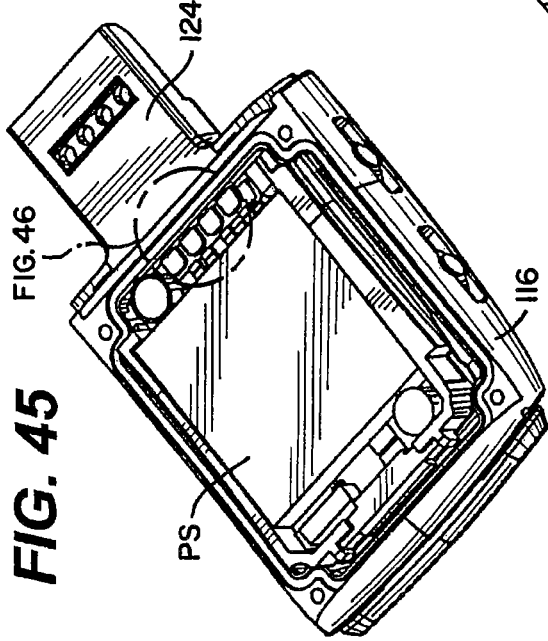
Figure 48:
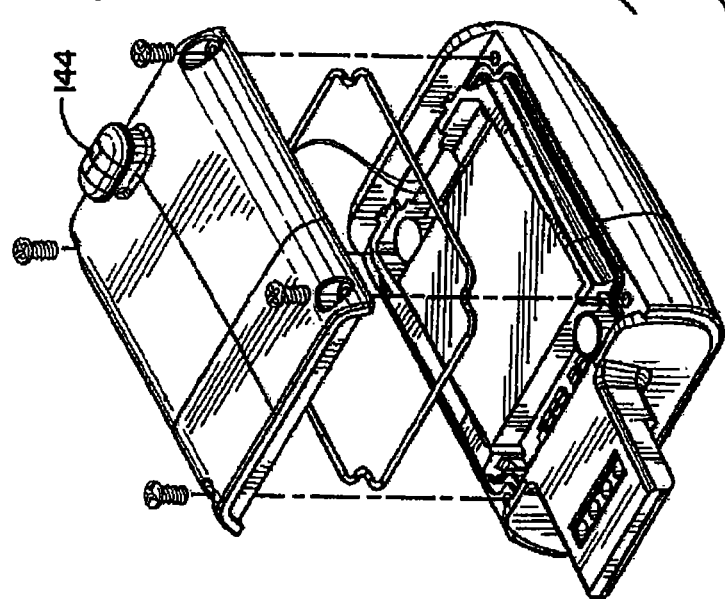
Figure 50:
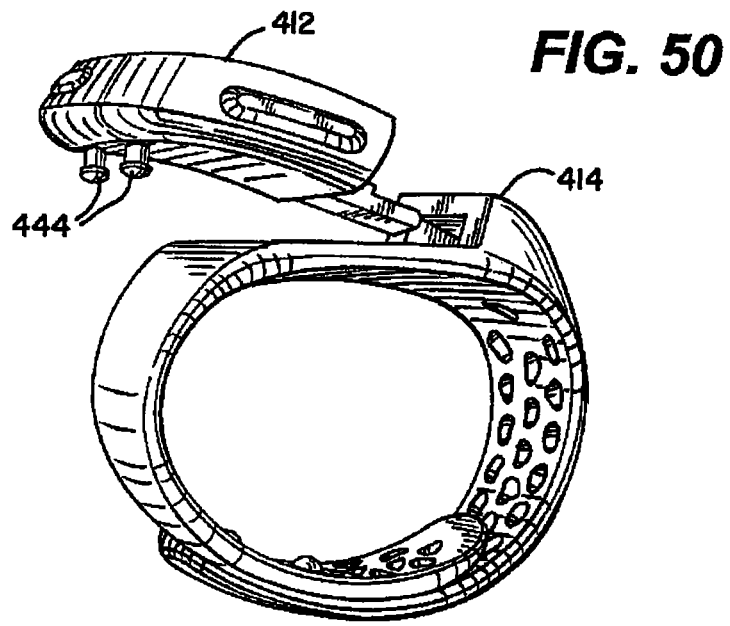
FIGS. 50-64 disclose views of another embodiment of a device in the form of a watch of an exemplary embodiment of the present invention.
Figure 51:
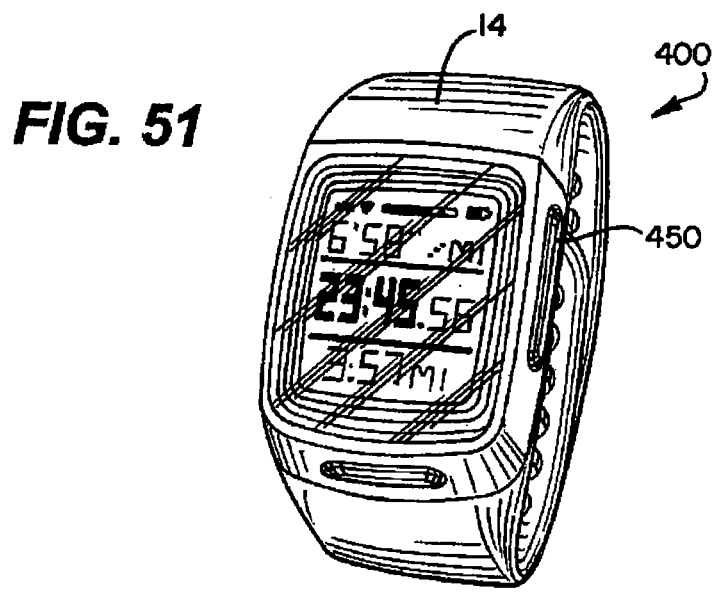
Figure 52:
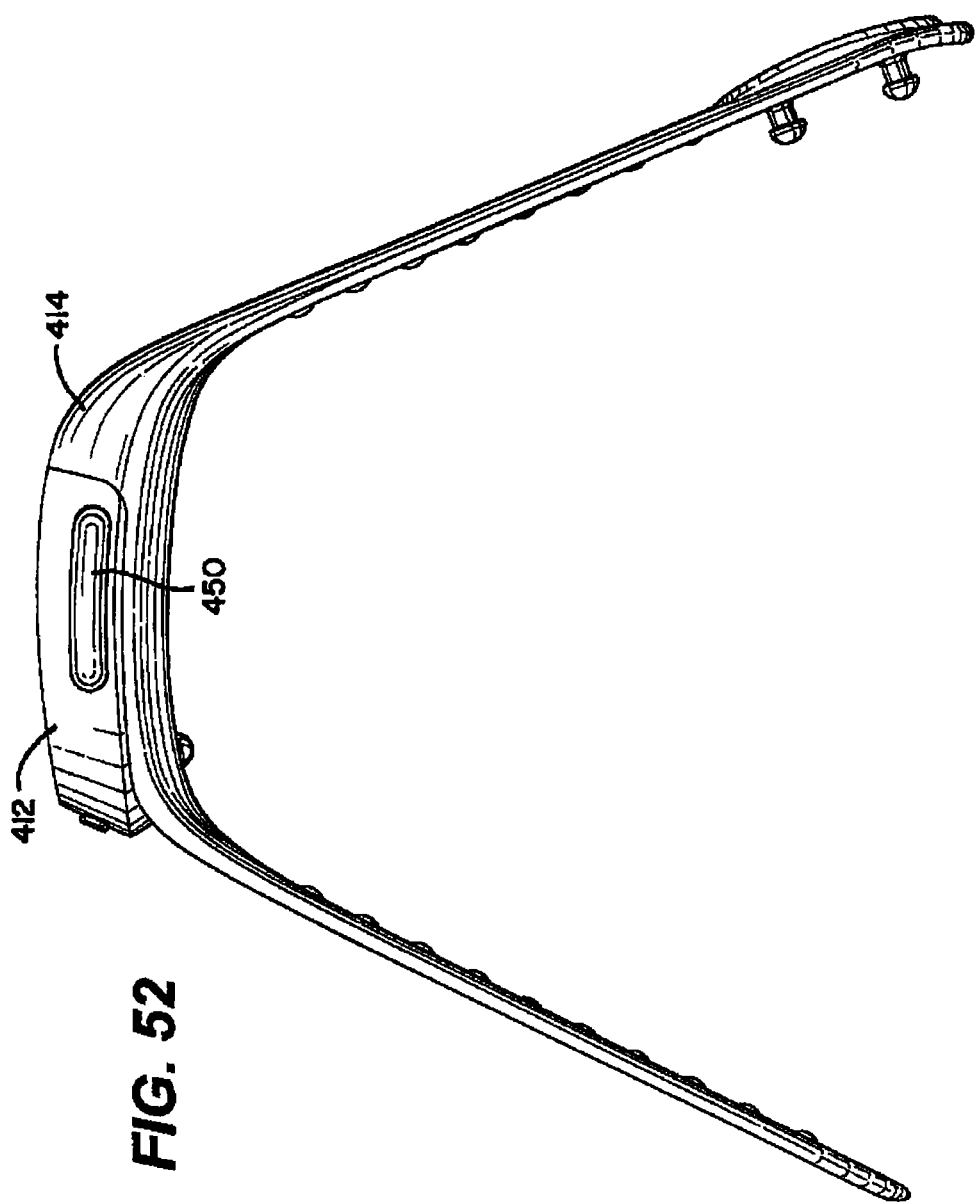
Figure 53:
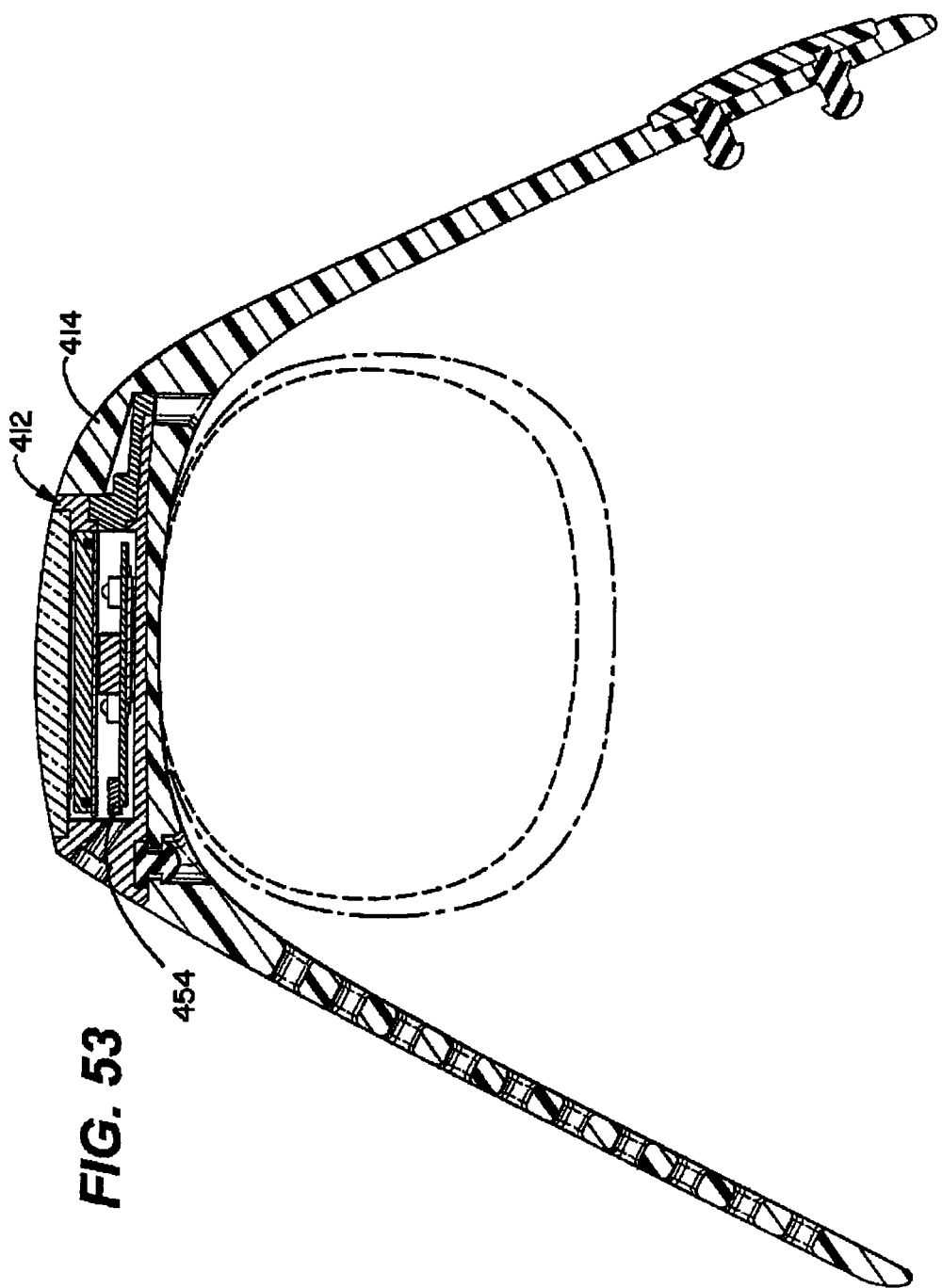

As further shown in FIGS. 44-46, the sub-assembly controller is positioned in the inner cavity of the housing 116 wherein the leads 125 of the USB connector 124 are operably connected to a contacts pad P on the printed circuit board B of the controller 118. As shown in FIG. 47, a piezoelectric member is connected to a back component of the housing 116. As shown in FIG. 48, the back component of the housing 116 is connected to the other housing component supporting the controller sub-assembly wherein the controller 118 is suitably mounted in the housing 116. A seal member is positioned between the housing components to provide the desired seal. The bottom housing component has the protrusion 144 thereon. It is understood that the housing components can be connected via traditional screw fasteners or other known fastening means.

Figure 49:
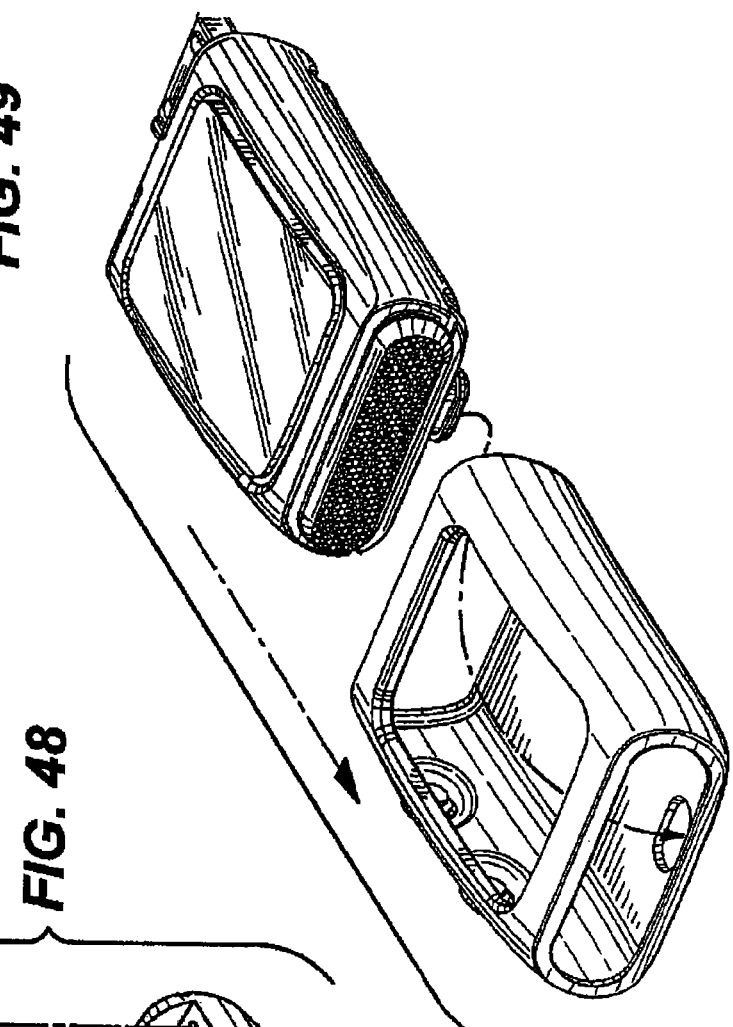

As shown in FIG. 49, an overlay member 117 in the form of a resilient rubber boot is considered part of the housing 116. The overlay member 117 has openings to accommodate the end button 152, the USB connector 124, the screen 139 and the protrusion 144. The overlay member 117 has raised sections corresponding to the side buttons. The overlay member 117 is positioned over the housing 116 wherein the electronic module 112 is formed. The overlay member 117 may have a heat-activated adhesive on an inside surface of the member 117 that is activated to affix the overlay member 117 to the housing components. As further shown in FIG. 23-24, the electronic module 112 is removably connected to the wristband 114 wherein the USB connector 124 is received in the sleeve 160 through the opening 162 and the protrusion 144 is received in the aperture 168. The watch 100 can then be worn on the user's wrist.

As discussed, the portable electronic module 112 is removably connected to the carrier 114 or wristband 114. As explained in greater detail below, the portable electronic module 112 may be plugged into a computer via the communication connector 124 wherein data and other information may be downloaded to the module 112 from a remote location such as an athletic performance monitoring site, or remote site (See FIGS. 10 and 16-20). Data recorded by the electronic module 112 may also be uploaded to the computer and then the remote site. The portable electronic module 112 can then be connected to the wristband 114. The connector 124 is inserted into the sleeve 160 of the carrier 114, and the protrusion 144 is placed into the aperture 168 of the carrier 114. The enlarged head of the protrusion 144 abuts against the wristband 114 to retain the module 112 onto the wristband 114. This provides for a wearable watch 110 wherein a user can utilize additional features of the watch 100 described herein relating to athletic performance and fitness.

General Operation

It is understood that the portable electronic module 112 of the watch 100 has associated software to function with the user interfaces associated with the watch 100. As explained in greater detail below, in addition to having chronograph functions like a conventional watch, the watch 100 has additional athletic functionality. For example, a user wearing shoes having a sensor(s) 1 mounted therein or a heart rate monitor 1 can use the watch 100 to wirelessly communicate with the sensor (s) 1 and monitor performance such as during exercise including running. Other sensor types can also be incorporated for use by the user and communication with the watch 100. The watch 100 can record and monitor athletic performance of the user.

Generally, the user controls operation of the watch 100 utilizing the three inputs described above, namely the side button 150, the end button 152 and the shock button 154. These inputs are configured such that the user provides inputs along first, second and third axes. In an exemplary embodiment, the inputs are configured in a tri-axes configuration, namely an x-y-z axes configuration (FIG. 27). This provides an enhanced user friendly user interface wherein the user can easily control operation of the watch 100 while participating in athletic activity. As can be appreciated from FIG. 27, the side button 150 is typically actuated by a user squeezing or pinching the side button 150 and opposite housing side 136 generally along the x-axis. The end button 152 is typically actuated by a user squeezing or pinching the end button 152 and opposite housing end 130 generally along the y-axis (FIG. 27). Finally, the shock button 54 is typically actuated by the user tapping the front side 138 of the housing 116, typically the crystal 139, generally along the z-axis (FIGS. 14, 15 and 27). As explained in greater detail below, the side button 150 is normally utilized to scroll or cycle through a list of items or values within the user interface, by pressing up or down in order to scroll through the list of items. The end button 152 is normally utilized for selecting items within the user interface, such as the options of "SELECT" and "OK." The shock button 154 is generally utilized for lighting the backlight and other specific functions such as marking of laps. For example, to light the backlight associated with the controller 118 and display 156, a user can simply tap the crystal 139. As also discussed in greater detail below, a user can tap the crystal 139 to actuate the shock button 154 to "mark" a segment of an athletic performance. The user may also have the ability to customize the buttons to their own preferences by utilizing the set-up functionality within the watch 100 or other software such as from a desktop utility associated with the watch 100 as well as remote site functionality that may be inputted into the watch 100 such as through the USB connector 124.

FIGS. 50-64 disclose another embodiment of the watch of the present invention generally designated with the reference numeral 400. The watch 400 of this embodiment has similar structure and functionality to the watch 10 of FIG. 1-21 and the watch 100 of FIGS. 22-49. Similar structures will not be fully described in greater detail as the above description applies equally to this additional embodiment. Similar structures will be described with reference numerals in the 400 series of reference numerals. As discussed, the watch 400 of this embodiment can utilize the user interface features described herein and have GPS functionality as described herein. As generally shown in FIGS. 50-53, the watch 400 generally includes a portable electronic module 412 removably connected to a carrier 414 or strap member in the form of a wristband 414.

As shown in FIGS. 54-60, the portable electronic module 412 includes various components supported by a housing 416, the components including a controller 418, an input device assembly 420, an output device assembly 422, and a communication connector 424, which may be considered a part of the input device assembly 420 and/or the output device assembly 422 in various embodiments. The communication connector 424 may be, for instance, a USB connector 424. The controller 418 is operably connected to the input device assembly 420, the output device assembly 422 and the communication connector 424.

Figure 54:
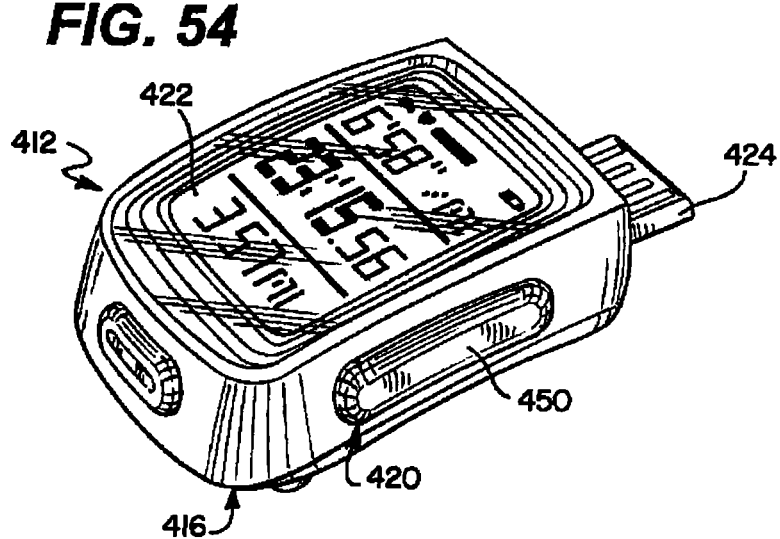
Figure 55:
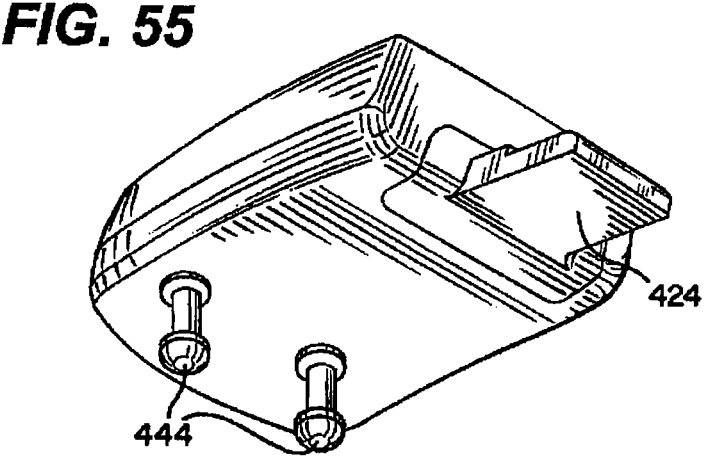
Figure 57:
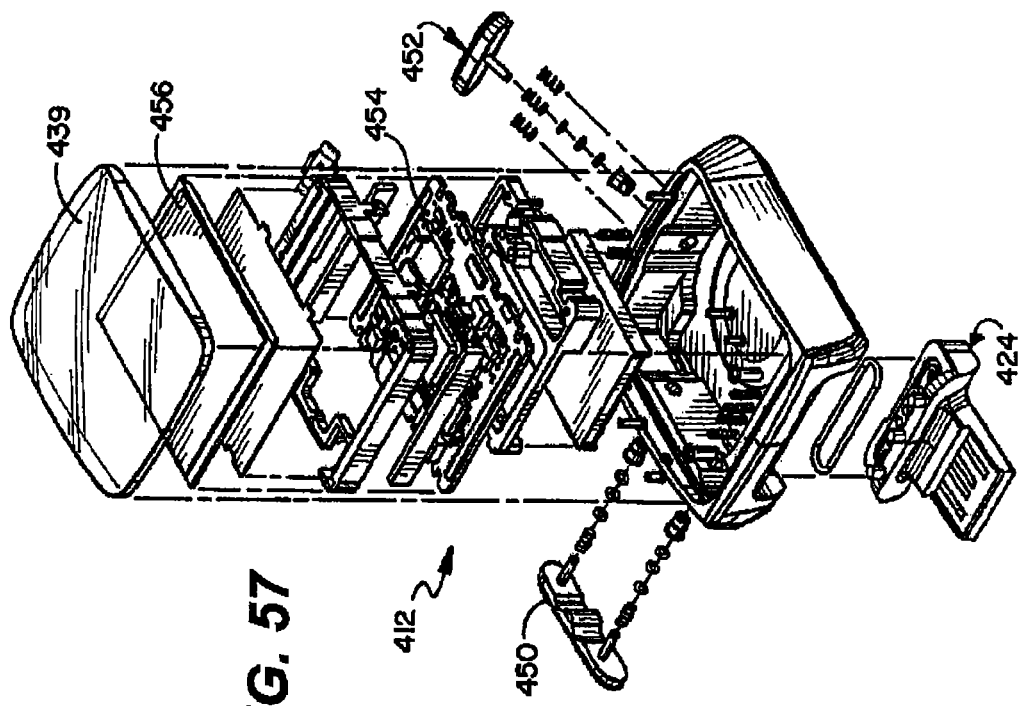
Figure 56:
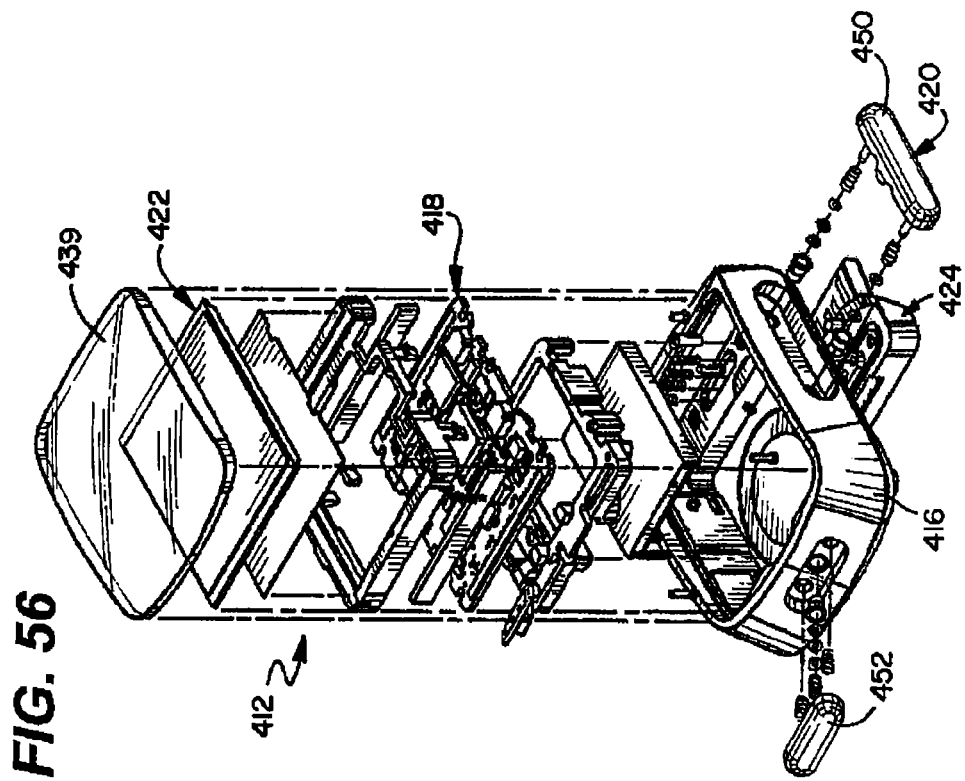
Figure 59:
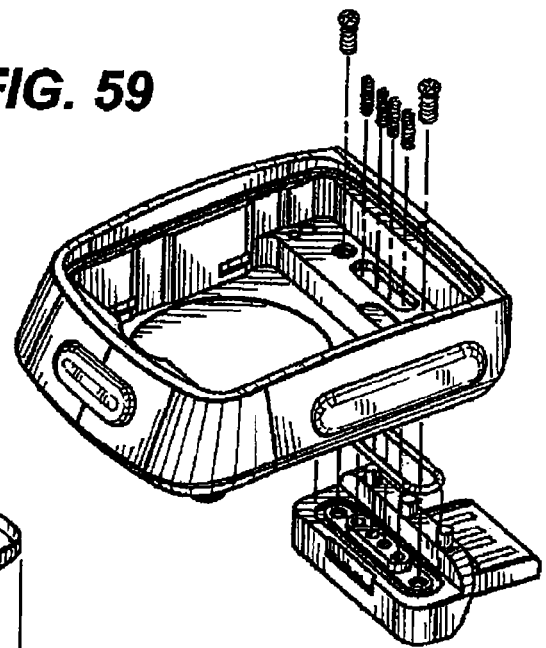
Figure 58:
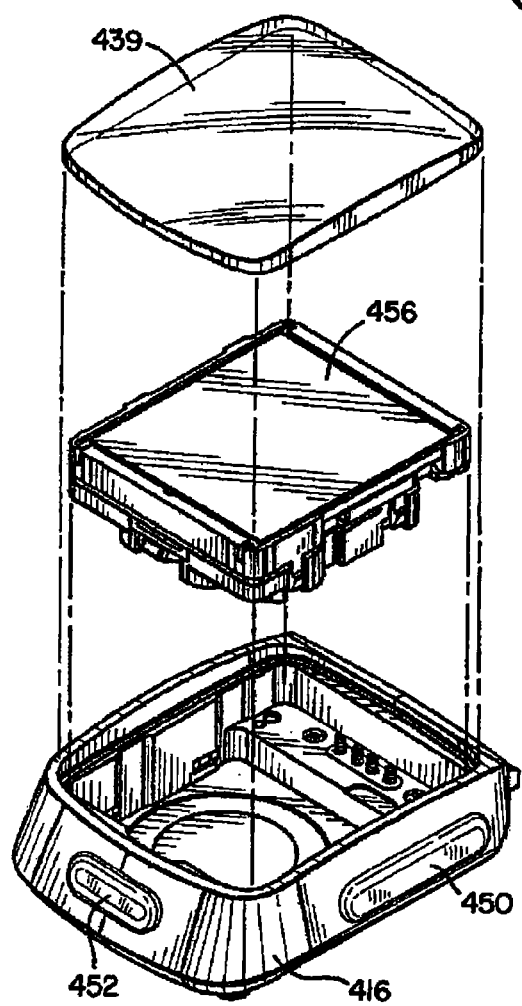

As shown in FIGS. 54-55, in this embodiment, the side button 450 is located at the three o-clock position, generally on the opposite side of the housing 416 from previous embodiments. Testing has found that for some users, this location can be more ergonomically preferred. The housing 416 also has the pair of protrusions 444 for cooperating with the apertures in the wristband 414 for securing the electronic module. The protrusions 444 are located for improved fit for user's having smaller wrists. The mounting core associated with the wristband in prior embodiments is eliminated in this design.

Figure 60:
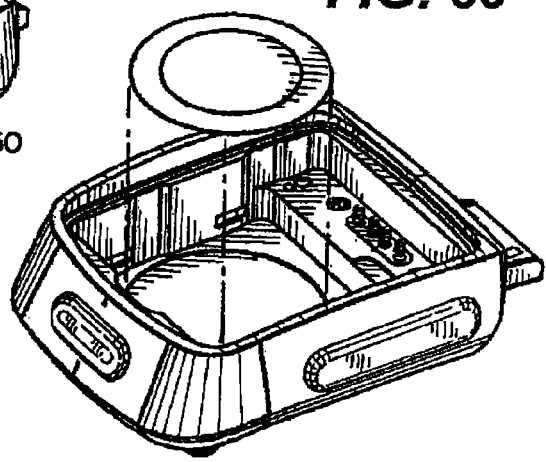

FIGS. 56-61 also show different exploded views of the various components of the electronic module 412. It is noted that the main controller 418 can be connected in a sub-assembly that is received in the cavity of the housing 416 wherein the glass or crystal 439 is placed over the controller sub-assembly similar to the watch 100 of FIGS. 22-49. It is further understood that the input buttons have tactile surfaces for enhanced operability of the watch. The watch 400 further includes a piezo speaker for audio feedback (FIG. 60). The components of the controller sub-assembly are formed in a similar fashion as described above regarding the watch 100 of FIGS. 22-49.

Figure 61:
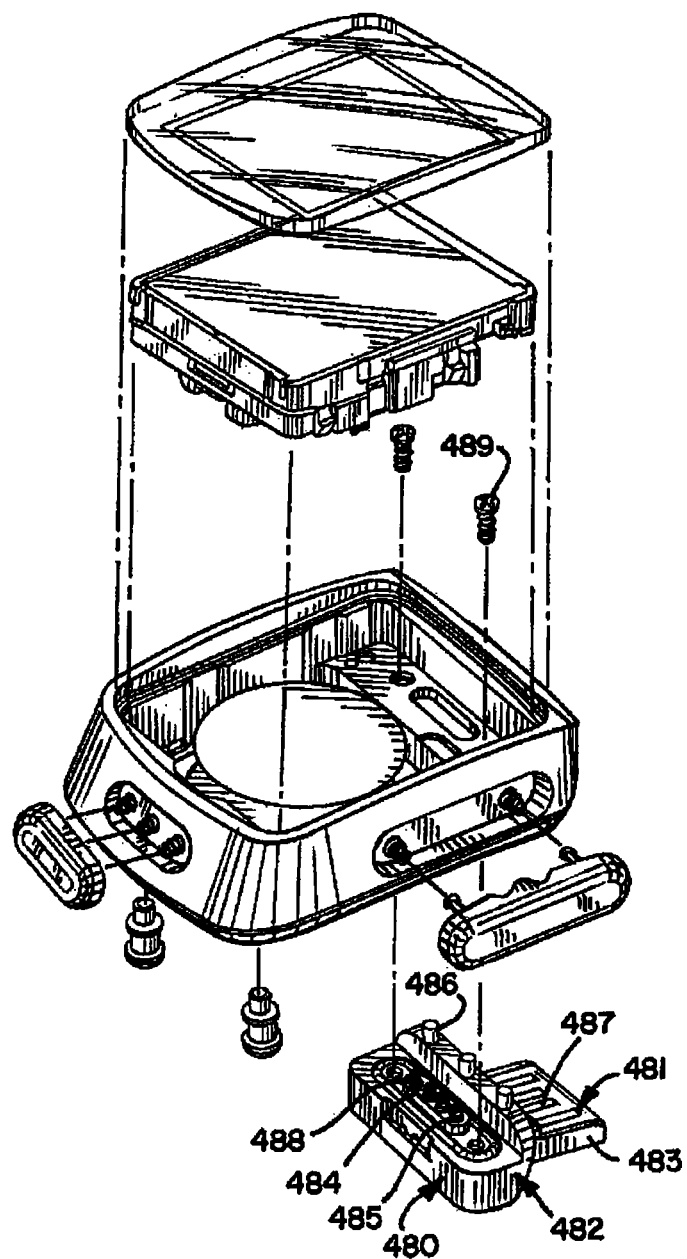
Figure 63:
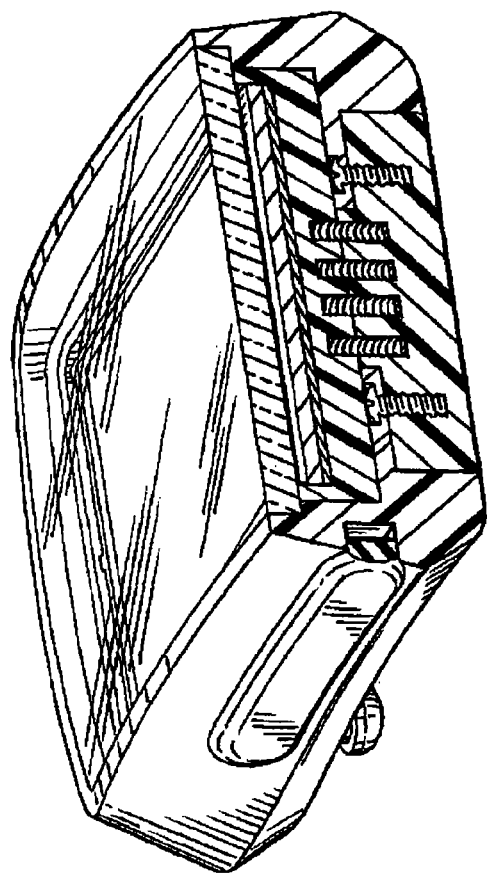
Figure 62:
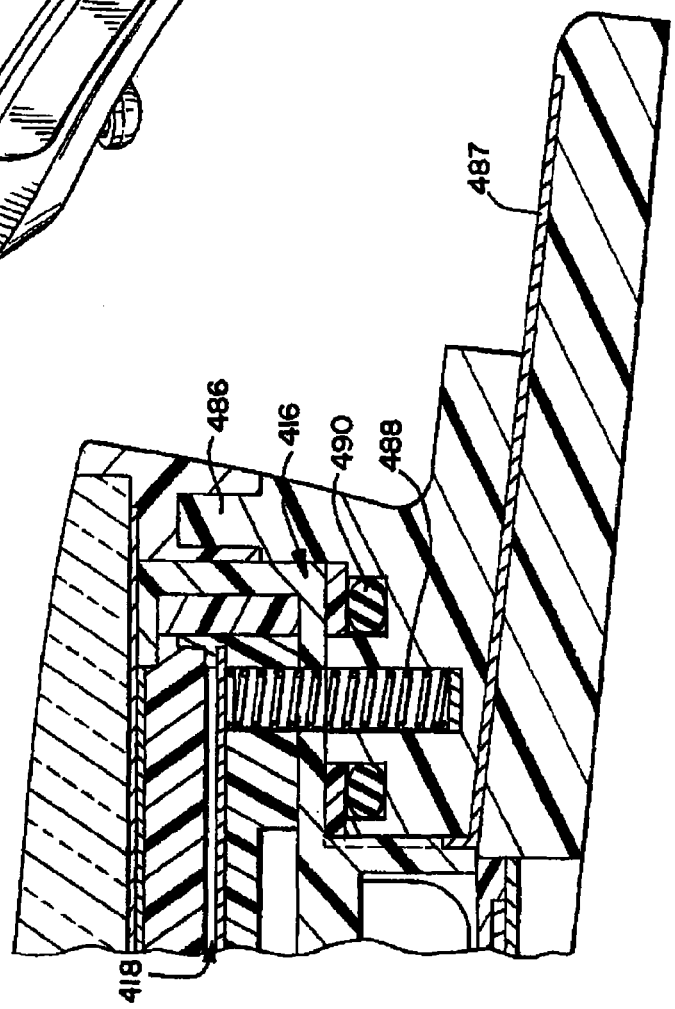
Figure 65:
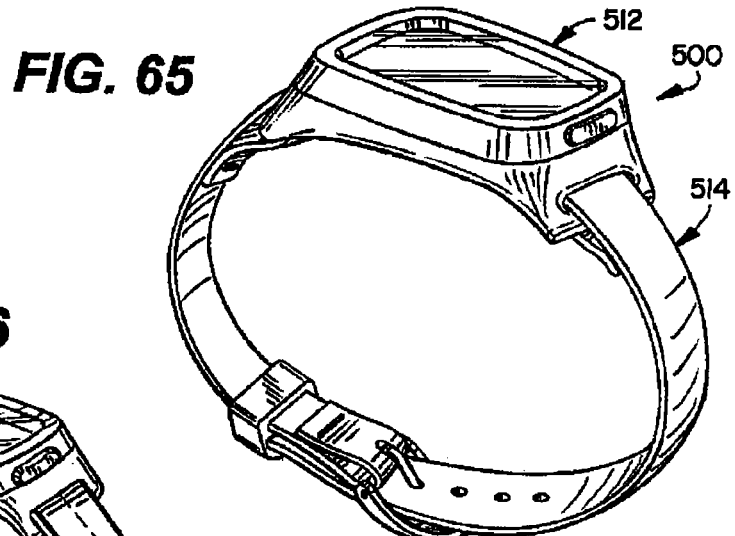
FIGS. 65-69 disclose views of another embodiment of a device in the form of a watch of an exemplary embodiment of the present invention.

FIGS. 59-63 show the communication connector 424 in greater detail. In this embodiment, the communication connector 424 is a separate member that is connected to the housing 416 and also in operable communication with the controller 418. As discussed, the communication connector 424 is in the form of a USB connector 424. As shown in FIG. 61, the USB connector 424 generally includes a base member 480 and a lead assembly 481. The base member 480 has mounting structure 482 and a leg 483 extending from the mounting structure 482. The mounting structure 482 defines a floor 484 having a plurality of openings 485 extending from the floor 484 and into the mounting structure 482. In an exemplary embodiment, the mounting structure 482 has four openings 485. The mounting structure 482 further has three protrusions 486 extending vertically upwards. The lead assembly 481 has a first lead segment 487 and a second lead segment 488. The first lead segment 487 includes a plurality of leads supported by the leg 483 and having ends extending into the mounting structure 482 and into the openings 485. Thus, in an exemplary embodiment, the first lead segment 487 includes four leads. The leads 487 are embedded in the leg such as by an injection molding process wherein the plastic is injected into a mold around the leads 487. The second lead segment 488 includes a plurality of leads 488 and in an exemplary embodiment, four leads. In a further exemplary embodiment the second leads 488 are resilient members such as in the form of wire springs 488. Each second lead 488 is inserted into a respective opening in the mounting structure 482. One end of each second lead 488 is in engagement with a respective first leads 487 (FIG. 62). Opposite ends of the second leads 488 extend out of the openings in the mounting structure. As shown in FIGS. 58-63, the mounting structure 482 is inserted into a recess in a bottom of the housing 416 and secured thereto via suitable fasteners 489. Fasteners can be screws, adhesives, welding or other securing members. The recess further has three apertures that receive the three protrusions 486 on the mounting structure 482. A gasket 490 is also included around the second leads 488 and is sandwiched between the mounting structure 482 and a portion of the housing 416. The second leads 488 extend through an opening in the bottom of the housing 416 wherein the ends of the second leads 488 are in operable connection with corresponding openings in the controller 418. When the USB connector 424 is connected to the housing 416, the second leads 488 are in a compressed state. Accordingly, an operable conductive connection is provided from the controller 418 to the ends of the first leads 487 supported by the leg 483. The USB connector 424 is easily inserted into the user's computer for data transfer as described above (FIG. 10). This USB connector design provides a secure and robust connection between the connector and the housing. This construction also minimizes the chance of moisture entering the housing via this connection. This configuration further allows for USB leads to be embedded in the leg via an injection molding process wherein the housing can be selected from various metal materials if desired.

As discussed, the embodiment of the watch shown in FIGS. 50-64 has all of the same operability characteristics described herein. Accordingly, the user interface features including the GPS features described herein are applicable to this watch embodiment.

Many embodiments described herein disclose a USB connector for data transfer between the electronic module and the user's computer and/or the remote site. The communication connector of the watch can also take other forms. In one embodiment, the communication connector can be a plug in connector such as shown in FIG. 21. The connector may have a cord with plug members to be inserted into the electronic module and the user's computer. The plug members that are inserted into the electronic module to secure the plug member can be magnetic members and also serve as data transfer members. Thus, data transmission can occur through the magnetic connectors if desired.

As discussed herein, the watch may employ various antennas for communication capabilities. The antennas can take various forms including chip antennas or sheet metal antennas. The sheet metal antenna may be a thin planar member positioned around a periphery of the display and sandwiched between the display and the crystal. The antennas are contained within the housing and in operable connection with the controller. The watch may further employ a GPS antenna in certain embodiments. The watch can employ a first antenna dedicated to communicate with the foot sensor and heart rate sensor and a second antenna dedicated to communicate with the GPS receiver chip.

FIGS. 65-69 disclose another embodiment of the watch of the present invention, generally designated with the reference numeral 500. Similar to previous embodiments, the watch 500 generally includes an electronic module 512 and a carrier 514. It is understood that the watch 500 has all the functional characteristics of other embodiments described herein including user interface and GPS features.

Figure 66:
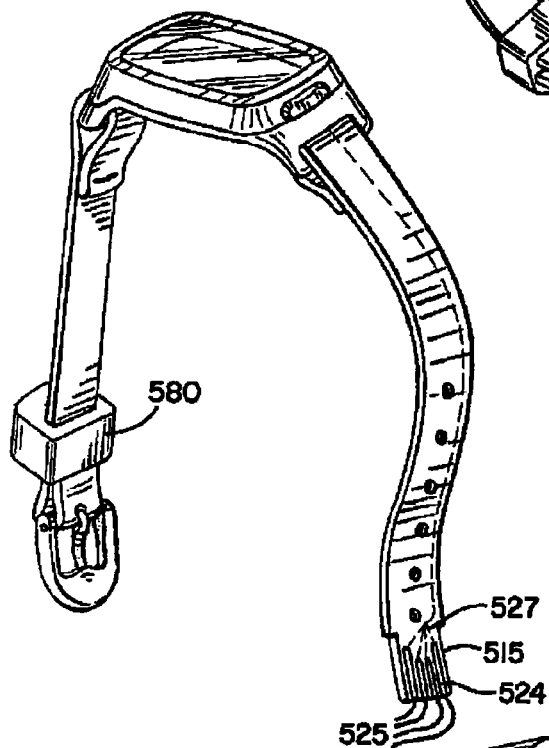
Figure 67:
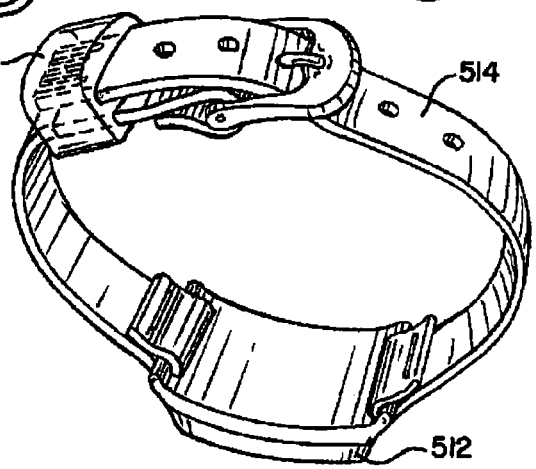
Figure 68:
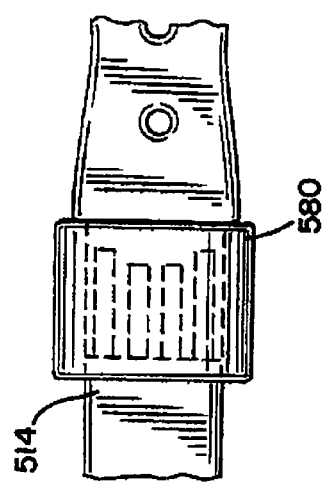
Figure 69:
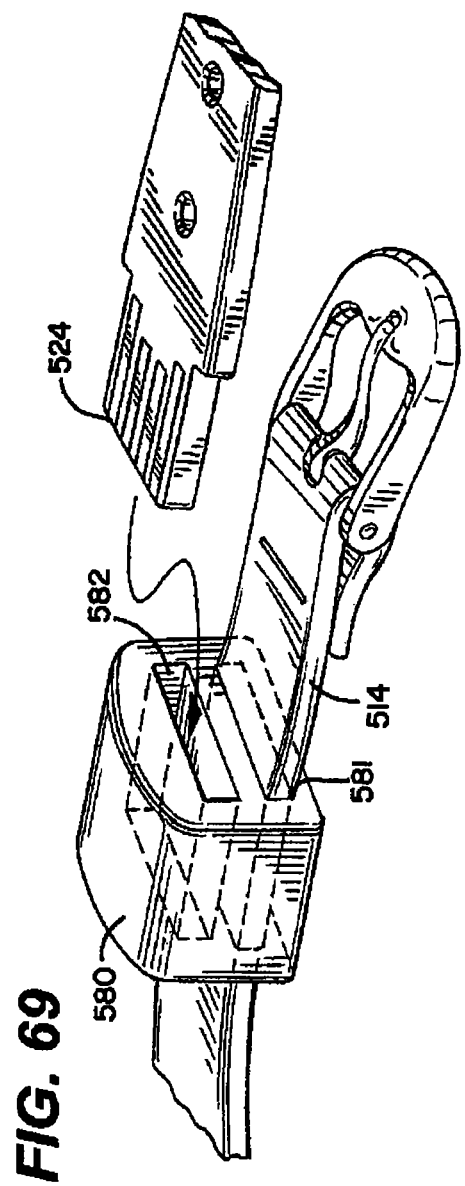

As further shown in FIG. 66, the watch 500 has a connector 524 structured in an alternate configuration. The connector 524 is operably connected to the electronic module 512 and is incorporated into the carrier 514. The carrier 514 is in the form of a wristband in the exemplary embodiment. A distal end 515 of the wristband 514 is in the form of a USB connector and represents the connector 524. The connector 524 has leads 525 at the distal end that define the USB connector 524. A plurality of flexible conductor connectors 527 are embedded in the wristband 514 and have one end operably connected to the controller of the electronic module 512 and another end operably connected to the leads 525 of the connector 524. The flexible connectors 527 may be bundled together if desired or can be embedded in separate fashion within the wristband 514. As further shown in FIGS. 66-69, the wristband 514 also has a cap member 580 at another segment of the wristband 514. The cap member 580 has a first slot 581 to accommodate the wristband segment to mount the cap member 580. The cap member 580 has a second slot 582 positioned on the cap member 580 generally adjacent to the first slot 581. When a user is wearing the watch 500, the distal end 515 of the wristband 514 having the connector 524 incorporated therein is inserted into and received by the second slot 582 as shown in FIGS. 67-68. The cap member 580 thus protects the USB connector 524.

Consistent with the description herein, the connector 524 is inserted into the USB port of a computer for data transfer. Data can be transferred between the electronic module 512, the user's computer, as well as a remote site as described herein. Other operational features described herein are incorporated into the watch 500.

FIGS. 70-73 disclose an additional variation of the embodiment of FIGS. 65-99. As shown in FIGS. 70-73, the wristband 514 has a cover member 584 positioned proximate the distal end 515 of the wristband 514. The cover member 584 is hingedly connected to the wristband 514 proximate the distal end 515. As shown in FIG. 71, the cover member 584 has a recessed portion 586 therein that accommodates the connector 524. The cover member 584 is moveable between a first position and a second position. In a first position as shown in FIG. 72, the cover member 584 covers the USB connector 524 at the distal end 515. The recessed portion 586 receives the connector 524. Accordingly, the leads 525 of the USB connector 524 are protected by the cover member 584. As shown in FIG. 72, the distal end 515 with the cover member 584 in the first position can be inserted into the second slot 582 of the cap member 580. The slot 582 of the cap member 580 may be sized to accommodate the distal end with the cover member 584. As shown in FIG. 70, the cover member 584 is movable to the second position exposing the leads of the USB connector 524 by pivoting the cover member 584 away from the distal end 515. The leads 525 of the USB connector 524 are then exposed wherein the USB connector 524 can be plugged into the USB port of a computer for data transfer as described herein with reference to FIG. 10.

Figure 75:
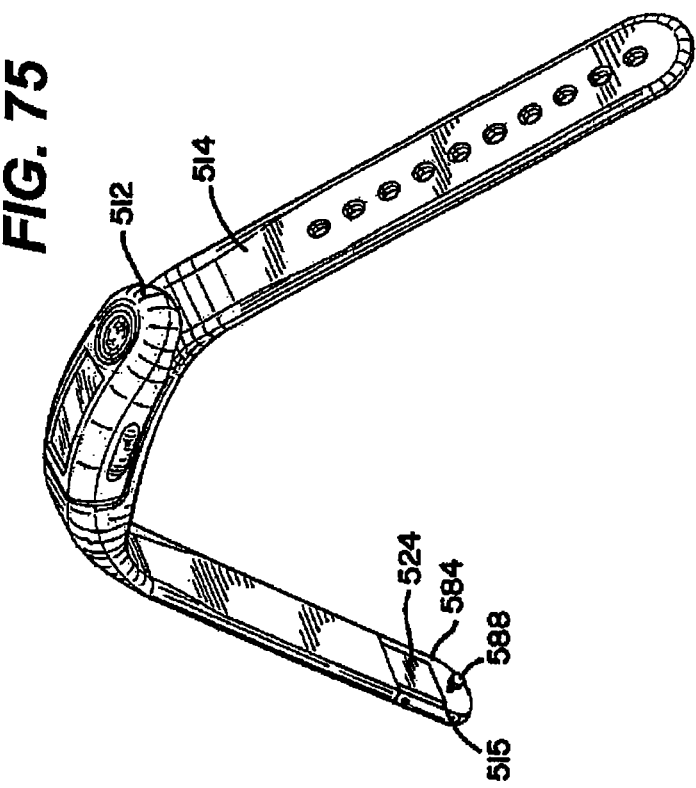
Figure 74:
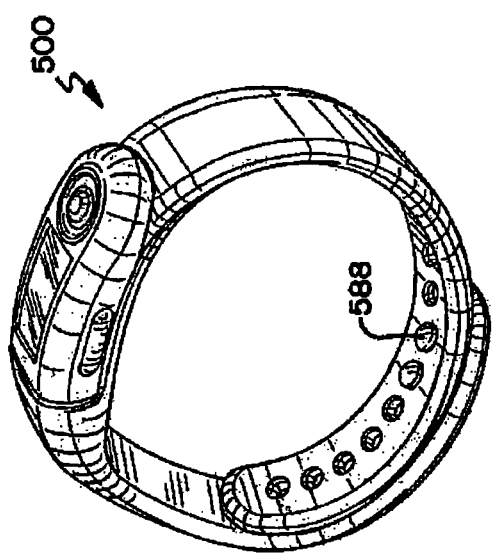

FIGS. 74-77 disclose another variation of the watch of the present invention, similar to the embodiment of FIGS. 70-73 and similar structures will be referenced with similar reference numerals. The watch also has a cover member 584 hingedly connected to the wristband 514. The cover member 584 may be connected to the wristband 514 via a support member attached to the wristband. The cover member 584 also has the recessed portion 586 to accommodate the USB connector 524 at the distal end 515 of the wristband 514. The cover member 584 has a protrusion 588 on an inside surface. The cover member 584 is moveable between a first position and a second position. In a first position as shown in FIG. 75, the cover member 584 covers the USB connector 524 at the distal end 515. Accordingly, the leads 525 of the USB connector 524 are protected by the cover member 584. As shown in FIG. 74, the distal end 515 with the cover member 584 in the first position can be connected to the other portion of the wristband 514 wherein the protrusion 588 is received in an aperture in the wristband 514. As shown in FIG. 76, the cover member 588 is movable to the second position exposing the leads of the USB connector 524 by pivoting the cover member 584 away from the distal end 515. The leads of the USB connector 524 are then exposed wherein the USB connector 524 can be plugged into the USB port of a computer for data transfer as described herein with reference to FIG. 10.

Figure 78:
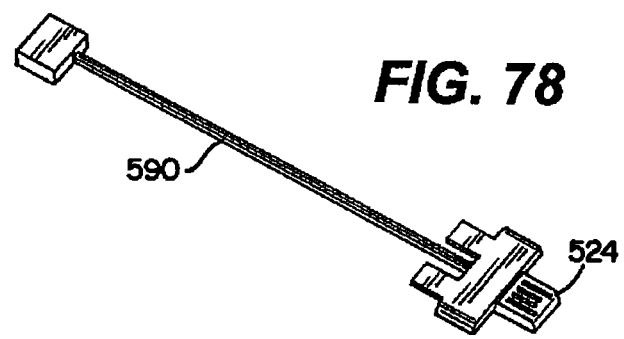
FIGS. 78-85 disclose views of portions of a wristband having a USB connector associated therewith in accordance with exemplary embodiments of the present invention.
Figure 79:
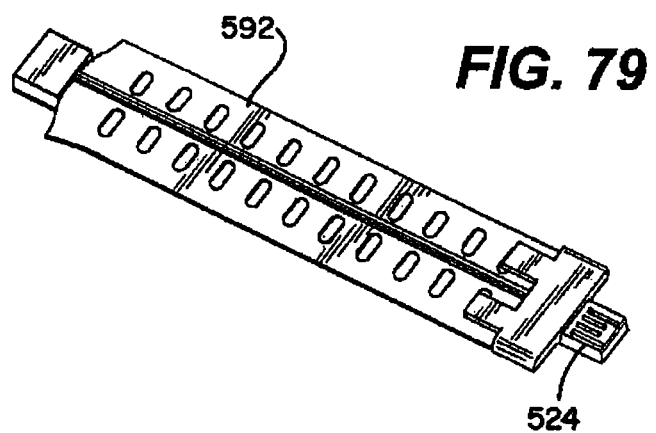
Figure 80:
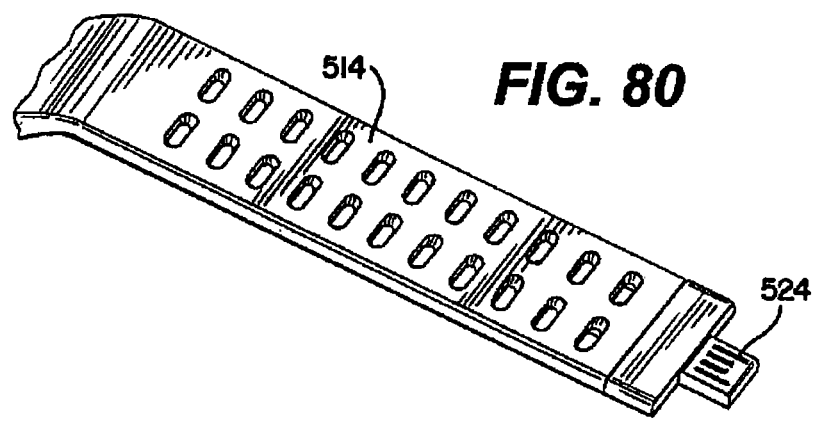

FIGS. 78-85 disclose additional structures wherein the USB connector 524 is incorporated into the wristband such as in the embodiments of FIGS. 65-77. In certain exemplary embodiments, the USB connector 524 has a lead assembly that is incorporated into the wristband via certain injection molding processes. FIGS. 78-79 disclose the formation of a portion of the wristband 514 via an injection molding process. As shown in FIG. 78, the USB connector 524 includes a cable assembly 590 that are in conductive communication with the USB leads at the distal end of the connector 524. The cable assembly 590 is laid in a mold wherein a first shot of injected molded material is injected into the mold and around the cable assembly to form a portion of the wristband as shown in FIG.

79. As can be appreciated from FIG. 80, a second shot of injected molded material is injected into the mold to form the wristband 514.

Figure 81:
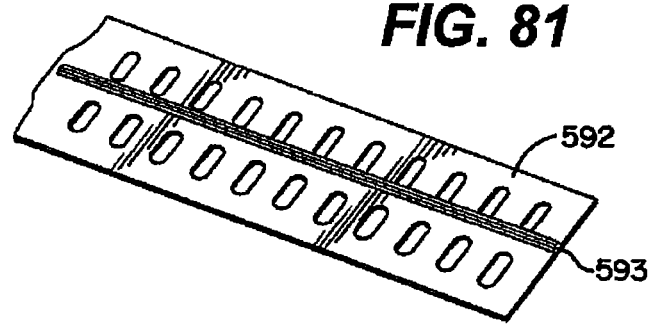
Figure 82:
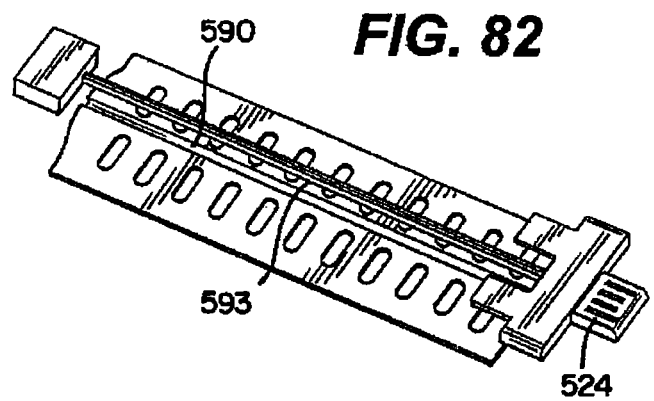
Figure 83:
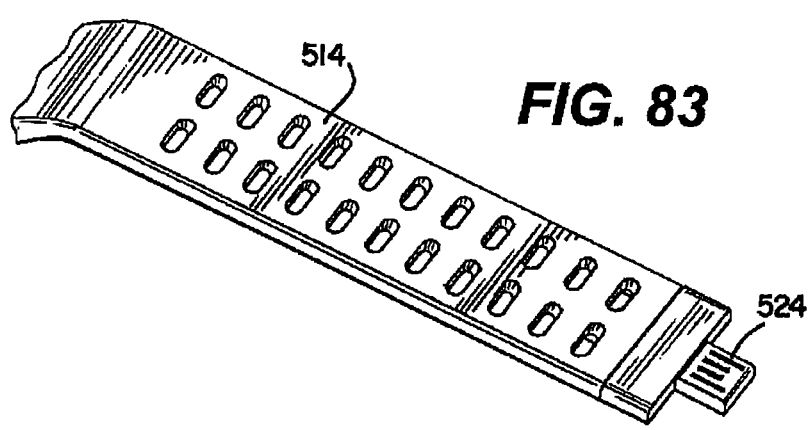

FIGS. 81-83 disclose another process in forming the wristband 514. As shown in FIG. 81, a first shot of injection molded material 592 is injected into a mold and includes a central groove 593 therein and forming a partial assembly. As shown in FIG. 82, the cable assembly 590 is laid into the groove 593 in a partial assembly. As shown in FIG. 83, a second shot of injection molded material is injected into the mold to form the wristband 514.

Figure 84:
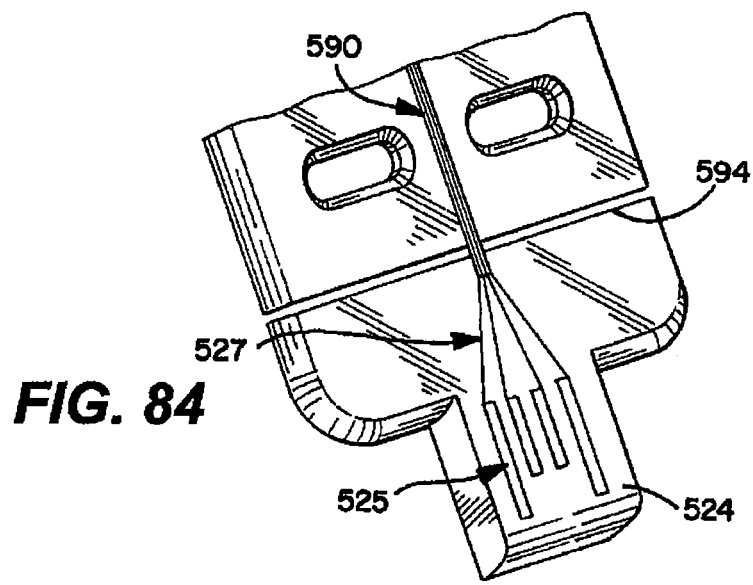
Figure 85:
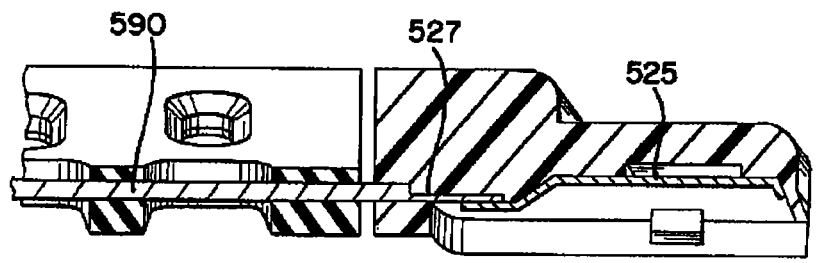

FIGS. 84 and 85 disclose a plug insert 594 of the USB connector. As a distal end, the cable assembly 590 has four flexible conductors 527 extending therefrom. Each conductor 527 extends and is connected to a respective USB lead 525 in the plug assembly 594. The cable assembly 590 is dimensioned to be as thin as possible while still allowing sufficient reliability while the thickness of the injected molded material is set so as to provide sufficient protection of the cable assembly but providing for a comfortable fit around a user's wrist.

It is understood that the various embodiments of the athletic watch described above can incorporate and include the operational features, user interface features and GPS functionality as describe herein. It is further understood that combinations of the various features can also be included in the various embodiments of the athletic watches of the present invention.

Operation and User Interface

It is understood that the portable electronic module 12 of the watch 10 has associated software to function with the user interfaces associated with the watch 10. In one arrangement, one or more processors such as that of controller 18 may be configured to execute one or more computer readable instructions stored in computer readable media (e.g., memory of controller 18) to perform various functions including generating one or more user interfaces and processing the input and interactions received therethrough. As explained in greater detail below, in addition to having chronograph functions like a conventional watch, the watch 10 has additional athletic functionality. For example, a user wearing shoes having a sensor(s) 1 mounted therein or a heart rate monitor can use the watch 10 to wirelessly communicate with the sensor(s) 1 and monitor performance such as during exercise including running. Other sensor types can also be incorporated for use by the user and communication with the watch 10. The watch 10 can record and monitor athletic performance of the user.

Figure 22:
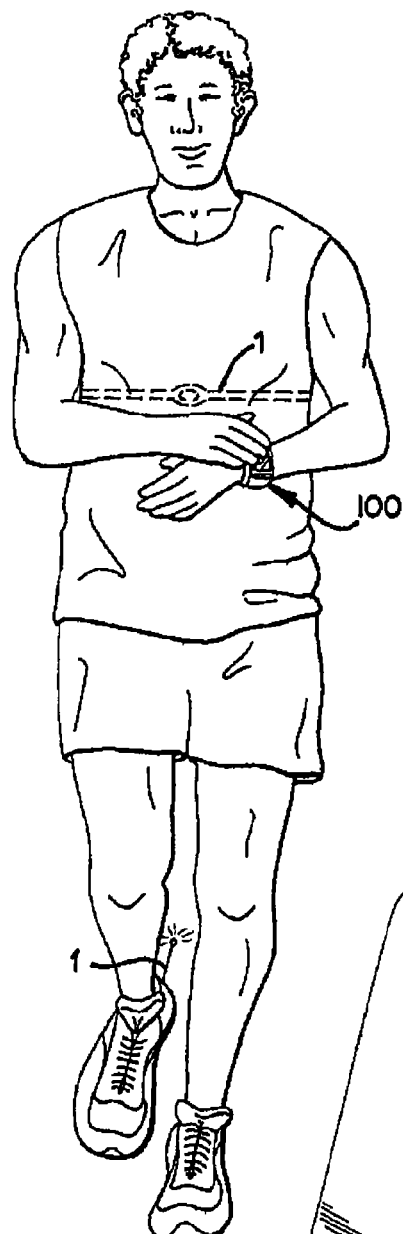
Figure 23:
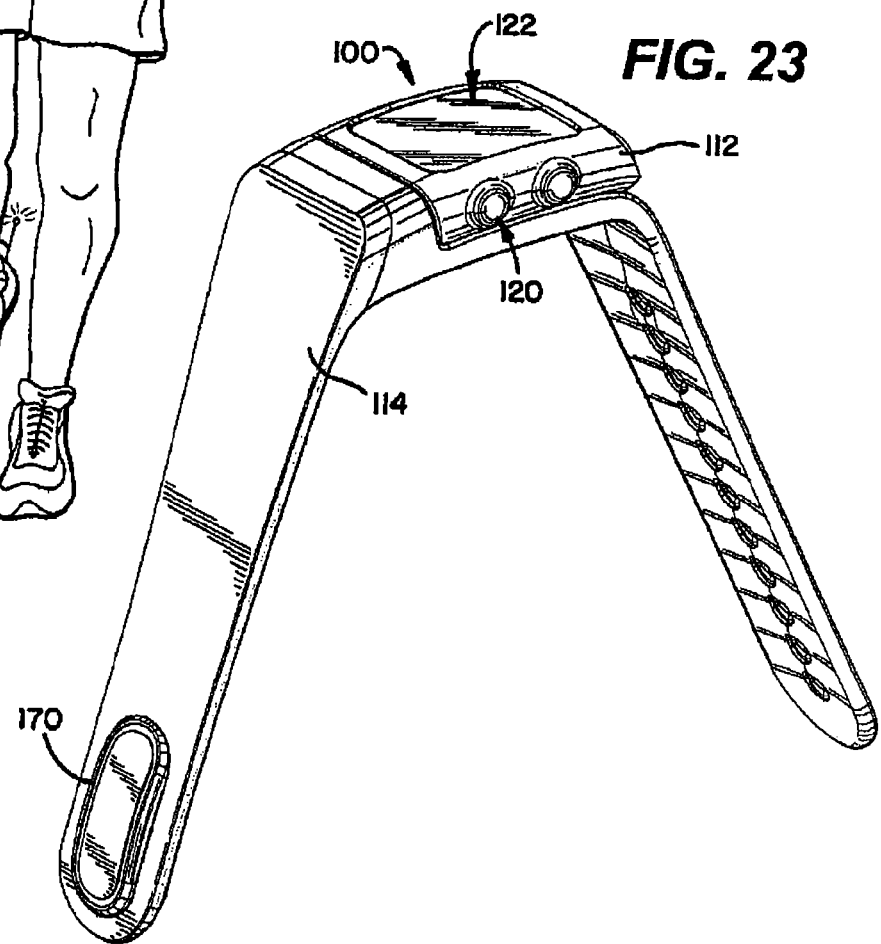
Figure 24:
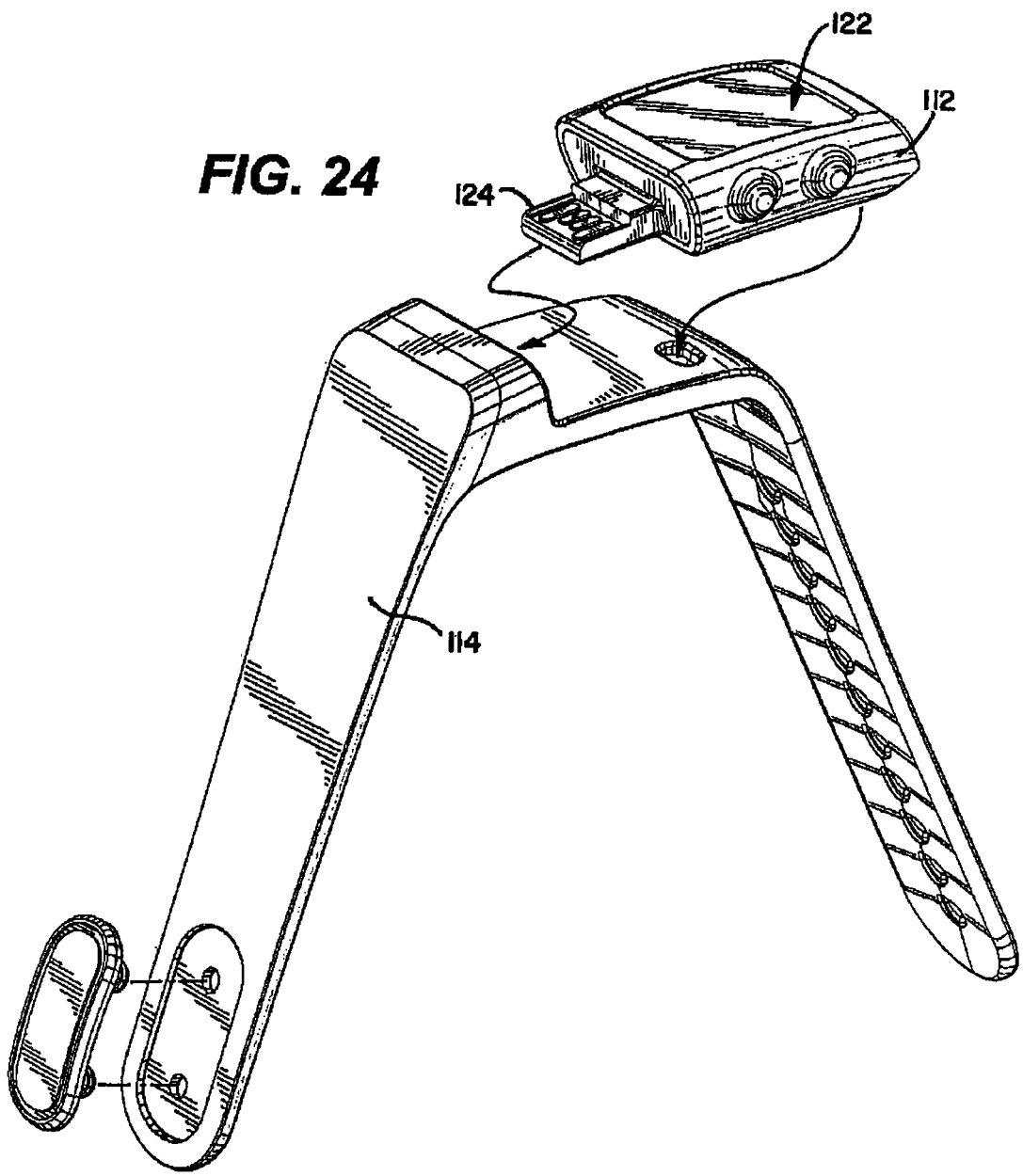

Generally, the user controls operation of the watch 10 utilizing the three inputs described above, namely the side button 50, the end button 52 and the shock button 54. These inputs are configured such that the user provides inputs along first, second and third axes. In an exemplary embodiment, the inputs are configured in a tri-axes configuration, namely an x-y-z axes configuration (FIG. 2). This provides an enhanced user friendly user interface wherein the user can easily control operation of the watch 10 while participating in athletic activity. As can be appreciated from FIG. 10, the side button 50 is typically actuated by a user squeezing or pinching the side button 50 and opposite housing side 36 generally along the x-axis. The end button 52 is typically actuated by a user squeezing or pinching the end button 52 and opposite housing end 30 generally along the y-axis (FIG. 12). Finally, the shock button 54 is typically actuated by the user tapping the front side 38 of the housing 16, typically the crystal 39, generally along the z-axis (FIGS. 14, 22). As explained in greater detail below, the side button 50 is normally utilized to scroll or cycle through a list of items or values within the user interface, by pressing up or down in order to scroll through the list of items. The end button 52 is normally utilized for selecting items within the user interface, such as the options of "SELECT" and "OK." The shock button 54 is generally utilized for lighting the backlight and other specific functions such as marking of laps. For example, to light the backlight associated with the controller 18 and display 56, a user can simply tap the crystal 39. As also discussed in greater detail below, a user can tap the crystal 39 to actuate the shock button 54 to "mark" a segment of an athletic performance. The user may also have the ability to customize the buttons to their own preferences by utilizing the set-up functionality within the watch 10 or other software such as from a desktop utility associated with the watch 10 as well as remote site functionality that may be inputted into the watch 10 such as through the USB connector 24.

Figure 140:
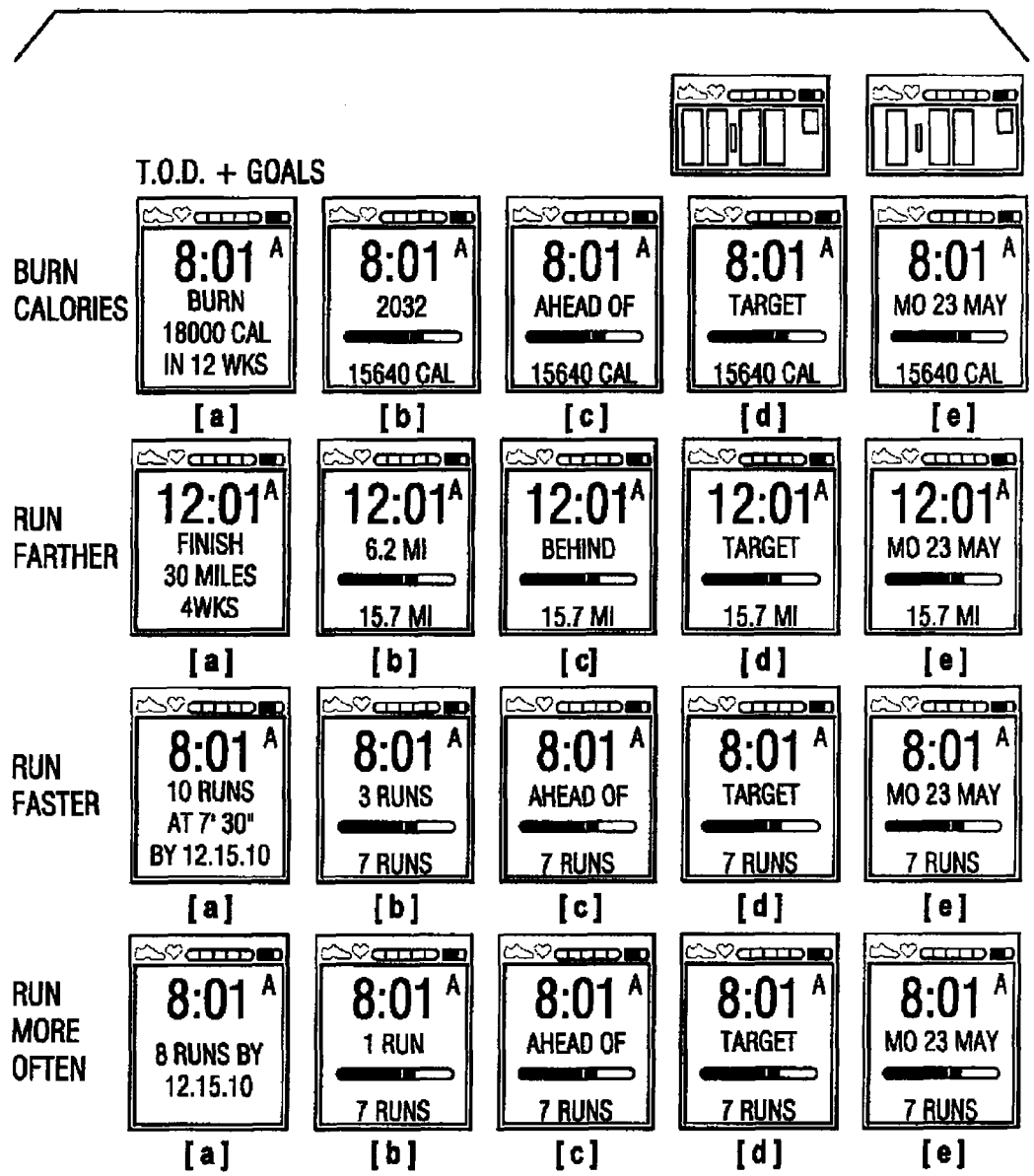

In reference to FIGS. 86-140, the user interface has two different modes. The first mode is an out-of-workout ("OOWO") mode. The OOWO mode is used for normal operation when the user is not participating in an athletic performance. The second mode is an in-workout ("IWO") mode for controlling, displaying, and recording a user's athletic performance, such as a run. The OOWO mode is used to guide a user to the IWO mode such as when starting a run.

Figure 86B:
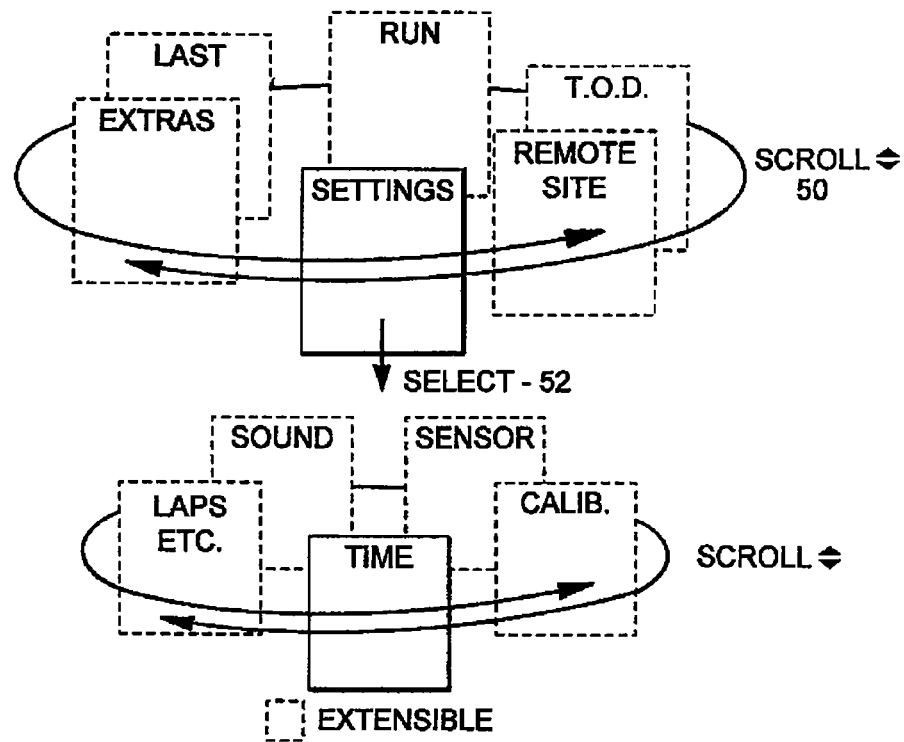
FIGS. 86-117 show various screen displays generated by a user interface operably associated with the watch of the present invention that a user may select for display according to various embodiments of the invention.
Figure 86C:
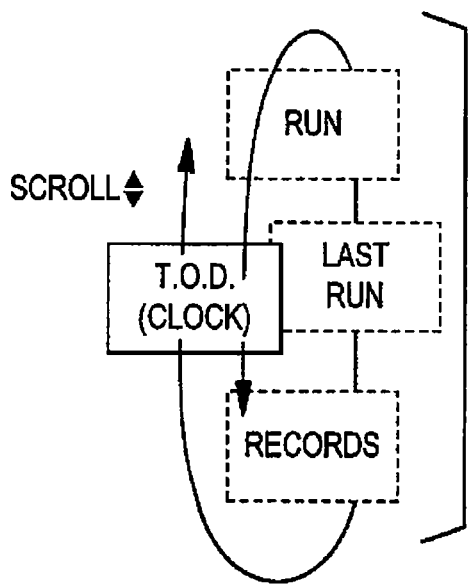

In the OOWO mode, the user interface provides a plurality of menu selections for operation of a plurality of sub-modes. While the selections can vary, in an exemplary embodiment, the menu selections include: a Time of Day mode, a Settings mode, a Run mode (which includes the IWO mode), a Last Run mode, a Remote Site mode, and an Extended Feature mode (FIG. 86b). In FIG. 86c, the menu selections may further include a records mode in which a user may view workout records set by the user. For example, the user may view the fastest run, farthest distance run, most calories burned, fastest pace, longest time run and the like.

Figure 127:
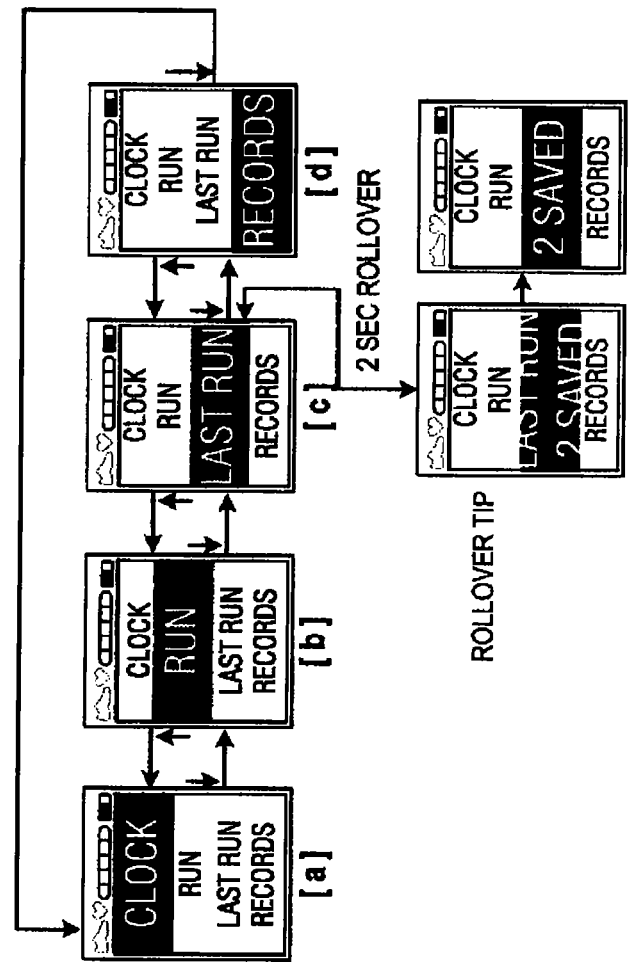

FIGS. 127 and 129 illustrate example sequences of interfaces in which a user may navigate through a menu list that includes a clock mode, a run mode, a last run mode and a records mode. A last run option in the menu interface may scroll within the highlight bar or region to display additional information (e.g., a number of saved workouts).

FIG. 128 illustrates a sequence of interfaces that may be displayed upon a user completing a soft reset of watch 10.

Figure 130A:
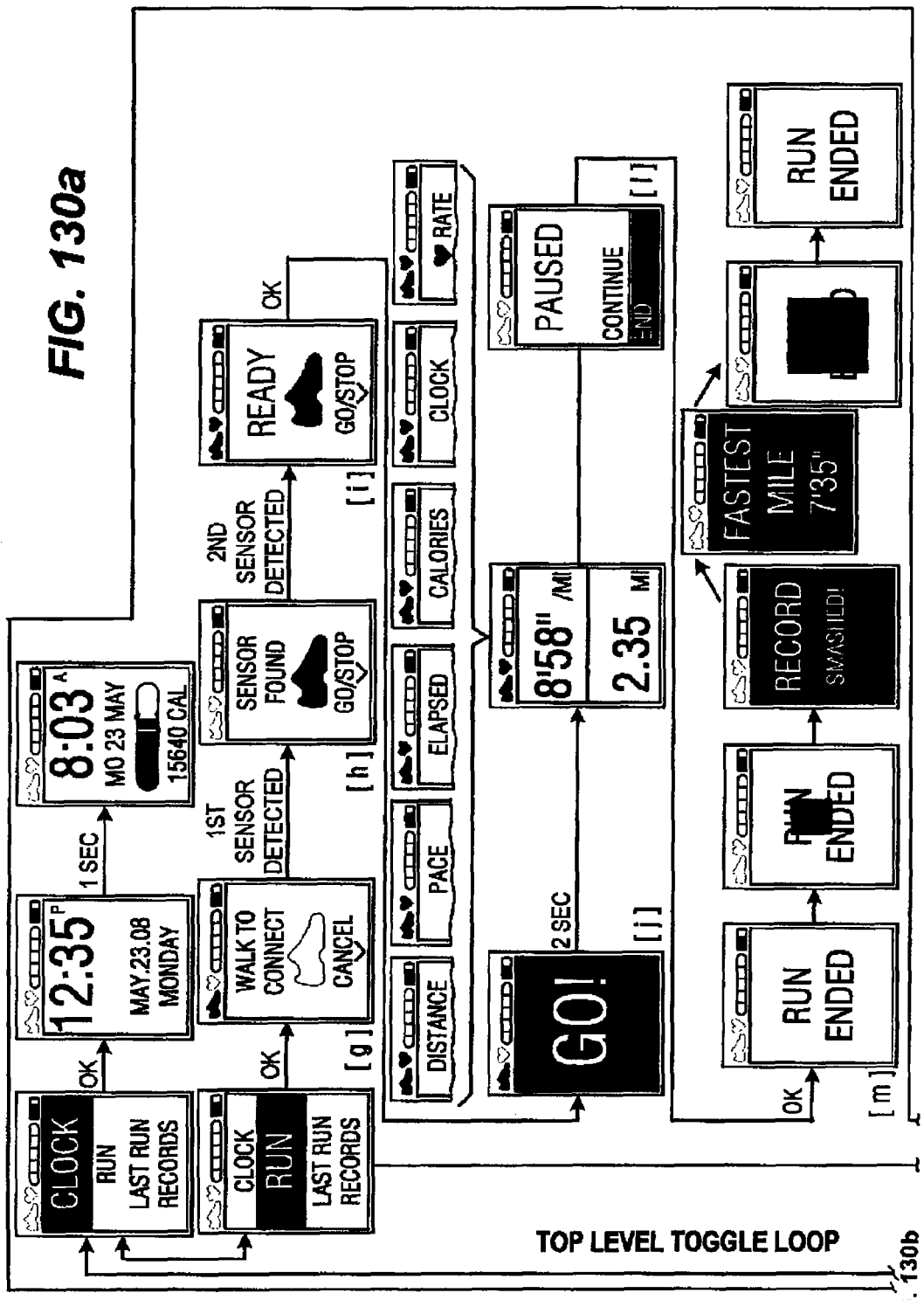
Figure 130B:
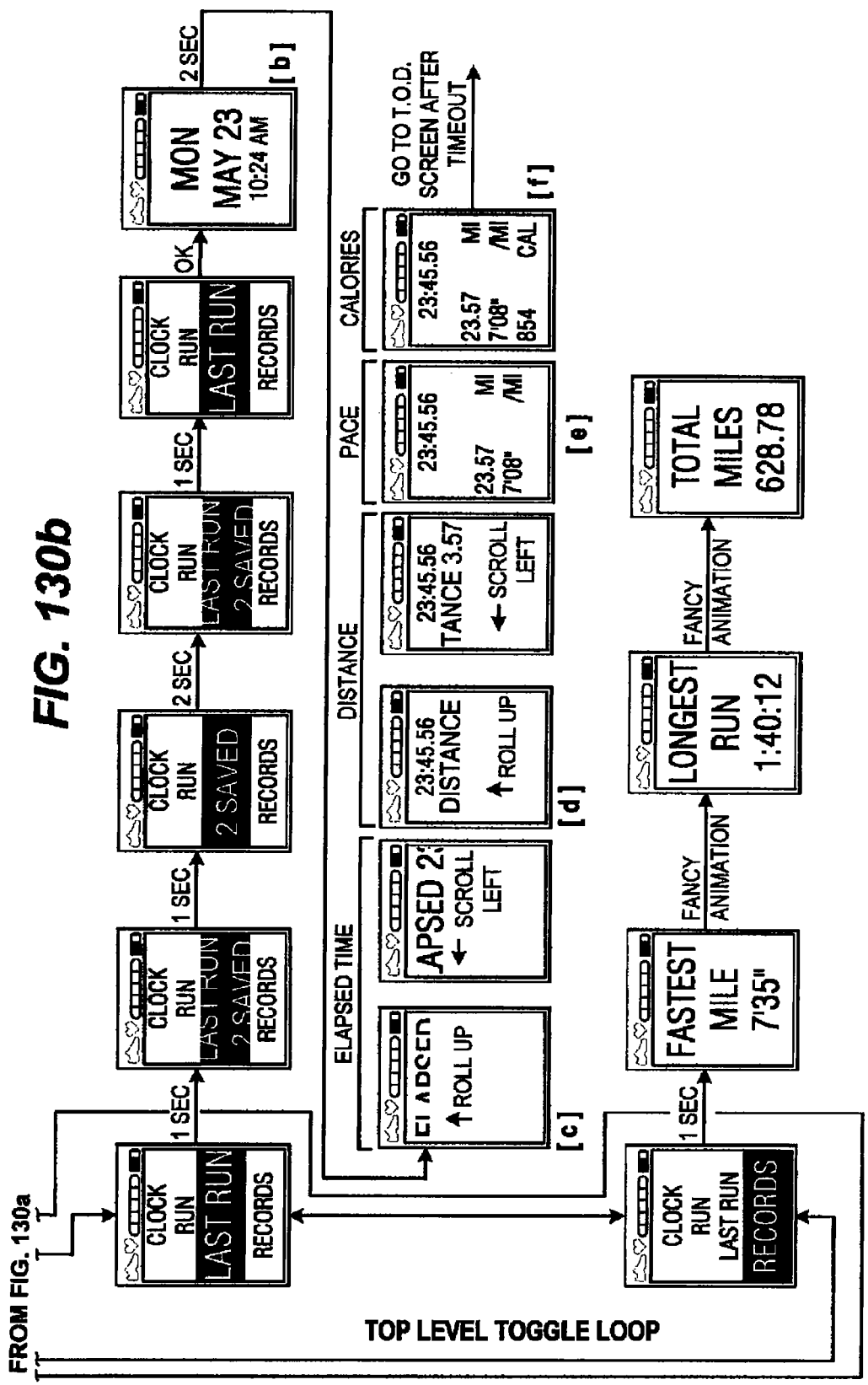

FIGS. 130a and 130b illustrate a map defining a navigation sequence through multiple interfaces for monitoring and tracking workouts. For example, a user may select a clock option, run option, last run option and a records option all from a top level menu. The interfaces of FIGS. 130a and 130b further display examples of information that may be displayed upon selection each of the options.

Figure 107A:
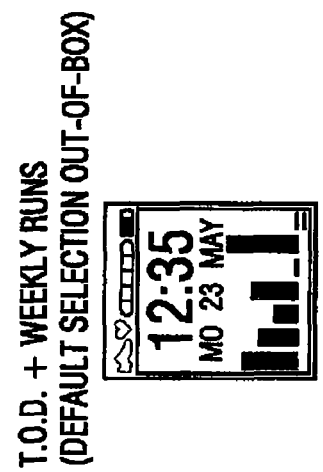
Figure 107B:
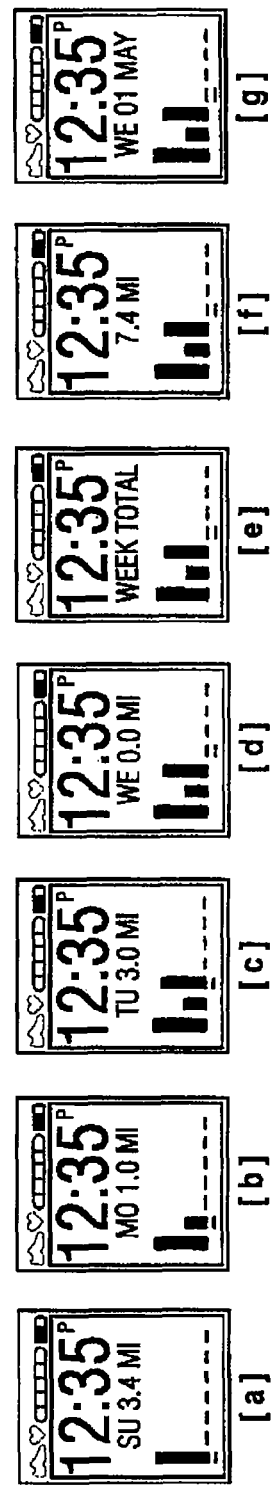

In the Time of Day mode, or the T.O.D. mode, the chronograph functions associated with the watch 10 are generally used and displayed such as shown in FIGS. 107a and 107b. The display in the T.O.D. mode can be customized by the user as further described herein. If a different mode of the user interface is selected, a user can scroll through the menu selections using the side button 50 and then select the T.O.D. mode using the end button 52. The T.O.D. mode may be the default setting for the watch 10. As discussed, the display 56 includes the plurality of different display fields. In these fields, the time of day, date and day of week may be displayed. Variations on how this information is displayed in the display fields can also be set by the user in the Settings mode as described below. The display 56 may also include a performance display field that can constantly display current information such as, weekly runs, distance run and/or calories burned over certain periods of time, as well as goals or records. Such performance values can be updated as desired. It is understood that the display 56 has a backlight associated therewith that deactivates after a predetermined time of inactivity. The user may tap the front side 38 to light the backlight to illuminate the display 56.

By scrolling through the menu selections using the side button and depressing the end button at the Settings mode, the user can set certain values and features of the watch 10. In one exemplary embodiment, the menu selections of the Settings mode include a Time/Date function, a Calibrate function, a Sensor function and a Sounds function.

In the Time/Date function (FIG. 96), controller/the user interface will display the time and date as currently set within the controller. The controller may display a pair of arrows above and below the numbers in the display field to be set. Depressing the end button sets the correct value. The user continues this process to set the complete Time and Date. It is understood that the Time can be set in military time if desired. The order of the month, day and year could also be arranged as desired. Once the proper time and date have been set, the user is prompted to select Accept or Cancel. Selecting Accept takes the user back to the initial menu selection of the Settings Mode. The user can also then select "EXIT" from the Settings mode menu to return to a default setting such as the T.O.D. mode.

Figure 97A:
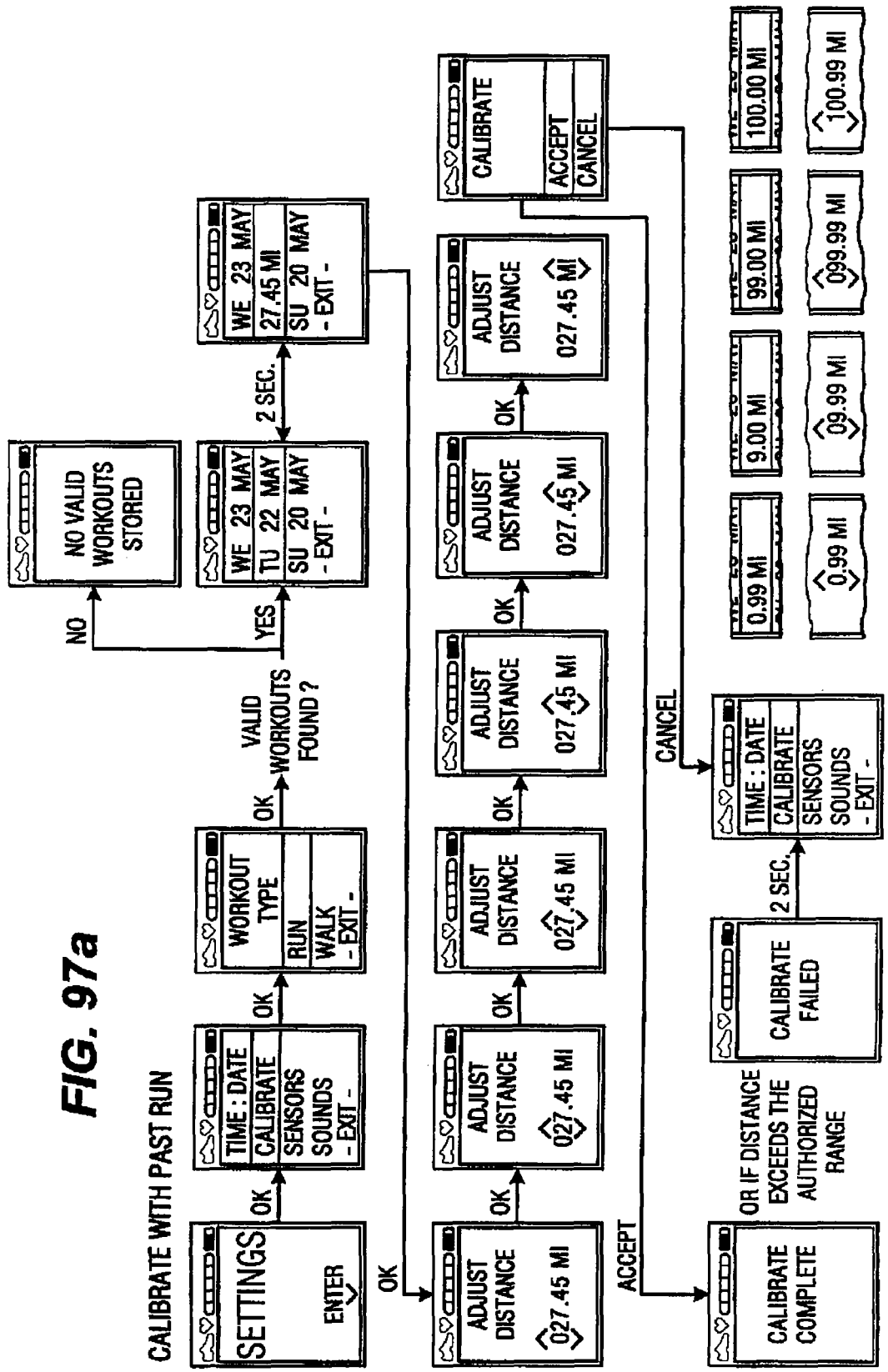

As shown in FIG. 97*a*, using the side button 50 and end button 52, a user can scroll and select the Calibrate function in the Settings mode. This allows the user to calibrate a sensor, such as the shoe-based sensor, to ensure accurate time-distance calculations for the athletic performances. As shown in FIG. 97*a*, once Calibrate is selected by pressing the end button 52, the controller will then display the message "WORKOUT TYPE," with the selection of "RUN" or "WALK" or "EXIT." The user may then select "RUN" and the controller will then display a list of the user's past runs. The highlighted workout displays the date and distance, toggling between each, so the user knows what the date and distance was for that workout. The user may then select the date of the run that the user wants to use for the calibration. The controller then displays the "ADJUST DISTANCE" screen. The user will then be able to adjust the distance in order to ensure the proper distance is entered into the controller. The controller may display a pair of arrows above and below the numbers for adjusting distance. The user can use the side button 50 to increment or decrement the numbers for the time. The user may then press the end button 52 to move to the next number. The user may continue this process while setting the correct distance as shown in FIG. 97*a*. After the user completes adjustment of the distance values, the controller displays an "ACCEPT/CANCEL" selection screen. Once the user presses the end button 52 to select "ACCEPT," the controller displays a "CALIBRATE COMPLETE" screen and returns to the Settings selection screen. If the distance exceeds a preset authorized range, the controller will display a "CALIBRATE FAILED" screen. The user would then be prompted to re-input a proper distance as describe above. A calibration can also cancelled by the user. It is understood that additional parameters can be added to the calibration process such as incorporating the user's inseam length and/or height with stride length.

Figure 97B:
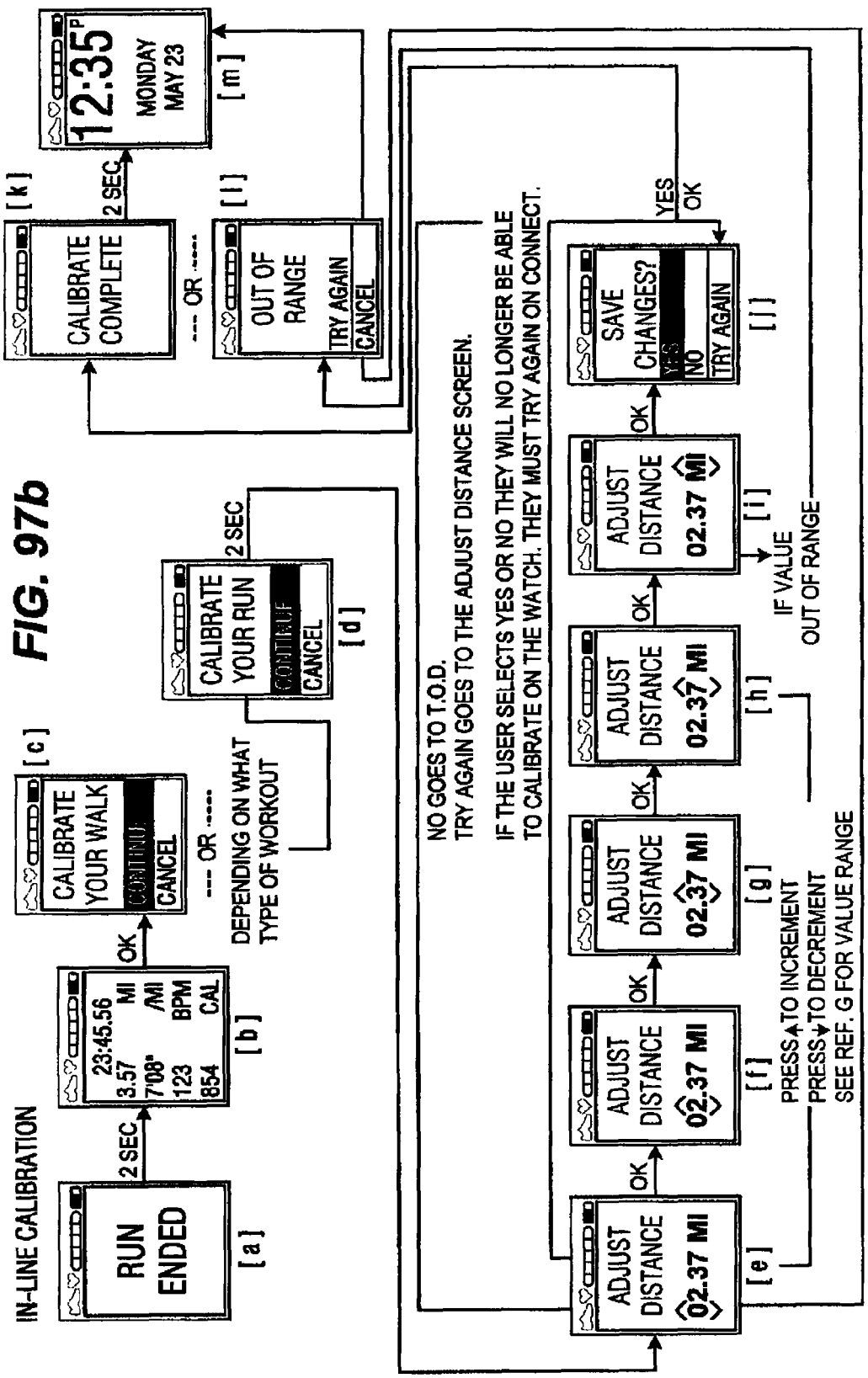

FIG. 97*b* illustrates another example series of interface for calibrating a sensor and workout. The calibration method may depend on the type of workout and thus, the interfaces may allow the user to select the type of workout.

Figure 98:
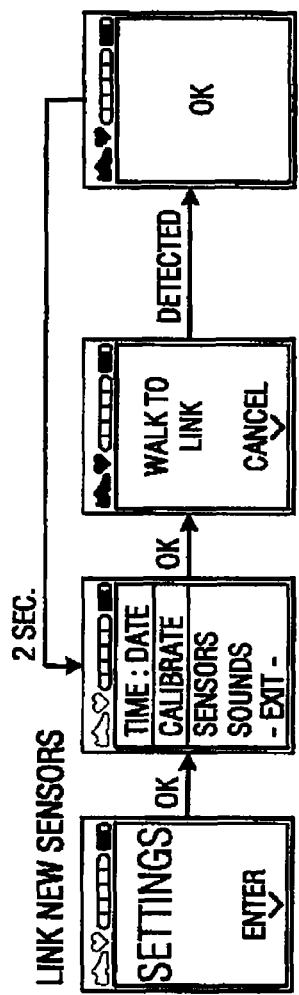
Figure 99:
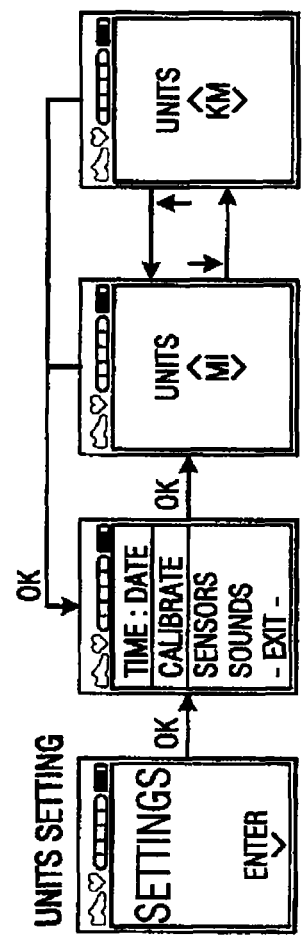

In the Settings mode, the user can also link new sensors to the watch 10. As shown in FIG. 98, several menu options are displayed in the Settings mode, namely: TIME:DATE, CALIBRATE, SENSORS, and SOUNDS. The user selects the "SENSORS" option using the side button 50 and the end button 52 consistent with the description above. The controller then displays the message "WALK TO LINK." After a set amount of time while the user walks, the watch 10 detects the sensor and the controller displays an "OK" screen for a set period of time. The user can then utilize other functions of the user interface. As further shown in FIG. 99, the user can also set the distance units in either miles or kilometers using the buttons 50,52 consistent with the description above.

Figure 100:
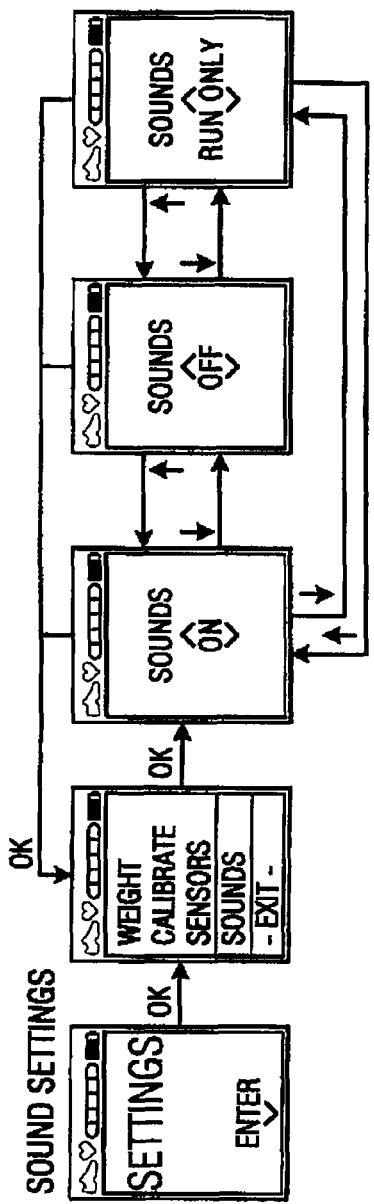
Figure 101:
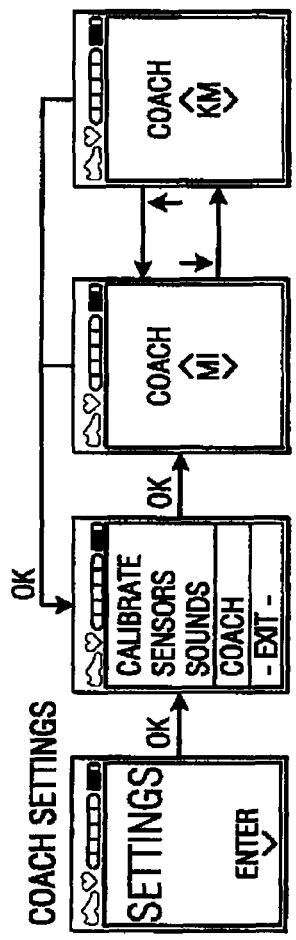
Figure 102:
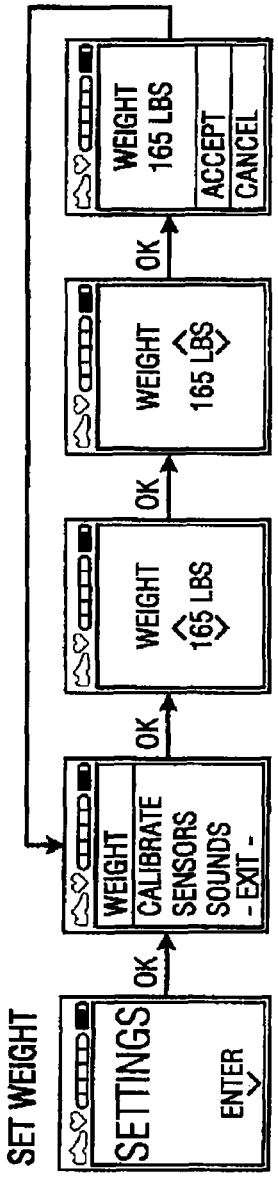

It is further understood that the user interface has a Sounds selection as part of the Settings menu (FIG. 100). The user has the option to have the Sounds on or off, as well as having the Sounds on only during a run in the IWO mode. The Settings menu may also have a Weight menu selection (FIG. 102) wherein a user can enter weight information to further enhance the performance features of the watch 10. As shown FIG. 101, the user can also select a COACH mode from the settings menu. Additional features regarding the COACH mode will be described in greater detail below.

Figure 103:
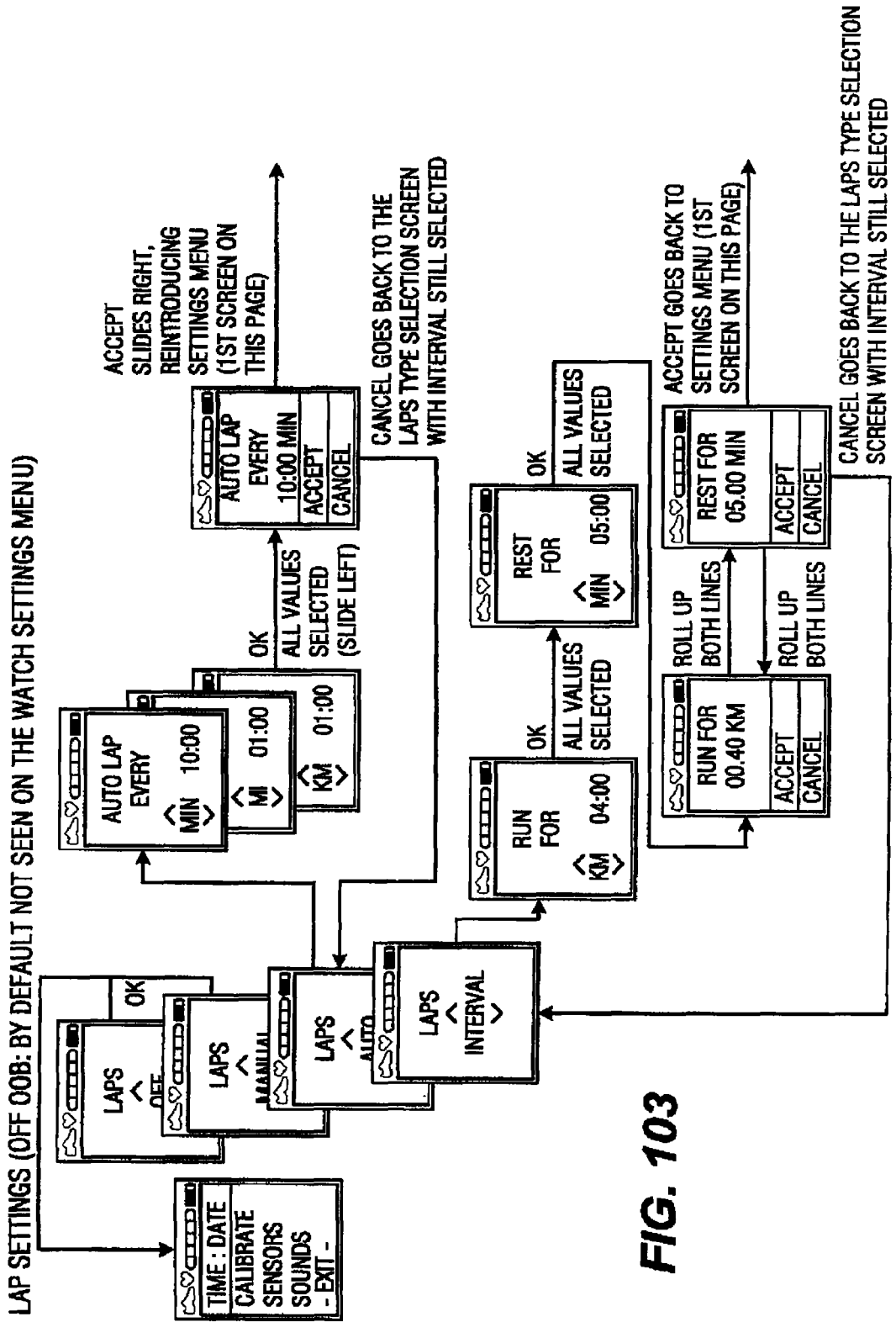

As further shown in FIG. 103, the Settings mode includes a menu selection for "Laps." The Laps function allows a user to manually or automatically apply certain demarcations to the performance data as displayed to the user as further described below. Generally, the Laps function is utilized by tapping the front side 38 of the watch 10 as described above, and generally the crystal 39 which activates the shock sensor 54. As discussed, the user can scroll through the menu selections and select "Laps." As shown in FIG. 103, a plurality of Laps types is available regarding the "Laps" function. First, the user can select that the Laps function be turned off. In other settings, the Laps function can be set to other types including Manual, Auto or Interval. If the user selects the Manual setting for the Laps function, the controller then displays the general Settings menu wherein a user can proceed with further activity. In this setting, the user can mark laps by tapping the crystal 39. For example as shown in FIG. 15, the user may tap the watch 10 to mark a lap, which when the user connects the module 12 to the Remote Site, the laps will be marked with indicia marks on a run curve such as shown in FIG. 14. If the user selects the Auto setting, the user interface displays an "Auto Lap Every" screen. The user can then select whether a lap will be marked at a certain time, e.g. every 10 minutes, or at each mile or kilometer. The user also has the option of multiple auto-marking intervals, e.g., marking 1 mile and then every 1 minute. Once selected, a review screen is displayed, wherein the user can accept the selection. If the user selects the Interval Laps type, additional screens are displayed prompting additional inputs from the user. These inputs will be described in further detail below in relation to the Run mode. A "Run For" screen is displayed wherein the user enters the distance to run. Once the distance is entered, a Rest For screen is displayed wherein the user enters the time the user will rest after the distance entered is run. As further shown in FIG. 103, the user is prompted to Accept the entered values. The user can also choose to Cancel the entered values wherein the initial Laps Interval screen is displayed for the user.

If the user selects "LAPS," the controller may display the times of each of the laps for the past run. The controller will also display the numbered lap along with the time for the lap-time in a scrolling feature when the cursor is over that certain lap. If the user selects OK while the cursor is over a lap, the controller will display the specific data for that lap, such as pace, total workout time, and total distance.

Once various values and parameters are set in the Settings mode, the user can select the Run mode using the side button 50 and end button 52 as shown in FIG. 86*b*. The Run mode will enter the user into the in-work-out (IWO) as describe above. Once selected, the user is prompted to link to sensors worn by the user. In an exemplary embodiment, the sensor is a shoe-based sensor such as an accelerometer and/or a heart rate monitor.

If the user has not previously linked a heart rate sensor to the watch 10, the user interface will attempt to detect the shoe-based sensor as shown in FIG. 86a. Thus, after entering the Run mode, the controller 18 displays the "Walk To Connect" screen with a shoe-shaped icon. The shoe-shaped icon is in outline form and in a blinking mode to indicate that the sensor has not yet been detected. It is understood that certain shortcuts can be provided to start a run such as pressing the one of the input buttons for a predetermined amount of time, such as pressing and holding the end button for two seconds. The user walks so that the watch 10 detects the sensor. The controller starts a timeout timer countdown for a preset time, such as 15 seconds. If a sensor is not detected within the preset time, the controller displays a screen indicating "Sensor Not Found" wherein the user can re-initiate the detecting process. Once properly detected, a "Ready" screen is displayed wherein the shoe-shaped icon is darkened and not blinking to indicate that the sensor has been properly detected. A "Start/End" selection is also displayed. Once the user selects the "Start" option, the watch 10 begins recording the athletic performance include speed, distance and other parameters such as calories burned.

Figure 86D:
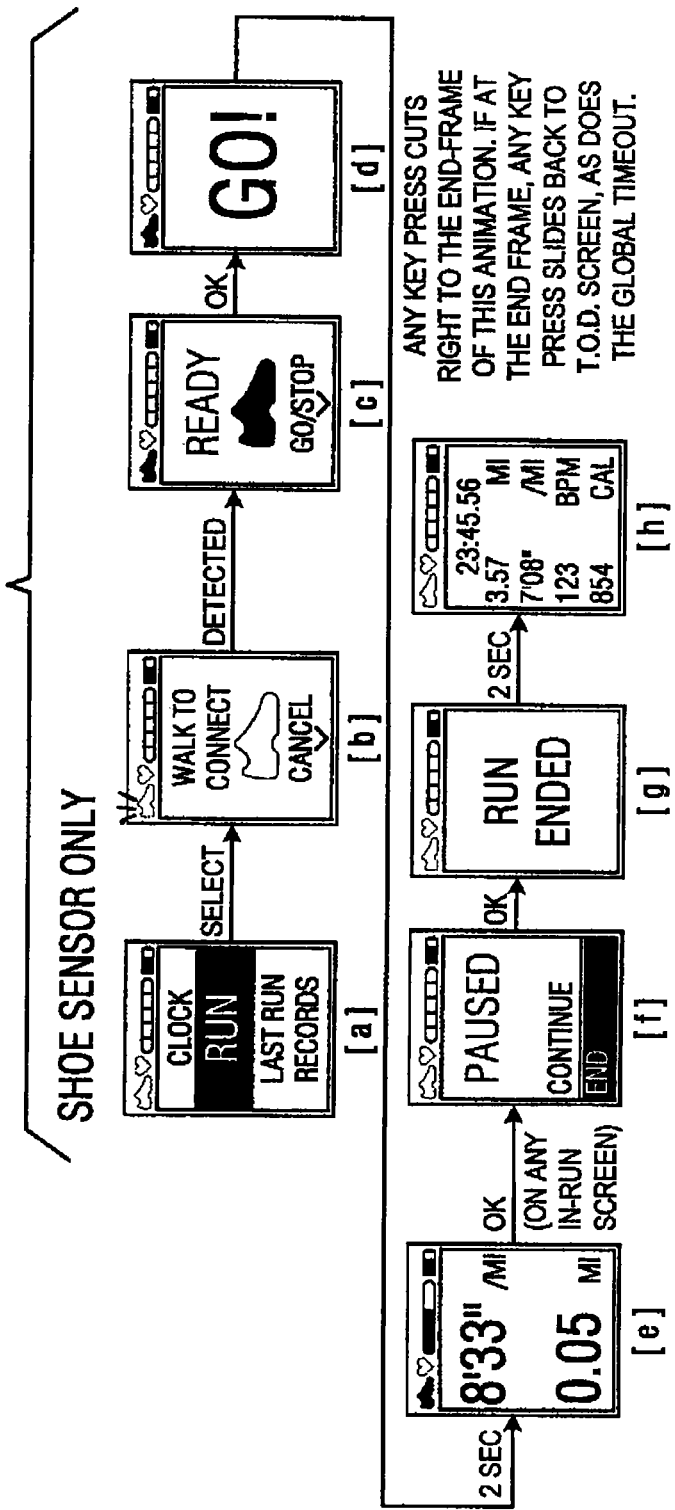

FIG. 86d illustrates another example of beginning a run with only a shoe-based sensor. As discussed above with respect to FIG. 86a, a user may select a run option and subsequently receive an instruction to walk or move in order to connect the shoe-based sensor to watch 10. During the run, a user's pace and distance may be displayed. If the user interacts with the interface (e.g., by selecting an OK button, tapping on a touch-screen), the run monitor may be suspended or paused. A user may subsequently choose to continue or end the run. When the run is ended, an interface displaying "RUN ENDED" may be displayed and, after a predefined amount of time, a run summary be displayed.

FIG. 86e illustrates another example series of user interfaces for initiating and conducting a run using multiple sensors such as a shoe-based sensor and a heart rate sensor. Depending on the desired type of run or the preferred display information, the interfaces may display distance information, pace information, elapsed time information, calories, clock, heart rate, lap splits and the like. Combinations of information may be displayed using bi- or tri-level display configurations. For example, distance and/or pace information may be displayed along with an elapsed time.

The controller then displays a Run Layout screen such as shown in interface J of FIG. 86b. The display screen may be in the form of a three-tiered display such as shown in interface J of FIG. 86b. The Run Layout screen may include the pace per mile, total workout time, and total distance, which is constantly updated during the athletic performance. The user can also modify the Run Layout screen wherein the performance data is displayed in a two-tiered display. A desktop utility software application associated with the user interface provides these options for the user as explained in further detail below. The two-tiered display allows the user to select data as desired that is displayed in a larger font, such as only displaying total workout time and calories. The user can also configure the layout to include additional information such as calories burned, heart-rate beats-per-minute, or time of day.

Figure 87:
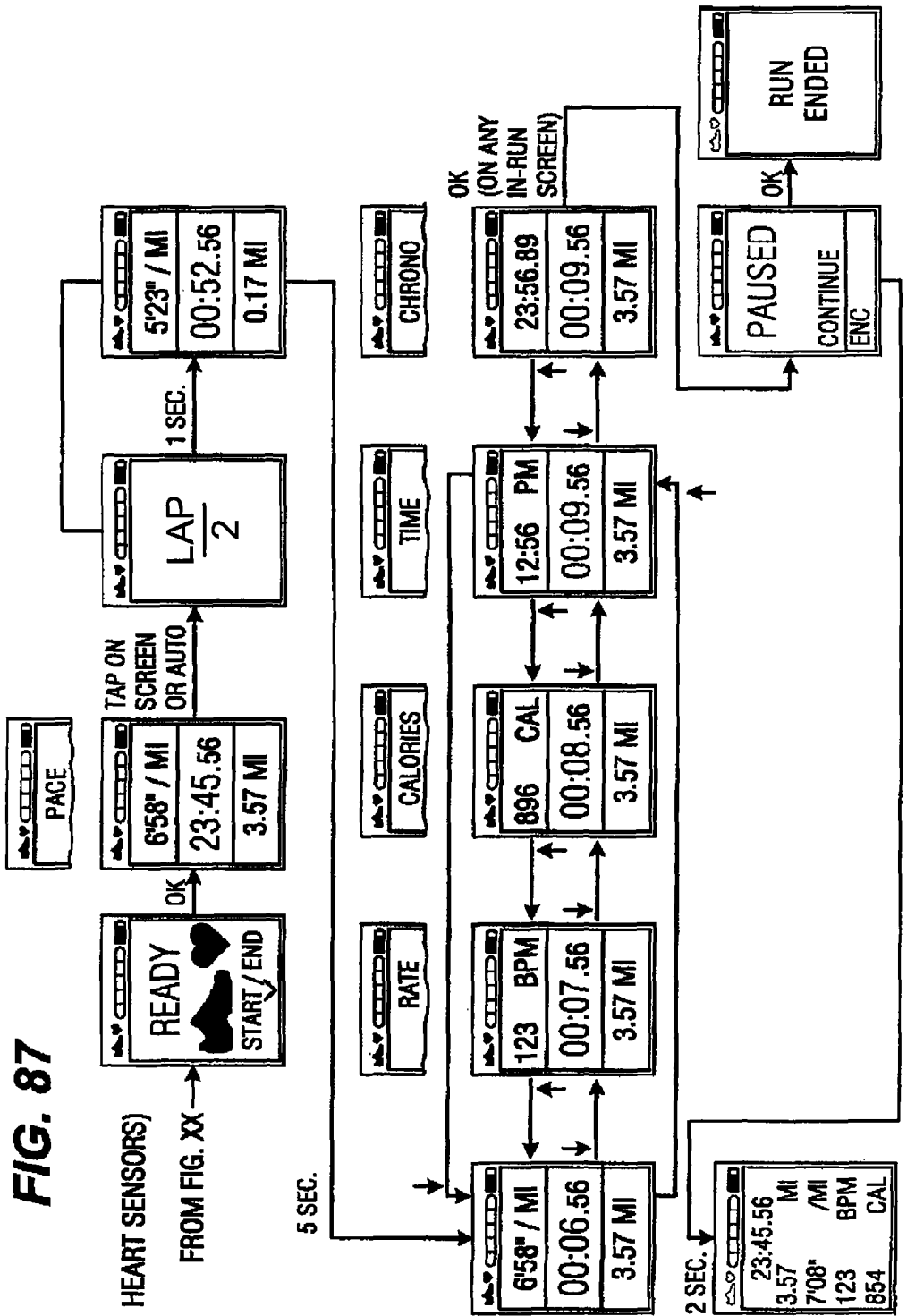

FIG. 87 discloses the screens the controller 18 displays when the user had previously linked heart rate monitor to the watch 10. Once the Run mode is selected, the controller displays the "Walk to Connect" screen similar to the discussion above, but now with a shoe-shaped icon and a heart-shaped icon, corresponding to the heart rate monitor. The shoe-shaped icon and the heart-shaped icon are both in outline form and in blinking mode to indicate that the sensors have not yet been detected. The user walks so that the watch 10 detects the sensors. The controller starts a timeout timer countdown for a preset time, such as 15 seconds. If a sensor is not detected within the preset time, the controller displays a screen indicating "Sensor Not Found" wherein the user can re-initiate the detecting process. Once properly detected, a "Ready" screen is displayed wherein the shoe-shaped icon and heart-shaped icon are darkened and not blinking to indicate that the sensors have been properly detected. As further shown in the FIG. 86e, depending on the sensor detected first by the watch 10, the shoe-shaped icon or the heart-shaped icon may be darkened while the other is still in outline form indicating that the watch 10 is detecting. A "Start/End" selection is also displayed with the "Ready" screen. Once the user selects the "Start" option, the watch 10 begins recording the athletic performance including speed, distance, heart rate and other parameters such as calories burned.

Figure 92A:
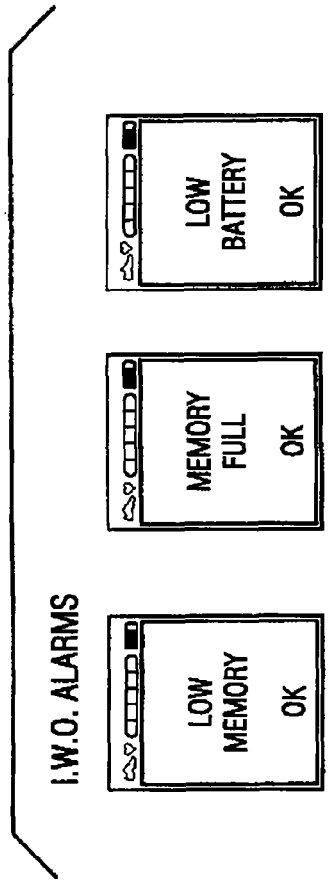
Figure 92B:
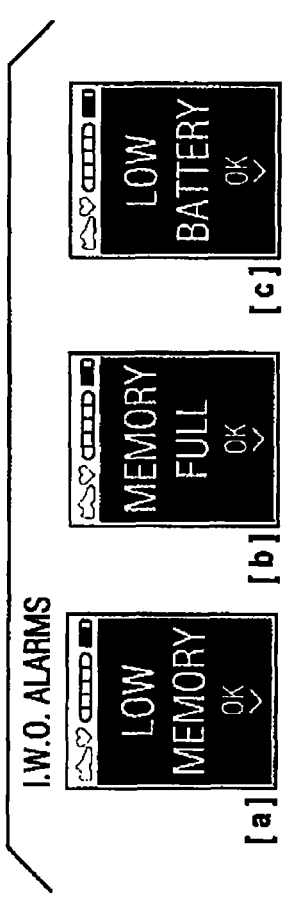
Figure 92C:
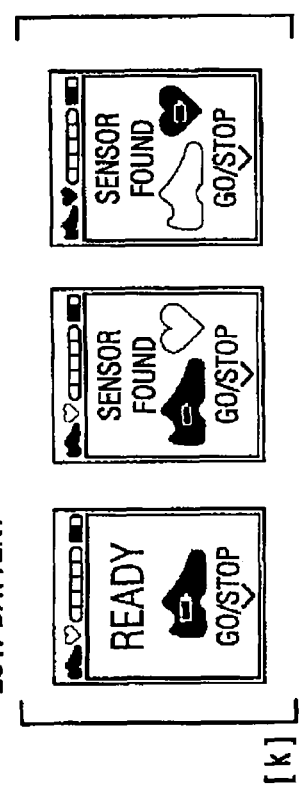

FIGS. 92a and 92b further show screens displayed if the sensors being used are low in battery power. A battery empty icon is shown within the sensor icon in such case. Thus, the battery empty icon is shown within the shoe-shaped icon or the heart-shaped icon. Alarms can also be displayed for low memory or full memory.

As the user continues in the athletic performance, the watch 10 constantly records and stores the data associated therewith. Performance data is also constantly displayed on the watch 10. As discussed, the display 56 may be set in the three-tier mode or the two-tier mode. As shown in the FIGS. 86e and 87, for instance, the controller may utilize labels associated with the data. For example, the label "PACE" may scroll across the top of the display and then the pace value (6'58"/ml) is constantly displayed. Such scrolling labels could also be used for the other metrics set to be displayed by the user. For example, FIG. 87 show that the display screens can be set to show scrolling labels and values such as heart rate, calories, time and chronograph. The labels could also be turned off or configured to scroll periodically during the athletic performance. If the Laps function is turned off or not utilized during the athletic performance, the user can pause the performance by pressing an input button. Once paused as shown in FIG. 87, the controller provides a menu selection for the user to Continue or to End the workout. If End is selected, the Run Ended screen is displayed as shown in FIG. 87. The controller is also configured to provide a shortcut to end a workout by pressing and holding the end button 52. This shortcut is provided when the user is in the IWO mode such as during a run.

As discussed above, the user has the option to utilize the Laps function by tapping the front side 38, or crystal 39 of the watch 10, which marks a lap providing additional functionality of the watch 10. As shown in FIGS. 15 and 87, once the user taps the crystal 39, the shock button 54 is activated marking a lap wherein a "Lap" screen is displayed. A "Lap 2" screen is displayed and it is understood that Lap 1, Lap 2, Lap 3 screens and so on will be displayed based on the number of Laps marked by the user. The Lap screen is displayed in a reverse configuration wherein the background is darkened and the indicia shown in a "white" configuration (See also "Personal Record" screen in FIGS. 90a and 90b). Upon marking a lap, it is understood that the backlight is lit and the controller is configured to prevent any further laps from being marked for a set period of time such as 6 seconds. This time prevention protects against accidental taps. Once a lap is marked, the controller displays the Run Information Screen that shows performance data for that current lap. The backlight remains lit and the screen remains in a reversed darkened configuration with the indicia shown in "white" figures. As further shown, the pace, time (chronograph) and distance is displayed for a set amount of time, such as 5 seconds. The time and distance are shown as values for only that lap that has been marked and the pace displayed is the average pace over the lap interval.

After the predetermined time to display the lap performance data, the controller then displays the ongoing run data display screen. Thus, the pace, time and distance are again displayed. It is understood that the controller can be configured to display performance data relating to the total workout if desired wherein the overall average pace, total time and total distance is displayed while the user continues with the athletic performance. It is also understood, that the controller can be configured to display the current lap performance data wherein the average pace for the current lap, current lap time and current lap distance is displayed. A combination of total data and lap data can also be displayed based on user preferences. Other performance data can also be displayed as part of the Run data display screen such as heart rate, calories, time of day, and time (chronograph). The controller can be configured to display any combinations of these data metrics in the various locations as well as in total data or lap data. It is further understood that the user can continue to mark additional laps by tapping the crystal 39 and activating the shock button 54. Data will continue to be displayed as discussed above. In one exemplary embodiment, the display shown in FIG. 87 is particularly utilized when the LAPS function is set in the manual mode. In such case, after a first lap is marked by tapping the crystal 39, the chronograph is displayed at the top row of the display. From then on, the larger center row displays the delta time, i.e., the lap time elapsed for the current lap. In addition, in the Laps function when using multiple sensors (foot sensor and heart rate sensor), the watch 10 captures data relating to chronograph, lap time, distance delta, average pace for that lap, average heart rate for that lap, and calorie delta but only displays pace delta, lap time and distance delta.

Figure 90A:
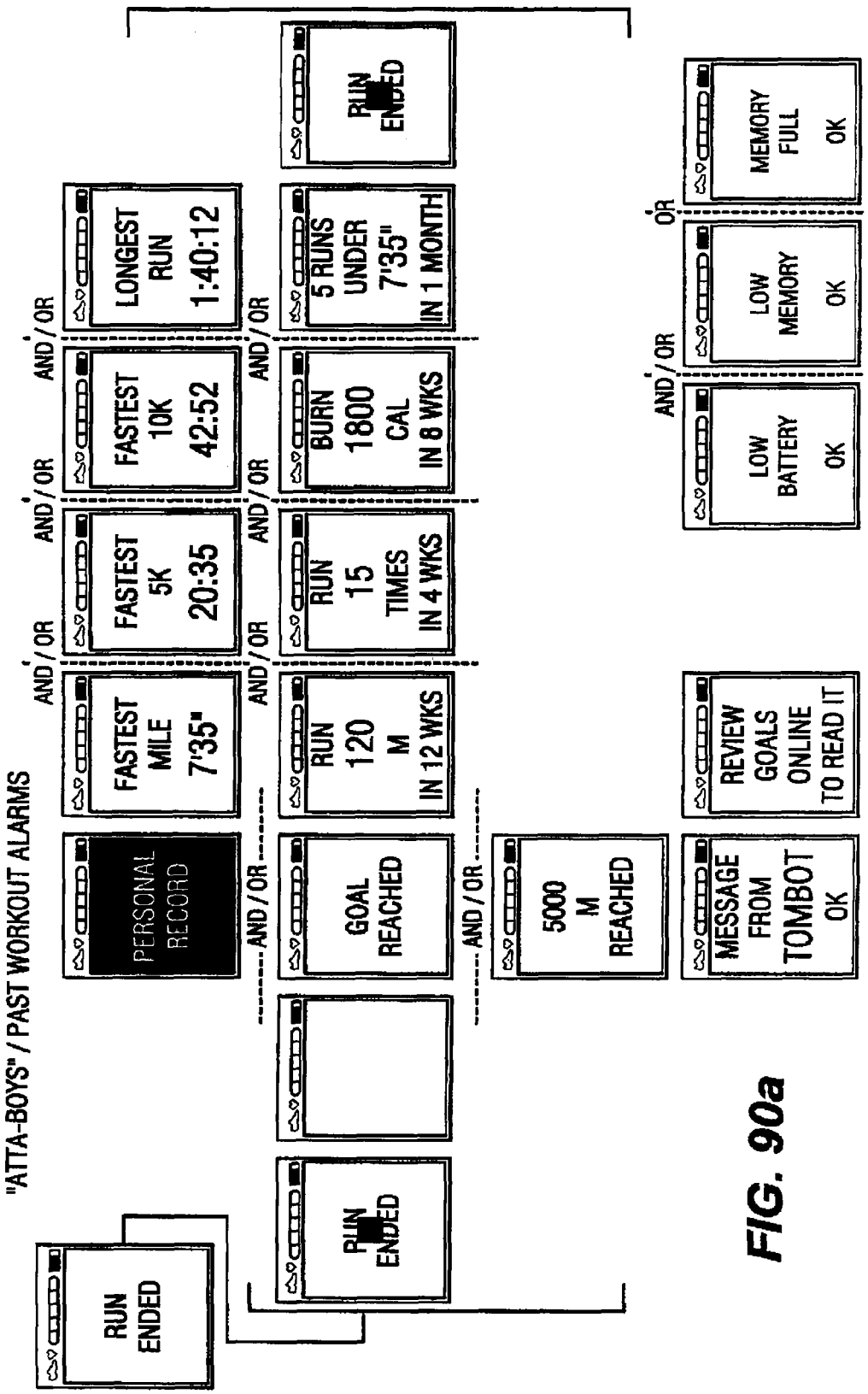
Figure 90B:
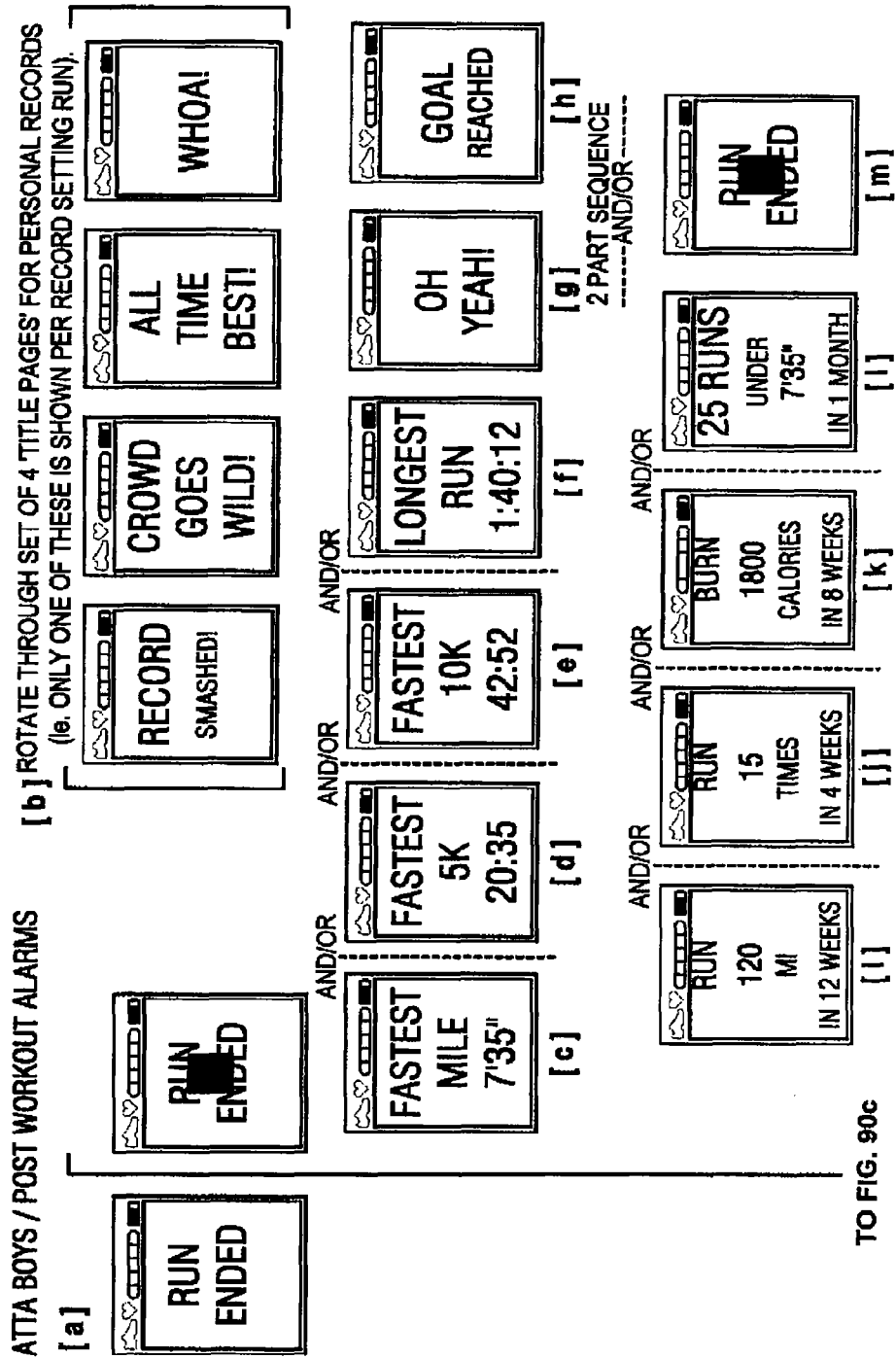

The user can pause recording of the athletic performance data by pressing the end button 52. As shown, a Paused screen is displayed with a Continue and End menu selection. When paused, the title bar acts as a ticker cycling through the user's chosen metrics (PAUSED-CHRONO-DISTANCE-PACE-HEART RATE-CALORIE-TIME OF DAY). Thus, the PAUSED title is displayed and then moves from right to left on the display wherein the numerical chronograph value scrolls onto the display from right to left, then followed by the distance numerical value, and so on for the other chosen metrics. If the user selects Continue, the watch 10 will resume recording performance data as discussed above. If the user selects End, the Run Ended screen is displayed. It is understood that a shortcut to end a run can be provided wherein the user can press and hold the end button 52 while in the IWO mode which will also stop the recording of data and display the Run Ended screen. If certain Goals are reached or other messages are provided by the watch, such information may be displayed to the user as described in greater detail below (FIGS. 90*a* and 90*b*). After a predetermined amount of time such as 2 seconds, a summary of the performance data is then displayed for review by the user. In an exemplary embodiment, a label of the performance metric scrolls across the screen from right to left followed by the numerical value of the data. Five rows of data can be displayed although this can be changed to add or subtract certain data. Thus, in one exemplary embodiment, the Time label scrolls across and the total time is displayed. The Distance label scrolls across and the total distance is displayed. The Pace label scrolls across the screen and the average pace for the workout is displayed. The Heart Rate label scrolls across the screen and the average heart rate in beats per minute (BPM) is displayed. Finally, the Calories label scrolls across the screen and the total number of calories burned is displayed. It is understood that if the watch 10 detects no sensors for a certain amount of time, e.g., 25 minutes, the watch 10 will go into the paused state automatically and an audible alert can be sent via the speaker. If paused for an additional predetermined period of time, e.g., five minutes, after the auto-paused state, then the run will automatically be ended. If the user entered the paused state manually, then the run will be ended after a predetermined amount of time such as thirty minutes.

Figure 88A:
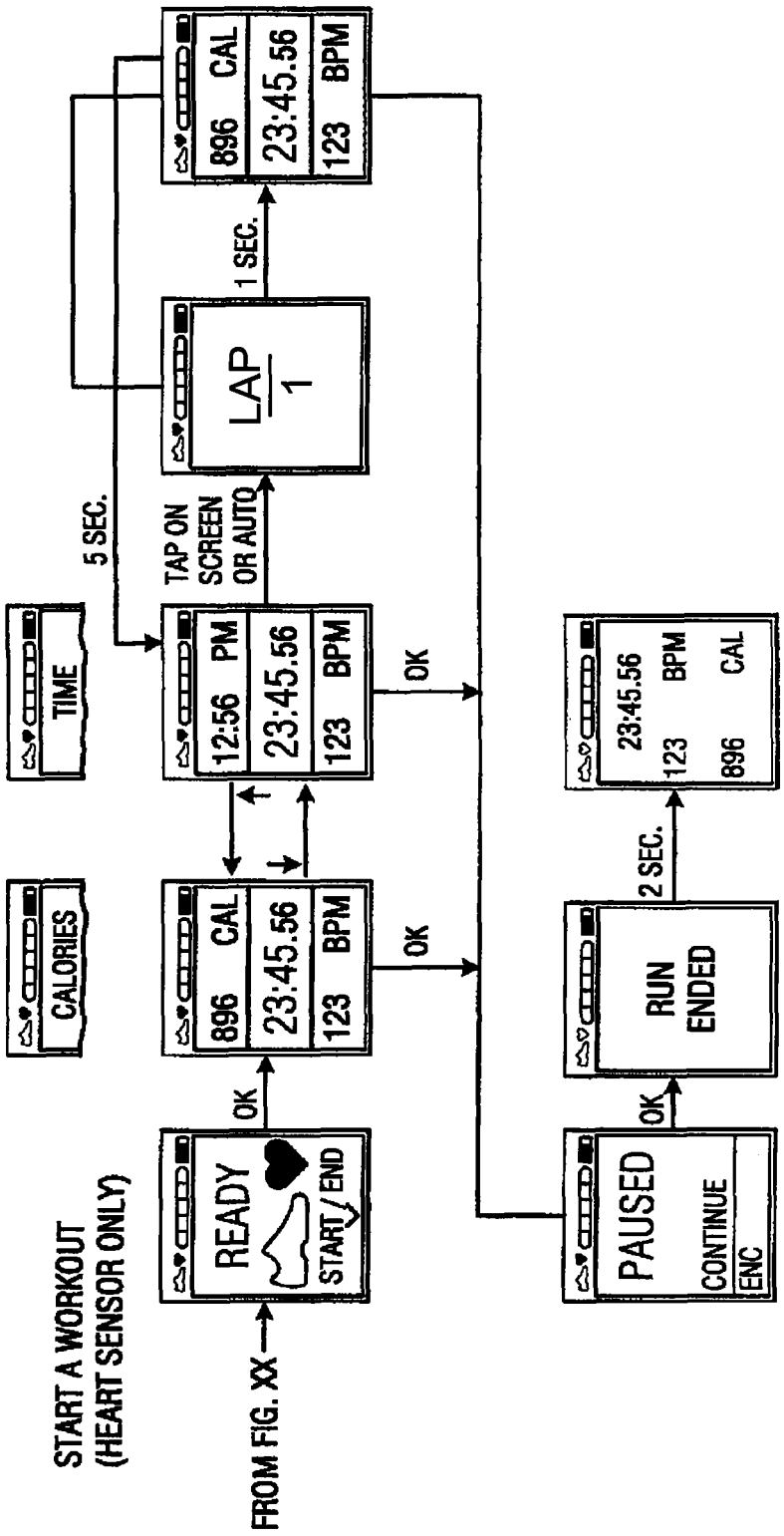

As shown in FIG. 88*a*, the user may have an athletic performance or workout with the heart sensor only and not a shoe based sensor. The user interface displays similar screens as described above utilizing both the shoe-based sensor and the heart rate sensor. The user initiates the Run mode wherein the watch detects the previously linked heart rate sensor as described above. As shown in FIG. 88*a*, the user interface displays the Ready screen once the heart rate sensor is detected wherein the heart icon is solid and not blinking while the shoe-based sensor remains in outline form. Once the user selects the Start menu selection, the watch 10 begins recording the performance data associated with the workout. In this instance, the user interface displays the Run Layout screen, which may be custom set by the user using the desktop utility application. For example, as shown in FIG. 88*a*, the controller can display calories, workout time, and heart rate (beats per minute—BPM) in the three-tier mode. As described above, the label scrolls across the display from right to left and then the value remains displayed. In another example, the user may set the Run Layout screen to show Time Of Day, workout time, and heart rate. Other screen layouts are also possible using the associated desktop utility software. The user performing a heart-rate only workout can also utilize the Laps function similarly as described above. As shown in FIG. 88*a*, the user can manually mark a lap by tapping the crystal 39 wherein a Lap 1 is marked and the backlight is illuminated. The user input (e.g., tapping the touch sensitive display) might only be interpreted as a lap marking when a user is currently performing an athletic activity and/or a particular interface (e.g., a workout monitoring interface) is displayed. After a predetermined amount of time, e.g., 1 second, the data on the Run Layout screen is again displayed as shown in FIG. 88*a*. The backlight may remain illuminated for a certain time. In this mode of operation, the Laps function captures and displays average heart rate, chronograph time and calories. The user can choose to capture and display other data as desired. The user can pause or end the workout, and it is understood that the Pause and Run Ended functions are similar as described above. Thus, when paused, the user interface displays data in ticker fashion wherein the label Paused scrolls across display, followed by the numerical values for chronograph, heart rate and calories scrolling across the display. Once the workout is ended, the performance data is displayed as described above wherein the label scrolls across the display followed by the numerical value. This can be done for the various performance metrics chosen to be displayed by the user such as workout time, heart rate and calories. After the performance data is displayed for a predetermined amount of time, the user interface returns to the Time Of Day screen.

Figure 88B:
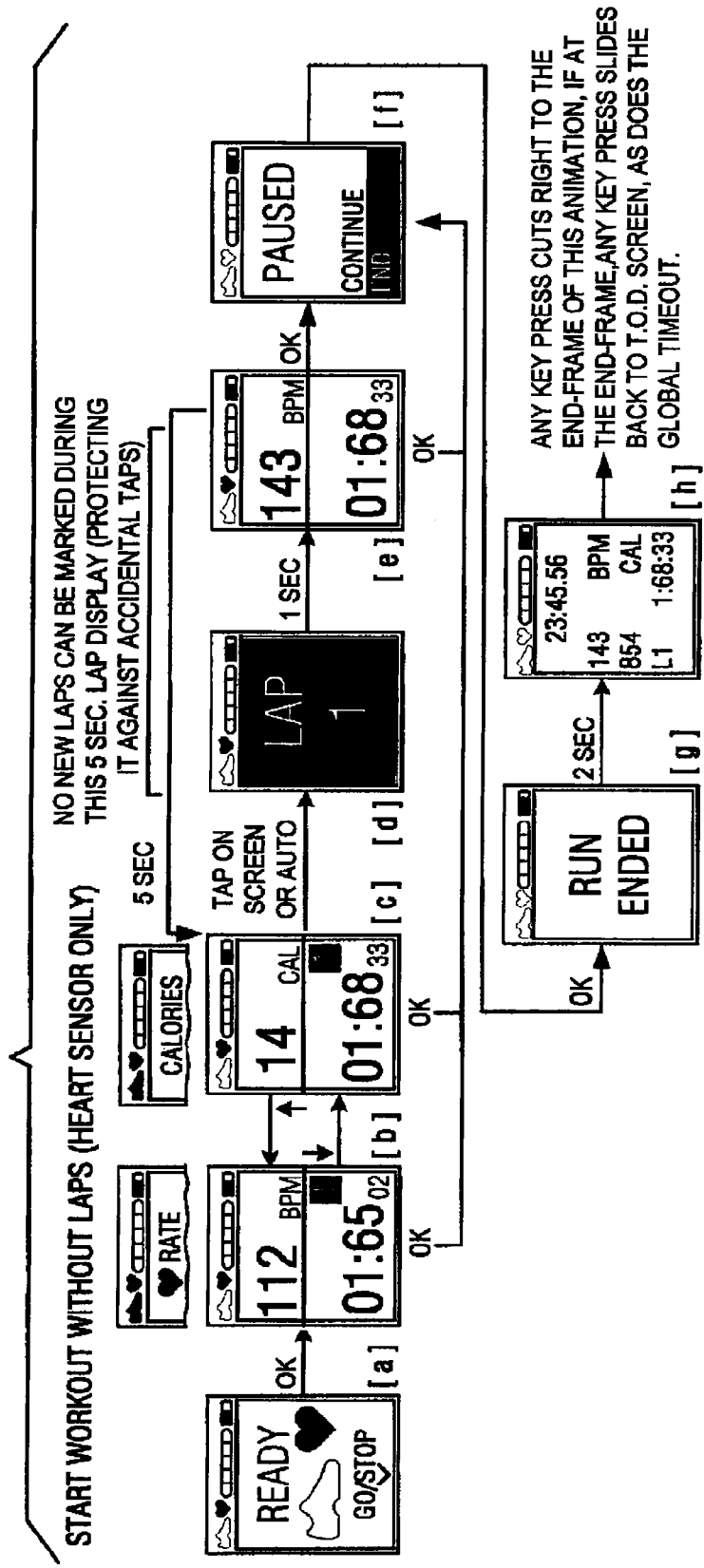

FIG. 88*b* illustrates another example series of interface for initiating and recording a workout and for allowing a user to manually mark laps during the run. For example, to mark a lap a user may tap a screen or a particular portion of the screen. Additionally, the interface may be locked from marking another lap for a predefined amount of time after the user has marked a lap. Such a lockout functionality may prevent accidental marking of laps (e.g., accidentally double tapping an interface). FIGS. 88c and 88d illustrate interfaces where lap time information may be displayed in a bottom position and a top position, respectively, of a display, e.g., of watch 10. For example, a lap indicator might not be incremented or the incremented lap indicator might not be displayed until a threshold amount of time (e.g., 5 seconds, 2 seconds, 10 seconds, 1 minute, 5 minutes) has passed since receiving the user input marking the lap. This may be used to insure that accidental double tapping within a short amount of time is not interpreted as multiple lap markings Additionally, in response to receiving a lap marking (e.g., a user input through a touch sensitive display), an interface displaying a pace of immediately previous lap may be displayed. The pace display may be displayed until the threshold amount of time has elapsed, at which time a workout monitoring interface including a statistic other than pace (e.g., distance of a current lap) may be displayed. Alternatively, the interface may display the same information with the exception of the updated lap indicator.

Figure 89A:
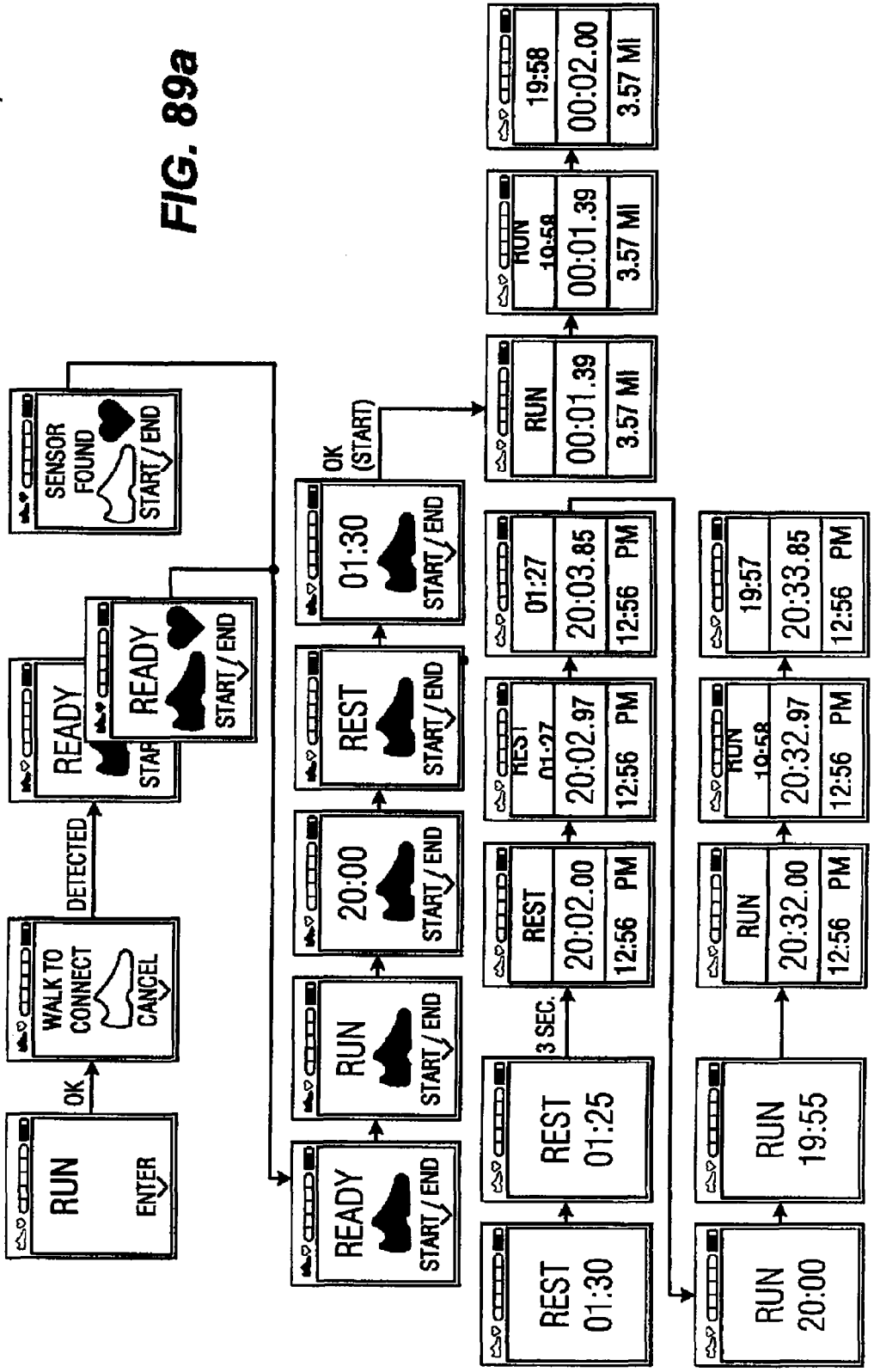

As discussed above, with the Laps function, the user can select the Interval option to perform an interval-based athletic performance in the IWO mode. As shown in FIG. 89a, the user walks in order for the watch 10 to link with the shoe sensor and/or the heart rate sensor. If the interval program has a distance setting in the program, it will only apply to step/pedometer based workouts such as the shoe sensor. As further shown in FIG. 89a, if the interval program has a distance setting and the user is performing a heart rate only workout, then Laps/intervals will be temporarily disabled for that workout only. It is understood, however, that if the interval program has only a time setting, then the user can perform interval training with a heart-rate only workout. Regardless, the watch 10 links to the sensors being used and the Ready screen is displayed.

FIG. 89a shows further screen views that the user interface displays for an interval workout. For example, once a user commences the interval workout by pressing the select or end button 52, the interval settings are displayed. Thus, as shown in FIG. 89a, the display indicates the user will run for 20 minutes. The display then indicates that the user will rest for 1 minute and 30 seconds. The user then commences the workout by pressing the end button 52. As shown in FIG. 89a, the user selected the three-tiered display with the desktop utility. Thus, initially, the Run label is displayed at the top row, the elapsed time is displayed in the larger middle row and the distance is displayed in the bottom row. As shown in FIG. 89a, after a predetermined time, the Run label scrolls upwards wherein an interval countdown timer is displayed wherein the 20 minute run interval is counted down. It is further understood that in an interval workout, the delta time elapsed will be displayed in the larger middle row in subsequent laps/interval periods. Using the desktop utility, the user can specify that the chronograph time can be displayed in the top row, or toggle loop, at the end of the loop.

As further shown in FIG. 89a, when the rest interval is reached, the backlight is illuminated wherein the user interface displays the Rest screen along with the time specified. The time is shown counting down for a predetermined time wherein the user interface displays the Run layout screen. Thus, the Rest label is displayed at the top row, the further elapsed time is displayed in the larger middle row and, based on user preferences, the time of day is displayed. The Rest label scrolls upwards wherein the rest interval time is displayed while counting down. Once the next run interval is reached, the user interface displays the Run screen with the designated time as shown in FIG. 89a and showing the backlight illuminated. The designated Run time begins to countdown. After a predetermined amount of time, the Run layout screen again is displayed. The Run label is displayed in the top row wherein the label scrolls upwards wherein the next designated run time continues to countdown. Further elapsed time is shown in the larger middle row. The time of day is also displayed in the bottom row as designated by the user.

Figure 89B:
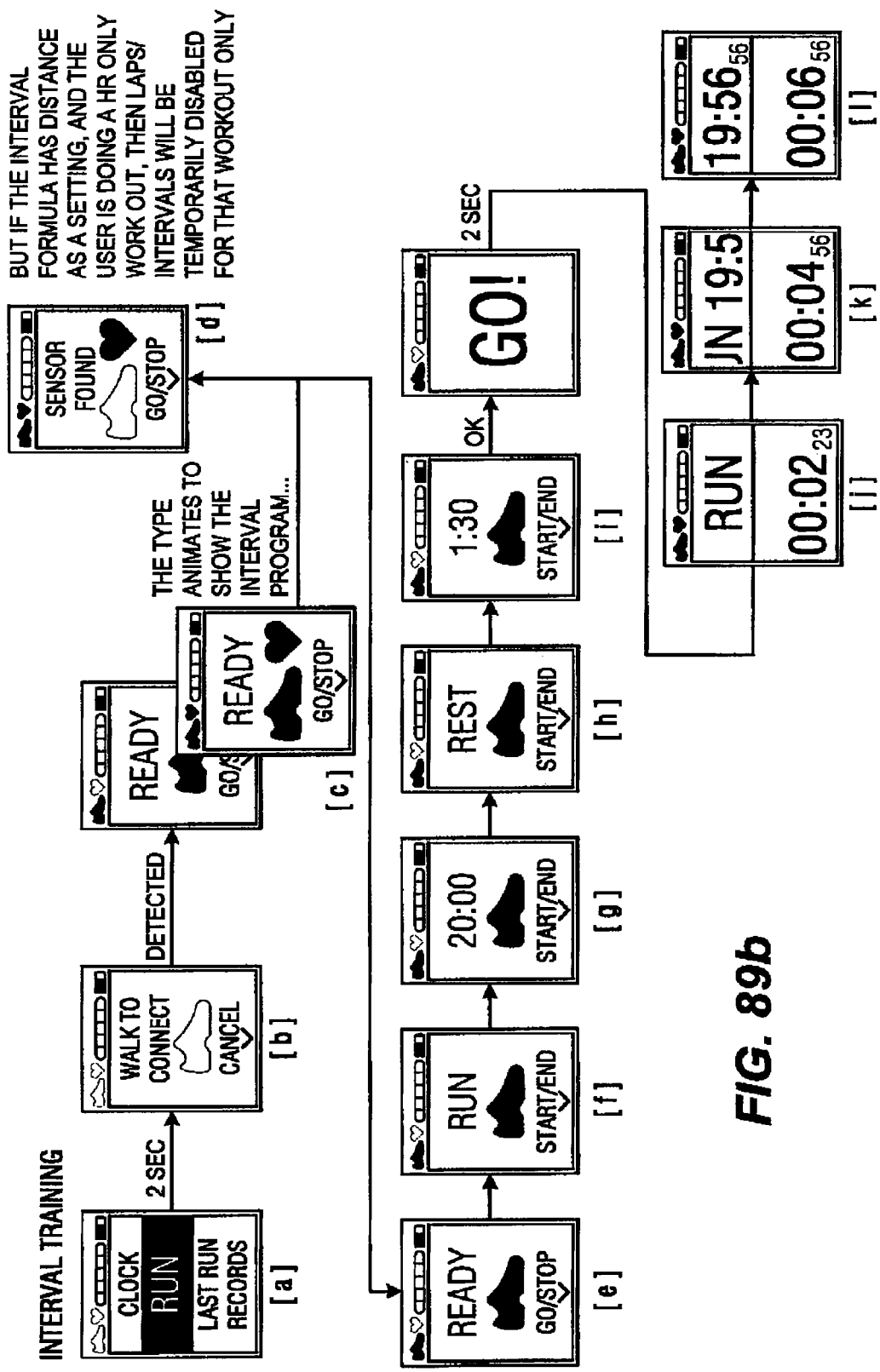

FIG. 89b illustrates another example series of interval training interfaces. The run interfaces may display instructions indicating whether the user is to run or rest. Additionally, the run line of the display may scroll (e.g., horizontally) to display an entirety of a message. For example, if the text "RUN 19:56" does not fit within the display area at the same time, the text may scroll to the left or right (or vertically). FIG. 89c illustrates additional example interval training interfaces. As illustrated, when a user is to transition from a rest to run mode (or vice versa), the interface may be initially displayed in a different manner (e.g., a first 3 seconds or other predefined amount of time). For example, the background may be backlit or displayed in a first color. After the predefined amount of time, the background might no longer be backlit or displayed in a second color different from the first.

The user can end an athletic performance or run as described above wherein the user interface displays the run ended screen. The user interface further displays the summary information such as total workout time, total distance, pace, heart rate and calories. As shown in the figures, the user interface has the capability of displaying additional information to the user. This information can be in the form of in-work-out alarms or other messages to the user. Regarding the alarms, an audible sound is emitted and the backlight is illuminated for a predetermined time such as 5 seconds. In an exemplary embodiment, the alarms at not subject to timeouts wherein the user must press the end button to dismiss the alarm.

As shown in FIGS. 90a, 90c, 92a and 92b, after a run is ended, if the level of recorded performance data nears a memory capacity of the electronic module, the user interface displays the screen Low Memory as shown in FIG. 90a. As discussed, the user must select the OK option by pressing the end button to dismiss the alarm. In this instance, the user is prompted to upload recorded performance data to the remote site as discussed. This alarm can also be displayed when a user seeks to commence a workout.

As shown in FIG. 90a, the user interface may display a MEMORY FULL alarm may at certain instances. For example, this alarm may be displayed when a user attempts to initiate a run with no memory remaining. In that case, the user interface may display the Run/Enter screen, Time of Day screen or some other screen of the user interface. The MEMORY FULL alarm may also occur during an athletic performance. In such case, the alarm screen may not be immediately displayed at that moment (it is understood that the user would have seen the LOW MEMORY warning upon starting the workout and ignored it). The system may stop recording data except for the total length and duration of the run. When the run is complete, the user may see this alert as part of the end of run sequence.

As shown in FIG. 90a, the user interface may display a Low Battery alarm. This alarm may be displayed when the user initiates and ends a run with the battery level equal to or below the reserve threshold. The reserve threshold should allow the user to run for at least an hour in an exemplary embodiment. FIG. 90c illustrates other example low battery and low or full memory alarm messages.

FIG. 90a discloses additional messages the user interface may display to the user. As previously discussed, athletic performance data is transferred between the electronic module and the remote site dedicated to storing and displaying the athletic performance data. Thus, certain data can be compared and stored in the electronic module to assist in displaying additional messages to the user. For example, as shown in FIG. 90a, the user interface can display personal records associated with the user. As previously described, the display can be reversed wherein the background of the display screen is darkened with the indicia shown in white lettering or perceptively different text. Thus, the electronic module is capable of storing the user's best personal times for certain categories and then comparing the current athletic performance data once the user ends an athletic performance or a run. If the user surpasses a previous time, the user interface can be configured to display a message to the user such as "PERSONAL RECORD" for a predetermined amount of time. The user interface may then display various different screens showing the user's personal data such as fastest mile with time data (FIG. 90a), fastest 5 k with time data, fastest 10 k with time data, or longest run with time data. Other personal record categories can also be displayed. FIG. 90b illustrates example achievement messages for congratulating the user on the goal achieved (e.g., best time, longest run, best pace, etc.). For example, the interface may display a message such as "RECORD SMASHED!" or "CROWD GOES WILD!"

Additionally, there may be post workout alarms, as further shown in FIG. 90a. During the RUN ENDED screen, if alarms need to be displayed, a black pop-up may take over the screen growing from the center. If a goal was reached during the workout, the title screen "GOAL REACHED" is shown. If several goals were reached during the workout, the title screen "GOALS REACHED" uses the plural and is only shown once (not prior to each goal that is displayed). Goals such as, total distance, total workout times, pace, and calories burned may be displayed as reached and ahead of target. For example, as shown in FIG. 90a, goal messages may be displayed such as running 120 miles in 12 weeks; running 15 times in 4 weeks; burning 1800 calories in 8 weeks; having 5 runs under 7'35" in one month; or 5000 miles reached. The user interface can also display a message to the user that another user has left the user a message wherein the user can review the message at the Remote Site. After all alarms are displayed, the black pop-up screen may retract itself and disappear. As soon as the pop-up screen disappears, the user is lead to the summary screen for that run. FIG. 90b illustrates additional example goal messages.

Figure 91A:
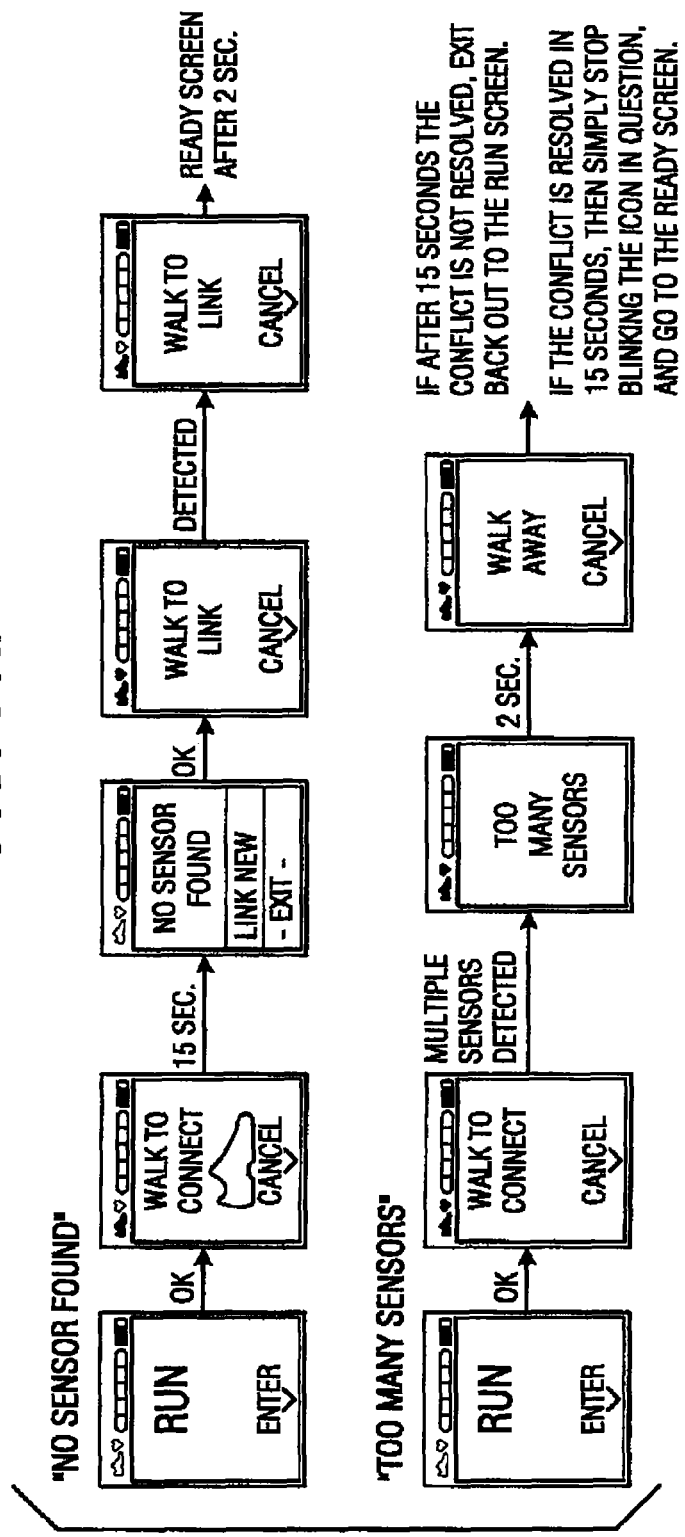

As shown in FIG. 91a, the user interface may also display additional messages to the user. As discussed above when the user prepares to commence an athletic performance, the user navigates through the user interface wherein the user is instructed to so that the watch 10 can detect and connect to the appropriate sensor. It could occur that the watch does not detect a sensor. As shown in FIG. 91a, after the watch 10 searches or attempts to detect the sensor for a preset time, such as 15 seconds, and the watch 10 fails to detect a sensor, the user interface displays a NO SENSOR FOUND message. The user has the option of either linking a new sensor by selecting the LINK NEW option, or by exiting by selecting the EXIT option. If the user selects the LINK NEW command, the user will be instructed to walk to link and after a predetermined amount of time, the sensor may then be detected and an OK screen will then be displayed for 2 seconds. The controller will then display the READY screen and the user can proceed with the workout as previously described. If the user selects the EXIT command, the user interface will display some other screen such as the Time of Day screen.

During the sensor detect and connect process, it can be possible for the watch to sense multiple sensors such as when linking sensors while in close proximity to other athletes also wearing sensors (e.g., at the start of a race competition such as a 5 k, 10 k or marathon race). Thus, as shown in FIG. 91a, the watch 10 of the user may detect too many sensors. In this situation, the user interface displays a "TOO MANY SENSORS" message for a predetermined amount of time wherein then the user interface displays a message to "WALK AWAY" in order to resolve the sensor detection problems. If after a preset time, such as 15 seconds, the conflict is not resolved, the controller will exit back out to the RUN screen. If the conflict is resolved within the preset time, such as 15 seconds, then the controller will stop blinking the icon in question and go to the READY screen.

FIGS. 91b and 91c illustrate additional example interfaces for linking new sensors. For example, FIG. 91b illustrates interfaces for linking a new sensor when no sensor is initially connected and FIG. 91c illustrates interfaces for linking a new sensor when multiple sensors have been detected.

Figure 93A:
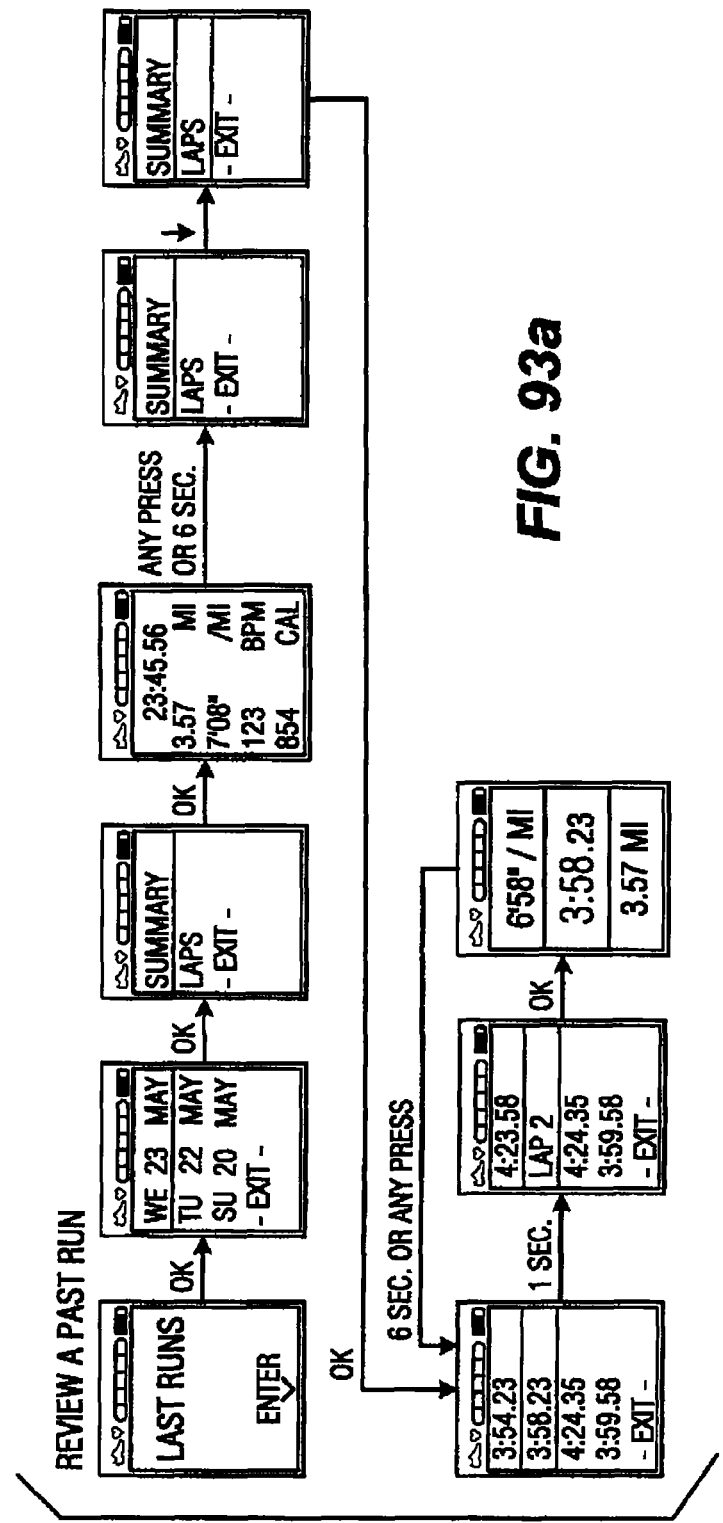
Figure 93B:
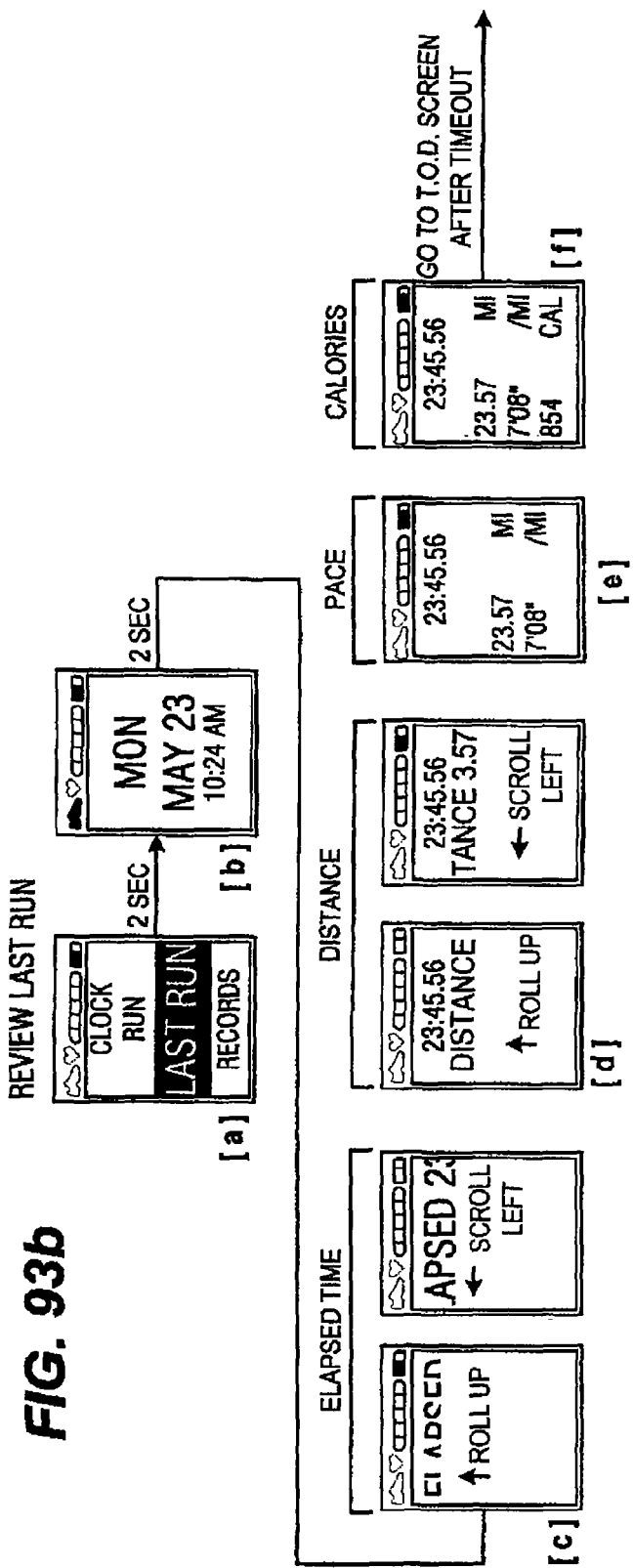

The user interface allows a user to review past athletic performances or runs. As discussed, the user can upload run data recorded by the module 12 to the Remote Site as well as download run data maintained on the Remote Site. As shown in FIG. 93a, in the out-of-workout-mode (OOWO), the user selects the LAST RUNS option using the side button. The user interface then displays the dates of the user's latest runs. The user can then select a particular date of run to review. The user interface then displays a pair of options, allowing the user to select "SUMMARY" or "LAPS." If the user selects "SUMMARY" by pressing the end button, the user interface displays any or all of the following information: total workout time, total distance, pace, average heart-rate, and/or total calories burned. After a predetermined amount of time, the user interface may then return to the previous Summary/Laps/Exit screen. If the user selects the Laps option, the user interface displays the general elapsed times for each lap of the run previously selected. The user can then use the side button to scroll among the lap data and select a particular lap. As shown in FIG. 93a, additional information for the selected lap is displayed such as pace, elapsed time for the selected lap, and distance of the lap. FIG. 93b illustrates another example series of interfaces through which a user may review information associated with the last run.

Figure 94:
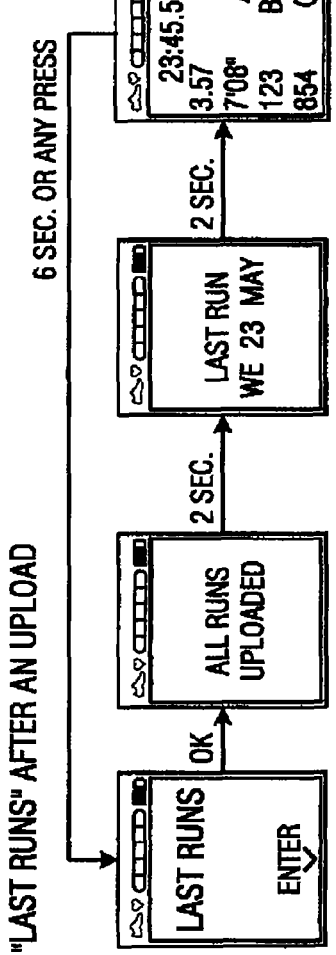
Figure 95:
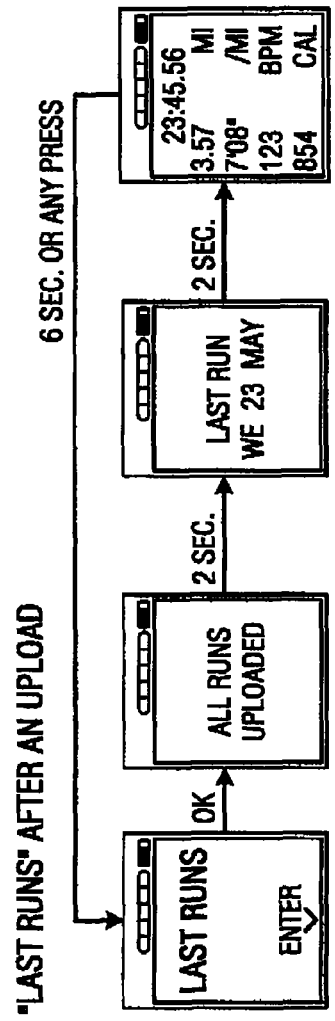
Figure 96:
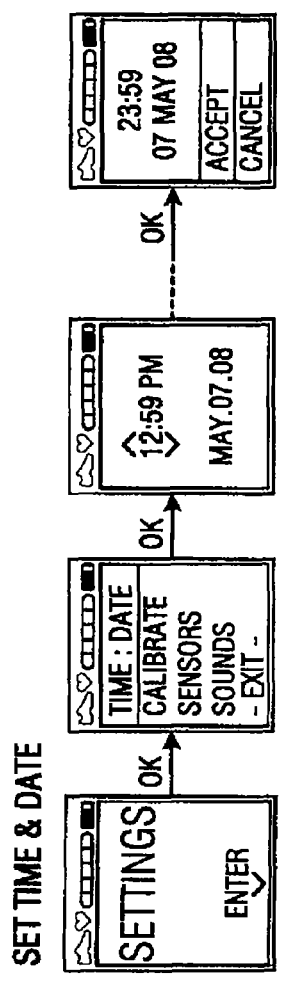

Once a user uploads athletic performance data to a remote location and the user selects the Last Run option, the user interface will display a message, "All Runs Uploaded" as shown in FIGS. 94 and 95. After a predetermined amount of time, the user interface displays the date of the user's last run. After a further predetermined amount of time, the user interface displays the summary data for the last run as described above. Thus, as shown in FIG. 94, the user interface displays the following information relating to the last run: total time, total distance, pace, average heart rate and calories burned.

As discussed, the watch 10 also has the Remote Site mode (FIG. 86b). As previously discussed, the electronic module 12 is removable from the wristband 14 and plugged into the user's personal computer or other device such as gym equipment. Athletic performance data recorded by the watch 10 during a run can then be uploaded to a Remote Site such as a site dedicated to the storage and display of athletic performance data. FIGS. 18 and 19-20 disclose additional features regarding communication with the Remote Site. The Remote Site may display the athletic performance data in certain formats useful to the user. For example, the remote site may display a plurality of run data for the user in a bar graph format. In addition, the remote site may display run data in a line graph format FIGS. 14 and 19). The Remote Site mode of the watch allows the user to download certain features of the Remote Site onto the watch 10. Thus, the watch 10 is capable of displaying certain amounts of athletic performance data and in a format useful to the user.

Figure 114:
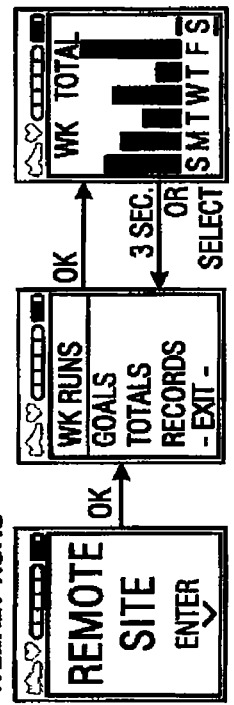

As shown in FIG. 114, the user can scroll through the main menu using the side button and select the Remote Site option using the end button 52. The user interface displays the Remote Site screen and the user can select enter using the end button 52. The Remote Site mode provides a plurality of menu options to the user. As shown in FIG. 114, in an exemplary embodiment, the user interface provides the following menu options: Weekly Runs (abbreviated "WK RUNS" on the display); Goals, Totals, Records and Exit. It is understood that when the electronic module is plugged into the user's personal computer and connected to the remote site via, for example, the desktop utility, user athletic data previously recorded by the electronic module and uploaded to the remote site can be downloaded to the electronic module to be displayed to the user as discussed herein.

The user can select the Weekly Run option. As is shown in FIG. 114, the Weekly Run menu option displays a chart in the form of a bar graph representing the run data for the past week, e.g., seven data entries for Sunday through Saturday. It is understood the display can be customized wherein the seven display can start with a different day. The display could also be modified to display data for a lesser amount of days such as Monday through Friday. As further shown in FIG. 114, the tallest bar represents the longest run for the current week thus far. All other bars have a height relative to the tallest bar. If there is no run data for a day of the week, the corresponding bar will be a single pixel tall, even if that bar represents today. It is understood the data display can be animated building from left to right, wherein the first bar line is displayed, such as Sunday data, followed by Monday data and so on. The data is displayed at a rate allowing the user to read each day of data as its being displayed. As data is displayed for each day, an underscore follows each day. Once the data is displayed for the current day, the underscore remains under the current day of data. The "WK TOTAL" heading then scrolls on the display from left to right. The user can press the side button scrolling up and down to control the animation of the weekly display. Thus, the user can review data corresponding to a week of runs. It is understood that this weekly data is constantly updated as the user uploads data to the remote site as well as download data from the remote site. It is also understood that the weekly display of data can be built as data is recorded and stored on the watch 10 as the user progresses through the week run by run. As explained in greater detail below, the weekly data can also be displayed as part of the Time Of Day display to be described in greater detail below.

Figure 115:
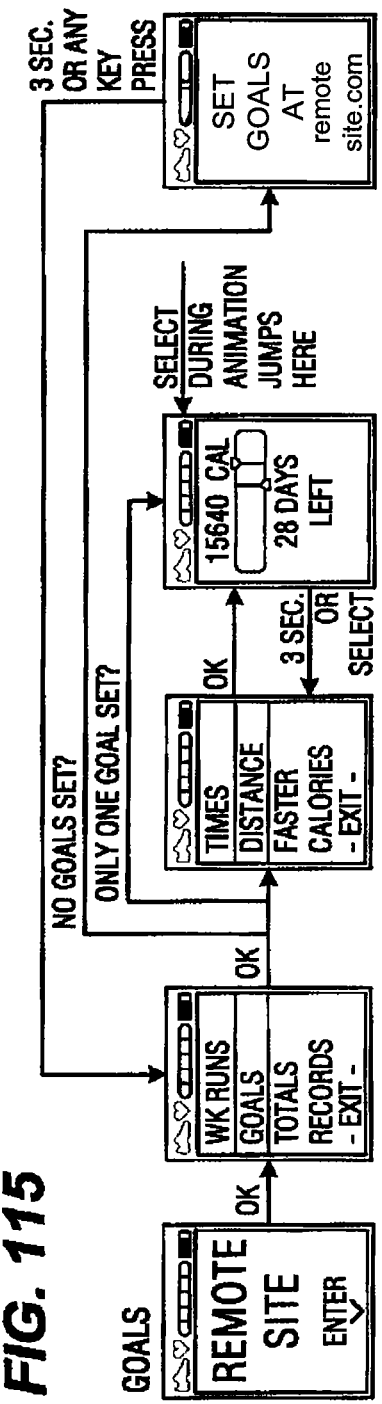

As shown in FIG. 115, the user may select Goals in the menu selections for the Remote Site mode. Once the user selects Goals, the user interface displays a further menu of different Goals including: Times, Distance, Faster, Calories and Exit. The user can set such goals relating to these metrics, for example, at the remote site wherein data related to such goals is downloaded to the electronic module from the remote site when the module is plugged into the user's computer and connected to the remote site. With reference to FIG. 115, the user had previously set a goal on the remote site to burn a certain # of calories in a certain # of days. Data related to this goal is downloaded to the electronic module in previous operations consistent with the previous description. It is understood that this data is updated upon successive uploads and downloads of information regarding the remote site. As shown in FIG. 115, the user selects Calories from the menu selections. In response to this selection, the user interface displays information relating to this goal such as current number of calories burned, a gauge member indicia and the amount of time that remains to reach the goal. Thus, a particular value for the goal selected is displayed at an upper portion of the display, such as "15640 CAL" (calories goal). Following the stated goal, a gauge member is shown in bar graph type format to indicate whether the user is "ahead" or "behind" the goal at this time. The gauge member may be displayed using a horizontal bar with two arrows or calipers, a lower caliper and a top caliper. The lower caliper may also have an upwardly extending line extending into the horizontal bar. The lower caliper indicates the target level of the goal as of the current day. The target level is where the user should be today in order to complete the goal on time. The top caliper (and the filled in portion of the bar) indicate the user's actual level as of today. The user interface also displays an indication as to how much time remains to complete the goal, e.g. "28 DAYS LEFT." The user interface is further configured to display this goal information in animated form which provides suspense to the user and a current sense of accomplishment to further motivate the user to reach the goal. Accordingly, it is understood that in response to selecting the CALORIES selection goal, goal information is displayed to the user in animated form. First, the goal is displayed to the user such as, "Burn # calories in # wks/days." This message scrolls off the display and the calorie data is displayed at the upper portion of the display counting up from 0 to, for example, 15640 calories. Simultaneously, an outline of the gauge member is displayed. The lower caliper and the top caliper move from left to right while the gauge member is darkened from left to right until the lower caliper and top caliper reach their final positions. An additional message is displayed at the lower portion of the display such as, "# Ahead/Behind Target." This message scrolls off of the display and the additional message "28 DAYS LEFT" is displayed. The data shown in FIG. 115 is displayed for a predetermined time such as 3 seconds wherein the display returns to the Remote Site menu. The user can repeat this animation sequence in order to see this additional information again. If no goals have been set by the user and the user selects the GOAL selection in Remote Site menu selection shown in FIG. 115, the user interface is configured to display a message to the user such as "SET GOALS AT REMOTE SITE.COM". In addition, if the user has only set a single goal, after selecting the GOAL menu selection, the user interface proceeds directly to the animated goal data display thus skipping the additional goal menu shown. Goal information can also be displayed in the Time Of Day screen as described in greater detail below. In one or more examples, goal information may be displayed in the time of day screen when the user is not performing athletic activity.

Figure 116A:
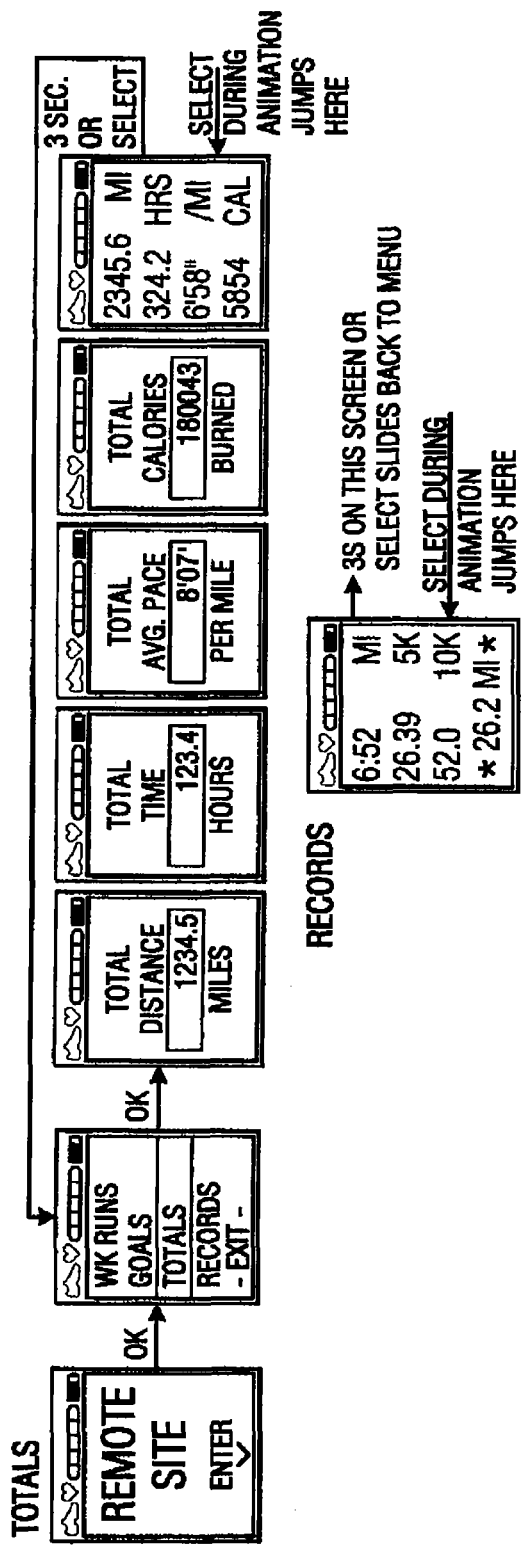

The Remote Site mode further has the TOTALS feature that acts as activity meters or running odometers on the watch 10. As shown in FIG. 116*a*, the TOTALS feature may display various metrics over a user-selected time. In an exemplary embodiment, the metrics may include, but not be limited to, total distance (in miles), e.g. total mileage run ever, total work-out time (in hours), e.g. total hours run, average pace, and total calories burned. The TOTALS data is displayed in response to selecting the TOTALS selection on the REMOTE SITE menu. The TOTALS data is synchronized with existing totals stored at the remote site. Accordingly, updated TOTALS data is downloaded onto the watch 10 when the electronic module is connected to the remote site via a computer. In an exemplary embodiment, the data is displayed in an animated fashion. Thus, the display configuration includes an odometer-type bar at a central location of the display, a metric value at a top portion of the display and a unit value at a bottom portion of the display. Thus, in response to selecting the TOTALS menu selection, and as shown in FIG. 116*a*, the controller displays "TOTAL DISTANCE" and "MILES" scrolling upwards and wherein the odometer member scrolls various numbers to the current total distance value, e.g. 1234.5 miles. This data is displayed for a predetermined amount of time wherein "TOTAL DISTANCE" and "MILES" scroll upwards off the display and wherein, as shown in FIG. 116*a*, the controller displays "TOTAL TIME" and "HOURS" scrolling upwards and wherein the odometer member scrolls various numbers to the current total time value, e.g. 123.4 hours. This data is displayed for a predetermined amount of time wherein "TOTAL TIME" and "HOURS" scroll upwards off the display and wherein, the controller displays "TOTAL AVG. PACE" and "PER MILE" scrolling upwards and wherein the odometer member scrolls various numbers to the current average pace value, e.g. 8' 07" per mile. This data is displayed for a predetermined amount of time wherein "TOTAL AVG. PACE" and "PER MILE" scroll upwards off the display and wherein the controller displays "TOTAL CALORIES" and "BURNED" scrolling upwards and wherein the odometer member scrolls various numbers to the current number of calories burned, e.g. 180043. This data is displayed for a predetermined amount of time wherein the controller then displays a summary screen of the total distance, total time, total average pace and total calories burned. The summary screen is displayed for a predetermined amount of time wherein the controller then displays the Remote Site menu selections and then proceeds to the Time Of Day screen. The display of the data in the described animated form provides a build-up of suspense for the user enhancing the user experience. It is understood that the controller is configured such that pressing the end button during the animation sequence halts the animation and displays the summary screen of data. Pressing the side button allows the user to proceed directly to the individual screens shown in FIG. 116*a*. The user may also configure the controller to display a selected metric continuously on the display following the animation of this additional information.

Figure 116B:
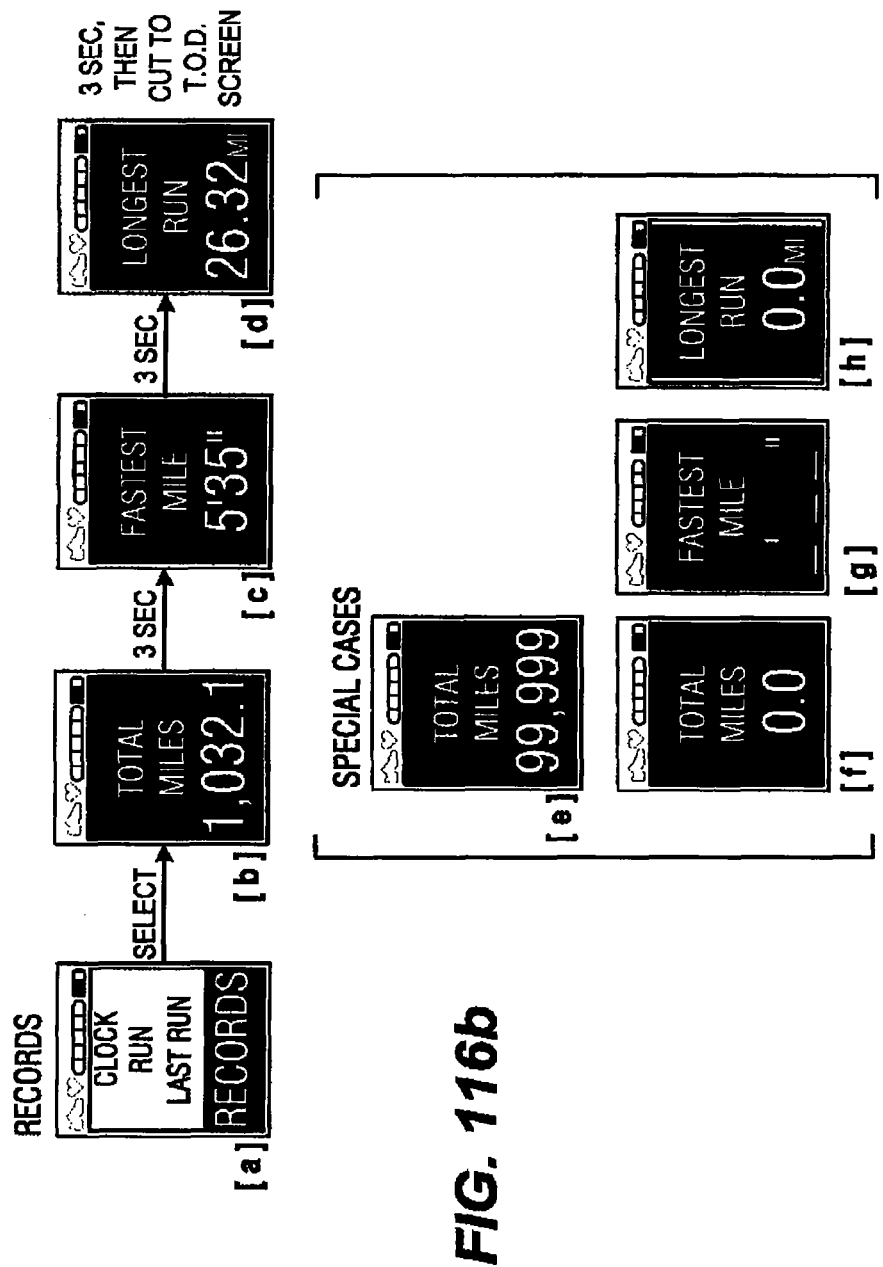

The Remote Site mode further has the RECORDS feature wherein the controller displays certain metrics corresponding to personal records of the user. This data is displayed in similar fashion s the Totals data referred to in FIG. 116*a*. In an exemplary embodiment, the RECORDS data displayed may include, but not be limited to, the user's: Fastest Mile, Fastest 5 k, Fastest 10 k and Longest Run. The RECORDS data is similar to the post workout alarms and motivational messages displayed to the user after a run is ended. The RECORDS data is displayed in response to selecting the RECORDS selection on the REMOTE SITE menu. The RECORDS data is synchronized with existing data stored at the remote site. Accordingly, updated RECORDS data is downloaded onto the watch 10 when the electronic module is connected to the remote site via a computer. In an exemplary embodiment, the data is displayed in an animated fashion similar to the animation described above regarding the TOTALS feature. Thus, the controller may display a "FASTEST MILE" heading along with a value, e.g. 6:52, for a predetermined amount of time. The controller then scrolls this data from the display and displays a "FASTEST 5K" heading along with a value and so forth for each record metric. At the conclusion of the RECORDS data, a RECORDS summary screen is displayed as shown in FIG. 116*a*, listing each record data for the user's fastest mile, fastest 5 k, fastest 10 k and longest run. This animation also provides a building suspense for the user. FIG. 116*b* illustrates other example interfaces through which a user may view current workout records set. In one or more arrangements, if no longest distance, fastest mile or longest run record has been defined, the interface may display 0.0 for the longest distance or longest run. Additionally, the fastest mile may be displayed with no pace information.

Figure 117A:
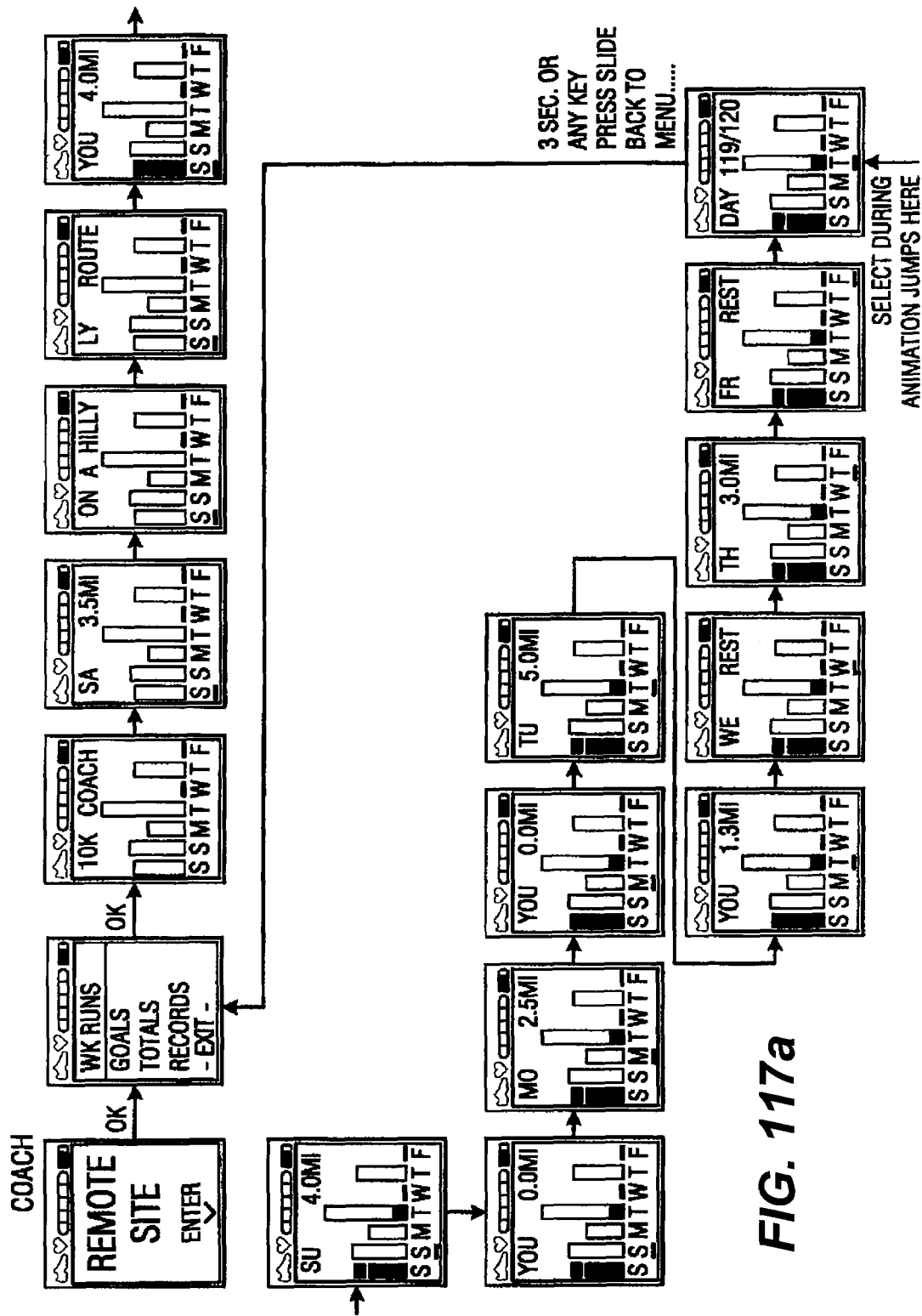

As previously discussed, the watch 10 is capable of communicating with the Remote Site dedicated to athletic performance monitoring. The Remote Site may include a training aid that provides training programs for users to assist users in achieving certain goals. For example, as shown in FIG. 117*a*, a user may seek assistance in training for a 10 k race. The Remote Site receives certain data inputted from the user wherein the training aid then provides a set training program recommendations for how far the user should run each day and which days the user should rest etc. The training program typically has a certain duration, e.g., a certain number of days.

If the user sets a training program on the Remote Site, the program parameters are downloaded to the watch 10 consistent with the description above. The user can access the training program on the watch via the Remote Site menu and under "WK RUNS." As further shown in FIG. 117*a*, the controller is configured to display the training program parameters for the current week. In an exemplary embodiment, the parameters are displayed in animated fashion similar to the descriptions above regarding the weekly runs description but with some differences. The training program data is represented by bar members wherein empty bars represent runs to be completed and solid bars represent runs already completed. The tallest bar represents the user's longest run for the current week thus far or the user's longest target run, whichever is greater. All other bars have a height relative to the tallest bar. If there is no run data for a day of the week, the corresponding bar will be a single pixel tall, even if that bar represents the current day. In addition, the weekly display is arranged to that the current day is always in the center position. Thus, the weekly display shows the training schedule for three days prior to the current day and three days following the current day.

In response to the user selecting "WK RUNS" on the remote site menu, the animated display of data commences. As shown in FIG. 117*a*, the first screen shows the entire training week with empty bars instantaneously (no animation) along with the title, e.g. "10K COACH." As shown in FIG. 117*a*, the animation builds from left to right providing data for each day of the week. FIG. 117*a* shows the animation for the first day, e.g., Saturday wherein a solid cursor is positioned under the Saturday heading. The day and target mileage first scrolls up and onto the display while flashing (on/off) the empty target bar. Certain training days may have notes from the training program wherein the note is scrolled at a readable pace across the screen. For example, FIG. 117*a* shows that the Saturday 3.5 mile run was to be completed "ON A HILLY ROUTE." The heading "YOU" is then displayed along with the user's actual run mileage for that day, e.g. 4.0 miles. The run bar is then darkened. FIG. 117*a* shows the remaining days for the training program. The data for the next day is displayed wherein the cursor moves to the Sunday heading wherein the user was to run 4.0 miles on Sunday. The "YOU" heading is displayed along with 0.0 miles indicating the user did not run on Sunday. The target bar remains empty. The Monday run data is then displayed wherein the user was to run 2.5 miles. The user did not run on Monday and the target bar remains empty. The run data for the current day, e.g., Tuesday is then displayed wherein the user was to run 5.0 miles. The data recorded indicates that the user ran 1.3 miles and the target bar is partially darkened in proportionate fashion. The target bars for the future days will remain empty by definition and will not require the "YOU" headings. As shown in FIG. 117, the training program indicates that the user is to rest on Wednesday, run 3.0 miles on Thursday and rest on Friday. The final training program data is then displayed as shown in FIG. 117a with the darkened/empty target bars along with an indication that the current day represents Day 119 of the 120 day training program. Pressing the end button during the animation takes the user to the final screen shown in FIG. 117a. The user can also control the animation using the side button wherein the user can interactively move the blinking cursor to any desired day. The run/target bars do not animate in that case but the title text rolls up and down for a predetermined time showing target mileage and actual mileage as appropriate.

Figure 117B:
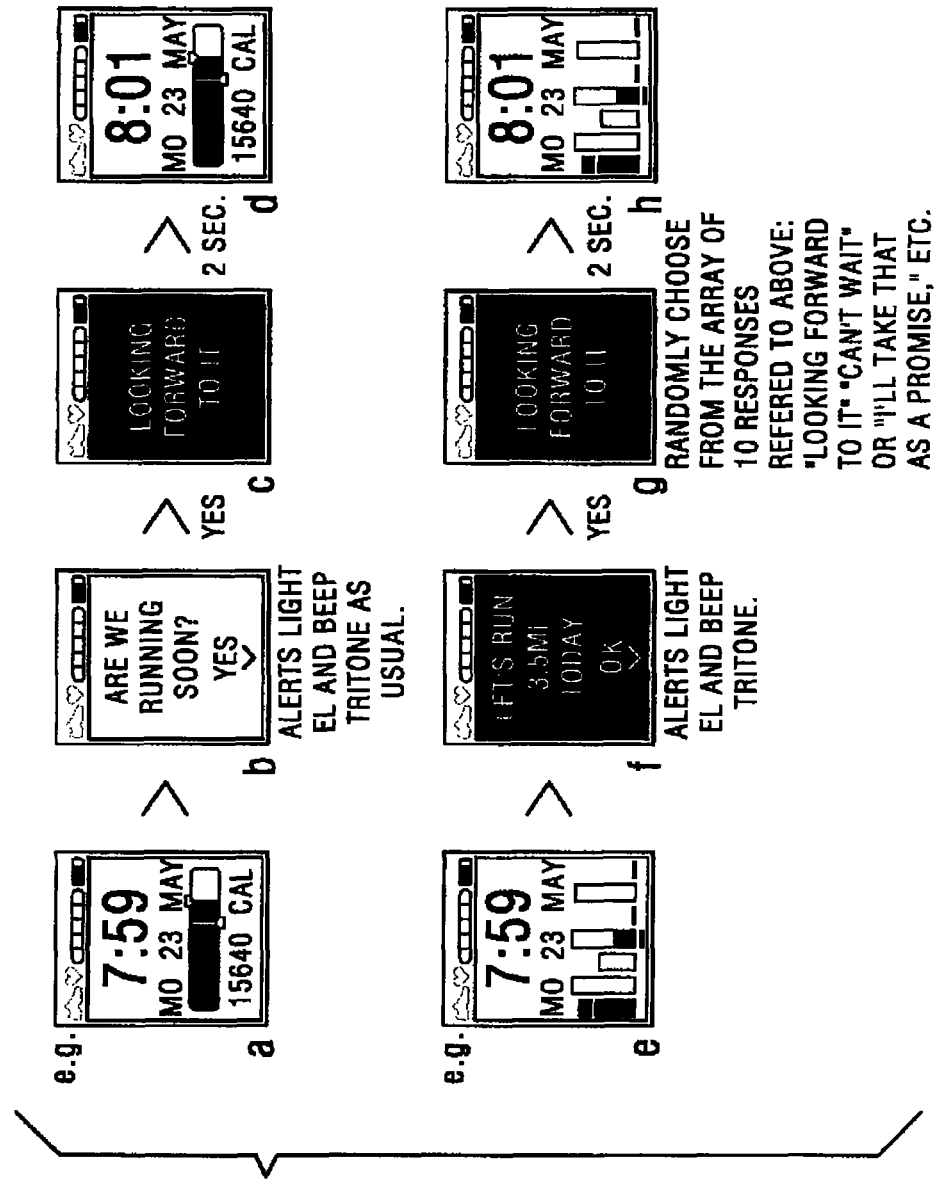
Figure 118:
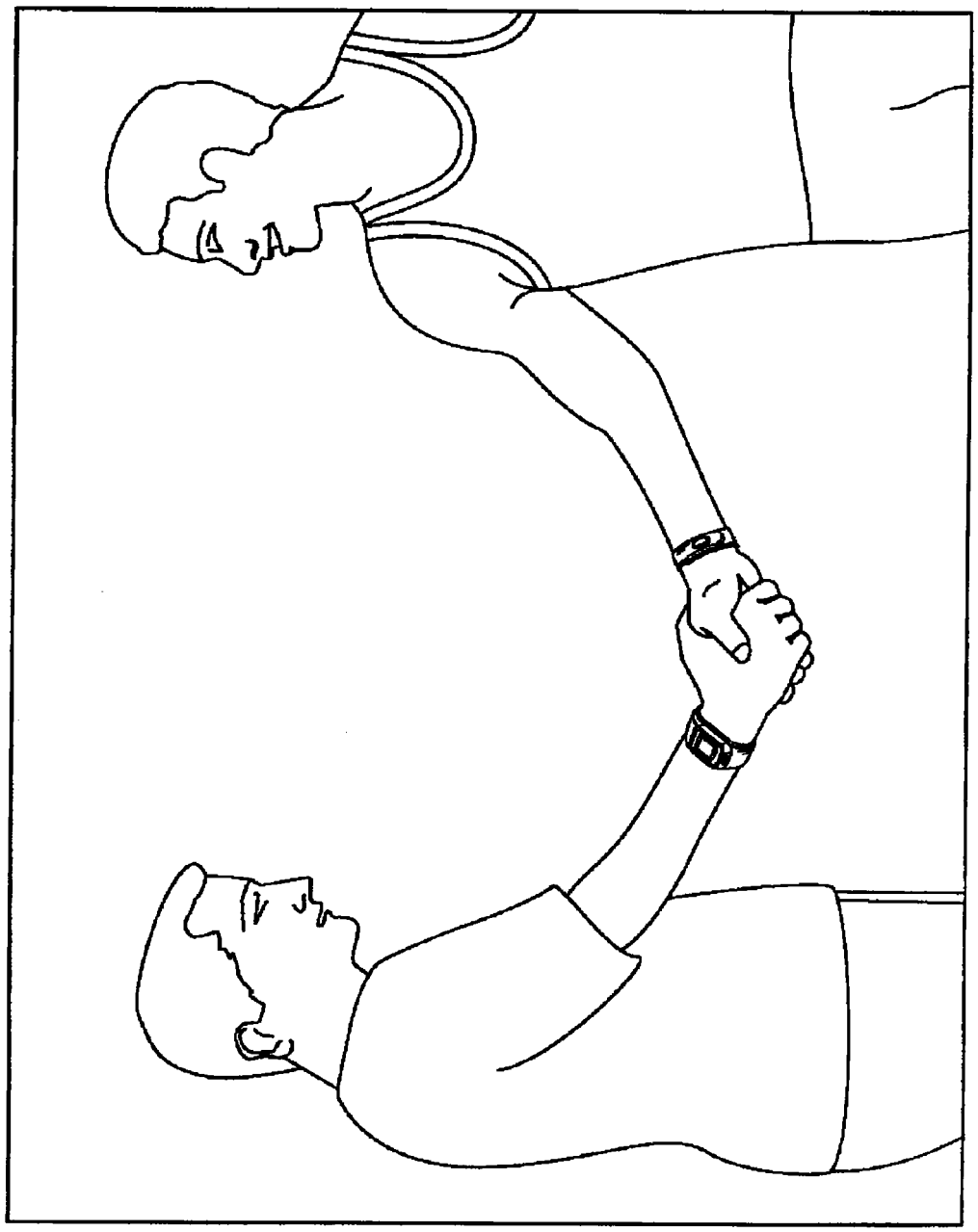
FIGS. 118-125 show additional features associated with the user interface of the watch of the present invention.

FIG. 117b disclose additional features of the user interface. These features may be incorporated specifically when the user has implemented a training schedule via the Remote Site as describe above, but can also be utilized with the user in general operation. In one or more arrangements, the training schedule may be defined based on or correspond to a defined goal. For example, if a user sets a goal to run 10 miles a week, a training schedule may include sub-goals of running 2 miles a day for 5 days of a single week. One feature may be in the form of two part messaging utilizing an input from the user. For example, the user interface (or "the coach") each day at some arbitrary time, may check the watch data to determine how many days have passed since the user last ran or exercised. If after a certain number of days set by the user interface there has been no activity by the user, the user interface may provide a message to the user. The days set might be three days although a different number can be set. In another example, the user interface or device (e.g., watch 10) may determine whether the user has completed a daily goal or is on track to complete an overall goal. Thus, if the user has only run 4 miles and there are only 3 days left until a week from the first run expires, the user interface or coach may provide a message to the user encouraging or reminding the user of his sub-goals and the remaining time allotted for completing the overall goal. Alternatively or additionally, a reminder or encouraging message may be displayed upon determining that the user is not on track to complete the goal (e.g., if the user is only average 1 miles a day over the last 4 days and the user's overall goal is to run 10 miles in a week).

Figure 113:
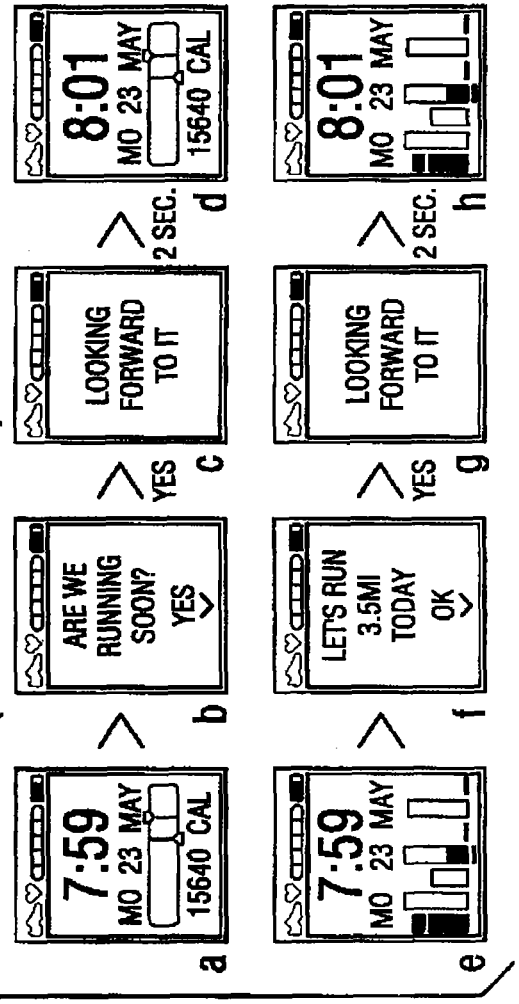

As shown FIG. 117b, the watch may have a Time Of Day display. If the user interface detects that the user has not run in three days, a pop up message may be displayed, "Are we running soon?" Also displayed is a desired answer such as "Yes". When the user selects "Yes" using the end button 52, a response message is displayed to the user such as "Looking Forward To It." After a predetermined amount of time, the display returns to the Time Of Day display set by the user. If the user does not answer the first message after a certain amount of time, such as midnight of that day, the message is dismissed. Other two-part messages can also be displayed such as "I feel like running today." If acknowledged by the user by selecting a "Yes," the user interface can display a "Can't Wait" message. Other messages can also be displayed. These messages can be set at the Remote Site and further be changed/modified over time to regularly provide new messages. Such messages provide additional motivation to the user to exercise and offer the impression that the activity monitoring device is responding directly and personally to the user's answer. These messages may also provide the impression that the device is able to offer more humanistic responses rather than simply electronic, machine feedback. The frequency of the messages can also be set via the Remote Site or user interface etc. A set of messages can be provided for each month wherein a different message is provided at certain times during the month. Messages can be altered for the next month. FIG. 117b further shows a two-part message that can be used specifically when the user has a training program implemented. The Time Of Day screen may be displayed with the Coach information displayed as described herein. The user interface may provide messages that correspond to the user's training program. For example, the user interface may display a message "Let's Run 3.5 MI (miles) today." When the user acknowledges the "Yes" option, the user interface responds with the second part of the message, "Looking Forward To It." After a predetermined amount of time, the user interface returns to the Time Of Day screen. If the training program has a rest day, no pop-up messages are displayed. If there is a note attached to a certain day of the training program, the note can be incorporated into the two-part message. Again, the messages can be modified or changed at the Remote Site. Such messaging provides additional motivation to the user and a sense of the watch operating in real-time with the Remote Site. FIG. 113 illustrates other example coaching pop up interfaces for prompting the user to perform another workout.

As previously discussed, the watch 10 has a Time of Day (T.O.D.) screen that can be set by the user utilizing the desktop utility software. In one exemplary embodiment as shown in FIG. 107a, the Time Of Day screen is configured to show the time of day more prominently proximate a top portion of the display as well as the date and day of the week proximate a bottom portion of the display. The user can also set the Time Of Day screen in different "dashboard" configurations to show variations of athletic performance data such as weekly runs, goals, totals, records and coaching information. These various Time Of Day screens can be set using the desktop utility software as desired by the user.

Figure 108A:
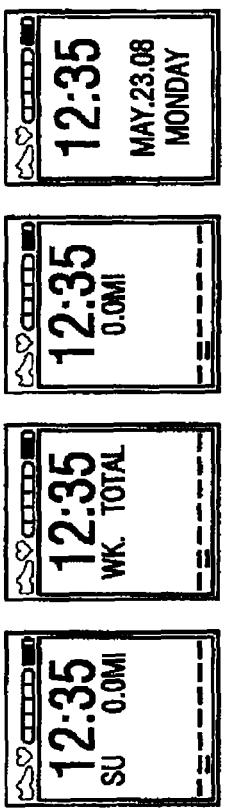
Figure 108B:
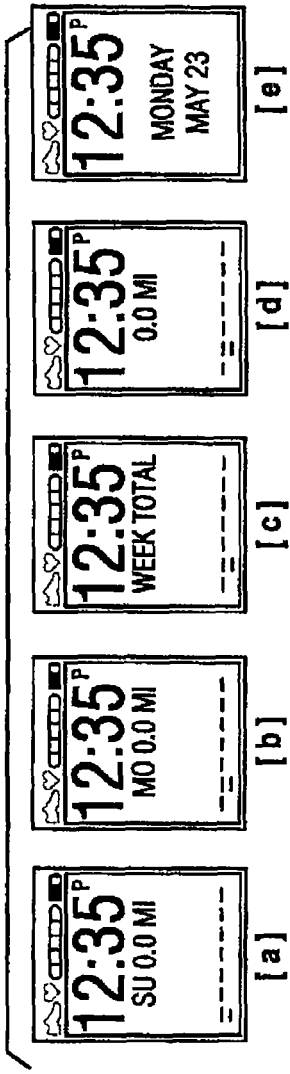

As shown in FIGS. 108a and 108b, the Time Of Day Screen can be set to show the current time of day at a top portion of the display as well as the date and day of the week at a central portion of the display. Finally, indicia representing the user's weekly run data can be displayed at a bottom portion of the display. In an exemplary embodiment, the indicia is in the form of vertical bars. The tallest bar represents your longest run for the current week thus far. All other bars have a height relative to the tallest bar. If there is no run data for a day of the week, the corresponding bar will be single pixel tall, even if that bar represents the current day.

The Time Of Day screen utilizing weekly runs can also utilize animation as described above. In this configuration, the user can press the end button to commence the animation which builds from left to right in an exemplary embodiment. The animation starts with the user's preferred week-start-date (e.g., Sunday or Monday as set at the Remote Site). Thus, as the first bar extends upwards at the left of the display, the day is displayed, e.g., "MO" for Monday, with the mileage value adjacent thereto. This data is displayed for predetermined time allowing the user to readily read the data. A cursor is positioned below the first bar. Once displayed for the suitable time, the cursor moves to the right wherein the next bar extends upwards, and the day is displayed, e.g. "TU" for Tuesday, with the mileage value adjacent thereto for that day. This sequence continues for each day of the week. At the conclusion of the seven days, a weekly total ("WK TOTAL")

heading scrolls from right to left at the central portion of the display followed by the total mileage value for the week of runs. This heading and weekly total value scrolls off the display and the day and date is again displayed. The bars remain on the display wherein the Time Of Day with weekly runs display is shown on the watch 10 as shown in FIGS. 107*a* and 107*b*. Additionally or alternatively, a run information display line (e.g., located below the time of day) may display the day total, a week total, a date and the like as shown in FIG. 107*b*. For example, the interface may automatically scroll through the various information. Alternatively, the user may toggle the workout information line to select the desired information. If the user fails to record a run for an entire week, the Time Of Day screen with weekly runs is slightly altered (FIGS. 108*a* and 108*b*). The animation as described above still occurs wherein the cursor moves along the display from left to right wherein a single bar is shown for each day while each day mileage total is shown as "0" including the weekly total. Rather than continuing to show a blank space for the seven single bars, the month, day, year and day are displayed as shown in FIGS. 108*a* and 108*b*.

Figure 109:
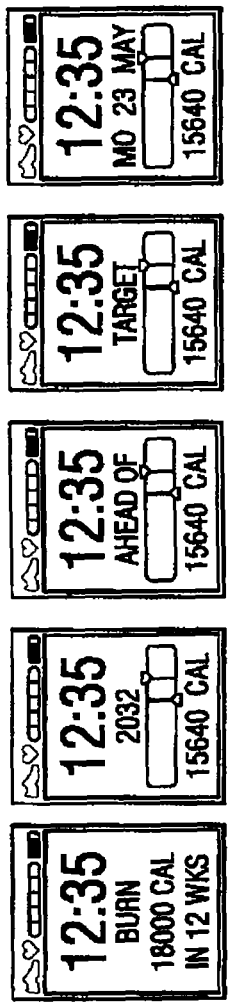

FIG. 109 disclose a dashboard configuration having a Time Of Day screen with Goals information. As discussed above, the user can set goals using the Remote Site wherein the goals data can be shown in animated form on the Time Of Day screen. When Goals is the selected dashboard view utilizing the desktop utility, goals are displayed on the display in animated form as shown in FIG. 109. For example, a goal is displayed to burn 18000 calories in twelve weeks. The gauge member is shown and darkened along with the moving calipers as described above. "Ahead/Behind" text also is scrolled across the display, e.g., "2032 Ahead Of Target. Once the goal information is displayed, the day, date and month is displayed beneath the time of day. The user may set multiple goals at the Remote Site. In this dashboard configuration, all user goals are displayed in sequence. The goals that are expiring soonest are shown last (e.g., order is from least urgent to most urgent so that the most urgent goal remains showing at the end of the animation). Each goal animation ends with the current date rolling down into place, and displayed for predetermined amount of time such as 3 seconds before the next goal sequence is started. As with other dashboard views, pressing the end button, jumps to the end of the current animation sequence. In the case of multiple goals, e.g. three active goals, pressing the end button would jump to the next goal animation, if a goal animation was already in animated sequence. If the sequence is in the last goal, the display proceeds to the last screen as shown in FIG. 109. Specifically, the animation jumps to the moment just before the day, date and month rolls down. If the user presses the end button after all animation sequences are complete, the full goal animations are restarted (e.g., just as if the user left the Time Of Day screen and returned to the screen).

In one exemplary embodiment, the user can set four different goals on the Remote Site. The user can set one goal per type as described above. For example, the user can set one calorie burn goal, one run more often goal, one run faster goal and one run further goal. Each goal has an expiration date. If no goals are set, or all goals are expired, a default Time Of Day screen can be shown. The Time Of Day plus Goals dashboard display is still maintained as the user's preference in case the user subsequently sets new goals at the Remote Site.

Figure 110:
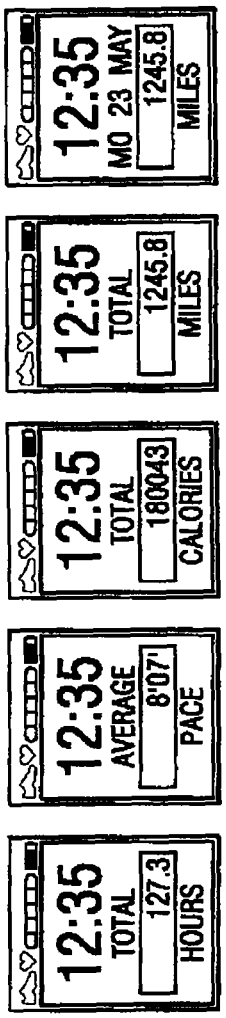

FIG. 110 disclose a dashboard configuration having a Time Of Day screen with Totals information. As discussed above, the user can show Totals information at the Remote Site menu. As shown in FIG. 110, the odometer member is displayed wherein numbers scroll therein until total values are shown for total hours, average pace, total calories, total miles. The last Total metric displayed remains displayed in the Time Of Day screen as shown in FIG. 110. Thus, the Totals metrics animate by rolling like odometers in the odometer member, one after each other. This animation is similar to the animation as described above regarding the Remote Site menu. In this dashboard configuration, however, the distance metric is the last metric to be displayed so that the distance metric is the metric that remains visible. Pressing the end button during the animation jumps the animation to the last screen showing the time of day, date and total distance metric. If the animation was complete, the animation is replayed.

Figure 111:
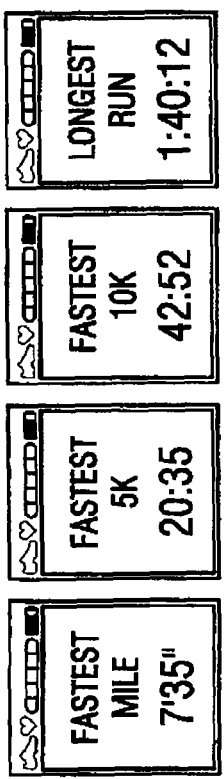

It is further understood that user can select a dashboard configuration having a Time Of Day screen with Records information as shown in FIG. 111. This data is displayed in animated form similar to the Totals information described above, except showing the user's personal records as the metrics. The following four records are saved from the user's best runs and displayed: Fastest Mile, Fastest 5 k, Fastest 10 k and Longest Run. To leave the final screen in a good final state, the heading "LONGEST" will scroll further down below the odometer member (replacing "RUN") simultaneously as the date rolls down into the display.

Figure 112:
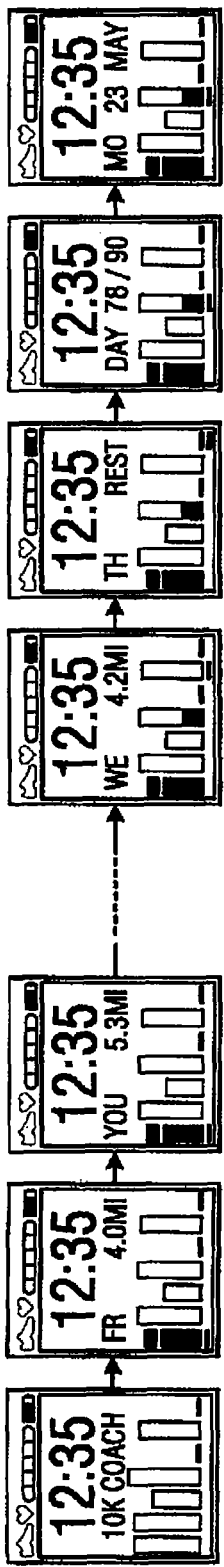

FIG. 112 disclose a dashboard configuration having a Time Of Day screen with a variant of weekly runs triggered by the user having an active training program set on the Remote Site as described above. Generally, this display is the same as the training program view, or "COACH" mode as described above, but smaller and without Days of Week labels. Accordingly, additional specific description of the data display and animation will not be repeated as the prior description applies to this particular Time Of Day dashboard configuration. As shown in FIG. 112, the Time Of Day with coaching/training information includes the current time, day, date, month as well as the weekly run data utilizing run/target run bars. Once a user commences animation, the "10K COACH" scrolls up on the display with the run bars. As shown in FIG. 112, the training program indicated the user was to run 4.0 miles on Friday wherein the user ran 5.3 miles. The entire run bar is darkened and an additional bar segment is placed over the Friday run bar. The user did not run on Saturday and Sunday, but ran a certain distance on the current day, Monday. The data further indicates that the user is to rest on Tuesday (single pixel run bar), run 4.2 miles on Wednesday, and rest on Thursday (single pixel run bar). An additional screen is displayed showing the complete run bars and indicating that the user is at Day 78 of the 90 day training program. Once displayed for a predetermined amount of time, the Time Of Day screen shows the current time, day, day, month and the run/target run bars.

As appreciated from FIG. 86*b*, the controller and user interface are configured such that additional or extendable features can be added to the watch as such features become available. Thus, the menu selections on the watch 10 can be expanded to provide additional headings and functionality for the new features. For example, additional features can be provided to the Remote Site or the desktop utility. Once the electronic module 12 is connected to the user's computer or to the Remote Site via the user's computer, the additional features can be downloaded to the electronic module 12.

Additional features can also be provided with the user interface of the watch 10. Such features could be considered extendable features added to the watch 10 over a period of time.

Figure 104A:
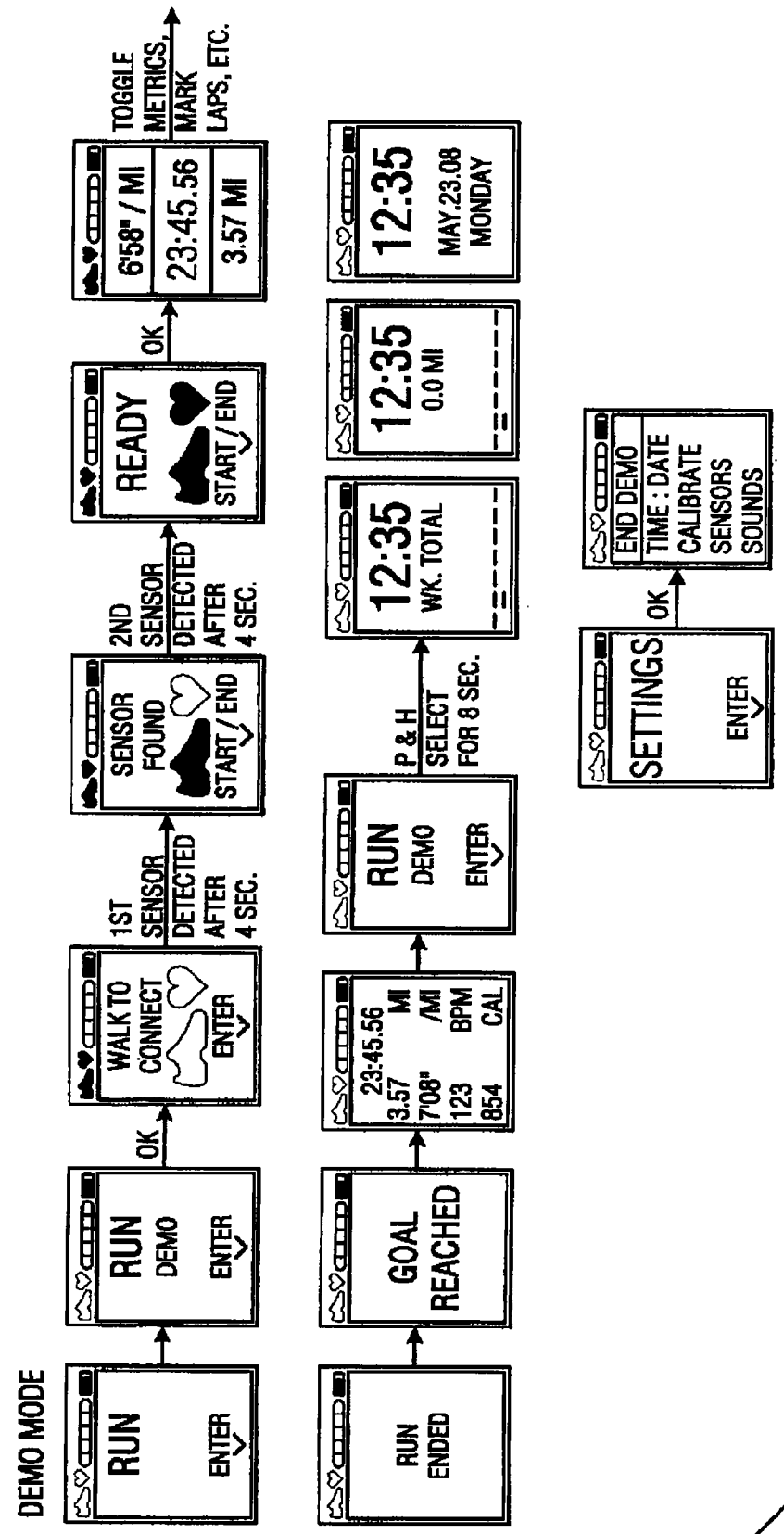
Figure 104B:
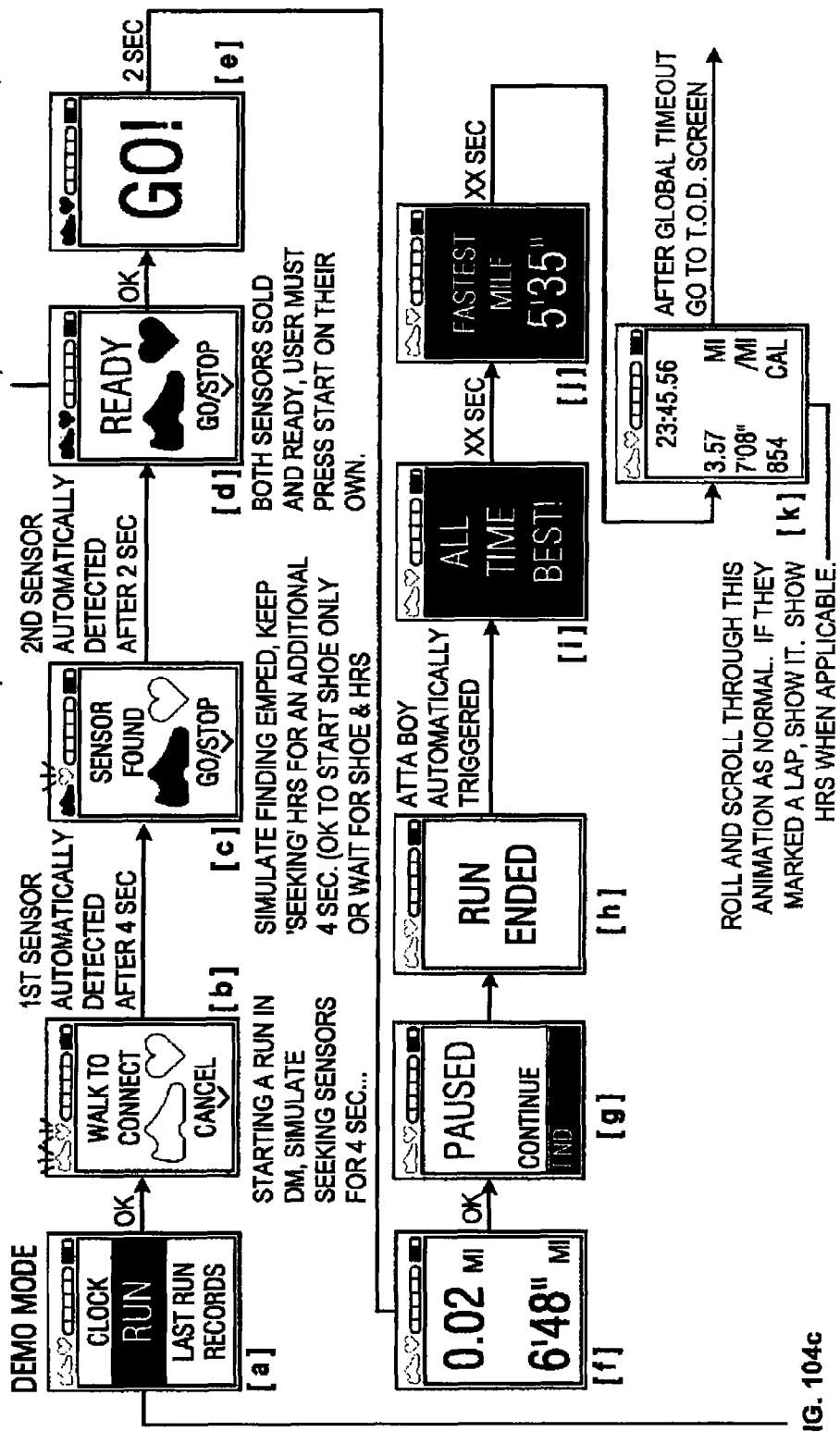

FIGS. 104*a*-104*c* disclose a "demo mode" for the watch 10. This mode can be utilized to show the full experience of the watch 10 for prospective purchasers without the need to link to actual shoe-mounted sensors, heart rate monitors, or other sensors. In an exemplary embodiment, the user presses and holds the end button for an extended predetermined amount of time while on the RUN screen as shown. While in the demo mode, the heading "DEMO" shows on the Run screen and an item is added to the top of the Settings menu to allow a visible way to turn "DEMO OFF." Additionally, pressing and holding the end button for a predetermined time while on the RUN screen toggles the demo mode off wherein the Time Of Day data with any dashboard configuration is animated on the display. In the demo mode, the user can toggle through different menu items wherein the watch 10 will display fake data showing the user the operability of the watch 10. FIGS. 104b and 104c illustrate demonstration interfaces for a run including congratulatory messages, ca Time of Day mode, a last run interface and a records mode.

Figure 105:
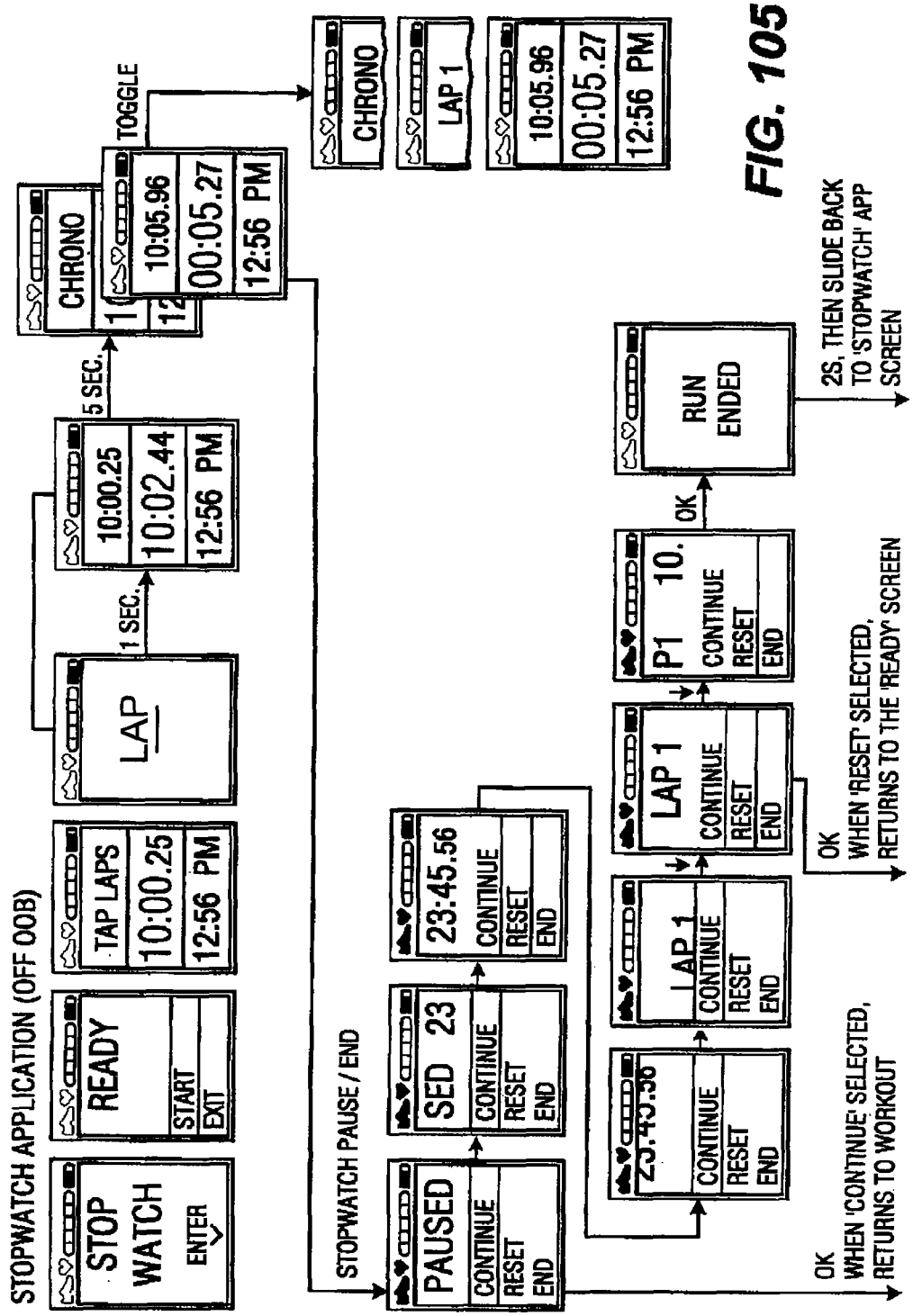

FIG. 105 show that the user interface can incorporate a stopwatch mode. Using the various inputs on the watch 10, the watch 10 can function as a stopwatch. Laps can be marked and the stopwatch paused as desired.

The user interface of the watch 10 provides significant functionality to the user thus at times requiring several menu items. In certain circumstances, the number of menu items can be greater than the capacity of the display wherein a user is required the use the side button to scroll the plurality of menu items along the screen. The controller can be configured to slow down the scrolling of the menu selections as the last menu item is to be displayed prior to the menu proceeding to the first menu item. A audible signal can also be provided at this time. Such features provide a tactile feel, or speed bump, for the user indicating that the start or end of the menu is approaching. With this feature, the chance that a user will accidently scroll past the desired menu item is minimized. For example, the tactile feel may include vibration of the device. The vibration may get stronger or faster as a user or interface gets closer to the start or end of the menu. In other examples, combinations of audio and tactile feedback may be provided. Such indicators may also be provided to identify lap, mile or other distance markers, pace thresholds, heart rate thresholds, time thresholds and the like. Accordingly, tactile feedback such as vibration may indicate to the user he or she is approaching a mile marker. In another example, a user may be audibly alerted or be provided with tactile feedback indicating that his or her pace is reaching a predefined point.

The watch 10 of the present invention is also provided with a desktop utility software application. The desktop utility typically resides on the user's computer and interfaces between the electronic module 12 and the remote site. It is understood that the user can customize functions on the watch 10 via the desktop utility. For example, certain programs may reside on the desktop utility such as Personal Bests data, a Marathon training program or Interval Training programs. These programs could be moved to reside on the watch 10. Similarly, programs residing on the watch 10 could also be moved to the desktop utility. The order of display of functions on the watch 10 could also be modified by the user utilizing the desktop utility. Such modifications are implemented once the user connects the electronic module 12 to the user's computer where the desktop utility resides.

Figure 106:
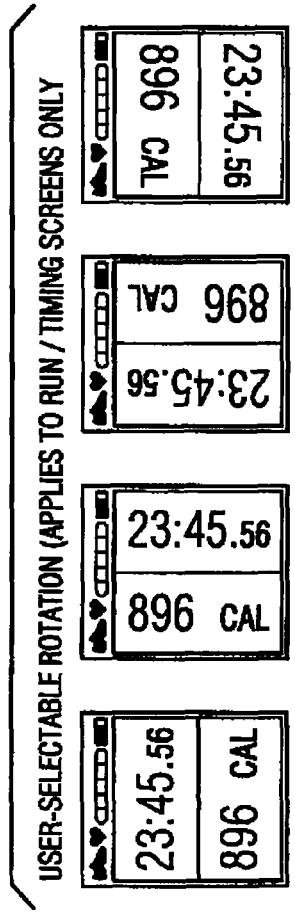

As shown in FIG. 106, the user interface can also be configured for user-selectable rotation. Thus, data can be displayed in general vertical fashion. Data can also be displayed in a 90 degree rotated configuration, either clockwise or counterclockwise. In an exemplary embodiment, the user interface can be configured such that the user-selectable rotation is only active on run/timing screens. While FIG. 106 show the rotations in a Run screen in two-tier format, the rotation feature can also apply in the three-tier format described above. The user can set this feature using the desktop utility software.

Figure 119:
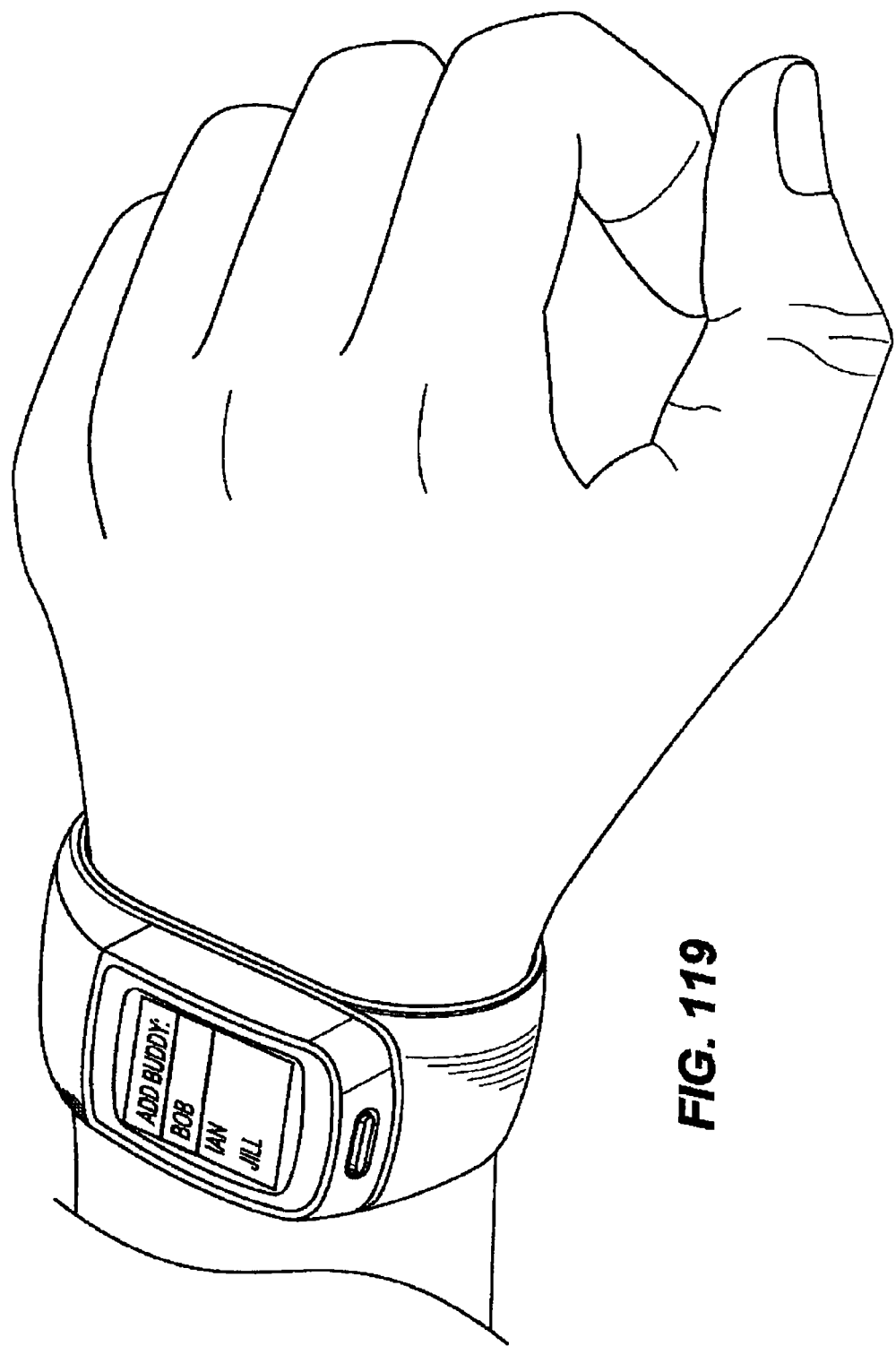
Figure 120:
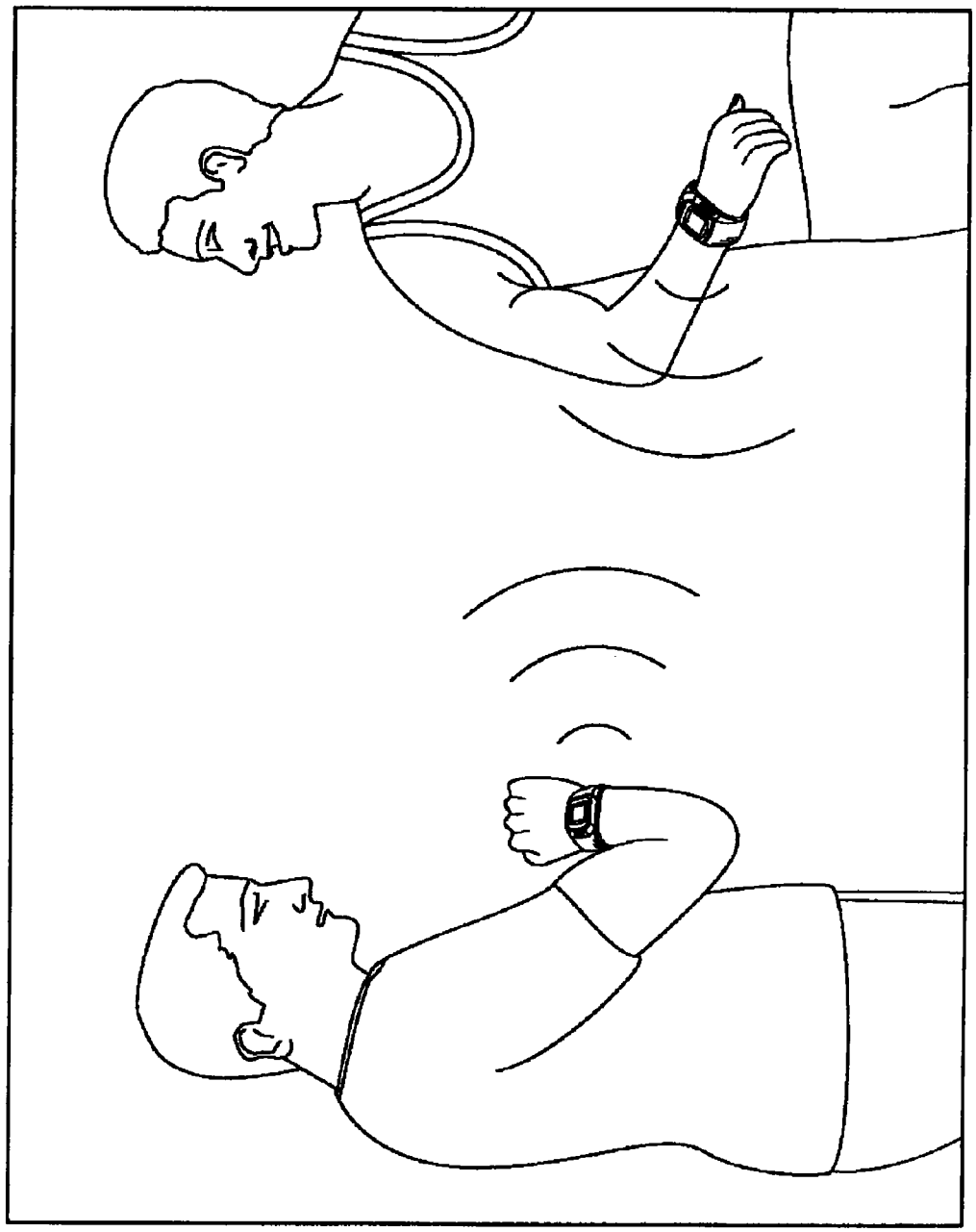
Figure 121:
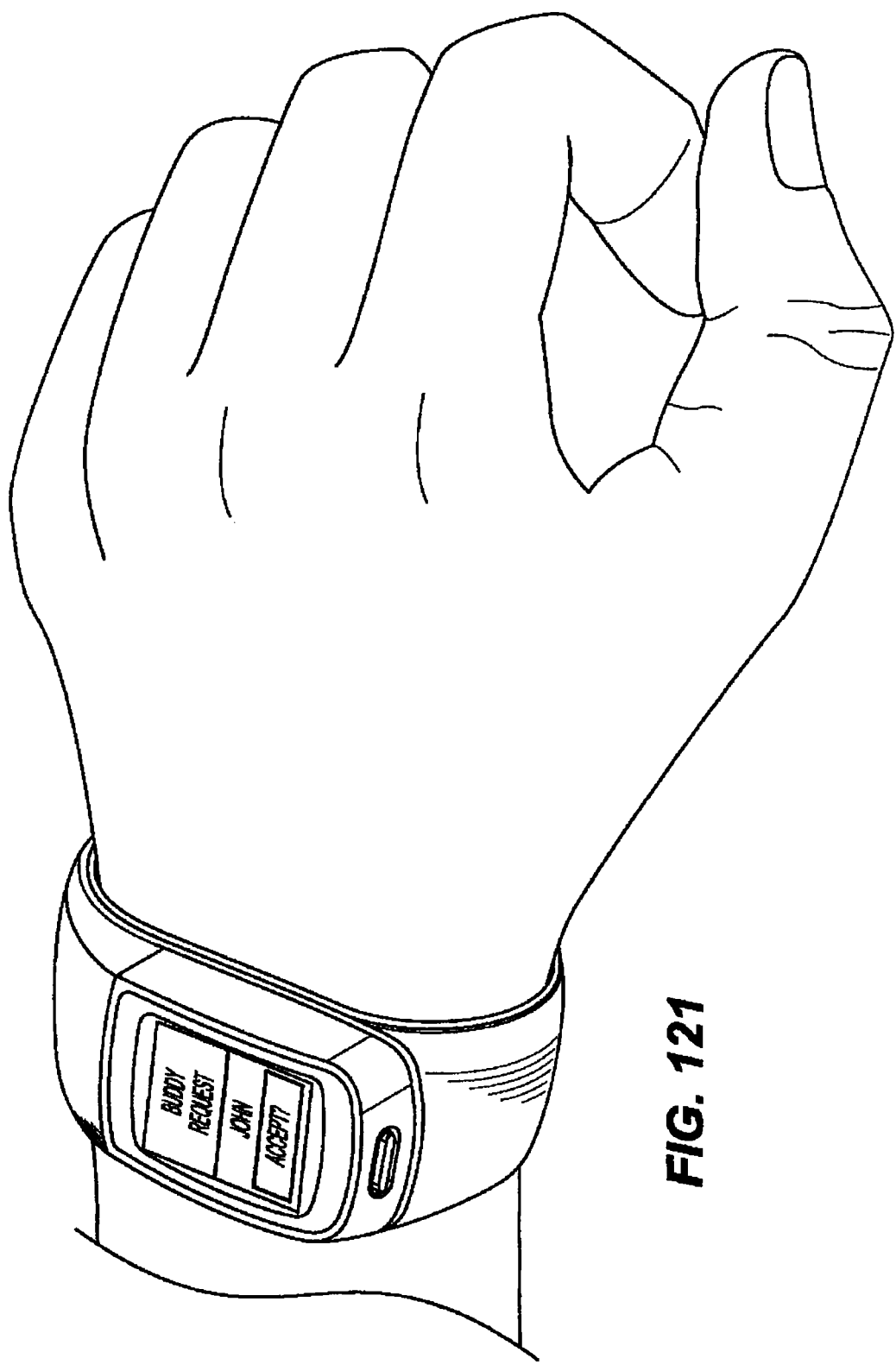
Figure 122:
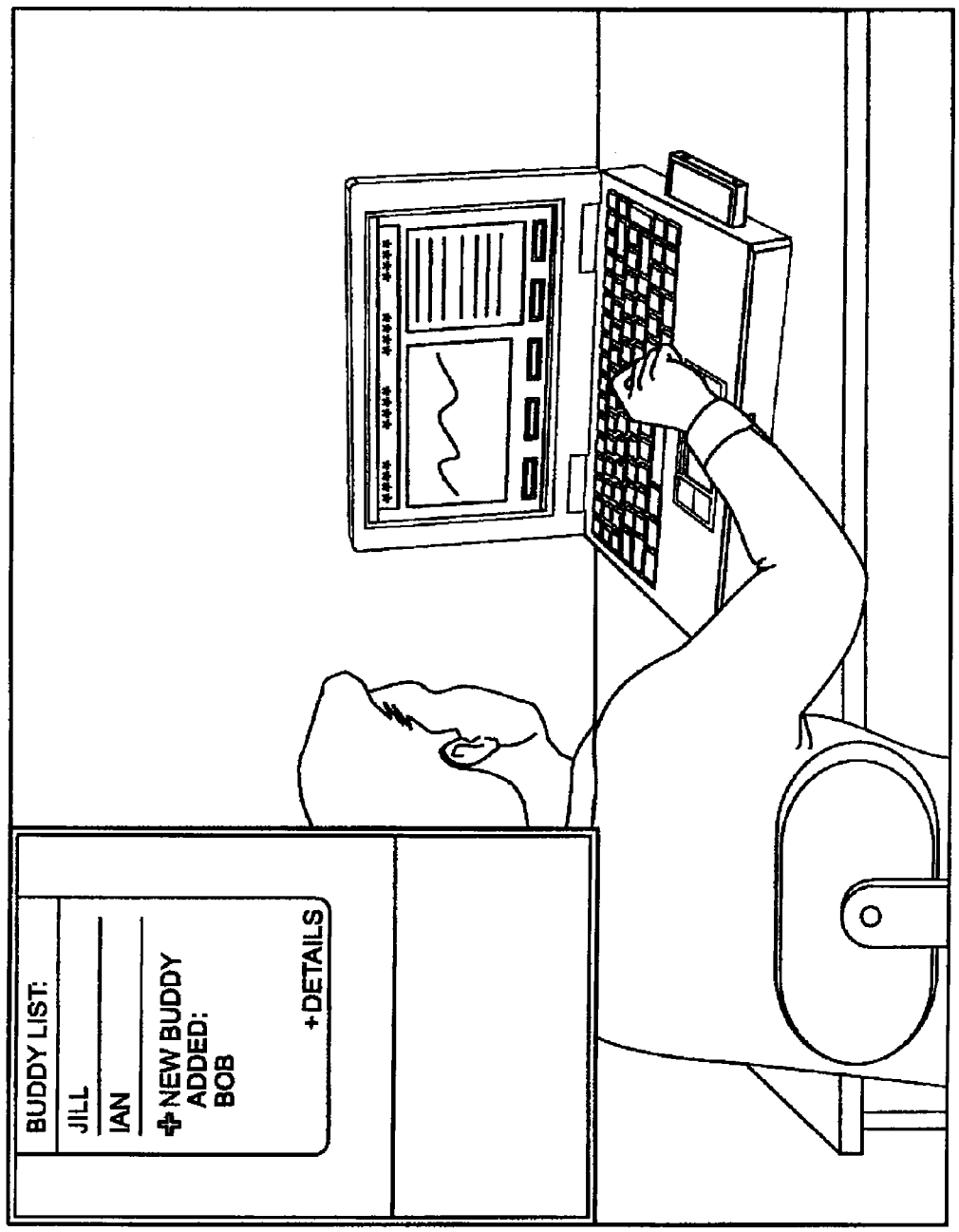

The user interface can also be configured with additional features as shown in FIGS. 118-125. The user interface can be configured such that user wearing the watch can communicate with another user wearing the watch. For example, a first runner may see another second runner numerous times as both runners often run the same route at the same time. If each runner is wearing the watch, the runners can place the watches in close proximity such as when shaking hands (FIG. 118), wherein the user interface provides a message of "Add Buddy" (FIG. 119). The other user can accept wherein the runners are now linked. FIG. 120 illustrates another example manner in which runners' devices may be linked. For example, the users may place their arms (on which the devices are worn) in proximity to one another, at which time a prompt may be displayed asking each user whether to accept a friend or buddy request (as shown in FIG. 121). Friends and buddies may further be added through a remote network site using a computing device or watch 10 as illustrated in FIG. 122. Accordingly, a user's device and a buddy's device might not need to be in proximity to one another to add the friend.

Figure 123:
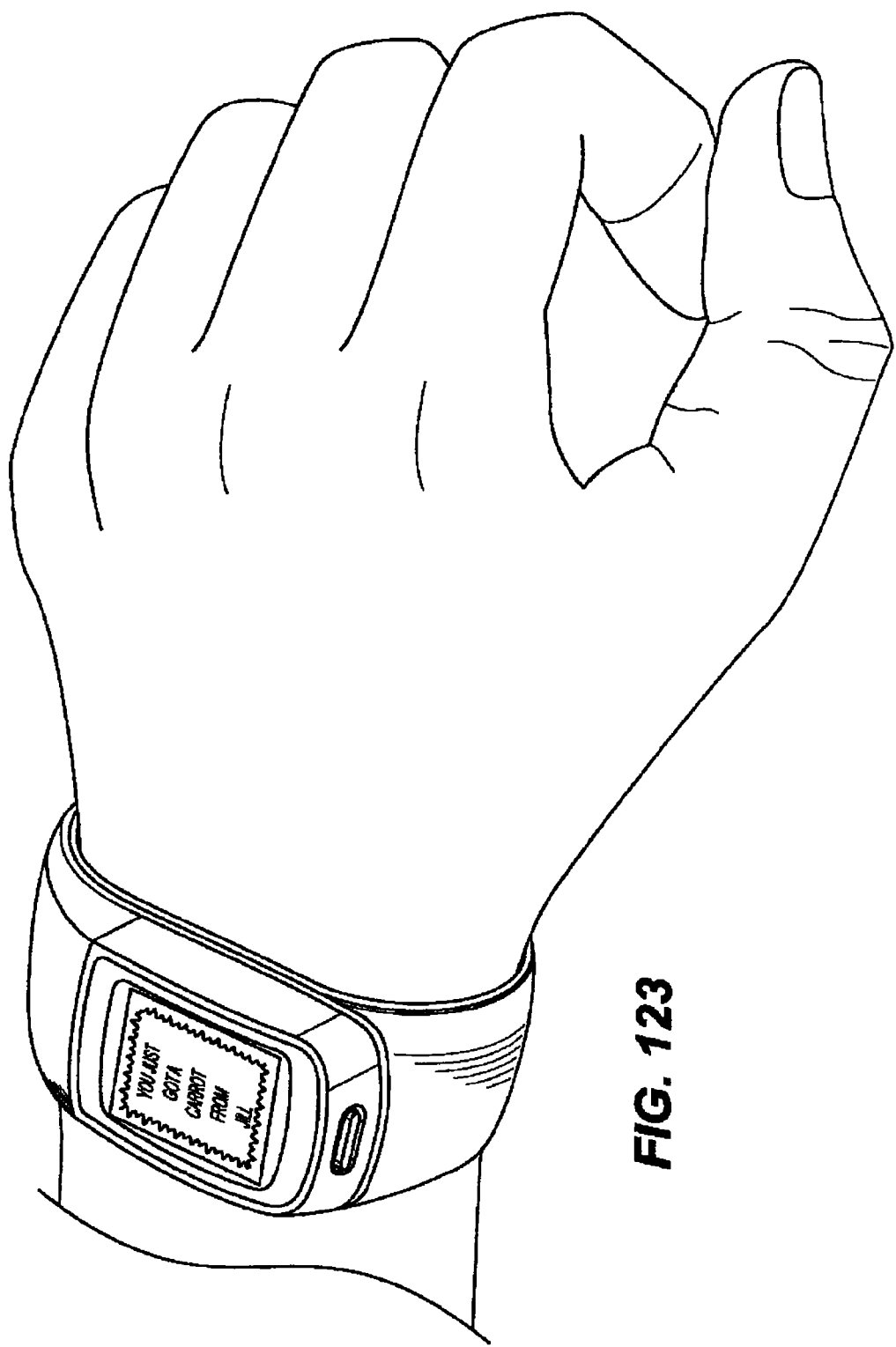
Figure 124:
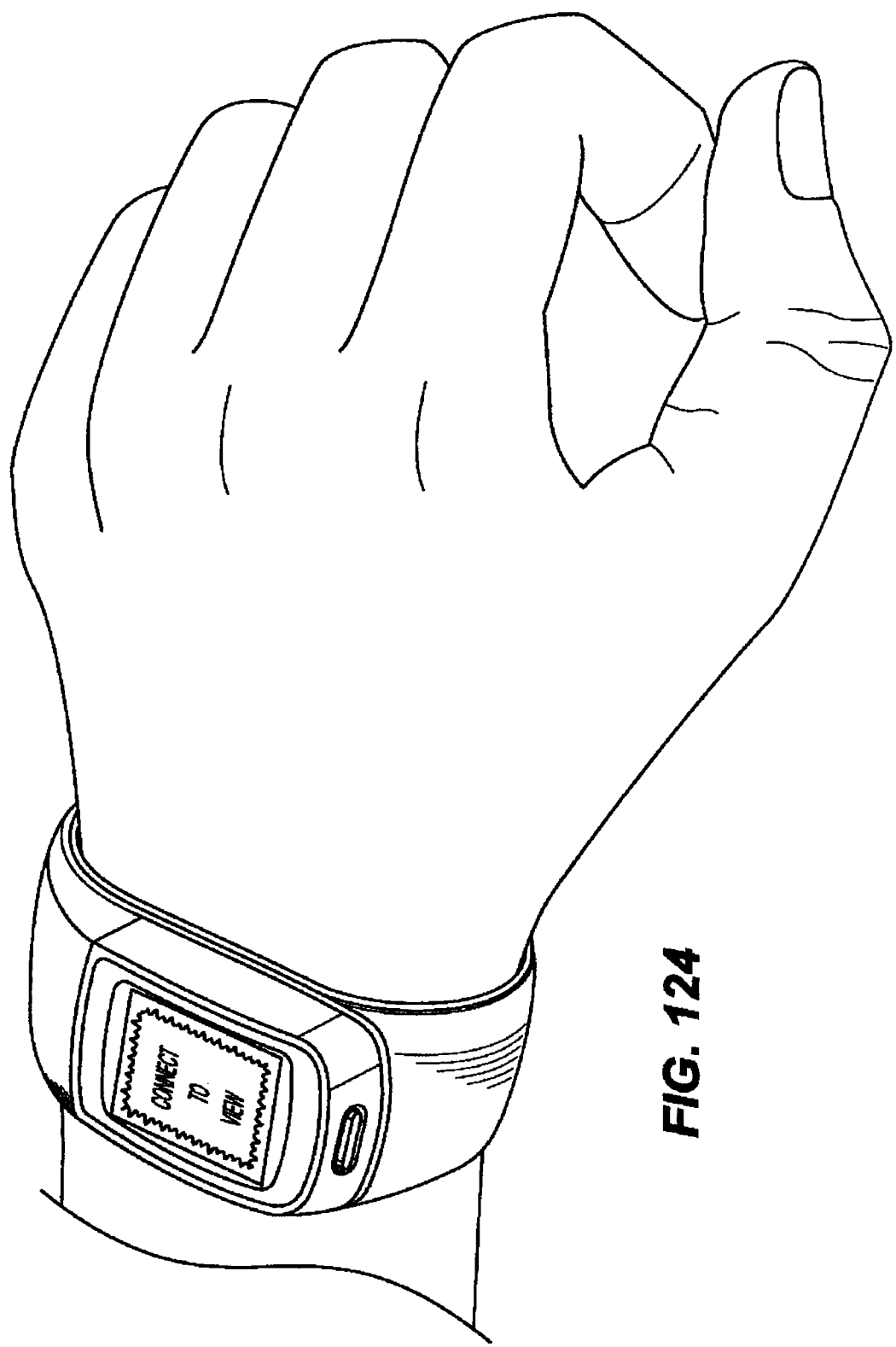
Figure 125:
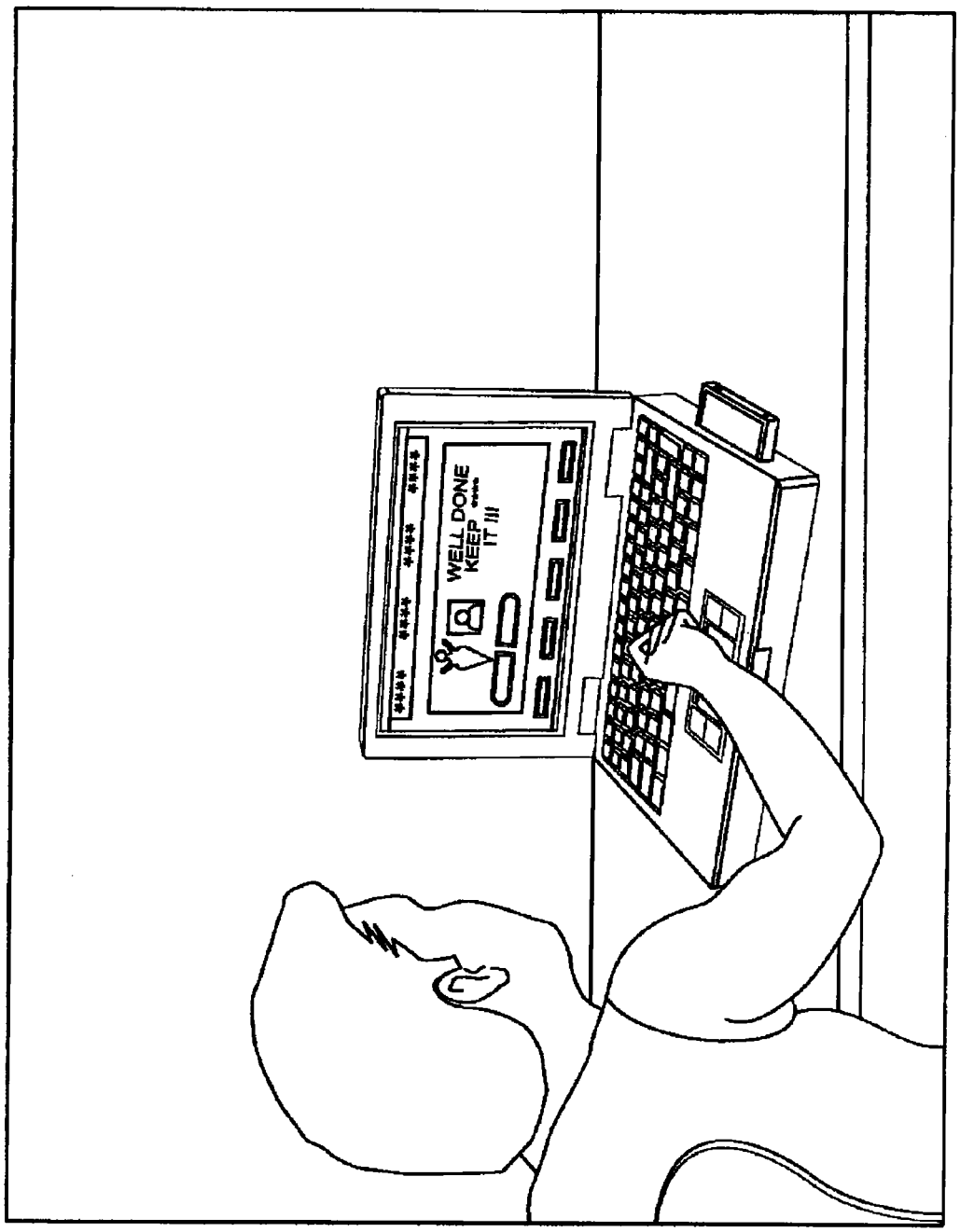

Each runner may have a list of other persons they are linked to. Further messaging capabilities are possible such as by using the Remote Site. For example, one runner can leave a message for another runner such as via the Remote Site. The message may be conditioned such that the runner receiving the message must meet a certain metric before being notified of the message. For example, a first runner may send a message to a second runner in the form of a motivational message once the second runner achieves a certain goal, such as running a certain amount of miles. Such message is sent to the second runner via the Remote Site and downloaded to the watch of the second runner when the second runner is connected to the Remote Site. The message, however, is hidden on the watch and does not appear until the watch records data and senses that the metric is met. Thus, once the second runner runs a certain distance, a message appears on the display of the watch worn by the second runner, such as "You Just Got A Carrot From Jill" (FIG. 123). The message may be referred to as a carrot and a corresponding carrot icon can be utilized on the watch display or on the Remote Site display. The user may further be provided with instructions to connect to a site in order to view the message (FIG. 124). A further message can be displayed to the second user on the watch. When the second user connects the watch to the computer and connects to the Remote Site, the message appears such as shown in FIG. 125. For example, the message may read "WELL DONE, KEEP ROCKIN' IT!!!" As previously discussed, the user interface can receive training programs from the Remote Site. Such training programs can include an actual race day program such as for a marathon, 10K, 5K etc. The race day program can convey to the user appropriate pace levels to maintain during the race to achieve a finish time as set by the user. The user interface can also be configured to provide shortcuts for certain functions. For example, depressing and holding one of or a combination of the buttons can automatically exit a current menu and return the user to the Time Of Day screen or other menu screen. Another button or combination can automatically take the user to the screen for commencing a run.

As discussed, certain shortcuts can be provided with the user interface such as pressing certain buttons for a predetermined amount of time to provide a certain function. Pressing certain buttons for a predetermined amount of time can also provide an expedited exit from the menu selections in the various menus of the user interface. Also, the user interface can monitor information regarding, for example goal information. If the user interface determines the user is close to a goal, the user interface may provide an additional message to the user. Such message may be designed to give the user further motivation in reaching the goal. As such information may be maintained in the Remote Site and downloaded to the watch periodically when the user connects the module 12 to the Remote Site via the computer, such features give the user a sense of real time functioning of the watch 10.

When connected to the Remote Site (via the computer), the watch 10 periodically polls the Remote Site to determine whether the user has changed anything relevant to the watch (i.e., has the user made any changes through the Remote Site that need to be downloaded to the watch 10 such as the various metrics, parameters and features discussed). If the Remote Site indicates changes have been made, the watch 10 will then request the changes from the Remote Site which will then send the updates or changes to the watch 10. As the user begins the log off process or seeks to disconnect the watch from the computer that connects it to the Remote Site, systems and methods according to at least some examples of this invention may prompt the user to wait until all updates have been received or to wait until the watch has a final chance to check for updates (so that any last minute changes are not lost). Alternatively, if the user abruptly terminates the watch's connection with the Remote Site (or the connection is lost in some other manner), any last minute changes that were not updated at the watch may be stored for the next connection session, if desired. In connecting to the Remote Site, the Remote Site can be configured to show examples of the watch display screens as customized by the user such as by the desktop utility. Thus, a user can see on the computer what the watch display will look like. It is further understood that the Remote Site can receive connection and data from multiple devices such as the watch 10, other athletic performance monitoring devices include those manufactured by competitor entities or music devices. The Remote Site is configured with the ability to distinguish among such devices. It is further understood that the watch 10 is used to monitor athletic performance data where an exemplary embodiments includes run data. Other data can also be recorded and monitored by the watch 10 including data generated in a gym setting such as a treadmill or other gym equipment including stair climbers, elliptical machines, rowing machines, bike machines. Other types of data can also be included such as heart rate, biking data or other physiological data. Communication by the watch 10 with the computer and/or Remote Site (or other network connections) can take other forms such as other USB connections, radio, cellular, 3G, other wireless connections or other general connection systems. The various user interface features can be implemented on any type of portable device described herein.

Figure 126:
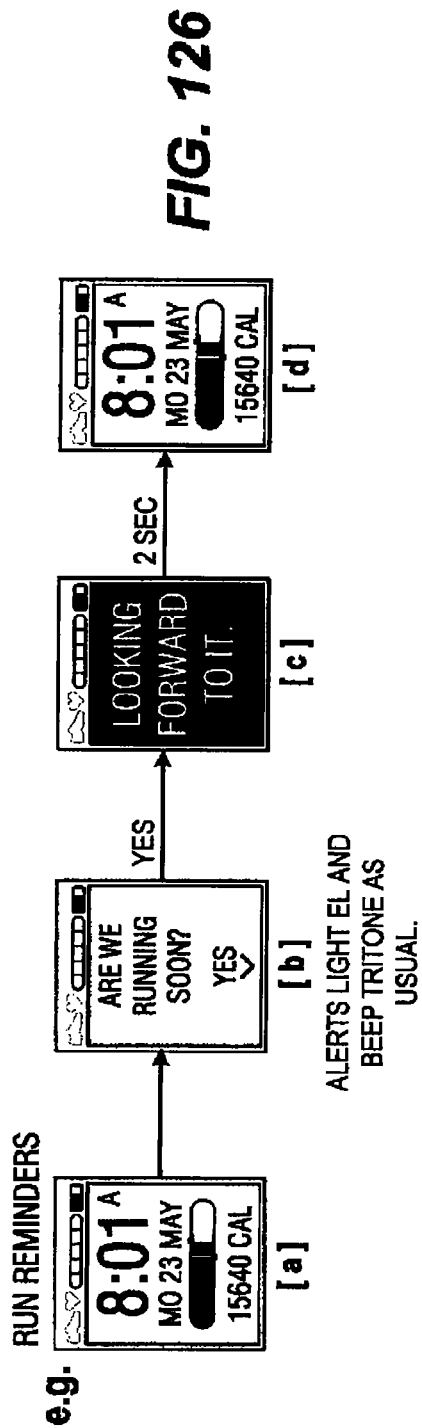

FIG. 126 illustrates run reminder interfaces in which a user may be reminded of an upcoming workout or to schedule a workout if none have been planned. For example, the user may be prompted to confirm that the user will be performing a workout soon. If the user does confirm the an upcoming workout, the interface may display an encouraging message such as "LOOKING FORWARD TO IT." The interface may then return to a time of day display.

FIGS. 131 and 132 illustrate zoning principles for defining a manner in which information is displayed on a display such as that of watch 10. For example, in FIG. 131, the information may be positioned and sized differently if the time is 4 digits instead of 3. In FIG. 132, a layout may be defined based on the number of items to be displayed. For example, in a 4 item layout, the elapsed time, distance, average pace and calories may be displayed with 5 pixels between lines. In another example, a 5 item layout may include elapsed time, distance, average pace, calories calibration, average heart rate and/or lap times. Instead of 5 pixels between each line as in a 4 item layout, there might only be 3 pixels between lines. FIG. 133 illustrates example 5 item layout interfaces.

Figure 134:
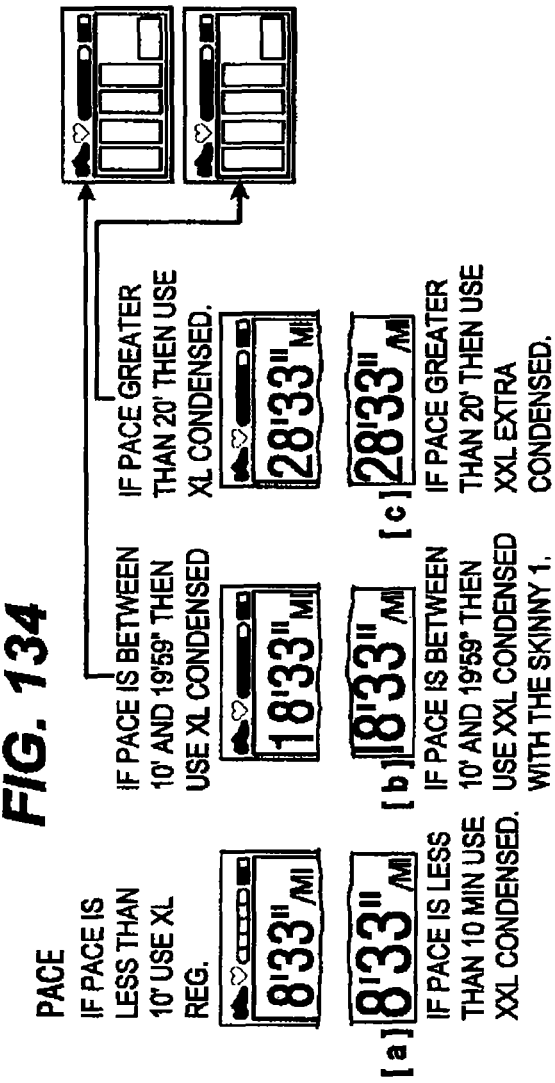
Figure 135:
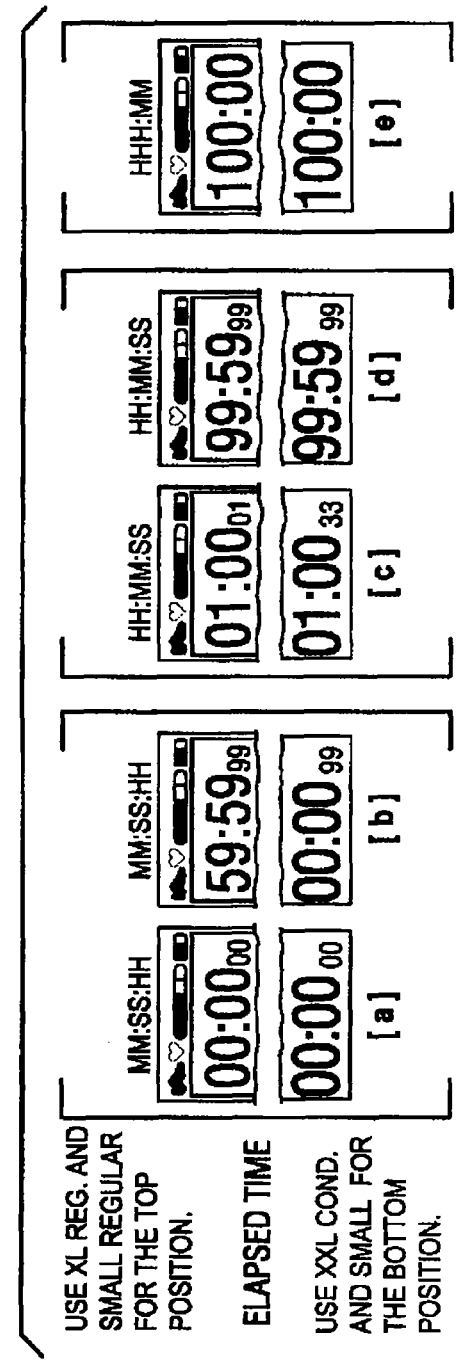
Figure 136:
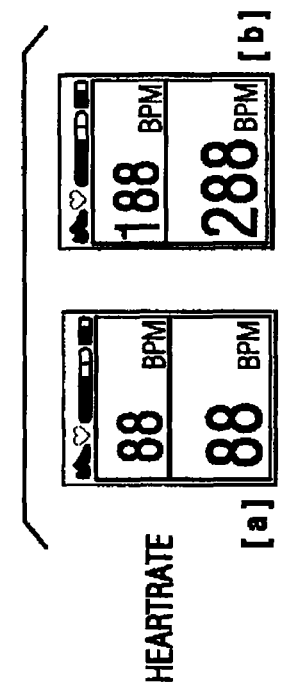
Figure 137:
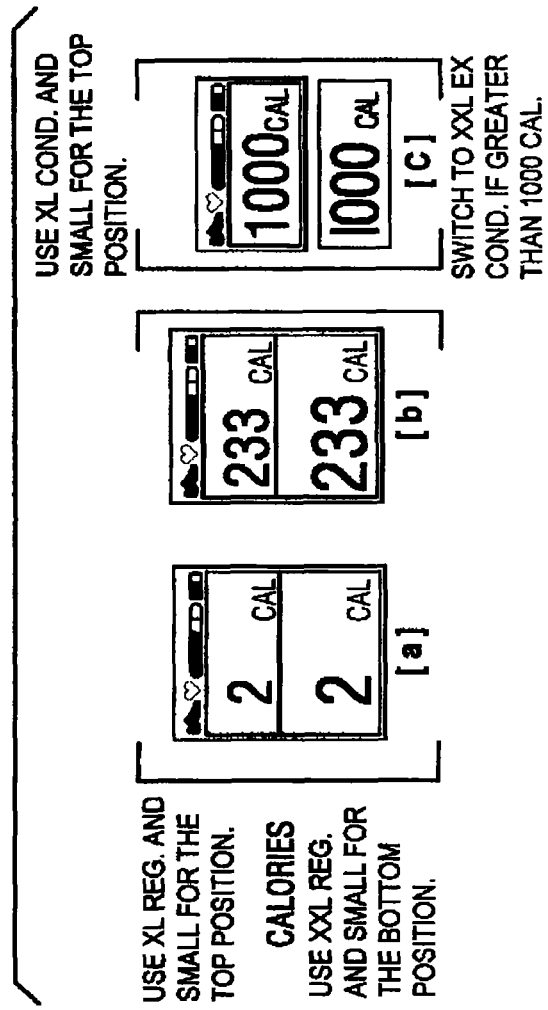

FIGS. 134-138 illustrate display configurations for different type of information including pace information, elapsed time, heart rate, calories burned and distance. In FIG. 134, pace information may be displayed in different font sizes depending on the pace. For example, if the pace is less then 10 minutes, the font may be displayed in a first font size. Ff the pace is between 10 minutes and 19 minutes and 59 seconds, the pace may be displayed in a second font size (e.g., a condensed font size).

Figure 139A:
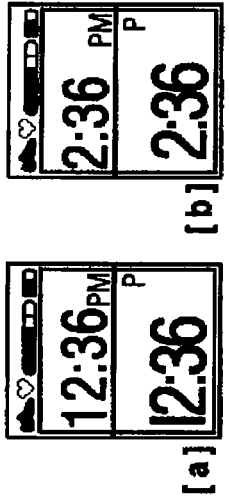
Figure 139B:
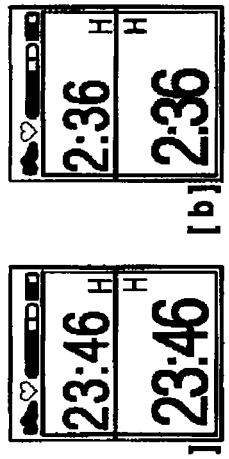

FIGS. 139*a* and 139*b* illustrate example interfaces for displaying a time of day. The size and position of the time of day may differ depending on whether the time of day is displayed in a top portion or a bottom portion.

FIG. 140 illustrates example user interfaces that displays a time of day in addition to a goal. Goals may include burning a certain number of calories, running farther than a previous distance, running faster or running with greater frequency. The display may be organized or configured using different fonts, positions and font sizes depending on the amount of space needed (e.g., an amount of text that needs to be displayed).

According to one or more arrangements, an amount of time for which a backlight remain active may be configured automatically and/or dynamically depending on the function or process that is being performed. For example, if a user is viewing workout data, the backlight may remain active for a longer period of time (e.g., 15 or 30 seconds) than a default backlight period (e.g., 5 seconds). By dynamically adjusting the backlight period based on a function being performed, a user may be able to complete the desired function or process without having the backlight turn off in the middle of completing the desired function or process. If a backlight period is not defined for a particular function or process, the device (e.g., watch 10) may use the default backlight period. In one example, the backlight active time period may correspond to an amount of time allotted for receiving user input, wherein reception of user input activates or renews the time period for backlighting. The device and/or systems thereof may further learn time periods based on a user's previous interactions. For example, if a user views a workout statistic interface, on average, for 10 seconds (e.g., as measured by a time a user initiates the interface and a time the user either turns off backlighting or switches to another interface), the active backlighting time period for that interface may be defined as 10 seconds.

Data tracked, stored, used and/or monitored by watch 10 may include geographic location-based sensor information. For example, watch 10 may include or be linked to a GPS device that provides the current location of watch 10. This information may be used to calculate a pace, a current distance run, an elevation, location comparison information for two or more users, start/end of laps and the like.

The various embodiments of the device of the present invention provides enhanced functionality in recording and monitoring athletic performance data. Data can regularly be uploaded to the computer as well as the Remote Site as described herein. In addition, data from the Remote Site can be downloaded to the device wherein the user can take the Remote Site with the user. The housing provides for a robust wearable watch. The housing structure can absorb the shocks and impacts of running such that the controller can operate smoothly. Additionally, the housing structure prevents debris, water, perspiration or other moisture from ingress into the interior of the housing where it could contaminate the controller and adversely affect operability. In one exemplary embodiment, the housing is water-resistant to approximately five atmospheres of pressure. The user interface configuration provides simple and easy operation of the watch, particularly the tri-axis configuration. The user can easily perform functions such as using the shock sensor and, in particular, mark laps by tapping the front face or crystal of the device. With such an easy operation, the user can focus on the athletic performance rather than to locate a proper user input on the watch. The user interface provides many features as described herein to provide enhanced operability of the device.

While the specific embodiments have been illustrated and described, numerous modifications come to mind without significantly departing from the spirit of the invention and the scope of protection is only limited by the scope of the accompanying Claims.

What is claimed is:

1. An activity monitoring watch comprising:
    a wristband configured to be worn by a user; and
    an electronic module attached to the wristband, the electronic module having a controller and a screen configured to receive a plurality of user inputs,
    including a first user input and a second user input configured to be applied by the user by tapping against the electronic module, and
    wherein the controller is configured to:
        generate a user interface displaying a scrollable menu of athletic activity functions, wherein each of the athletic activity functions is independently user-selectable from other ones of the athletic activity functions;
        generate a time of day interface comprising a time of day simultaneously displayed in conjunction with a workout summary comprising a plurality of workouts performed over a predefined time period;
        display a first display on the user interface responsive to the first user input that comprises the user tapping the electronic module with a first force, the first force comprising a first magnitude and a first direction; and
        display a second display on the user interface responsive to the second user input that comprises the user tapping the electronic module with a second force, the second force comprising a second magnitude, greater than the first magnitude, and the second force being applied along substantially the first direction, and
    wherein the controller is configured to prevent additional taps of the screen from activating the first or second displays for a set period of time.

2. The activity monitoring watch of claim 1, wherein the user interface further includes a user-moveable focus bar configured to identify a function on which a user is currently focused, and
    wherein information relating to the identified function is displayed in a scrolling manner within the focus bar.

3. The activity monitoring watch of claim 2, wherein the identified function is a workout history function and the information relating to the workout history function includes a statistic of a most recent workout.

4. The activity monitoring watch of claim 1, wherein the controller is further configured to:
    determine the user has achieved a goal; and
    in response to determining that the user has achieved the goal, generate an interface providing an indication that a message from another user is available.

5. The activity monitoring watch of claim 1, wherein each of the plurality of workouts is represented by a progress bar indicating an target workout amount and an actual workout amount.

6. The activity monitoring watch of claim 5, wherein the controller is further configured to generate an interface comprising a message encouraging the user to perform a workout in response to determining that the user has not performed a workout in a most recent predefined amount of time.

7. The activity monitoring watch of claim 6, wherein the message includes a prompt for user input to confirm an upcoming workout and wherein the controller is further configured to generate another message in response to the user input corresponding to a confirmation of the upcoming workout, wherein the other message comprises positive reinforcement of the user's confirmation.

8. The activity monitoring watch of claim 1, wherein the controller is further configured to:
    receive an instruction to exit a function; and
    in response to the exit instruction, return to a default display mode of the activity monitoring watch, the default display mode corresponding to a time of day function and comprising the time of day interface.

9. A portable athletic activity monitoring device comprising:
    a processor; and
    memory operatively coupled to the processor and storing computer readable instructions that, when executed, cause the device to:
        generate a user interface comprising a time of day simultaneously displayed with a plurality of progress meters corresponding to one or more athletic activity goals specified by a user,
        update the user interface based upon a first user input mechanism being activated by the user tapping the device with a first force, the first force comprising a first magnitude and a first direction; and
        update the user interface with a second user input mechanism being activated by the user tapping the device with a second force, the second force comprising a second magnitude, greater than the first magnitude, and the second force being applied along substantially the first direction,
    detect athletic activity performed by the user; and
    modify an appearance of at least one of the plurality of progress meters to reflect the detected athletic activity performed by the user,
    wherein the user interface is displayed when the user is not performing an athletic workout, wherein the plurality of progress meters includes a day-by-day breakdown of workouts performed over a predefined time period, the day-by-day breakdown including a first progress meter corresponding to a future day and a second progress meter corresponding to a current or previous day, and
    wherein the processor is configured to prevent additional taps of the device from activating the first or second user inputs for a set period of time.

10. The portable athletic activity monitoring device of claim 9, wherein the user interface includes an animated goal display comprising a plurality of goals displayed sequentially.

11. The portable athletic activity monitoring device of claim 9, wherein the one or more goals comprises a plurality of sub-goals and wherein the plurality of progress meters corresponds to the plurality of sub-goals and wherein the plurality of progress meters are simultaneously displayed in the user interface.

12. The portable athletic activity monitoring device of claim 11, wherein the plurality of sub-goals comprise a plurality of daily sub-goals, wherein the first progress meter corresponds to a first daily sub-goal and the second progress meter corresponds to a second daily sub-goal.

13. The portable athletic activity monitoring device of claim 9, wherein the computer readable instructions, when executed, further cause the device to:
    determine whether the user is on track to complete the specified one or more goals; and
    generate a reminder message in response to determining that the user is not on track to complete the specified one or more goals.

14. A method comprising:
    generating, by a portable athletic activity monitoring device, a user interface comprising a time of day simultaneously displayed with a plurality of progress meters corresponding to one or more athletic activity goals specified by a user;
    displaying a first display on the user interface responsive to a first user input mechanism being activated by the user tapping the device with a first force, the first force comprising a first magnitude and a first direction;
    displaying a second display on the user interface responsive to a second user input mechanism being activated by the user tapping the device with a second force, the second force comprising a second magnitude, greater than the first magnitude, and the second force being applied along substantially the first direction;
    detecting, by the portable athletic activity monitoring device, an athletic activity performed by the user; and
    modifying, by the portable athletic activity monitoring device, an appearance of at least one of the plurality of progress meters to reflect the detected athletic activity performed by the user,
    wherein the user interface is displayed when the user is not performing an athletic workout, wherein the plurality of progress meters includes a day-by-day breakdown of workouts performed over a predefined time period, the day-by-day breakdown including a first progress meter corresponding to a future day and a second progress meter corresponding to a current or previous day, and
    wherein additional taps of the device are prevented from activating the first or second displays for a set period of time.

15. The method of claim 14, wherein the one or more goals comprises a plurality of sub-goals and wherein the plurality of progress meters corresponds to the plurality of sub-goals and wherein the plurality of progress meters are simultaneously displayed in the user interface.

16. The method of claim 15, wherein the plurality of sub-goals comprise a plurality of daily sub-goals, wherein the first progress meter corresponds to a first daily sub-goal and the second progress meter corresponds to a second daily sub-goal.

17. The method of claim 14, wherein the user interface further includes a time of day displayed simultaneously with the plurality of progress meters.

18. The method of claim 14, further comprising:
    determine whether the user is on track to complete the specified one or more goals; and
    generate a reminder message in response to determining that the user is not on track to complete the specified one or more goals.

* * * * *